(12) United States Patent
Long et al.

(10) Patent No.: US 12,271,795 B1
(45) Date of Patent: Apr. 8, 2025

(54) SYSTEMS AND METHODS FOR PARALLEL EXPLORATION OF A HYPERPARAMETER SEARCH SPACE

(71) Applicant: SAS Institute Inc., Cary, NC (US)

(72) Inventors: Xindian Long, Cary, NC (US); Liping Cai, Cary, NC (US); Xingqi Du, McKinney, TX (US); Steven Eric Krueger, Raleigh, NC (US); Joshua David Griffin, Harrisburg, NC (US); Yan Xu, Cary, NC (US); Scott Russell Pope, Cary, NC (US); Lawrence Edmund Lewis, Durham, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 19/000,713

(22) Filed: Dec. 24, 2024

Related U.S. Application Data

(63) Continuation of application No. 19/000,685, filed on Dec. 23, 2024, which is a continuation-in-part of application No. 19/000,641, filed on Dec. 23, 2024.

(60) Provisional application No. 63/680,807, filed on Aug. 8, 2024, provisional application No. 63/660,761, filed on Jun. 17, 2024, provisional application No. 63/637,188, filed on Apr. 22, 2024.

(51) Int. Cl.
*G06N 20/00* (2019.01)

(52) U.S. Cl.
CPC .................. *G06N 20/00* (2019.01)

(58) Field of Classification Search
None
See application file for complete search history.

(56) References Cited

U.S. PATENT DOCUMENTS

2021/0304003 A1* 9/2021 Johnson ................ G06F 18/217

OTHER PUBLICATIONS

Hutter, Frank, Lars Kotthoff, and Joaquin Vanschoren. Automated machine learning: methods, systems, challenges. Springer Nature, 2019. 223 pages. (Year: 2019).*
Raiaan, Mohaimenul Azam Khan, Sadman Sakib, Nur Mohammad Fahad, Abdullah Al Mamun, Md Anisur Rahman, Swakkhar Shatabda, and Md Saddam Hossain Mukta. "A systematic review of hyperparameter optimization techniques in Convolutional Neural Networks." Decision Analytics Journal (2024): 100470. (Year: 2024).*

(Continued)

*Primary Examiner* — Vincent Gonzales
(74) *Attorney, Agent, or Firm* — Padowithz Alce; Alce PLLC

(57) ABSTRACT

A system, method, and computer-program product includes selecting, by a controller node, a plurality of hyperparameter search points from a hyperparameter search space; instructing, by the controller node, one or more worker nodes to concurrently train a plurality of machine learning models for a target number of epochs using the plurality of hyperparameter search points; receiving, from the one or more worker nodes, a plurality of performance metrics that measure a performance of the plurality of machine learning models during the target number of epochs; and removing, by the controller node, one or more underperforming hyperparameter search points from the plurality of hyperparameter search points according to a pre-defined performance metric ranking criterion associated with the plurality of performance metrics.

30 Claims, 61 Drawing Sheets

(56) References Cited

OTHER PUBLICATIONS

Rane et al., "Tools and frameworks for machine learning and deep learning: A review," Deep Science Publishing, Chapter 4, 2024, pp. 80-95.
Rahrooh et al., "Towards a framework for interoperability and reproducibility of predictive models," Elsevier, 2023, Journal of Biomedical Informatics, pp. 1-9.
Skopt, "Skopt's Top Level Minimization Functions," 2017, pp. 1.
Lee et al., "Towards Ensuring Software Interoperability Between Deep Learning Frameworks," Sciendo, vol. 13, No. 4., 2023, pp. 215-228.
Abukwaik et al.,. "How practical is it? Machine Learning for Identifying Conceptual Interoperability Constraints in API Documents," arXiv:1812.02096v1 [cs.SE], Dec. 5, 2018, pp. 1-20.
Nilsson et al., "Interoperability and machine-to-machine translation model with mappings to machine learning tasks," Mar. 26, 2019, pp. 1-7.
Martin et al., "BPMN4sML: A BPMN Extension for Serverless Machine Learning; Technology Independent and Interoperable Modeling of Machine Learning Workflows and their Serverless Deployment Orchestration," arXiv:2208.02030v1 [cs.SE], Aug. 2, 2022, pp. 1-113.
Grimmer et al., "Cross-Language Interoperability in a Multi-Language Runtime," ACM Transactions on Programming Languages and Systems, vol. 40, No. 2, May 2018.
Makhachashvilli et al., "Digital Interoperability of Foreign Languages Education," DHW, Dec. 2021, pp. 1-8.
Boukhers et al., "Enhancing Data Space Semantic Interoperability through Machine Learning: a Visionary Perspective," ACM, May 2023, pp. 1-6.
AWS, "AMS Advanced User Guide," Jun. 2024, pp. 1-864.
Azure Databricks, "Best Practices for Interoperability and Usability," Nov. 2024, pp. 1-5.
Bridging Divides: Language Interoperability | Voltron Data, 2023, pp. 1-19.
Altair, "Altair SLC™ With Fully Integrated SAS Language Compiler," Technical Document, May 2023, pp. 1-4.
Jacob Nilsson, "Machine Learning Concepts for Service Data Interoperability," Cyber-Physical Systems, pp. 1-174.
Skopt, "Getting Started," Scikit-Optimize Contributors, 2017, pp. 1.
Melodie Rush, "Getting Started with Python Integration to SAS Viya for Predictive Modeling-Fitting a Random Forest," SAS, Jun. 2024, pp. 1-11.
"Getting Started with Ray Tune" Ray 2.24.0, 2024, pp. 1-4.
Github, "Hyperopt-Sklearn," 2024, pp. 1-7.
Github, "Optuna/Optuna: A Hyerperameter Optimization Framework," 2024, pp. 1-6.
Github, "Sassoftware/Python-Swat: The SAS Scripting Wrapper for Analytics Transfer (SWAT)," 2024, pp. 1-4.
Hyperopt, "The Alternative Hyperparameter Optimization Technique You Need to Know," Feb. 2024, pp. 1-15.
Hyperopt, "Distributed Asynchronous Hyperparameter Optimization," Jun. 2023, pp. 1-3.
Databricks, "Model Selection Using Scikit-Learn, Hyperopt, and MLflow," 2024, pp. 1-7.
Databricks, "Hyperparameter Tuning," 2024, pp. 1-3.
Ava Klissouras, "integrating SAS and Python: An Intern's Journey of Growth," The SAS Data Science Blog, Jul. 2024, pp. 1-8.
Interop et al., "How do Multiple Languages Interact in One Project?" May 2009, pp. 1-5.
Azure Databricks, "Interoperability and Usability for the Data Lakehouse," Jun. 2024, pp. 1-2.
Wikipedia, Language Interoperabiltiy, 2024, pp. 1-2.
Zeid et al., "Interoperability in Smart Manufacturing: Research Challenges," MDPI, 2019, pp. 1-17.
Anh Nguyen, "Programming Language interoperability in cross-platform software development," School of Science, 2022, pp. 1-64.
Zacharewicz et al., "Model Driven Interoperability for System Engineering," Modelling, Aug. 2020, pp. 1-28.
"Optimize Your Optimization," 2017, pp. 1-7.
"Optuna: A Hyperparameter Optimization Framework", 2024, pp. 1-5.
"Ray Tune: Hyperparameter Tuning" 2024, pp. 1-3.
Scikit-Optimize, "Sequential Model-Based Optimization Toolbox," Jun. 2024, pp. 1-8.
Scikit-Optimize 0.10.2, "Sequential Model-Based Optimization in Python," 2024, pp. 1-2.
Nilsson et al., "AI Concepts for System of Systems Dynamic Interoperability," MDPI, 2024, pp. 1-19.
Azure, "What is Azure Machine Learing?" Microsoft Learn, 2024, pp. 1-9.

* cited by examiner

3000

3110
Transferring, using an application programming interface, a plurality of data blocks written in a first programming language from a first computer process to a second computer process that is configured to execute an algorithm written in a second programming language, wherein transferring a respective data block of the plurality of data blocks includes:

3110A
Serializing, using the application programming interface, the respective data block into a serialized data block based on a serialization protocol executed by the application programming interface, wherein the serialized data block is encoded in a programming language-agnostic data format

3110B
Writing, by the first computer process, the serialized data block to a cross-process queue in response to serializing the respective data block

3110C
Reading, by the second computer process, the serialized data block from the cross-process queue

3110D
Deserializing, using the application programming interface, the serialized data block retrieved from the cross-process queue into a deserialized data block that is encoded in a data structure of the second programming language based on a deserialization protocol executed by the application programming interface

3120
Executing, by the second computer process, the algorithm written in the second programming language based on providing at least a portion of the deserialized data block to the algorithm for data processing

FIG. 30

SYSTEMS AND METHODS FOR PARALLEL EXPLORATION OF A HYPERPARAMETER SEARCH SPACE

CROSS-REFERENCE TO RELATED APPLICATIONS

This application is a continuation of U.S. patent application Ser. No. 19/000,685, filed on 23 Dec. 2024, which is a continuation-in-part of U.S. patent application Ser. No. 19/000,641, filed on 23 Dec. 2024, which claims the benefit of U.S. Provisional Application No. 63/680,807, filed on 8 Aug. 2024, U.S. Provisional Application No. 63/660,761, filed on 17 Jun. 2024, and U.S. Provisional Application No. 63/637,188, filed on 22 Apr. 2024; each of which is incorporated herein by reference in its entirety for all purposes.

TECHNICAL FIELD

This invention relates generally to the machine learning field and, more specifically, to new and useful systems and methods for parallel exploration of a hyperparameter search space.

BACKGROUND

With the adoption of machine learning continuing to rise, the need for effectively configuring and optimizing machine learning models has become increasingly important. Machine learning models often rely on hyperparameters-parameters set before training begins—to govern their learning behavior and overall performance.

Existing methods for hyperparameter tuning are inefficient and resource intensive. For instance, traditional techniques that rely on trial-and-error often demand significant time and computational effort. Such approaches fail to thoroughly explore a hyperparameter search space, resulting in suboptimal model performance, wasted compute resources, and prolonged development cycles.

Accordingly, there is a need for new and improved systems and methods that enhance the efficiency and effectiveness of hyperparameter tuning. The embodiments of the present application provide technical solutions that at least address the needs described above, as well as the deficiencies of the state of the art.

BRIEF SUMMARY OF THE EMBODIMENTS

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

In one embodiment, a computer-program product comprising a non-transitory machine-readable storage medium storing computer instructions that, when executed by one or more processors, perform operations that includes: commencing a parent computer process that executes a set of instructions written in a first programming language based on receiving a request to perform an analytical operation on one or more datasets, wherein the parent computer process is configured to: access the one or more datasets, and store configuration data that specify the analytical operation to be performed on the one or more datasets; commencing at least one child computer process that is launched by the parent computer process when the parent computer process initiates an execution of the analytical operation on the one or more datasets, wherein the at least one child computer process is configured to run an analytical application written in a second programming language to perform the analytical operation on the one or more datasets; transmitting, by the at least one child computer process, one or more requests to the parent computer process to retrieve the one or more datasets and the configuration data; writing, by the parent computer process, the one or more datasets and the configuration data to a cross-process queue based on the parent computer process receiving the one or more requests; reading, by the at least one child computer process, the one or more datasets and the configuration data from the cross-process queue; and executing, using the analytical application, the analytical operation based on the one or more datasets and the configuration data in response to the at least one child computer process reading the one or more datasets and the configuration data from the cross-process queue.

In one embodiment, the parent computer process is executed within a first container of a containerized compute environment provided by an analytics compute service, wherein the first container is configured to execute the set of instructions written in the first programming language, the at least one child computer process is executed within a second container of the containerized compute environment provided by the analytics compute service, wherein the second container is configured to run the analytical application written in the second programming language, and the first container is different than the second container.

In one embodiment, the parent computer process is executed by an analytics compute service implemented by a distributed network of computers, and the at least one child computer process is executed by the analytics compute service implemented by the distributed network of computers.

In one embodiment, the parent computer process is executed by an analytics compute service, the at least one child computer process is executed by a remote service, and the analytics compute service operates independently of the remote service.

In one embodiment, the at least one child computer process operates as a leader process after the at least one child computer process is commenced, and the parent computer process operates as a listener process that is configured to receive and fulfill the one or more requests from the leader process.

In one embodiment, the request to perform the analytical operation on the one or more datasets is initiated by a user, the request to perform the analytical operation on the one or more datasets includes: the one or more datasets, an analytical function to perform on the one or more datasets, and a set of user-defined parameters required for executing the analytical function, and the configuration data includes the analytical function and the set of user-defined parameters.

In one embodiment, the parent computer process is configured to interpret the request from the user, wherein interpreting the request from the user includes: identifying, from the request, the one or more datasets to be used during the analytical operation, extracting, from the request, the analytical function to be performed on the one or more datasets, and extracting, from the request, the set of user-defined parameters required for executing the analytical function.

In one embodiment, the parent computer process is designed to process the request from the user, wherein processing the request from the user includes: parsing, from the request, the one or more datasets to be used during the analytical operation, parsing, from the request, the analytical function to be performed on the one or more datasets, and parsing, from the request, the set of user-defined parameters required for executing the analytical function.

In one embodiment, executing, using the analytical application, the analytical operation based on the one or more datasets and the configuration data includes: computing, using the analytical application, an analytical output based on the one or more datasets and the configuration data; and transmitting, by the at least one child computer process, the analytical output to the parent computer process.

In one embodiment, the at least one child computer process does not have permissions to write the analytical output to a computer database, the parent computer process has the permissions to write the analytical output to the computer database, the computer-program product further comprises computer instructions for performing operations including: in response to the parent computer process receiving the analytical output: writing, by the parent computer process, the analytical output to the computer database.

In one embodiment, the computer-program product further includes: generating, during the execution of the analytical operation, one or more logs that includes information associated with a status of the execution of the analytical operation; transmitting, by the at least one child computer process, the one or more logs to the parent computer process; and surfacing, by the parent computer process, the one or more logs to a user associated with the request during the execution of the analytical operation.

In one embodiment, the at least one child computer process includes a plurality of child computer processes, each child computer process of the plurality of child computer processes are launched by the parent computer process when the parent computer process initiates the execution of the analytical operation on the one or more datasets, and each child computer process is configured to run a distinct analytical application written in the second programming language to perform a distinct task of the analytical operation.

In one embodiment, the parent computer process and the at least one child computer process communicate using an application programming interface, the at least one child computer process transmits the one or more requests to the parent computer process using the application programming interface, the parent computer process writes the one or more datasets and the configuration data to the cross-process queue based on a serialization protocol defined by the application programming interface, and the at least one child computer process reads the one or more datasets and the configuration data from the cross-process queue based on a deserialization protocol defined by the application programming interface.

In one embodiment, writing, by the parent computer process, the one or more datasets and the configuration data to the cross-process queue includes: serializing the one or more datasets into one or more serialized datasets, wherein each serialized dataset of the one or more serialized datasets is in a language-agnostic format, and serializing the configuration data into serialized configuration data, wherein the serialized configuration data is in the language-agnostic format.

In one embodiment, reading, by the at least one child computer process, the one or more datasets and the configuration data from the cross-process queue includes: deserializing the one or more serialized datasets into one or more deserialized datasets that is compatible with the second programming language, and deserializing the serialized configuration data into deserialized configuration data that is compatible with the second programming language.

In one embodiment, executing, using the analytical application, the analytical operation based on the one or more datasets and the configuration data includes: computing, using the analytical application, an analytical output based on the one or more deserialized datasets and the deserialized configuration data.

In one embodiment, the cross-process queue is located in-memory of a single computer that is accessible by the parent computer process and the at least one child computer process.

In one embodiment, the parent computer process and the at least one child computer process operate within an operating system of a computer, the computer includes random access memory, the parent computer process and the at least one child computer process have access to the random access memory of the computer, and the cross-process queue is located within the random access memory of the computer.

In one embodiment, the parent computer process and the at least one child computer process operate within an operating system of a computer, the computer includes shared memory that is accessible by the parent computer process and the at least one child computer process, and the cross-process queue is located within the shared memory of the computer.

In one embodiment, the cross-process queue is configured using shared memory of a single computer, and the cross-process queue is an in-memory queuing mechanism that enables the parent computer process and the at least one child computer process to transfer data or information between the parent computer process and the at least one child computer process by reading and writing the data or the information to the cross-process queue.

In one embodiment, a computer-implemented method includes commencing a parent computer process that executes a set of instructions written in a first programming language based on receiving a request to perform an analytical operation on one or more datasets, wherein the parent computer process is configured to: access the one or more datasets, and store configuration data that specify the analytical operation to be performed on the one or more datasets; commencing at least one child computer process that is launched by the parent computer process when the parent computer process initiates an execution of the analytical operation on the one or more datasets, wherein the at least one child computer process is configured to run an analytical application written in a second programming language to perform the analytical operation on the one or more datasets; transmitting, by the at least one child computer process, one or more requests to the parent computer process to retrieve the one or more datasets and the configuration data; writing, by the parent computer process, the one or more datasets and the configuration data to a cross-process queue based on the parent computer process receiving the one or more requests; reading, by the at least one child computer process, the one or more datasets and the configuration data from the cross-process queue; and executing, using the analytical application, the analytical operation based on the one or more datasets and the configuration data in response to the at least one child computer process reading the one or more datasets and the configuration data from the cross-process queue.

In one embodiment, the parent computer process is executed within a first container of a containerized compute environment provided by an analytics compute service, wherein the first container is configured to execute the set of instructions written in the first programming language, the at least one child computer process is executed within a second container of the containerized compute environment provided by the analytics compute service, wherein the second container is configured to run the analytical application written in the second programming language, and the first container is different than the second container.

In one embodiment, the parent computer process is executed by an analytics compute service implemented by a distributed network of computers, and the at least one child computer process is executed by the analytics compute service implemented by the distributed network of computers.

In one embodiment, the parent computer process is executed by an analytics compute service, the at least one child computer process is executed by a remote service, and the analytics compute service operates independently of the remote service.

In one embodiment, the at least one child computer process operates as a leader process after the at least one child computer process is commenced, and the parent computer process operates as a listener process that is configured to receive and fulfill the one or more requests from the leader process.

In one embodiment, the request to perform the analytical operation on the one or more datasets is initiated by a user, the request to perform the analytical operation on the one or more datasets includes: the one or more datasets, an analytical function to perform on the one or more datasets, and a set of user-defined parameters required for executing the analytical function, and the configuration data includes the analytical function and the set of user-defined parameters.

In one embodiment, a computer-implemented system includes: one or more processors; a memory; a computer-readable medium operably coupled to the one or more processors, the computer-readable medium having computer-readable instructions stored thereon that, when executed by the one or more processors, cause a computing device to perform operations comprising: commencing a parent computer process that executes a set of instructions written in a first programming language based on receiving a request to perform an analytical operation on one or more datasets, wherein the parent computer process is configured to: access the one or more datasets, and store configuration data that specify the analytical operation to be performed on the one or more datasets; commencing at least one child computer process that is launched by the parent computer process when the parent computer process initiates an execution of the analytical operation on the one or more datasets, wherein the at least one child computer process is configured to run an analytical application written in a second programming language to perform the analytical operation on the one or more datasets; transmitting, by the at least one child computer process, one or more requests to the parent computer process to retrieve the one or more datasets and the configuration data; writing, by the parent computer process, the one or more datasets and the configuration data to a cross-process queue based on the parent computer process receiving the one or more requests; reading, by the at least one child computer process, the one or more datasets and the configuration data from the cross-process queue; and executing, using the analytical application, the analytical operation based on the one or more datasets and the configuration data in response to the at least one child computer process reading the one or more datasets and the configuration data from the cross-process queue.

In one embodiment, the parent computer process is executed within a first container of a containerized compute environment provided by an analytics compute service, wherein the first container is configured to execute the set of instructions written in the first programming language, the at least one child computer process is executed within a second container of the containerized compute environment provided by the analytics compute service, wherein the second container is configured to run the analytical application written in the second programming language, and the first container is different than the second container.

In one embodiment, the parent computer process is executed by an analytics compute service implemented by a distributed network of computers, and the at least one child computer process is executed by the analytics compute service implemented by the distributed network of computers.

In one embodiment, the parent computer process is executed by an analytics compute service, the at least one child computer process is executed by a remote service, and the analytics compute service operates independently of the remote service.

In one embodiment, the at least one child computer process operates as a leader process after the at least one child computer process is commenced, and the parent computer process operates as a listener process that is configured to receive and fulfill the one or more requests from the leader process.

In one embodiment, a computer-program product comprising a non-transitory machine-readable storage medium storing computer instructions that, when executed by one or more processors, perform operations including: receiving, by a first computer process operating in a first programming language, a request to perform an analytical function of a plurality of predefined analytical functions executable by an analytics service, wherein: the analytical function includes a set of instructions for implementing an algorithm that is (i) configured to perform the analytical function and (ii) written in a second programming language, and the first computer process provides a first set of application programming interface (API) functions for responding to data requests; launching, by the first computer process, a second computer process operating in the second programming language that implements the algorithm in response to the first computer process commencing an execution of the analytical function, wherein: the second computer process provides a second set of application programming interface (API) functions for creating and transmitting the data requests; invoking one or more API functions of the first set of API functions by the first computer process and one or more API functions of the second set of API functions by the second computer process to transfer one or more analytical function parameters and one or more datasets specified within the request to perform the analytical function from the first computer process to the second computer process; computing, by the second computer process executing the algorithm, an analytical result for the analytical function based on providing the one or more analytical function parameters and the one or more datasets to the algorithm; and transferring the analytical result from the second computer process to the first computer process.

In one embodiment, the computer-program product further includes during the launch of the second computer process: sending, by the first computer process, a process identifier of the first computer process to the second computer process, and pairing the second computer process with the first computer process based on the process identifier of the first computer process.

In one embodiment, the computer-program product further includes in response to pairing the second computer process with the first computer process: writing, to a first cross-process queue, one or more requests for the one or more analytical function parameters and the one or more datasets in response to invoking, by the second computer process, the one or more API functions of the second set of API functions, writing, to a second cross-process queue different from the first cross-process queue, one or more response messages that includes the one or more analytical function parameters and the one or more datasets in response to invoking, by the first computer process, the one or more API functions of the first set of API functions, and obtaining, by the second computer process, the one or more analytical function parameters and the one or more datasets specified within the request in response to reading the one or more response messages from the second cross-process queue.

In one embodiment, invoking, by the second computer process, the one or more API functions of the second set of API functions includes invoking a parameters-request API function, and the computer-program product further comprises computer instructions for performing operations including: in response to the second computer process invoking the parameters-request API function: creating, by the parameters-request API function, a request message encoded in the second programming language that includes a request to obtain parameter data associated with the analytical function from the first computer process; serializing, using a serialization protocol of the parameters-request API function, the request message encoded in the second programming language into a serialized request message encoded in a binary data format; and writing, by a data writer of the parameters-request API function, the serialized request message to a first cross-process queue.

In one embodiment, the computer-program product further includes detecting, by the first computer process, the serialized request message within the first cross-process queue; invoking, by the first computer process, a parameters-response API function of the first set of API functions in response to detecting the serialized request message within the first cross-process queue; in response to invoking the parameters-response API function: reading, by the first computer process, the serialized request message from the first cross-process queue using a data reader of the parameters-response API function; and deserializing, by the first computer process, the serialized request message into a deserialized request message encoded in the first programming language based on a deserialization protocol of the parameters-response API function.

In one embodiment, the computer-program product further includes retrieving, using the parameters-response API function, the one or more analytical function parameters specified within the request to perform the analytical function in response to deserializing the serialized request message; creating, by the first computer process, a response message to the request for parameter data that includes the one or more analytical function parameters encoded in the first programming language using the parameters-response API function; serializing, by the first computer process, the response message into a serialized response message that includes the one or more analytical function parameters encoded in the binary data format based on a serialization protocol of the parameters-response API function; and writing, by the first computer process, the serialized response message to a second cross-process queue using a data writer of the parameters-response API function.

In one embodiment, the computer-program product further includes detecting, by the second computer process, the serialized response message within the second cross-process queue; invoking, by the second computer process, a parameters response handler API function of the second set of API functions in response to detecting the serialized response message within the second cross-process queue; in response to invoking the parameters response handler API function: reading, by the second computer process, the serialized response message from the second cross-process queue using a data reader of the parameters response handler API function; deserializing, by the second computer process, the serialized response message into a deserialized response message that includes the one or more analytical function parameters encoded in the second programming language based on a deserialization protocol of the parameters response handler API function; and extracting, by the second computer process, the one or more analytical function parameters encoded in the second programming language from the deserialized response message.

In one embodiment, invoking, by the second computer process, the one or more API functions of the second set of API functions includes invoking a tabular data-request API function, and the computer-program product further comprises computer instructions for performing operations including: in response to the second computer process invoking the tabular data-request API function: creating, by the tabular data-request API function, a request message encoded in the second programming language that includes a request to obtain tabular data associated with the analytical function from the first computer process; serializing, using a serialization protocol of the tabular data-request API function, the request message encoded in the second programming language into a serialized request message encoded in a binary data format; and writing, by a data writer of the tabular data-request API function, the serialized request message to a first cross-process queue.

In one embodiment, the computer-program product further includes detecting, by the first computer process, the serialized request message within the first cross-process queue; invoking, by the first computer process, a tabular data-response API function of the first set of API functions in response to detecting the serialized request message within the first cross-process queue; in response to invoking the tabular data-response API function: reading, by the first computer process, the serialized request message from the first cross-process queue using a data reader of the tabular data-response API function; and deserializing, by the first computer process, the serialized request message into a deserialized request message encoded in the first programming language based on a deserialization protocol of the tabular data-response API function.

In one embodiment, the computer-program product further includes retrieving, using the tabular data-response API function, the one or more datasets specified within the request to perform the analytical function in response to deserializing the serialized request message; creating, by the first computer process, a response message to the request for tabular data that includes the one or more datasets encoded in the first programming language using the tabular data-response API function; serializing, by the first computer process, the response message into a serialized response message that includes the one or more datasets encoded in the binary data format based on a serialization protocol of the tabular data-response API function; and writing, by the first computer process, the serialized response message to a second cross-process queue using a data writer of the tabular data-response API function.

In one embodiment, the computer-program product further includes detecting, by the second computer process, the serialized response message within the second cross-process queue; invoking, by the second computer process, a tabular data response handler API function of the second set of API functions in response to detecting the serialized response message within the second cross-process queue; in response to invoking the tabular data response handler API function: reading, by the second computer process, the serialized response message from the second cross-process queue using a data reader of the tabular data response handler API function; deserializing, by the second computer process, the serialized response message into a deserialized response message that includes the one or more datasets encoded in the second programming language based on a deserialization protocol of the tabular data response handler API function; and extracting, by the second computer process, the one or more datasets encoded in the second programming language from the deserialized response message.

In one embodiment, invoking, by the second computer process, the one or more API functions of the second set of API functions includes invoking a tabular data-request API function, and the computer-program product further comprises computer instructions for performing operations including: in response to the second computer process invoking the tabular data-request API function: transmitting, via a first cross-process queue, a serialized request message to the first computer process, wherein the serialized request message includes a request for the one or more datasets; writing, using a tabular data-response API function invoked by the first computer process, a serialized response message that includes the one or more datasets encoded in a binary data format to a second cross-process queue different from the first cross-process queue; and reading, using a tabular data response handler API function invoked by the second computer process, the serialized response message from the second cross-process queue, wherein reading the serialized response message from the cross-process queue includes: reading, using a data reader of the tabular data response handler API function, the one or more datasets encoded in the binary data format from the second cross-process queue, and converting, using the data reader of the tabular data response handler API function, the one or more datasets encoded in the binary data format to one or more representations of the one or more datasets in the second programming language.

In one embodiment, the second programming language corresponds to a python-based programming language, converting, using the data reader of the tabular data response handler API function, the one or more datasets encoded in the binary data format to the one or more representations of the one or more datasets in the second programming language includes: converting each dataset of the one or more datasets to a corresponding pandas dataframe object.

In one embodiment, the computer-program product further includes invoking, by the second computer process, a log writer API function to transfer one or more log messages generated during the execution of the algorithm, and writing, using a data writer of the log writer API function, a serialized message that includes the one or more log messages encoded in a binary data format to a cross-process queue.

In one embodiment, the computer-program product further includes detecting, by the first computer process, the serialized message within the cross-process queue; invoking, by the first computer process, a log reader API function in response to detecting the serialized message within the cross-process queue; in response to invoking the log reader API function: reading, by the first computer process, the serialized message from the cross-process queue using the log reader API function, wherein reading the serialized message from the cross-process queue includes: reading, using a data reader of the log reader API function, the one or more log messages encoded in the binary data format from the cross-process queue, and deserializing, using the data reader of the log reader API function, the one or more log messages encoded in the binary data format into one or more deserialized log messages encoded in the first programming language.

In one embodiment, the computer-program product further includes surfacing, by the first computer process, a set of log messages that includes one or more error events or one or more informational events that occurred in the first computer process and the second computer process, wherein the set of log messages includes: a first subset of log messages generated by the first computer process, and a second subset of log messages generated by the second computer process, wherein the second subset of log messages includes the one or more deserialized log messages.

In one embodiment, the analytical result includes one or more data tables outputted by the algorithm, and the computer-program product further comprises computer instructions for performing operations including: invoking, by the second computer process, an output data writer API function, in response to the second computer process invoking the output data writer API function: writing, by the second computer process, a serialized message that includes the one or more data tables in a binary data format to a cross-process queue using a data writer of the output data writer API function; and reading, using an output data reader API function invoked by the first computer process, the serialized message from the cross-process queue, wherein reading the serialized message from the cross-process queue includes: reading, using a data reader of the output data reader API function, the one or more data tables in the binary data format from the cross-process queue, and deserializing, using the data reader of the output data reader API function, the one or more data tables in the binary data format into one or more deserialized data tables encoded in the first programming language; and writing, by the first computer process, the one or more deserialized data tables encoded in the first programming language to a computer database of the analytics service.

In one embodiment, the computer-program product further includes obtaining, by the second computer process, metadata related to the execution of the algorithm; invoking, by the second computer process, an algorithm metadata writer API function; and in response to the second computer process invoking the algorithm metadata writer API function: writing, to a cross-process queue, a serialized message that includes the metadata in a binary data format using a data writer of the algorithm metadata writer API function; and reading, by the first computer process, the serialized message from the cross-process queue in response to the first computer process invoking an algorithm metadata reader API function, wherein reading the serialized message from the cross-process queue includes: reading, using a data reader of the algorithm metadata reader API function, the metadata in the binary data format from the cross-process queue, and deserializing, using the data reader of the algorithm metadata reader API function, the metadata in the binary data format into deserialized metadata encoded in the first programming language; and surfacing, by the first computer process, a metadata summary artifact that includes the deserialized metadata.

In one embodiment, the computer-program product further includes augmenting the plurality of predefined analytical functions executable by the analytics service to include a third-party analytical function created by a user of the analytics service, wherein: the third-party analytical function is configured to perform a target analytical computation using a user-created algorithm written in the second programming language, and the analytical function of the plurality of predefined analytical functions corresponds to the third-party analytical function.

In one embodiment, invoking, by the second computer process, the one or more API functions of the second set of API functions includes invoking, by the second computer process, a first API function to request the one or more analytical function parameters from the first computer process, and after the second computer process receives the one or more analytical function parameters, invoking, by the second computer process, a second API function to request the one or more datasets.

In one embodiment, invoking, by the second computer process, the one or more API functions of the second set of API functions includes sequentially invoking a plurality of API functions.

In one embodiment, invoking, by the second computer process, the one or more API functions of the second set of API functions includes simultaneously invoking a plurality of API functions.

In one embodiment, the computer-program product further includes: writing, to a single-producer single-consumer cross-process queue, one or more requests for the one or more analytical function parameters and the one or more datasets in response to invoking, by the second computer process, the one or more API functions of the second set of API functions, writing, to multiple-producer multiple-consumer cross-process queue, one or more response messages that includes the one or more analytical function parameters and the one or more datasets in response to invoking, by the first computer process, the one or more API functions of the first set of API functions, and obtaining, by the second computer process, the one or more analytical function parameters and the one or more datasets specified within the request in response to reading the one or more response messages from the multiple-producer multiple-consumer cross-process queue.

In one embodiment, a computer-implemented method includes: receiving, by a first computer process operating in a first programming language, a request to perform an analytical function of a plurality of predefined analytical functions executable by an analytics service, wherein: the analytical function includes a set of instructions for implementing an algorithm that is (i) configured to perform the analytical function and (ii) written in a second programming language, and the first computer process provides a first set of application programming interface (API) functions for responding to data requests; launching, by the first computer process, a second computer process operating in the second programming language that implements the algorithm in response to the first computer process commencing an execution of the analytical function, wherein: the second computer process provides a second set of application programming interface (API) functions for creating and transmitting the data requests; invoking one or more API functions of the first set of API functions by the first computer process and one or more API functions of the second set of API functions by the second computer process to transfer one or more analytical function parameters and one or more datasets specified within the request to perform the analytical function from the first computer process to the second computer process; computing, by the second computer process executing the algorithm, an analytical result for the analytical function based on providing the one or more analytical function parameters and the one or more datasets to the algorithm; and transferring the analytical result from the second computer process to the first computer process.

In one embodiment, the computer-implemented method further includes: during the launch of the second computer process: sending, by the first computer process, a process identifier of the first computer process to the second computer process, and pairing the second computer process with the first computer process based on the process identifier of the first computer process.

In one embodiment, the computer-implemented method further includes: in response to pairing the second computer process with the first computer process: writing, to a first cross-process queue, one or more requests for the one or more analytical function parameters and the one or more datasets in response to invoking, by the second computer process, the one or more API functions of the second set of API functions, writing, to a second cross-process queue different from the first cross-process queue, one or more response messages that includes the one or more analytical function parameters and the one or more datasets in response to invoking, by the first computer process, the one or more API functions of the first set of API functions, and obtaining, by the second computer process, the one or more analytical function parameters and the one or more datasets specified within the request in response to reading the one or more response messages from the second cross-process queue.

In one embodiment, the computer-implemented method further includes in response to pairing the second computer process with the first computer process: writing, to a command cross-process queue, one or more requests for the one or more analytical function parameters and the one or more datasets in response to invoking, by the second computer process, the one or more API functions of the second set of API functions, writing, to a data transfer cross-process queue different from the command cross-process queue, one or more response messages that includes the one or more analytical function parameters and the one or more datasets in response to invoking, by the first computer process, the one or more API functions of the first set of API functions, and obtaining, by the second computer process, the one or more analytical function parameters and the one or more datasets specified within the request in response to reading the one or more response messages from the data transfer cross-process queue.

In one embodiment, the command cross-process queue is a single-producer, single-consumer cross-process queue, and the data transfer cross-process queue is a multiple-producer, multiple-consumer cross-process queue.

In one embodiment, a computer-implemented system includes: one or more processors; a memory; a computer-readable medium operably coupled to the one or more processors, the computer-readable medium having computer-readable instructions stored thereon that, when executed by the one or more processors, cause a computing device to perform operations comprising: receiving, by a first computer process operating in a first programming language, a request to perform an analytical function of a plurality of predefined analytical functions executable by an analytics service, wherein: the analytical function includes a set of instructions for implementing an algorithm that is (i) configured to perform the analytical function and (ii) written in a second programming language, and the first computer process provides a first set of application programming interface (API) functions for responding to data requests; launching, by the first computer process, a second computer process operating in the second programming language that implements the algorithm in response to the first computer process commencing an execution of the analytical function, wherein: the second computer process provides a second set of application programming interface (API) functions for creating and transmitting the data requests; invoking one or more API functions of the first set of API functions by the first computer process and one or more API functions of the second set of API functions by the second computer process to transfer one or more analytical function parameters and one or more datasets specified within the request to perform the analytical function from the first computer process to the second computer process; computing, by the second computer process executing the algorithm, an analytical result for the analytical function based on providing the one or more analytical function parameters and the one or more datasets to the algorithm; and transferring the analytical result from the second computer process to the first computer process.

In one embodiment, the computer-implemented system further includes during the launch of the second computer process: sending, by the first computer process, a process identifier of the first computer process to the second computer process, and pairing the second computer process with the first computer process based on the process identifier of the first computer process.

In one embodiment, a computer-program product comprising a non-transitory machine-readable storage medium storing computer instructions that, when executed by one or more processors, perform operations including: transferring, using an application programming interface, a plurality of data blocks written in a first programming language from a first computer process to a second computer process that is configured to execute an algorithm written in a second programming language, wherein transferring a respective data block of the plurality of data blocks includes: serializing, using the application programming interface, the respective data block into a serialized data block based on a serialization protocol executed by the application programming interface, wherein the serialized data block is encoded in a programming language-agnostic data format; writing, by the first computer process, the serialized data block to a cross-process queue in response to serializing the respective data block; reading, by the second computer process, the serialized data block from the cross-process queue; deserializing, using the application programming interface, the serialized data block retrieved from the cross-process queue into a deserialized data block that is encoded in a data structure of the second programming language based on a deserialization protocol executed by the application programming interface; and executing, by the second computer process, the algorithm written in the second programming language based on providing at least a portion of the deserialized data block to the algorithm for data processing.

In one embodiment, the computer-program further includes transmitting, by the second computer process, a request to obtain data of a target data category from the first computer process using the application programming interface; obtaining, by the first computer process, the data of the target data category from an analytical backend service in response to receiving the request; and creating the respective data block, wherein creating the respective data block includes instantiating a data model of a plurality of predefined data models that corresponds to the target data category, wherein the data model includes a plurality of attributes that define a structure of the data model, and attributing an attribute value to each attribute of the plurality of attributes of the data model.

In one embodiment, serializing the respective data block into the serialized data block based on the serialization protocol includes translating the respective data block written in the first programming language into a binary-based data format that includes: a binary-based representation of each attribute of the plurality of attributes of the data model, a binary-based representation of the attribute value attributed to each attribute of the plurality of attributes of the data model, and a binary-based representation of a data type that corresponds to each attribute of the plurality of attributes.

In one embodiment, deserializing the serialized data block into the deserialized data block includes translating the respective data block encoded in the binary-based data format to the second programming language, translating the respective data block encoded in the binary-based data format to the second programming language includes: constructing an instance of the data model that corresponds to the target data category in the second programming language, and attributing a set of attribute values extracted from the respective data block encoded in the binary-based data format to the instance of the data model that corresponds to the target data category in the second programming language, wherein each attribute value of the set of attribute values: is attributed to a corresponding component of the instance of the data model that corresponds to the target data category in the second programming language, and is encoded in a corresponding data structure of the second programming language.

In one embodiment, the computer-program product further includes: transferring, using the application programming interface, a second plurality of data blocks written in the second programming language from the second computer process to the first computer process, wherein transferring a respective data block of the second plurality of data blocks includes: serializing, using the application programming interface, the respective data block of the second plurality of data blocks into a second serialized data block based on the serialization protocol executed by the application programming interface; writing, by the second computer process, the second serialized data block to a command cross-process queue in response to serializing the respective data block of the second plurality of data blocks; reading, by the first computer process, the second serialized data block from the command cross-process queue; and deserializing, using the application programming interface, the second serialized data block retrieved from the command cross-process queue into a second deserialized data block that is encoded in the first programming language based on the deserialization protocol executed by the application programming interface.

In one embodiment, the computer-program product further includes implementing, using the application programming interface, a plurality of cross-process queues in response to obtaining the plurality of data blocks set to be transferred from the first computer process to the second computer process, wherein each distinct cross-process queue is assigned to a respective data block of the plurality of data blocks, and simultaneously transferring the plurality of data blocks from the first computer process to the second computer process using the plurality of cross-process queues.

In one embodiment, the plurality of data blocks are simultaneously transferred from the first computer process to the second computer process using the cross-process queue, simultaneously transferring the plurality of data blocks from the first computer process to the second computer process includes: concurrently executing, via a plurality of producer processes, a plurality of write operations that writes the plurality of data blocks to the cross-process queue, and concurrently executing, by a plurality of consumer processes, a plurality of read operations that reads the plurality of data blocks written to the cross-process queue.

In one embodiment, the respective data block is in a data format that corresponds to a predefined data model of a plurality of distinct predefined data models, the serialization protocol includes a predefined set of instructions for translating the respective data block associated with the predefined data model to the programming language-agnostic data format.

In one embodiment, the deserialization protocol includes a set of predefined instructions for decoding the serialized data block from the programming language-agnostic data format into the data structure of the second programming language based on a corresponding representation of the predefined data model in the second programming language.

In one embodiment, the respective data block is represented as a message, the message is serialized into the programming language-agnostic data format using a predefined message schema of a plurality of predefined message schemas, the serialized message is written to the cross-process queue by the first computer process, the second computer process reads the serialized message from the cross-process queue, and the application programming interface deserializes the serialized message read from the cross-process queue using the predefined message schema to translate the serialized message to one or more representations of the second programming language.

In one embodiment, the application programming interface provides a first set of application programming interface functions that is accessible by the first computer process and a second set of application programming interface functions that is accessible by the second computer process, the first computer process invokes an application programming interface function of the first set of application programming interface functions to create the respective data block and serialize the respective data block into the serialized data block, and the second computer process invokes an application programming interface function of the second set of application programming interface functions to read the serialized data block from the cross-process queue and deserialize the serialized data block into the deserialized data block.

In one embodiment, the first computer process implements a first set of application programming interface functions of the application programming interface, the second computer process implements a second set of application programming interface functions of the application programming interface, the first set of application programming interface functions are different than the second set of application programming interface functions, the first computer process invokes an application programming interface function of the first set of application programming interface functions to create the respective data block and serialize the respective data block into the serialized data block, and the second computer process invokes an application programming interface function of the second set of application programming interface functions to read the serialized data block from the cross-process queue and deserialize the serialized data block into the deserialized data block.

In one embodiment, a computer-implemented method includes transferring, using an application programming interface, a plurality of data blocks written in a first programming language from a first computer process to a second computer process that is configured to execute an algorithm written in a second programming language, wherein transferring a respective data block of the plurality of data blocks includes: serializing, using the application programming interface, the respective data block into a serialized data block based on a serialization protocol executed by the application programming interface, wherein the serialized data block is encoded in a programming language-agnostic data format; writing, by the first computer process, the serialized data block to a cross-process queue in response to serializing the respective data block; reading, by the second computer process, the serialized data block from the cross-process queue; deserializing, using the application programming interface, the serialized data block retrieved from the cross-process queue into a deserialized data block that is encoded in a data structure of the second programming language based on a deserialization protocol executed by the application programming interface; and executing, by the second computer process, the algorithm written in the second programming language based on providing at least a portion of the deserialized data block to the algorithm for data processing.

In one embodiment, the computer-implemented method further includes transmitting, by the second computer process, a request to obtain data of a target data category from the first computer process using the application programming interface; obtaining, by the first computer process, the data of the target data category from an analytical backend service in response to receiving the request; and creating the respective data block, wherein creating the respective data block includes: instantiating a data model of a plurality of predefined data models that corresponds to the target data category, wherein the data model includes a plurality of attributes that define a structure of the data model, and attributing an attribute value to each attribute of the plurality of attributes of the data model.

In one embodiment, serializing the respective data block into the serialized data block based on the serialization protocol includes translating the respective data block written in the first programming language into a binary-based data format that includes a binary-based representation of each attribute of the plurality of attributes of the data model, a binary-based representation of the attribute value attributed to each attribute of the plurality of attributes of the data model, and a binary-based representation of a data type that corresponds to each attribute of the plurality of attributes.

In one embodiment, deserializing the serialized data block into the deserialized data block includes translating the respective data block encoded in the binary-based data format to the second programming language, translating the respective data block encoded in the binary-based data format to the second programming language includes: constructing an instance of the data model that corresponds to the target data category in the second programming language, and attributing a set of attribute values extracted from the respective data block encoded in the binary-based data format to the instance of the data model that corresponds to the target data category in the second programming language, wherein each attribute value of the set of attribute values: is attributed to a corresponding component of the instance of the data model that corresponds to the target data category in the second programming language, and is encoded in a corresponding data structure of the second programming language.

In one embodiment, the computer-implemented method further includes: transferring, using the application programming interface, a second plurality of data blocks written in the second programming language from the second computer process to the first computer process, wherein transferring a respective data block of the second plurality of data blocks includes: serializing, using the application programming interface, the respective data block of the second plurality of data blocks into a second serialized data block based on the serialization protocol executed by the application programming interface; writing, by the second computer process, the second serialized data block to a command cross-process queue in response to serializing the respective data block of the second plurality of data blocks; reading, by the first computer process, the second serialized data block from the command cross-process queue; and deserializing, using the application programming interface, the second serialized data block retrieved from the command cross-process queue into a second deserialized data block that is encoded in the first programming language based on the deserialization protocol executed by the application programming interface.

In one embodiment, the computer-implemented method further includes: implementing, using the application programming interface, a plurality of cross-process queues in response to obtaining the plurality of data blocks set to be transferred from the first computer process to the second computer process, wherein each distinct cross-process queue is assigned to a respective data block of the plurality of data blocks, and simultaneously transferring the plurality of data blocks from the first computer process to the second computer process using the plurality of cross-process queues.

In one embodiment, the plurality of data blocks are simultaneously transferred from the first computer process to the second computer process using the cross-process queue, simultaneously transferring the plurality of data blocks from the first computer process to the second computer process includes: concurrently executing, via a plurality of producer processes, a plurality of write operations that writes the plurality of data blocks to the cross-process queue, and concurrently executing, by a plurality of consumer processes, a plurality of read operations that reads the plurality of data blocks written to the cross-process queue.

In one embodiment, the respective data block is in a data format that corresponds to a predefined data model of a plurality of distinct predefined data models, the serialization protocol includes a predefined set of instructions for translating the respective data block associated with the predefined data model to the programming language-agnostic data format.

In one embodiment, the deserialization protocol includes a set of predefined instructions for decoding the serialized data block from the programming language-agnostic data format into the data structure of the second programming language based on a corresponding representation of the predefined data model in the second programming language.

In one embodiment, the respective data block is represented as a message, the message is serialized into the programming language-agnostic data format using a predefined message schema of a plurality of predefined message schemas, the serialized message is written to the cross-process queue by the first computer process, the second computer process reads the serialized message from the cross-process queue, and the application programming interface deserializes the serialized message read from the cross-process queue using the predefined message schema to translate the serialized message to one or more representations of the second programming language.

In one embodiment, the application programming interface provides a first set of application programming interface functions that is accessible by the first computer process and a second set of application programming interface functions that is accessible by the second computer process, the first computer process invokes an application programming interface function of the first set of application programming interface functions to create the respective data block and serialize the respective data block into the serialized data block, and the second computer process invokes an application programming interface function of the second set of application programming interface functions to read the serialized data block from the cross-process queue and deserialize the serialized data block into the deserialized data block.

In one embodiment, the first computer process implements a first set of application programming interface functions of the application programming interface, the second computer process implements a second set of application programming interface functions of the application programming interface, the first set of application programming interface functions are different than the second set of application programming interface functions, the first computer process invokes an application programming interface function of the first set of application programming interface functions to create the respective data block and serialize the respective data block into the serialized data block, and the second computer process invokes an application programming interface function of the second set of application programming interface functions to read the serialized data block from the cross-process queue and deserialize the serialized data block into the deserialized data block.

In one embodiment, a computer-implemented system includes: one or more processors; a memory; a computer-readable medium operably coupled to the one or more processors, the computer-readable medium having computer-readable instructions stored thereon that, when executed by the one or more processors, cause a computing device to perform operations comprising: transferring, using an application programming interface, a plurality of data blocks written in a first programming language from a first computer process to a second computer process that is configured to execute an algorithm written in a second programming language, wherein transferring a respective data block of the plurality of data blocks includes: serializing, using the application programming interface, the respective data block into a serialized data block based on a serialization protocol executed by the application programming interface, wherein the serialized data block is encoded in a programming language-agnostic data format; writing, by the first computer process, the serialized data block to a cross-process queue in response to serializing the respective data block; reading, by the second computer process, the serialized data block from the cross-process queue; deserializing, using the application programming interface, the serialized data block retrieved from the cross-process queue into a deserialized data block that is encoded in a data structure of the second programming language based on a deserialization protocol executed by the application programming interface; and executing, by the second computer process, the algorithm written in the second programming language based on providing at least a portion of the deserialized data block to the algorithm for data processing.

In one embodiment, the computer-implemented system further includes transmitting, by the second computer process, a request to obtain data of a target data category from the first computer process using the application programming interface; obtaining, by the first computer process, the data of the target data category from an analytical backend service in response to receiving the request; and creating the respective data block, wherein creating the respective data block includes: instantiating a data model of a plurality of predefined data models that corresponds to the target data category, wherein the data model includes a plurality of attributes that define a structure of the data model, and attributing an attribute value to each attribute of the plurality of attributes of the data model.

In one embodiment, serializing the respective data block into the serialized data block based on the serialization protocol includes: translating the respective data block written in the first programming language into a binary-based data format that includes: a binary-based representation of each attribute of the plurality of attributes of the data model, a binary-based representation of the attribute value attributed to each attribute of the plurality of attributes of the data model, and a binary-based representation of a data type that corresponds to each attribute of the plurality of attributes.

In one embodiment, deserializing the serialized data block into the deserialized data block includes translating the respective data block encoded in the binary-based data format to the second programming language, translating the respective data block encoded in the binary-based data format to the second programming language includes: constructing an instance of the data model that corresponds to the target data category in the second programming language, and attributing a set of attribute values extracted from the respective data block encoded in the binary-based data format to the instance of the data model that corresponds to the target data category in the second programming language, wherein each attribute value of the set of attribute values: is attributed to a corresponding component of the instance of the data model that corresponds to the target data category in the second programming language, and is encoded in a corresponding data structure of the second programming language.

In one embodiment, the computer-implemented system further includes transferring, using the application programming interface, a second plurality of data blocks written in the second programming language from the second computer process to the first computer process, wherein transferring a respective data block of the second plurality of data blocks includes: serializing, using the application programming interface, the respective data block of the second plurality of data blocks into a second serialized data block based on the serialization protocol executed by the application programming interface; writing, by the second computer process, the second serialized data block to a command cross-process queue in response to serializing the respective data block of the second plurality of data blocks; reading, by the first computer process, the second serialized data block from the command cross-process queue; and deserializing, using the application programming interface, the second serialized data block retrieved from the command cross-process queue into a second deserialized data block that is encoded in the first programming language based on the deserialization protocol executed by the application programming interface.

In one embodiment, the computer-implemented system further includes implementing, using the application programming interface, a plurality of cross-process queues in response to obtaining the plurality of data blocks set to be transferred from the first computer process to the second computer process, wherein each distinct cross-process queue is assigned to a respective data block of the plurality of data blocks, and simultaneously transferring the plurality of data blocks from the first computer process to the second computer process using the plurality of cross-process queues.

In one embodiment, a computer-program product comprising a non-transitory machine-readable storage medium storing computer instructions that, when executed by one or more processors, perform operations including: initializing, within a compute environment, a first container that provides a set of runtime components for a target programming language and a predetermined set of algorithms written in the target programming language; writing, by a resource transfer task executing within the first container, the set of runtime components for the target programming language and the predetermined set of algorithms written in the target second programming language to a shared storage volume of the compute environment; initializing, within the compute environment, a second container that provides a runtime environment for executing an analytics backend service written in a first programming language; mounting, within the second container, the shared storage volume that includes the set of runtime components for the target programming language and the predetermined set of algorithms written in the target programming language; invoking, by a first computer process operating within the second container, an analytics function provided by the analytics backend service, wherein the analytics function is configured to use at least one algorithm of the predetermined set of algorithms written in the target programming language to perform a computational task; launching, within the second container, a second computer process that executes the at least one algorithm to perform the computational task specified by the analytics function using the set of runtime components included in the mounted shared storage volume; and transferring an analytical output computed by the at least one algorithm that performed the computational task from the second computer process to the first computer process.

In one embodiment, the computer-program product further includes: deploying, by a container orchestration service, a pod within the compute environment based on a pod configuration file, wherein the pod configuration file includes: a container image of the analytics backend service, and a container image that includes the set of runtime components for the target programming language and the predetermined set of algorithms written in the target programming language; and in response to deploying the pod within the compute environment: initializing, within the pod, the first container based on the container image that includes the set of runtime components for the target programming language and the predetermined set of algorithms written in the target programming language; and initializing, within the pod, the second container based on the container image of the analytics backend service.

In one embodiment, the set of runtime components for the target programming language includes a code interpreter of the target programming language, the mounted shared storage volume includes the code interpreter of the target programming language, and the second computer process executes the at least one algorithm written in the target programming language using the code interpreter of the target programming language.

In one embodiment, writing the set of runtime components for the target programming language to the shared storage volume of the compute environment includes: writing a plurality of software libraries used by the predetermined set of algorithms to the shared storage volume of the compute environment, and writing a code interpreter of the target programming language to the shared storage volume of the compute environment.

In one embodiment, the computer-program product further includes: in response to the resource transfer task writing the set of runtime components for the target programming language and the predetermined set of algorithms written in the target programming language to the shared storage volume of the compute environment: transitioning the first container from an active state to an inactive state, and deallocating compute resources previously allocated to the first container.

In one embodiment, the first container is initialized based on a container image that includes the set of runtime components for the target programming language and the predetermined set of algorithms written in the target programming language, and the computer-program product further comprises computer instructions for performing operations including: periodically scanning the container image for security vulnerabilities, wherein periodically scanning the container image includes: assessing a security risk of one or more open-source software libraries included in the container image, and assessing a security threat of each algorithm of the predetermined set of algorithms included in the container image.

In one embodiment, the container image is configured with a set of container permissions that restricts an end user from modifying the container image.

In one embodiment, the first container and the second container are different containers within the compute environment, the first container is configured to operate independently of the second container, and the computer-program product further comprises computer instructions for performing operations including: detecting a security threat in the first container, wherein: the security threat is localized to the first container based on the first container operating independently of the second container, and the security threat does not compromise the second container based on the second container operating independently of the first container.

In one embodiment, the second computer process does not have permissions to write the analytical output to a computer database of the analytics backend service, the first computer process has the permissions to write the analytical output to the computer database of the analytics backend service, and the computer-program product further comprises computer instructions for performing operations including: in response to the first computer process obtaining the analytical output: writing, by the first computer process, the analytical output to the computer database.

In one embodiment, initializing, within the compute environment, the second container that provides the runtime environment for executing the analytics backend service includes: loading one or more software libraries used by the analytics backend service, wherein the one or more software libraries are written in the first programming language, and creating the runtime environment, wherein the runtime environment is configured to execute computer instructions of the analytics backend service.

In one embodiment, the first container is initialized within the compute environment before the first computer process invokes the analytics function.

In one embodiment, the computer-program product further includes: deploying, by a container orchestration service, a pod within the compute environment based on a pod configuration file, wherein the pod configuration file includes: a container image of the analytics backend service, and a container image that includes the set of runtime components for the target programming language and the predetermined set of algorithms written in the target programming language; and based on deploying the pod within the compute environment: initializing, within the pod, the first container that commences the execution of the resource transfer task that writes the set of runtime components for the target programming language and the predetermined set of algorithms written in the target programming language to the shared storage volume of the pod, and initializing, within the pod, the second container based on the container image of the analytics backend service.

In one embodiment, the first container is initialized within the compute environment before the second container is initialized within the compute environment.

In one embodiment, the set of runtime components for the target programming language includes a code interpreter of the target programming language, the mounted shared storage volume includes the code interpreter of the target programming language, the second computer process is launched in response to the first computer process invoking the analytics function provided by the analytics backend service, and in response to launching the second computer process: accessing, by the second computer process, the code interpreter of the target programming language and the at least one algorithm used by the analytics function from the mounted shared storage volume; initializing, within memory of the second computer process, the code interpreter of the target programming language and the at least one algorithm used by the analytics function in response to accessing the code interpreter and the at least one algorithm used by the analytics function from the mounted shared storage volume; and executing, by the second computer process, the at least one algorithm written in the target programming language using the code interpreter of the target programming language.

In one embodiment, transferring the analytical output computed by the at least one algorithm that performed the computational task from the second computer process to the first computer process includes using a cross-process queue, the cross-process queue is implemented within shared memory of a computer, the cross-process queue includes a plurality of cells for storing data blocks or messages during data transfer operations, and the shared memory of the computer includes: a write operation index tracking index values of one or more cells within the cross-process queue that are available to write, and a read operation index tracking index values of one or more cells within the cross-process queue that are available to read.

In one embodiment, transferring the analytical output computed by the at least one algorithm that performed the computational task from the second computer process to the first computer process includes using a cross-process queue, the cross-process queue is located within shared memory of the second container, and the cross-process queue is not accessible by the first container.

In one embodiment, transferring the analytical output computed by the at least one algorithm that performed the computational task from the second computer process to the first computer process includes using a socket, the socket provides a communication channel between the second computer process and the first computer process, the socket provides a bidirectional communication for exchanging data between the second computer process and the first computer process.

In one embodiment, transferring the analytical output computed by the at least one algorithm that performed the computational task from the second computer process to the first computer process includes using shared memory of a computer that is executing the second computer process and the first computer process.

In one embodiment, a first pod initializes the first container, a second pod initializes the second container, the first pod is different than the second pod, and the first container and the second container use a socket for transferring data between the first pod and the second pod.

In one embodiment, a computer-implemented method includes initializing, within a compute environment, a first container that provides a set of runtime components for a target programming language and a predetermined set of algorithms written in the target programming language; writing, by a resource transfer task executing within the first container, the set of runtime components for the target programming language and the predetermined set of algorithms written in the target second programming language to a shared storage volume of the compute environment; initializing, within the compute environment, a second container that provides a runtime environment for executing an analytics backend service written in a first programming language; mounting, within the second container, the shared storage volume that includes the set of runtime components for the target programming language and the predetermined set of algorithms written in the target programming language; invoking, by a first computer process operating within the second container, an analytics function provided by the analytics backend service, wherein the analytics function is configured to use at least one algorithm of the predetermined set of algorithms written in the target programming language to perform a computational task; launching, within the second container, a second computer process that executes the at least one algorithm to perform the computational task specified by the analytics function using the set of runtime components included in the mounted shared storage volume; and transferring an analytical output computed by the at least one algorithm that performed the computational task from the second computer process to the first computer process.

In one embodiment, the computer-implemented method further includes: deploying, by a container orchestration service, a pod within the compute environment based on a pod configuration file, wherein the pod configuration file includes: a container image of the analytics backend service, and a container image that includes the set of runtime components for the target programming language and the predetermined set of algorithms written in the target programming language; and in response to deploying the pod within the compute environment: initializing, within the pod, the first container based on the container image that includes the set of runtime components for the target programming language and the predetermined set of algorithms written in the target programming language; and initializing, within the pod, the second container based on the container image of the analytics backend service.

In one embodiment, the set of runtime components for the target programming language includes a code interpreter of the target programming language, the mounted shared storage volume includes the code interpreter of the target programming language, and the second computer process executes the at least one algorithm written in the target programming language using the code interpreter of the target programming language.

In one embodiment, writing the set of runtime components for the target programming language to the shared storage volume of the compute environment includes: writing a plurality of software libraries used by the predetermined set of algorithms to the shared storage volume of the compute environment, and writing a code interpreter of the target programming language to the shared storage volume of the compute environment.

In one embodiment, the computer-implemented method further includes: in response to the resource transfer task writing the set of runtime components for the target programming language and the predetermined set of algorithms written in the target programming language to the shared storage volume of the compute environment: transitioning the first container from an active state to an inactive state, and deallocating compute resources previously allocated to the first container.

In one embodiment, the first container is initialized based on a container image that includes the set of runtime components for the target programming language and the predetermined set of algorithms written in the target programming language, and the computer-program product further comprises computer instructions for performing operations including: periodically scanning the container image for security vulnerabilities, wherein periodically scanning the container image includes: assessing a security risk of one or more open-source software libraries included in the container image, and assessing a security threat of each algorithm of the predetermined set of algorithms included in the container image.

In one embodiment, the container image is configured with a set of container permissions that restricts an end user from modifying the container image.

In one embodiment, the first container and the second container are different containers within the compute environment, the first container is configured to operate independently of the second container, and the computer-program product further comprises computer instructions for performing operations including: detecting a security threat in the first container, wherein: the security threat is localized to the first container based on the first container operating independently of the second container, and the security threat does not compromise the second container based on the second container operating independently of the first container.

In one embodiment, the second computer process does not have permissions to write the analytical output to a computer database of the analytics backend service, the first computer process has the permissions to write the analytical output to the computer database of the analytics backend service, and the computer-program product further comprises computer instructions for performing operations including: in response to the first computer process obtaining the analytical output: writing, by the first computer process, the analytical output to the computer database.

In one embodiment, a computer-implemented system includes: one or more processors; a memory; a computer-readable medium operably coupled to the one or more processors, the computer-readable medium having computer-readable instructions stored thereon that, when executed by the one or more processors, cause a computing device to perform operations comprising: initializing, within a compute environment, a first container that provides a set of runtime components for a target programming language and a predetermined set of algorithms written in the target programming language; writing, by a resource transfer task executing within the first container, the set of runtime components for the target programming language and the predetermined set of algorithms written in the target second programming language to a shared storage volume of the compute environment; initializing, within the compute environment, a second container that provides a runtime environment for executing an analytics backend service written in a first programming language; mounting, within the second container, the shared storage volume that includes the set of runtime components for the target programming language and the predetermined set of algorithms written in the target programming language; invoking, by a first computer process operating within the second container, an analytics function provided by the analytics backend service, wherein the analytics function is configured to use at least one algorithm of the predetermined set of algorithms written in the target programming language to perform a computational task; launching, within the second container, a second computer process that executes the at least one algorithm to perform the computational task specified by the analytics function using the set of runtime components included in the mounted shared storage volume; and transferring an analytical output computed by the at least one algorithm that performed the computational task from the second computer process to the first computer process.

In one embodiment, the computer-implemented system further includes: deploying, by a container orchestration service, a pod within the compute environment based on a pod configuration file, wherein the pod configuration file includes: a container image of the analytics backend service, and a container image that includes the set of runtime components for the target programming language and the predetermined set of algorithms written in the target programming language; and in response to deploying the pod within the compute environment: initializing, within the pod, the first container based on the container image that includes the set of runtime components for the target programming language and the predetermined set of algorithms written in the target programming language; and initializing, within the pod, the second container based on the container image of the analytics backend service.

In one embodiment, a computer-program product comprising a non-transitory machine-readable storage medium storing computer instructions that, when executed by one or more processors, perform operations includes: initializing, within a compute environment, a first container that provides a first runtime environment for executing computer instructions of an analytics backend service written in a first programming language; invoking, by a first computer process operating within the first container, an analytics function provided by the analytics backend service, wherein the analytics function is configured to use at least one algorithm written in a second programming language to perform a computational task; initializing, within the compute environment, a second container that provides a second runtime environment for executing the at least one algorithm used by the analytics function; commencing, by the second container, a second computer process that executes the at least one algorithm to perform the computational task specified by the analytics function; and transferring, using a cross-process queue, an analytical output computed by the at least one algorithm for the computational task from the second computer process to the first computer process.

In one embodiment, the computer-program product further includes: deploying, by a container orchestration service, one or more pods within the compute environment based on one or more pod configuration files, wherein the one or more pod configuration files includes: a container image of the analytics backend service written in the first programming language, and a container image of an auxiliary compute service that includes the at least one algorithm written in the second programming language; and in response to deploying the one or more pods within the compute environment: initializing, within the one or more pods, the first container based on the container image of the analytics backend service, and initializing, within the one or more pods, the second container based on the container image of the auxiliary compute service.

In one embodiment, initializing, within the compute environment, the second container that provides the second runtime environment for executing the at least one algorithm used by the analytics function includes: loading one or more software libraries used by the at least one algorithm to perform the computational task specified by the analytics function, wherein the one or more software libraries are written in the second programming language, and creating the second runtime environment, wherein the second runtime environment is operably configured to execute the at least one algorithm written in the second programming language.

In one embodiment, initializing, within the compute environment, the second container that provides the second runtime environment for executing the at least one algorithm used by the analytics function includes: creating the second runtime environment that is configured to execute the at least one algorithm written in the second programming language, wherein creating the second runtime environment includes: installing, into a filesystem of the second container, one or more software libraries required by the at least one algorithm to perform the computational task specified by the analytics function, and storing, within the filesystem of the second container, source code associated with the at least one algorithm.

In one embodiment, executing the at least one algorithm to perform the computational task specified by the analytics function includes: loading, into a memory space allocated to the second container, the one or more software libraries required by the at least one algorithm to perform the computational task specified by the analytics function, loading, into the memory space allocated to the second container, the source code associated with the at least one algorithm, and executing, using a code interpreter of the second programming language, the source code associated with the at least one algorithm that uses the one or more software libraries to perform the computational task.

In one embodiment, the second container is initialized based on a container image of an auxiliary compute service, the auxiliary compute service includes the at least one algorithm, and the computer-program product further comprises computer instructions for performing operations including: periodically scanning the container image of the auxiliary compute service for security vulnerabilities, wherein scanning the container image of the auxiliary compute service includes: assessing a security risk of one or more open-source software libraries used by the auxiliary compute service, and assessing a security threat of the at least one algorithm.

In one embodiment, the container image of the auxiliary compute service defines a set of container permissions that restricts an end user from modifying the container image of the auxiliary compute service.

In one embodiment, the first container and the second container are different containers within the compute environment, the first container is configured to operate independently of the second container, and the computer-program product further comprises computer instructions for performing operations including: detecting a security threat in the second container, wherein: the security threat is localized to the second container based on the second container operating independently of the first container, and the security threat does not compromise the first container based on the second container operating independently of the first container.

In one embodiment, the second computer process does not have permissions to write the analytical output to a computer database of the analytics backend service, the first computer process has the permissions to write the analytical output to the computer database of the analytics backend service, and the computer-program product further comprises computer instructions for performing operations including: in response to the first computer process obtaining the analytical output: writing, by the first computer process, the analytical output to the computer database based on determining the first computer process has the permissions to write the analytical output to the computer database of the analytics backend service.

In one embodiment, initializing, within the compute environment, the first container that provides the first runtime environment for executing the computer instructions of the analytics backend service includes: loading one or more software libraries used by the analytics backend service, wherein the one or more software libraries are written in the first programming language, and creating the first runtime environment, wherein the first runtime environment is configured to execute the computer instructions of the analytics backend service.

In one embodiment, the second container is initialized within the compute environment after the first computer process invokes the analytics function.

In one embodiment, the computer-program product further includes: selecting a container image of a plurality of container images based on the analytics function invoked by the first computer process, wherein the selected container image is pre-configured with one or more runtime components that provide the second runtime environment, wherein: the second container that provides the second runtime environment for executing the at least one algorithm associated with the analytics function is initialized using the selected container image.

In one embodiment, the first container and the second container are initialized contemporaneously within the compute environment when a pod starts within the compute environment.

In one embodiment, a computer-implemented method includes: initializing, within a compute environment, a first container that provides a first runtime environment for executing computer instructions of an analytics backend service written in a first programming language; invoking, by a first computer process operating within the first container, an analytics function provided by the analytics backend service, wherein the analytics function is configured to use at least one algorithm written in a second programming language to perform a computational task; initializing, within the compute environment, a second container that provides a second runtime environment for executing the at least one algorithm used by the analytics function; commencing, by the second container, a second computer process that executes the at least one algorithm to perform the computational task specified by the analytics function; and transferring, using a cross-process queue, an analytical output computed by the at least one algorithm for the computational task from the second computer process to the first computer process.

In one embodiment, the computer-implemented method further includes: deploying, by a container orchestration service, one or more pods within the compute environment based on one or more pod configuration files, wherein the one or more pod configuration files includes: a container image of the analytics backend service written in the first programming language, and a container image of an auxiliary compute service that includes the at least one algorithm written in the second programming language; and in response to deploying the one or more pods within the compute environment: initializing, within the one or more pods, the first container based on the container image of the analytics backend service, and initializing, within the one or more pods, the second container based on the container image of the auxiliary compute service.

In one embodiment, initializing, within the compute environment, the second container that provides the second runtime environment for executing the at least one algorithm used by the analytics function includes: loading one or more software libraries used by the at least one algorithm to perform the computational task specified by the analytics function, wherein the one or more software libraries are written in the second programming language, and creating the second runtime environment, wherein the second runtime environment is operably configured to execute the at least one algorithm written in the second programming language.

In one embodiment, initializing, within the compute environment, the second container that provides the second runtime environment for executing the at least one algorithm used by the analytics function includes: creating the second runtime environment that is configured to execute the at least one algorithm written in the second programming language, wherein creating the second runtime environment includes: installing, into a filesystem of the second container, one or more software libraries required by the at least one algorithm to perform the computational task specified by the analytics function, and storing, within the filesystem of the second container, source code associated with the at least one algorithm.

In one embodiment, executing the at least one algorithm to perform the computational task specified by the analytics function includes: loading, into a memory space allocated to the second container, the one or more software libraries required by the at least one algorithm to perform the computational task specified by the analytics function, loading, into the memory space allocated to the second container, the source code associated with the at least one algorithm, and executing, using a code interpreter of the second programming language, the source code associated with the at least one algorithm that uses the one or more software libraries to perform the computational task.

In one embodiment, the second container is initialized based on a container image of an auxiliary compute service, the auxiliary compute service includes the at least one algorithm, and the computer-program product further comprises computer instructions for performing operations including: periodically scanning the container image of the auxiliary compute service for security vulnerabilities, wherein scanning the container image of the auxiliary compute service includes: assessing a security risk of one or more open-source software libraries used by the auxiliary compute service, and assessing a security threat of the at least one algorithm.

In one embodiment, the container image of the auxiliary compute service defines a set of container permissions that restricts an end user from modifying the container image of the auxiliary compute service.

In one embodiment, the first container and the second container are different containers within the compute environment, the first container is configured to operate independently of the second container, and the computer-implemented method further comprises computer instructions for performing operations including: detecting a security threat in the second container, wherein: the security threat is localized to the second container based on the second container operating independently of the first container, and the security threat does not compromise the first container based on the second container operating independently of the first container.

In one embodiment, the second computer process does not have permissions to write the analytical output to a computer database of the analytics backend service, the first computer process has the permissions to write the analytical output to the computer database of the analytics backend service, and the computer-implemented method further comprises computer instructions for performing operations including: in response to the first computer process obtaining the analytical output: writing, by the first computer process, the analytical output to the computer database based on determining the first computer process has the permissions to write the analytical output to the computer database of the analytics backend service.

In one embodiment, initializing, within the compute environment, the first container that provides the first runtime environment for executing the computer instructions of the analytics backend service includes: loading one or more software libraries used by the analytics backend service, wherein the one or more software libraries are written in the first programming language, and creating the first runtime environment, wherein the first runtime environment is configured to execute the computer instructions of the analytics backend service.

In one embodiment, the second container is initialized within the compute environment after the first computer process invokes the analytics function.

In one embodiment, the computer-implemented method further includes: selecting a container image of a plurality of container images based on the analytics function invoked by the first computer process, wherein the selected container image is pre-configured with one or more runtime components that provide the second runtime environment, wherein: the second container that provides the second runtime environment for executing the at least one algorithm associated with the analytics function is initialized using the selected container image.

In one embodiment, the first container and the second container are initialized contemporaneously within the compute environment when a pod starts within the compute environment.

In some embodiments, a computer-program product comprises a non-transitory machine-readable storage medium storing computer instructions that, when executed by one or more processors, perform operations comprising: computing, by a controller node, a hyperparameter search space for a plurality of hyperparameters; selecting, by the controller node, a plurality of hyperparameter search points from the hyperparameter search space; distributing, by the controller node, the plurality of hyperparameter search points across one or more worker nodes; assigning, by the one or more worker nodes, the plurality of hyperparameter search points to a plurality of model trainers of the one or more worker nodes; concurrently training, by the plurality of model trainers, a plurality of machine learning models based on the plurality of hyperparameter search points assigned to the plurality of model trainers; computing, by the plurality of model trainers, a plurality of performance metrics that measure a performance of the plurality of machine learning models; transmitting the plurality of performance metrics from the one or more worker nodes to the controller node; determining, by the controller node, one or more sets of optimal hyperparameter values for the plurality of hyperparameters based on the plurality of performance metrics; and outputting, by the controller node, the one or more sets of optimal hyperparameter values.

In some embodiments, a first hyperparameter search point is assigned to a first model trainer, and a second hyperparameter search point is assigned to a second model trainer, and concurrently training the plurality of machine learning models based on the plurality of hyperparameter search points includes concurrently: training, via the first model trainer, a first machine learning model based on the first hyperparameter search point, and training, via the second model trainer, a second machine learning model based on the second hyperparameter search point.

In some embodiments, the first hyperparameter search point corresponds to a first set of values for the plurality of hyperparameters, and the second hyperparameter search point corresponds to a second set of values for the plurality of hyperparameters, training the first machine learning model based on the first hyperparameter search point includes configuring the plurality of hyperparameters of the first machine learning model according to the first set of values, and training the second machine learning model based on the second hyperparameter search point includes configuring the plurality of hyperparameters of the second machine learning model according to the second set of values.

In some embodiments, a first worker node of the one or more worker nodes includes the first model trainer and the second model trainer.

In some embodiments, a first worker node of the one or more worker nodes includes the first model trainer, and a second worker node of the one or more worker nodes includes the second model trainer.

In some embodiments, a first hyperparameter search point and a second hyperparameter search point of the plurality of hyperparameter search points are distributed to a first worker node of the one or more worker nodes, and assigning the plurality of hyperparameter search points to the plurality of model trainers of the one or more worker nodes includes: assigning the first hyperparameter search point to a first model trainer of the first worker node, and assigning the second hyperparameter search point to a second model trainer of the first worker node.

In some embodiments, a first hyperparameter search point is distributed to a first worker node, and a second hyperparameter search point is distributed to a second worker node, and assigning the plurality of hyperparameter search points to the plurality of model trainers of the one or more worker nodes includes: assigning the first hyperparameter search point to a respective model trainer of the first worker node, and assigning the second hyperparameter search point to a respective model trainer of the second worker node.

In some embodiments, distributing the plurality of hyperparameter search points across the one or more worker nodes includes: distributing a respective hyperparameter search point to a first worker node when the respective hyperparameter search point is associated with a first area of the hyperparameter search space, and distributing the respective hyperparameter search point to a second worker node when the respective hyperparameter search point is associated with a second area of the hyperparameter search space.

In some embodiments, a respective hyperparameter search point of the plurality of hyperparameter search points corresponds to a first set of values for the plurality of hyperparameters.

In some embodiments, a second respective hyperparameter search point of the plurality of hyperparameter search points corresponds to a second set of values for the plurality of hyperparameters.

In some embodiments, the hyperparameter search space at least includes: a first dimension that includes possible values of a first hyperparameter, a second dimension that includes possible values of a second hyperparameter, and a superset of hyperparameter search points that are located at intersections of the possible values of the first hyperparameter and the possible values of the second hyperparameter.

In some embodiments, the computer instructions, when executed by the one or more processors, perform the operations comprising: (A) computing the hyperparameter search space; (B) selecting the plurality of hyperparameter search points from the hyperparameter search space; (C) distributing the plurality of hyperparameter search points the across one or more worker nodes; (D) assigning the plurality of hyperparameter search points to the plurality of model trainers of the one or more worker nodes; (E) concurrently training the plurality of machine learning models based on the plurality of hyperparameter search points; (F) computing the plurality of performance metrics for the plurality of machine learning models; (G) transmitting the plurality of performance metrics to the controller node; (H) determining the one or more sets of optimal hyperparameter values by repeating (B)-(G) for one or more additional selections of hyperparameter search points until the one or more sets of optimal hyperparameter values are detected; and (I) outputting the one or more sets of optimal hyperparameter values.

In some embodiments, a first model trainer trains a first machine learning model based on hyperparameter values of a first hyperparameter search point, and a second model trainer trains a second machine learning model based on hyperparameter values of a second hyperparameter search point, and computing the plurality of performance metrics that measure the performance of the plurality of machine learning models includes: computing, via the first model trainer, a loss metric for the first machine learning model trained on the hyperparameter values of the first hyperparameter search point, and computing, via the second model trainer, a loss metric for the second machine learning model trained on the hyperparameter values of the second hyperparameter search point.

In some embodiments, a respective model trainer of the one or more worker nodes includes a computational processing unit that is configured to train a respective machine learning model of the plurality of machine learning models, and the computational processing unit of the respective model trainer comprises one of: a graphics processing unit (GPU), and a central processing unit (CPU).

In some embodiments, determining the one or more sets of optimal hyperparameter values based on the plurality of performance metrics includes: determining a performance metric of the plurality of performance metrics that satisfies a pre-defined performance criterion, identifying a hyperparameter search point used to train a machine learning model associated with the performance metric, and selecting hyperparameter values associated with the hyperparameter search point as one of the one or more sets of optimal hyperparameter values.

In some embodiments, the performance metric satisfies the pre-defined performance criterion when the performance metric corresponds to a lowest amount of loss among a remainder of the plurality of performance metrics, and the performance metric does not satisfy the pre-defined performance criterion when the performance metric does not correspond to the lowest amount of loss among the remainder of the plurality of performance metrics.

In some embodiments, a computer-implemented method comprises: computing, by a controller node, a hyperparameter search space for a plurality of hyperparameters; selecting, by the controller node, a plurality of hyperparameter search points from the hyperparameter search space; distributing, by the controller node, the plurality of hyperparameter search points across one or more worker nodes; assigning, by the one or more worker nodes, the plurality of hyperparameter search points to a plurality of model trainers of the one or more worker nodes; concurrently training, by the plurality of model trainers, a plurality of machine learning models based on the plurality of hyperparameter search points assigned to the plurality of model trainers; computing, by the plurality of model trainers, a plurality of performance metrics that measure a performance of the plurality of machine learning models; transmitting the plurality of performance metrics from the one or more worker nodes to the controller node; determining, by the controller node, one or more sets of optimal hyperparameter values for the plurality of hyperparameters based on the plurality of performance metrics; and outputting, by the controller node, the one or more sets of optimal hyperparameter values.

In some embodiments, a first hyperparameter search point is assigned to a first model trainer, and a second hyperparameter search point is assigned to a second model trainer, and concurrently training the plurality of machine learning models based on the plurality of hyperparameter search points includes concurrently: training, via the first model trainer, a first machine learning model based on the first hyperparameter search point, and training, via the second model trainer, a second machine learning model based on the second hyperparameter search point.

In some embodiments, the first hyperparameter search point corresponds to a first set of values for the plurality of hyperparameters, and the second hyperparameter search point corresponds to a second set of values for the plurality of hyperparameters, training the first machine learning model based on the first hyperparameter search point includes configuring the plurality of hyperparameters of the first machine learning model according to the first set of values, and training the second machine learning model based on the second hyperparameter search point includes configuring the plurality of hyperparameters of the second machine learning model according to the second set of values.

In some embodiments, a first worker node of the one or more worker nodes includes the first model trainer and the second model trainer.

In some embodiments, a first worker node of the one or more worker nodes includes the first model trainer, and a second worker node of the one or more worker nodes includes the second model trainer.

In some embodiments, a first hyperparameter search point and a second hyperparameter search point of the plurality of hyperparameter search points are distributed to a first worker node of the one or more worker nodes, and assigning the plurality of hyperparameter search points to the plurality of model trainers of the one or more worker nodes includes: assigning the first hyperparameter search point to a first model trainer of the first worker node, and assigning the second hyperparameter search point to a second model trainer of the first worker node.

In some embodiments, a first hyperparameter search point is distributed to a first worker node, and a second hyperparameter search point is distributed to a second worker node, and assigning the plurality of hyperparameter search points to the plurality of model trainers of the one or more worker nodes includes: assigning the first hyperparameter search point to a respective model trainer of the first worker node, and assigning the second hyperparameter search point to a respective model trainer of the second worker node.

In some embodiments, a computer-implemented system comprises: one or more processors; a memory; and a computer-readable medium operably coupled to the one or more processors, the computer-readable medium having computer-readable instructions stored thereon that, when executed by the one or more processors, cause a computing device to perform operations comprising: computing, by a controller node, a hyperparameter search space for a plurality of hyperparameters; selecting, by the controller node, a plurality of hyperparameter search points from the hyperparameter search space; distributing, by the controller node, the plurality of hyperparameter search points across one or more worker nodes; assigning, by the one or more worker nodes, the plurality of hyperparameter search points to a plurality of model trainers of the one or more worker nodes; concurrently training, by the plurality of model trainers, a plurality of machine learning models based on the plurality of hyperparameter search points assigned to the plurality of model trainers; computing, by the plurality of model trainers, a plurality of performance metrics that measure a performance of the plurality of machine learning models; transmitting the plurality of performance metrics from the one or more worker nodes to the controller node; determining, by the controller node, one or more sets of optimal hyperparameter values for the plurality of hyperparameters based on the plurality of performance metrics; and outputting, by the controller node, the one or more sets of optimal hyperparameter values.

In some embodiments, distributing the plurality of hyperparameter search points across the one or more worker nodes includes: distributing a respective hyperparameter search point to a first worker node when the respective hyperparameter search point is associated with a first area of the hyperparameter search space, and distributing the respective hyperparameter search point to a second worker node when the respective hyperparameter search point is associated with a second area of the hyperparameter search space.

In some embodiments, a respective hyperparameter search point of the plurality of hyperparameter search points corresponds to a first set of values for the plurality of hyperparameters.

In some embodiments, a second respective hyperparameter search point of the plurality of hyperparameter search points corresponds to a second set of values for the plurality of hyperparameters.

In some embodiments, the hyperparameter search space at least includes: a first dimension that includes possible values of a first hyperparameter, a second dimension that includes possible values of a second hyperparameter, and a superset of hyperparameter search points that are located at intersections of the possible values of the first hyperparameter and the possible values of the second hyperparameter.

In some embodiments, the computer-readable instructions, when executed by the one or more processors, cause the computing device to perform operations comprising: (A) computing the hyperparameter search space; (B) selecting the plurality of hyperparameter search points from the hyperparameter search space; (C) distributing the plurality of hyperparameter search points the across one or more worker nodes; (D) assigning the plurality of hyperparameter search points to the plurality of model trainers of the one or more worker nodes; (E) concurrently training the plurality of machine learning models based on the plurality of hyperparameter search points; (F) computing the plurality of performance metrics for the plurality of machine learning models; (G) transmitting the plurality of performance metrics to the controller node; (H) determining the one or more sets of optimal hyperparameter values by repeating (B)-(G) for one or more additional selections of hyperparameter search points until the one or more sets of optimal hyperparameter values are detected; and (I) outputting the one or more sets of optimal hyperparameter values.

In some embodiments, an apparatus comprises at least one processor and a storage to store instructions that, when executed by the at least one processor, cause the at least one processor to perform operations comprising: computing, by a controller node, a hyperparameter search space for a plurality of hyperparameters; selecting, by the controller node, a plurality of hyperparameter search points from the hyperparameter search space; instructing, by the controller node, one or more worker nodes to concurrently train a plurality of machine learning models based on the plurality of hyperparameter search points; receiving, from the one or more worker nodes, a plurality of performance metrics that measure a performance of the plurality of machine learning models; determining, by the controller node, one or more sets of optimal hyperparameter values based on the plurality of performance metrics; and outputting, by the controller node, the one or more sets of optimal hyperparameter values.

In some embodiments, a computer-program product comprises a non-transitory machine-readable storage medium storing computer instructions that, when executed by one or more processors, perform operations comprising: (A) selecting, by a controller node, a plurality of hyperparameter search points from a hyperparameter search space; (B) assigning, by the controller node, the plurality of hyperparameter search points to a plurality of model trainers of one or more worker nodes; (C) concurrently training, via the plurality of model trainers, a plurality of machine learning models for a target number of epochs using the plurality of hyperparameter search points assigned to the plurality of model trainers; (D) computing, via the plurality of model trainers, a plurality of performance metrics that measure a performance of the plurality of machine learning models during the target number of epochs; (E) transmitting, by the one or more worker nodes, the plurality of performance metrics to the controller node; (F) removing, by the controller node, one or more underperforming hyperparameter search points from the plurality of hyperparameter search points according to a pre-defined performance metric ranking criterion associated with the plurality of performance metrics; (G) determining, by the controller node, if a remainder of the plurality of hyperparameter search points satisfy a termination condition after removing the one or more underperforming hyperparameter search points in (F); (H) based upon determining that the plurality of hyperparameter search points does not satisfy the termination condition, increasing the target number of epochs and repeating (B)-(G) for the remainder of the plurality of hyperparameter search points until the termination condition is satisfied; and (I) based upon determining that the remainder of the plurality of hyperparameter search points satisfy the termination condition, outputting at least one hyperparameter search point from the remainder of the plurality of hyperparameter search points as an optimal configuration for a plurality of hyperparameters.

In some embodiments, a first respective hyperparameter search point is assigned to a first model trainer, and a second respective hyperparameter search point is assigned to a second model trainer, and concurrently training the plurality of machine learning models for the target number of epochs includes concurrently: training, via the first model trainer, a first machine learning model for the target number of epochs using hyperparameter values associated with the first respective hyperparameter search point; and training, via the second model trainer, a second machine learning model for the target number of epochs using hyperparameter values associated with the second respective hyperparameter search point.

In some embodiments, a first respective hyperparameter search point and a second respective hyperparameter search point remain in the plurality of hyperparameter search points after removing the one or more underperforming hyperparameter search points in (F), and repeating (C) of (B)-(G) for the remainder of the plurality of hyperparameter search points at least includes concurrently: resuming, at a first model trainer, training of a machine learning model trained on the first respective hyperparameter search point for the target number of epochs increased by (H), and resuming, at a second model trainer, training of a machine learning model trained on the second respective hyperparameter search point for the target number of epochs increased by (H).

In some embodiments, concurrently training the plurality of machine learning models for the target number of epochs in (C) includes concurrently training the plurality of machine learning models for a first number of epochs, increasing the target number of epochs in (F) includes increasing the target number of epochs from the first number of epochs to a second number of epochs, and repeating (C) of (B)-(G) for the remainder of the plurality of hyperparameter search points at least includes: concurrently training, via the plurality of model trainers, machine learning models associated with the remainder of the plurality of hyperparameter search points for the second number of epochs.

In some embodiments, a first respective hyperparameter search point remains and a second respective hyperparameter search point does not remain in the plurality of hyperparameter search points after removing the one or more underperforming hyperparameter search points in (F), and repeating (C) of (B)-(G) for the remainder of the plurality of hyperparameter search points at least includes concurrently: resuming, at a first model trainer, training of a machine learning model trained on the first respective hyperparameter search point for the target number of epochs increased by (H), and forgoing resuming, at a second model trainer, training of a machine learning model trained on the second respective hyperparameter search point for the target number of epochs increased by (H).

In some embodiments, the plurality of performance metrics computed in (D) includes a respective performance metric that measures the performance of a machine learning model trained on a first respective hyperparameter search point for the target number of epochs, the first respective hyperparameter search point remains in the plurality of hyperparameter search points after removing the one or more underperforming hyperparameter search points in (F), and repeating (D) of (B)-(G) for the remainder of the plurality of hyperparameter search points at least includes: re-computing the respective performance metric to measure the performance of the machine learning model trained on the first respective hyperparameter search point for the target number of epochs increased by (H).

In some embodiments, transmitting the plurality of performance metrics to the controller node in (E) includes transmitting a first respective performance metric that measures the performance of a machine learning model trained on a first respective hyperparameter search point for the target number of epochs, the first respective hyperparameter search point remains in the plurality of hyperparameter search points after removing the one or more underperforming hyperparameter search points in (F), and repeating (E) of (B)-(G) for the remainder of the plurality of hyperparameter search points at least includes transmitting an update to the first respective performance metric that measures the performance of the machine learning model trained on the first respective hyperparameter search point for the target number of epochs increased by (H).

In some embodiments, a respective performance metric of the plurality of performance metrics measures the performance of a machine learning model trained by a respective model trainer, and removing the one or more underperforming hyperparameter search points from the plurality of hyperparameter search points according to the pre-defined performance metric ranking criterion includes: determining if the respective performance metric exceeds a minimum percentile threshold of the pre-defined performance metric ranking criterion; and if the determining determines that respective performance metric does not exceed the minimum percentile threshold of the pre-defined performance metric ranking criterion: identifying a hyperparameter search point assigned to the respective model trainer that trained the machine learning model as an underperforming hyperparameter search point; and removing the hyperparameter search point from the plurality of hyperparameter search points.

In some embodiments, removing the one or more underperforming hyperparameter search points from the plurality of hyperparameter search points according to the pre-defined performance metric ranking criterion further includes: if the determining determines that respective performance metric exceeds the minimum percentile threshold of the pre-defined performance metric ranking criterion: forgoing identifying the hyperparameter search point assigned to the respective model trainer as the underperforming hyperparameter search point; and forgoing removing the hyperparameter search point from the plurality of hyperparameter search points.

In some embodiments, the respective performance metric is determined to exceed the minimum percentile threshold of the pre-defined performance metric ranking criterion when the respective performance metric ranks above a pre-defined percentage of other performance metrics in the plurality of performance metrics, and the respective performance metric is determined to not exceed the minimum percentile threshold of the pre-defined performance metric ranking criterion when the respective performance metric does not rank above the pre-defined percentage of other performance metrics.

In some embodiments, determining if the remainder of the plurality of hyperparameter search points satisfy the termination condition in (G) includes: determining that the remainder of the plurality of hyperparameter search points satisfies the termination condition when the remainder of the plurality of hyperparameter search points do not include more than one hyperparameter search point, and determining that the remainder of the plurality of hyperparameter search points does not satisfy the termination condition when the remainder of the plurality of hyperparameter search points include more than one hyperparameter search point.

In some embodiments, repeating (B)-(G) for the remainder of the plurality of hyperparameter search points until the termination condition is satisfied includes repeating (B)-(G) until the remainder of the plurality of hyperparameter search points includes one remaining hyperparameter search point, and the at least one hyperparameter search point outputted in (I) corresponds to the one remaining hyperparameter search point.

In some embodiments, a subset of the plurality of hyperparameter search points remains in the plurality of hyperparameter search points after removing the one or more underperforming hyperparameter search points in (F), and repeating (E) and (F) of (B)-(G) for the remainder of the plurality of hyperparameter search points at least includes: transmitting a subset of the plurality of performance metrics that measure the performance of machine learning models that were trained on the subset of the plurality of hyperparameter search points for the target number of epochs increased by (H), and removing, by the controller node, one or more second underperforming hyperparameter search points from the subset of the plurality of hyperparameter search points according to the pre-defined performance metric ranking criterion associated with the subset of the plurality of performance metrics.

In some embodiments, repeating (B)-(G) for the remainder of the plurality of hyperparameter search points at least includes repeating (B)-(G) an additional time, removing the one or more underperforming hyperparameter search points during the additional time includes removing one or more additional underperforming hyperparameter search points, and repeating (G) of (B)-(G) for the additional time includes: determining, by the controller node, if the remainder of the plurality of hyperparameter search points satisfy the termination condition after removing the one or more additional underperforming hyperparameter search points from the remainder of the plurality of hyperparameter search points in (F) of the additional time.

In some embodiments, a computer-implemented method comprises: (A) selecting, by a controller node, a plurality of hyperparameter search points from a hyperparameter search space; (B) assigning, by the controller node, the plurality of hyperparameter search points to a plurality of model trainers of one or more worker nodes; (C) concurrently training, via the plurality of model trainers, a plurality of machine learning models for a target number of epochs using the plurality of hyperparameter search points assigned to the plurality of model trainers; (D) computing, via the plurality of model trainers, a plurality of performance metrics that measure a performance of the plurality of machine learning models during the target number of epochs; (E) transmitting, by the one or more worker nodes, the plurality of performance metrics to the controller node; (F) removing, by the controller node, one or more underperforming hyperparameter search points from the plurality of hyperparameter search points according to a pre-defined performance metric ranking criterion associated with the plurality of performance metrics; (G) determining, by the controller node, if a remainder of the plurality of hyperparameter search points satisfy a termination condition after removing the one or more underperforming hyperparameter search points in (F); (H) based upon determining that the plurality of hyperparameter search points does not satisfy the termination condition, increasing the target number of epochs and repeating (B)-(G) for the remainder of the plurality of hyperparameter search points until the termination condition is satisfied; and (I) based upon determining that the remainder of the plurality of hyperparameter search points satisfy the termination condition, outputting at least one hyperparameter search point from the remainder of the plurality of hyperparameter search points as an optimal configuration for a plurality of hyperparameters.

In some embodiments, a first respective hyperparameter search point is assigned to a first model trainer, and a second respective hyperparameter search point is assigned to a second model trainer, and concurrently training the plurality of machine learning models for the target number of epochs includes concurrently: training, via the first model trainer, a first machine learning model for the target number of epochs using hyperparameter values associated with the first respective hyperparameter search point; and training, via the second model trainer, a second machine learning model for the target number of epochs using hyperparameter values associated with the second respective hyperparameter search point.

In some embodiments, a first respective hyperparameter search point and a second respective hyperparameter search point remain in the plurality of hyperparameter search points after removing the one or more underperforming hyperparameter search points in (F), and repeating (C) of (B)-(G) for the remainder of the plurality of hyperparameter search points at least includes concurrently: resuming, at a first model trainer, training of a machine learning model trained on the first respective hyperparameter search point for the target number of epochs increased by (H), and resuming, at a second model trainer, training of a machine learning model trained on the second respective hyperparameter search point for the target number of epochs increased by (H).

In some embodiments, concurrently training the plurality of machine learning models for the target number of epochs in (C) includes concurrently training the plurality of machine learning models for a first number of epochs, increasing the target number of epochs in (F) includes increasing the target number of epochs from the first number of epochs to a second number of epochs, and repeating (C) of (B)-(G) for the remainder of the plurality of hyperparameter search points at least includes: concurrently training, via the plurality of model trainers, machine learning models associated with the remainder of the plurality of hyperparameter search points for the second number of epochs.

In some embodiments, a first respective hyperparameter search point remains and a second respective hyperparameter search point does not remain in the plurality of hyperparameter search points after removing the one or more underperforming hyperparameter search points in (F), and repeating (C) of (B)-(G) for the remainder of the plurality of hyperparameter search points at least includes concurrently: resuming, at a first model trainer, training of a machine learning model trained on the first respective hyperparameter search point for the target number of epochs increased by (H), and forgoing resuming, at a second model trainer, training of a machine learning model trained on the second respective hyperparameter search point for the target number of epochs increased by (H).

In some embodiments, the plurality of performance metrics computed in (D) includes a respective performance metric that measures the performance of a machine learning model trained on a first respective hyperparameter search point for the target number of epochs, the first respective hyperparameter search point remains in the plurality of hyperparameter search points after removing the one or more underperforming hyperparameter search points in (F), and repeating (D) of (B)-(G) for the remainder of the plurality of hyperparameter search points at least includes: re-computing the respective performance metric to measure the performance of the machine learning model trained on the first respective hyperparameter search point for the target number of epochs increased by (H).

In some embodiments, transmitting the plurality of performance metrics to the controller node in (E) includes transmitting a first respective performance metric that measures the performance of a machine learning model trained on a first respective hyperparameter search point for the target number of epochs, the first respective hyperparameter search point remains in the plurality of hyperparameter search points after removing the one or more underperforming hyperparameter search points in (F), and repeating (E) of (B)-(G) for the remainder of the plurality of hyperparameter search points at least includes transmitting an update to the first respective performance metric that measures the performance of the machine learning model trained on the first respective hyperparameter search point for the target number of epochs increased by (H).

In some embodiments, a respective performance metric of the plurality of performance metrics measures the performance of a machine learning model trained by a respective model trainer, and removing the one or more underperforming hyperparameter search points from the plurality of hyperparameter search points according to the pre-defined performance metric ranking criterion includes: determining if the respective performance metric exceeds a minimum percentile threshold of the pre-defined performance metric ranking criterion; and if the determining determines that respective performance metric does not exceed the minimum percentile threshold of the pre-defined performance metric ranking criterion: identifying a hyperparameter search point assigned to the respective model trainer that trained the machine learning model as an underperforming hyperparameter search point; and removing the hyperparameter search point from the plurality of hyperparameter search points.

In some embodiments, a computer-implemented system comprises: one or more processors; a memory; and a computer-readable medium operably coupled to the one or more processors, the computer-readable medium having computer-readable instructions stored thereon that, when executed by the one or more processors, cause a computing device to perform operations comprising: (A) selecting, by a controller node, a plurality of hyperparameter search points from a hyperparameter search space; (B) assigning, by the controller node, the plurality of hyperparameter search points to a plurality of model trainers of one or more worker nodes; (C) concurrently training, via the plurality of model trainers, a plurality of machine learning models for a target number of epochs using the plurality of hyperparameter search points assigned to the plurality of model trainers; (D) computing, via the plurality of model trainers, a plurality of performance metrics that measure a performance of the plurality of machine learning models during the target number of epochs; (E) transmitting, by the one or more worker nodes, the plurality of performance metrics to the controller node; (F) removing, by the controller node, one or more underperforming hyperparameter search points from the plurality of hyperparameter search points according to a pre-defined performance metric ranking criterion associated with the plurality of performance metrics; (G) determining, by the controller node, if a remainder of the plurality of hyperparameter search points satisfy a termination condition after removing the one or more underperforming hyperparameter search points in (F); (H) based upon determining that the plurality of hyperparameter search points does not satisfy the termination condition, increasing the target number of epochs and repeating (B)-(G) for the remainder of the plurality of hyperparameter search points until the termination condition is satisfied; and (I) based upon determining that the remainder of the plurality of hyperparameter search points satisfy the termination condition, outputting at least one hyperparameter search point from the remainder of the plurality of hyperparameter search points as an optimal configuration for a plurality of hyperparameters.

In some embodiments, a first respective hyperparameter search point is assigned to a first model trainer, and a second respective hyperparameter search point is assigned to a second model trainer, and concurrently training the plurality of machine learning models for the target number of epochs includes concurrently: training, via the first model trainer, a first machine learning model for the target number of epochs using hyperparameter values associated with the first respective hyperparameter search point; and training, via the second model trainer, a second machine learning model for the target number of epochs using hyperparameter values associated with the second respective hyperparameter search point.

In some embodiments, a first respective hyperparameter search point and a second respective hyperparameter search point remain in the plurality of hyperparameter search points after removing the one or more underperforming hyperparameter search points in (F), and repeating (C) of (B)-(G) for the remainder of the plurality of hyperparameter search points at least includes concurrently: resuming, at a first model trainer, training of a machine learning model trained on the first respective hyperparameter search point for the target number of epochs increased by (H), and resuming, at a second model trainer, training of a machine learning model trained on the second respective hyperparameter search point for the target number of epochs increased by (H).

In some embodiments, concurrently training the plurality of machine learning models for the target number of epochs in (C) includes concurrently training the plurality of machine learning models for a first number of epochs, increasing the target number of epochs in (F) includes increasing the target number of epochs from the first number of epochs to a second number of epochs, and repeating (C) of (B)-(G) for the remainder of the plurality of hyperparameter search points at least includes: concurrently training, via the plurality of model trainers, machine learning models associated with the remainder of the plurality of hyperparameter search points for the second number of epochs.

In some embodiments, a first respective hyperparameter search point remains and a second respective hyperparameter search point does not remain in the plurality of hyperparameter search points after removing the one or more underperforming hyperparameter search points in (F), and repeating (C) of (B)-(G) for the remainder of the plurality of hyperparameter search points at least includes concurrently: resuming, at a first model trainer, training of a machine learning model trained on the first respective hyperparameter search point for the target number of epochs increased by (H), and forgoing resuming, at a second model trainer, training of a machine learning model trained on the second respective hyperparameter search point for the target number of epochs increased by (H).

In some embodiments, the plurality of performance metrics computed in (D) includes a respective performance metric that measures the performance of a machine learning model trained on a first respective hyperparameter search point for the target number of epochs, the first respective hyperparameter search point remains in the plurality of hyperparameter search points after removing the one or more underperforming hyperparameter search points in (F), and repeating (D) of (B)-(G) for the remainder of the plurality of hyperparameter search points at least includes: re-computing the respective performance metric to measure the performance of the machine learning model trained on the first respective hyperparameter search point for the target number of epochs increased by (H).

In some embodiments, transmitting the plurality of performance metrics to the controller node in (E) includes transmitting a first respective performance metric that measures the performance of a machine learning model trained on a first respective hyperparameter search point for the target number of epochs, the first respective hyperparameter search point remains in the plurality of hyperparameter search points after removing the one or more underperforming hyperparameter search points in (F), and repeating (E) of (B)-(G) for the remainder of the plurality of hyperparameter search points at least includes transmitting an update to the first respective performance metric that measures the performance of the machine learning model trained on the first respective hyperparameter search point for the target number of epochs increased by (H).

In some embodiments, an apparatus comprises at least one processor and a storage to store instructions that, when executed by the at least one processor, cause the at least one processor to perform operations comprising: (A) selecting, by a controller node, a plurality of hyperparameter search points from a hyperparameter search space; (B) instructing, by the controller node, one or more worker nodes to concurrently train a plurality of machine learning models for a target number of epochs using the plurality of hyperparameter search points; (C) receiving, from the one or more worker nodes, a plurality of performance metrics that measure a performance of the plurality of machine learning models during the target number of epochs; (D) removing, by the controller node, one or more underperforming hyperparameter search points from the plurality of hyperparameter search points according to a pre-defined performance metric ranking criterion associated with the plurality of performance metrics; (E) determining, by the controller node, if a remainder of the plurality of hyperparameter search points satisfy a termination condition after removing the one or more underperforming hyperparameter search points in (F); (H) based upon determining that the plurality of hyperparameter search points does not satisfy the termination condition, increasing the target number of epochs and repeating (B)-(E) for the remainder of the plurality of hyperparameter search points until the termination condition is satisfied; and (I) based upon determining that the remainder of the plurality of hyperparameter search points satisfy the termination condition, outputting at least one hyperparameter search point from the remainder of the plurality of hyperparameter search points as an optimal configuration for a plurality of hyperparameters.

In some embodiments, a computer-program product comprises a non-transitory machine-readable storage medium storing computer instructions that, when executed by one or more processors, perform operations comprising: (A) selecting, by a controller node, a plurality of candidate hyperparameter search points from a hyperparameter search space; (B) assigning, by the controller node, the plurality of candidate hyperparameter search points to a plurality of model trainers of one or more worker nodes; (C) concurrently training, via the plurality of model trainers, a plurality of machine learning models for a target number of epochs using the plurality of candidate hyperparameter search points assigned to the plurality of model trainers; (D) identifying, by the controller node, a collection of intermediate candidate hyperparameter search points that outperform a remainder of the plurality of candidate hyperparameter search points by evaluating a performance of the plurality of machine learning models after training for the target number of epochs; (E) performing, by the controller node, a crossover operation with the collection of intermediate candidate hyperparameter search points to identify one or more new candidate hyperparameter search points to test in the hyperparameter search space; (F) adding, by the crossover operation, the one or more new candidate hyperparameter search points to the collection of intermediate candidate hyperparameter search points to generate a composite collection of candidate hyperparameter search points; (G) determining, by the controller node, if a threshold number of generations have been exceeded after generating the composite collection of candidate hyperparameter search points; (H) based upon determining that the threshold number of generations have not been exceeded, repeating (B)-(G) for the composite collection of candidate hyperparameter search points until the threshold number of generations are exceeded; and (I) based upon determining that the threshold number of generations have been exceeded, outputting at least one candidate hyperparameter search point from the composite collection of candidate hyperparameter search points as an optimal hyperparameter search point for the hyperparameter search space.

In some embodiments, the composite collection of candidate hyperparameter search points includes a first candidate hyperparameter search point of the plurality of candidate hyperparameter search points, and repeating (C) of (B)-(G) for the composite collection of candidate hyperparameter search points includes: resuming, at a first model trainer, training of a machine learning model trained on the first candidate hyperparameter search point until the machine learning model has been trained on the first candidate hyperparameter search point for a second target number of epochs, greater than the target number of epochs.

In some embodiments, the composite collection of candidate hyperparameter search points includes the first candidate hyperparameter search point and a second candidate hyperparameter search point that was not included in the collection of intermediate candidate hyperparameter search points identified in (D), and repeating (C) of (B)-(G) for the composite collection of candidate hyperparameter search points includes: initiating, at a second model trainer, training of a machine learning model for the second target number of epochs using the second candidate hyperparameter search point.

In some embodiments, the crossover operation with the collection of intermediate candidate hyperparameter search points identifies the one or more new candidate hyperparameter search points to test in the hyperparameter search space by: randomly selecting a group of intermediate candidate hyperparameter search points from the collection of intermediate candidate hyperparameter search points, identifying a subgroup of intermediate candidate hyperparameter search points from the group of intermediate candidate hyperparameter search points that satisfies a pre-defined performance criterion, computing a centroid for the subgroup of intermediate candidate hyperparameter search points, identifying an intermediate candidate hyperparameter search point of the subgroup of intermediate candidate hyperparameter search points that is furthest from the centroid, and detecting a new respective candidate hyperparameter search point to test in the hyperparameter search space by applying a directional vector from the intermediate candidate hyperparameter search point identified as being furthest from the centroid.

In some embodiments, the crossover operation performs (E) and (F) until the composite collection of candidate hyperparameter search points reaches a target size.

In some embodiments, the plurality of machine learning models includes a first machine learning model trained on a first respective hyperparameter candidate search point, and the collection of intermediate candidate hyperparameter search points that outperform the remainder of the plurality of candidate hyperparameter search points includes the first respective hyperparameter candidate search point when an efficacy metric of the first machine learning model ranks within a predefined scoring range.

In some embodiments, the computer-instructions, when executed by the one or more processors, perform operations comprising: (H) based upon determining that the threshold number of generations have not been exceeded: determining if a respective candidate hyperparameter search point of the composite collection of candidate hyperparameter search points is within a predefined threshold of a previously tested candidate hyperparameter search point of the plurality of candidate hyperparameter search points used in (C); and if the respective candidate hyperparameter search point is within the predefined threshold of the previously tested candidate hyperparameter search point: accessing, by the controller node, a training checkpoint associated with a first machine learning model trained on the previously tested candidate hyperparameter search point for the target number of epochs; and repeating (B)-(G) for the composite collection of candidate hyperparameter search points, including repeating (B)-(G) for the respective candidate hyperparameter search point using at least the training checkpoint of the first machine learning model.

In some embodiments, repeating (B) and (C) of (B)-(G) for the respective candidate hyperparameter search point includes: assigning, by the controller node, the respective candidate hyperparameter search point to a model trainer of a first worker node, and using, by the model trainer of the first worker node, the training checkpoint of the first machine learning model to train a second machine learning model on the respective candidate hyperparameter search point for a second target number of epochs, greater than the target number of epochs.

In some embodiments, the computer-instructions, when executed by the one or more processors, perform operations further comprising: if the respective candidate hyperparameter search point is not within the predefined threshold of the previously tested candidate hyperparameter search point: initializing, by the controller node, a set of initial weights that is not based on the training checkpoint associated with the first machine learning model; and repeating (B)-(G) for the composite collection of candidate hyperparameter search points, including repeating (B)-(G) for the respective candidate hyperparameter search point using at least the set of initial weights.

In some embodiments, repeating (B) and (C) of (B)-(G) for the respective candidate hyperparameter search point includes: assigning, by the controller node, the respective candidate hyperparameter search point to a model trainer of a first worker node, and using, by the model trainer of the first worker node, the set of initial weights to train a second machine learning model on the respective candidate hyperparameter search point for a second target number of epochs, greater than the target number of epochs.

In some embodiments, the plurality of candidate hyperparameter search points are randomly selected from the hyperparameter search space, and the plurality of candidate hyperparameter search points includes less than a predefined maximum number of candidate hyperparameter search points.

In some embodiments, the computer instructions, when executed by the one or more processors, perform operations further comprising: saving, to a computer database, a plurality of training checkpoints associated with training the plurality of machine learning models for the target number of epochs in (C).

In some embodiments, assigning the plurality of candidate hyperparameter search points to the plurality of model trainers of the one or more worker nodes includes: assigning a first candidate hyperparameter search point to a first respective model trainer of a first worker node; and assigning a second candidate hyperparameter search point to a first respective model trainer of a second worker node.

In some embodiments, assigning the plurality of candidate hyperparameter search points to the plurality of model trainers of the one or more worker nodes includes: assigning a first candidate hyperparameter search point to a first respective model trainer of a first worker node; and assigning a second candidate hyperparameter search point to a second respective model trainer of the first worker node.

In some embodiments, concurrently training the plurality of machine learning models for the target number of epochs includes concurrently: training, at a first model trainer, a first machine learning model for the target number of epochs using a first candidate hyperparameter search point assigned to the first model trainer, and training, at a second model trainer, a second machine learning model for the target number of epochs using a second candidate hyperparameter search point assigned to the second model trainer.

In some embodiments, a computer-implemented method comprises: (A) selecting, by a controller node, a plurality of candidate hyperparameter search points from a hyperparameter search space; (B) assigning, by the controller node, the plurality of candidate hyperparameter search points to a plurality of model trainers of one or more worker nodes; (C) concurrently training, via the plurality of model trainers, a plurality of machine learning models for a target number of epochs using the plurality of candidate hyperparameter search points assigned to the plurality of model trainers; (D) identifying, by the controller node, a collection of intermediate candidate hyperparameter search points that outperform a remainder of the plurality of candidate hyperparameter search points by evaluating a performance of the plurality of machine learning models after training for the target number of epochs; (E) performing, by the controller node, a crossover operation with the collection of intermediate candidate hyperparameter search points to identify one or more new candidate hyperparameter search points to test in the hyperparameter search space; (F) adding, by the crossover operation, the one or more new candidate hyperparameter search points to the collection of intermediate candidate hyperparameter search points to generate a composite collection of candidate hyperparameter search points; (G) determining, by the controller node, if a threshold number of generations have been exceeded after generating the composite collection of candidate hyperparameter search points; (H) based upon determining that the threshold number of generations have not been exceeded, repeating (B)-(G) for the composite collection of candidate hyperparameter search points until the threshold number of generations are exceeded; and (I) based upon determining that the threshold number of generations have been exceeded, outputting at least one candidate hyperparameter search point from the composite collection of candidate hyperparameter search points as an optimal hyperparameter search point for the hyperparameter search space.

In some embodiments, the composite collection of candidate hyperparameter search points includes a first candidate hyperparameter search point of the plurality of candidate hyperparameter search points, and repeating (C) of (B)-(G) for the composite collection of candidate hyperparameter search points includes: resuming, at a first model trainer, training of a machine learning model trained on the first candidate hyperparameter search point until the machine learning model has been trained on the first candidate hyperparameter search point for a second target number of epochs, greater than the target number of epochs.

In some embodiments, the composite collection of candidate hyperparameter search points includes the first candidate hyperparameter search point and a second candidate hyperparameter search point that was not included in the collection of intermediate candidate hyperparameter search points identified in (D), and repeating (C) of (B)-(G) for the composite collection of candidate hyperparameter search points includes: initiating, at a second model trainer, training of a machine learning model for the second target number of epochs using the second candidate hyperparameter search point.

In some embodiments, the crossover operation with the collection of intermediate candidate hyperparameter search points identifies the one or more new candidate hyperparameter search points to test in the hyperparameter search space by: randomly selecting a group of intermediate candidate hyperparameter search points from the collection of intermediate candidate hyperparameter search points, identifying a subgroup of intermediate candidate hyperparameter search points from the group of intermediate candidate hyperparameter search points that satisfies a pre-defined performance criterion, computing a centroid for the subgroup of intermediate candidate hyperparameter search points, identifying an intermediate candidate hyperparameter search point of the subgroup of intermediate candidate hyperparameter search points that is furthest from the centroid, and detecting a new respective candidate hyperparameter search point to test in the hyperparameter search space by applying a directional vector from the intermediate candidate hyperparameter search point identified as being furthest from the centroid.

In some embodiments, the crossover operation performs (E) and (F) until the composite collection of candidate hyperparameter search points reaches a target size.

In some embodiments, the plurality of machine learning models includes a first machine learning model trained on a first respective hyperparameter candidate search point, and the collection of intermediate candidate hyperparameter search points that outperform the remainder of the plurality of candidate hyperparameter search points includes the first respective hyperparameter candidate search point when an efficacy metric of the first machine learning model ranks within a predefined scoring range.

In some embodiments, the computer-implemented further comprises: (H) based upon determining that the threshold number of generations have not been exceeded: determining if a respective candidate hyperparameter search point of the composite collection of candidate hyperparameter search points is within a predefined threshold of a previously tested candidate hyperparameter search point of the plurality of candidate hyperparameter search points used in (C); and if the respective candidate hyperparameter search point is within the predefined threshold of the previously tested candidate hyperparameter search point: accessing, by the controller node, a training checkpoint associated with a first machine learning model trained on the previously tested candidate hyperparameter search point for the target number of epochs; and repeating (B)-(G) for the composite collection of candidate hyperparameter search points, including repeating (B)-(G) for the respective candidate hyperparameter search point using at least the training checkpoint of the first machine learning model.

In some embodiments, a computer-implemented system comprises: one or more processors; a memory; and a computer-readable medium operably coupled to the one or more processors, the computer-readable medium having computer-readable instructions stored thereon that, when executed by the one or more processors, cause a computing device to perform operations comprising: (A) selecting, by a controller node, a plurality of candidate hyperparameter search points from a hyperparameter search space; (B) assigning, by the controller node, the plurality of candidate hyperparameter search points to a plurality of model trainers of one or more worker nodes; (C) concurrently training, via the plurality of model trainers, a plurality of machine learning models for a target number of epochs using the plurality of candidate hyperparameter search points assigned to the plurality of model trainers; (D) identifying, by the controller node, a collection of intermediate candidate hyperparameter search points that outperform a remainder of the plurality of candidate hyperparameter search points by evaluating a performance of the plurality of machine learning models after training for the target number of epochs; (E) performing, by the controller node, a crossover operation with the collection of intermediate candidate hyperparameter search points to identify one or more new candidate hyperparameter search points to test in the hyperparameter search space; (F) adding, by the crossover operation, the one or more new candidate hyperparameter search points to the collection of intermediate candidate hyperparameter search points to generate a composite collection of candidate hyperparameter search points; (G) determining, by the controller node, if a threshold number of generations have been exceeded after generating the composite collection of candidate hyperparameter search points; (H) based upon determining that the threshold number of generations have not been exceeded, repeating (B)-(G) for the composite collection of candidate hyperparameter search points until the threshold number of generations are exceeded; and (I) based upon determining that the threshold number of generations have been exceeded, outputting at least one candidate hyperparameter search point from the composite collection of candidate hyperparameter search points as an optimal hyperparameter search point for the hyperparameter search space.

In some embodiments, the composite collection of candidate hyperparameter search points includes a first candidate hyperparameter search point of the plurality of candidate hyperparameter search points, and repeating (C) of (B)-(G) for the composite collection of candidate hyperparameter search points includes: resuming, at a first model trainer, training of a machine learning model trained on the first candidate hyperparameter search point until the machine learning model has been trained on the first candidate hyperparameter search point for a second target number of epochs, greater than the target number of epochs.

In some embodiments, the composite collection of candidate hyperparameter search points includes the first candidate hyperparameter search point and a second candidate hyperparameter search point that was not included in the collection of intermediate candidate hyperparameter search points identified in (D), and repeating (C) of (B)-(G) for the composite collection of candidate hyperparameter search points includes: initiating, at a second model trainer, training of a machine learning model for the second target number of epochs using the second candidate hyperparameter search point.

In some embodiments, the crossover operation with the collection of intermediate candidate hyperparameter search points identifies the one or more new candidate hyperparameter search points to test in the hyperparameter search space by: randomly selecting a group of intermediate candidate hyperparameter search points from the collection of intermediate candidate hyperparameter search points, identifying a subgroup of intermediate candidate hyperparameter search points from the group of intermediate candidate hyperparameter search points that satisfies a pre-defined performance criterion, computing a centroid for the subgroup of intermediate candidate hyperparameter search points, identifying an intermediate candidate hyperparameter search point of the subgroup of intermediate candidate hyperparameter search points that is furthest from the centroid, and detecting a new respective candidate hyperparameter search point to test in the hyperparameter search space by applying a directional vector from the intermediate candidate hyperparameter search point identified as being furthest from the centroid.

In some embodiments, the crossover operation performs (E) and (F) until the composite collection of candidate hyperparameter search points reaches a target size.

In some embodiments, the plurality of machine learning models includes a first machine learning model trained on a first respective hyperparameter candidate search point, and the collection of intermediate candidate hyperparameter search points that outperform the remainder of the plurality of candidate hyperparameter search points includes the first respective hyperparameter candidate search point when an efficacy metric of the first machine learning model ranks within a predefined scoring range.

In some embodiments, the computer-readable instructions, when executed by the one or more processors, cause the computing device to perform the operations comprising: (H) based upon determining that the threshold number of generations have not been exceeded: determining if a respective candidate hyperparameter search point of the composite collection of candidate hyperparameter search points is within a predefined threshold of a previously tested candidate hyperparameter search point of the plurality of candidate hyperparameter search points used in (C); and if the respective candidate hyperparameter search point is within the predefined threshold of the previously tested candidate hyperparameter search point: accessing, by the controller node, a training checkpoint associated with a first machine learning model trained on the previously tested candidate hyperparameter search point for the target number of epochs; and repeating (B)-(G) for the composite collection of candidate hyperparameter search points, including repeating (B)-(G) for the respective candidate hyperparameter search point using at least the training checkpoint of the first machine learning model.

In some embodiments, an apparatus comprises at least one processor and a storage to store instructions that, when executed by the at least one processor, cause the at least one processor to perform operations comprising: (A) selecting, by a controller node, a plurality of candidate hyperparameter search points from a hyperparameter search space; (B) instructing, by the controller node, one or more worker nodes to concurrently train a plurality of machine learning models for a target number of epochs using the plurality of candidate hyperparameter search points; (C) identifying, by the controller node, a collection of intermediate candidate hyperparameter search points that outperform a remainder of the plurality of candidate hyperparameter search points by evaluating a performance of the plurality of machine learning models after training for the target number of epochs; (D) performing, by the controller node, a crossover operation with the collection of intermediate candidate hyperparameter search points to identify one or more new candidate hyperparameter search points to test in the hyperparameter search space; (E) adding, by the crossover operation, the one or more new candidate hyperparameter search points to the collection of intermediate candidate hyperparameter search points to generate a composite collection of candidate hyperparameter search points; (F) determining, by the controller node, if a threshold number of generations have been exceeded after generating the composite collection of candidate hyperparameter search points; (G) based upon determining that the threshold number of generations have not been exceeded, repeating (B)-(F) for the composite collection of candidate hyperparameter search points until the threshold number of generations are exceeded; and (H) based upon determining that the threshold number of generations have been exceeded, outputting at least one candidate hyperparameter search point from the composite collection of candidate hyperparameter search points as an optimal hyperparameter search point for the hyperparameter search space.

BRIEF DESCRIPTION OF THE FIGURES

FIG. 30 illustrates a flow chart showing an example process of transferring a data block from a first computer process to a second computer process, according to some embodiments of the present technology.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

EXAMPLE SYSTEMS

Systems depicted in some of the figures may be provided in various configurations. In some embodiments, the systems may be configured as a distributed system where one or more components of the system are distributed across one or more networks in a cloud computing system.

Figure 1:
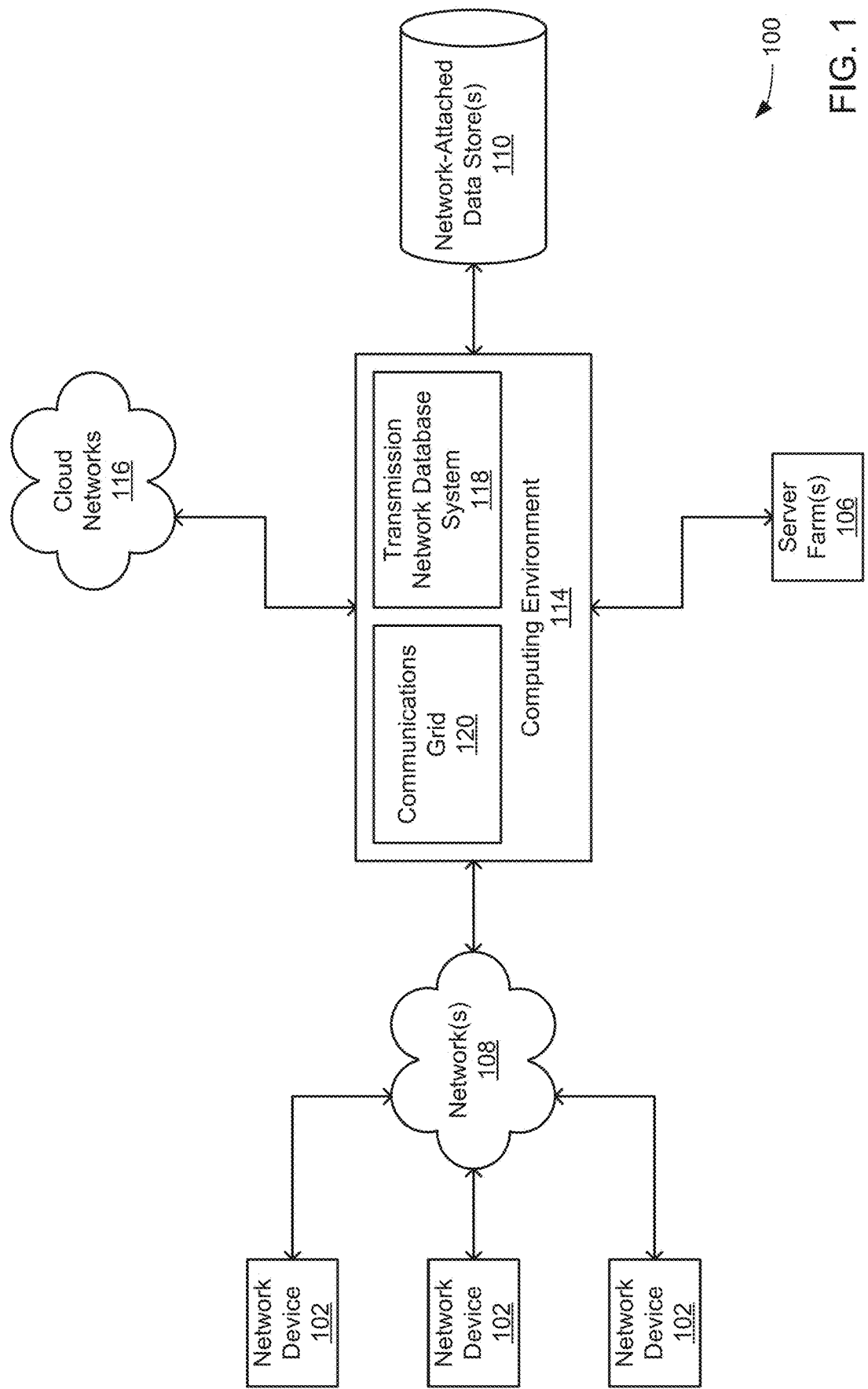
FIG. 1 illustrates a block diagram that provides an illustration of the hardware components of a computing system, according to some embodiments of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
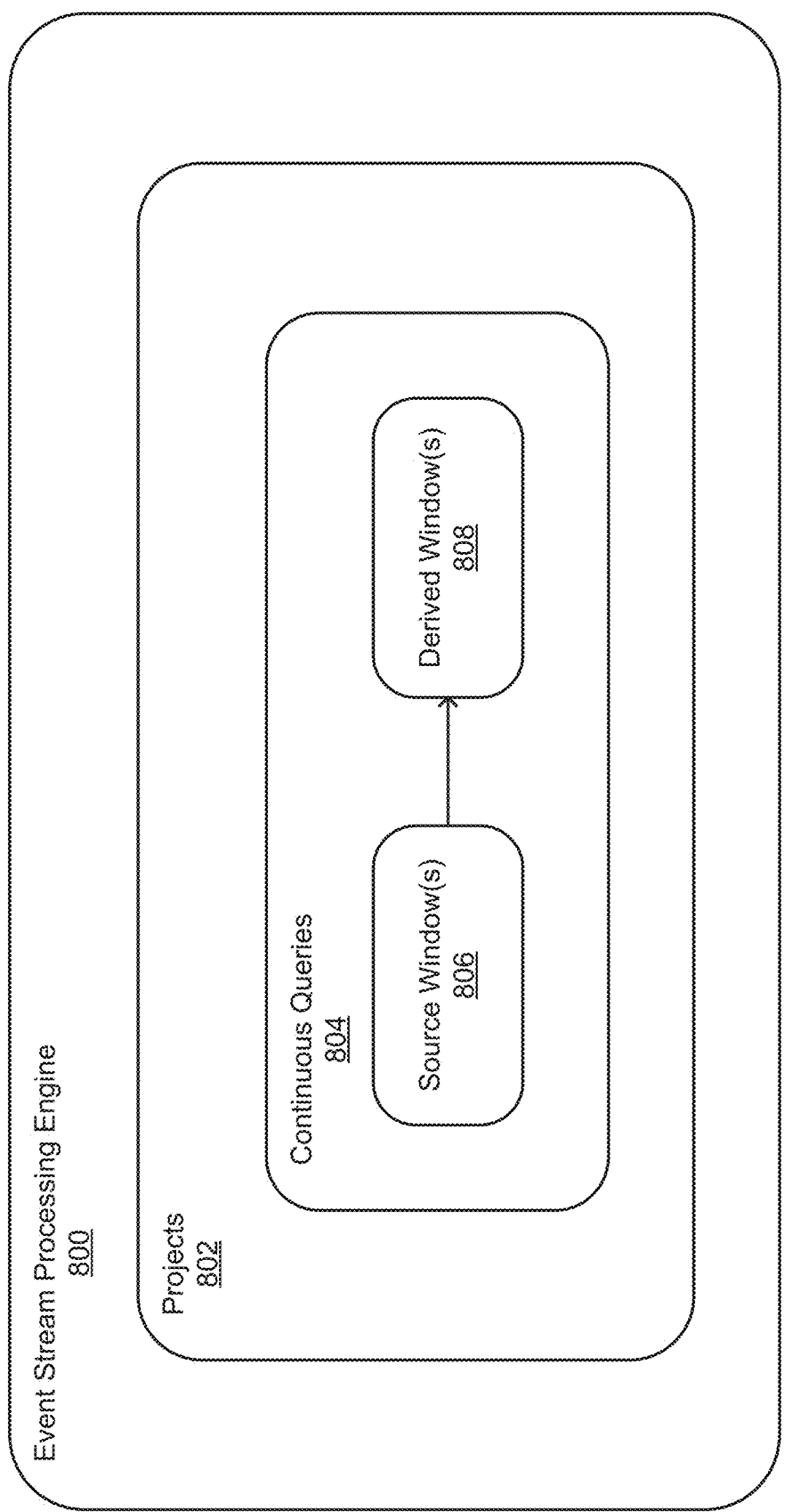
FIG. 8 illustrates a block diagram including components of an Event Stream Processing Engine (ESPE), according to some embodiments of the present technology.
Figure 9:
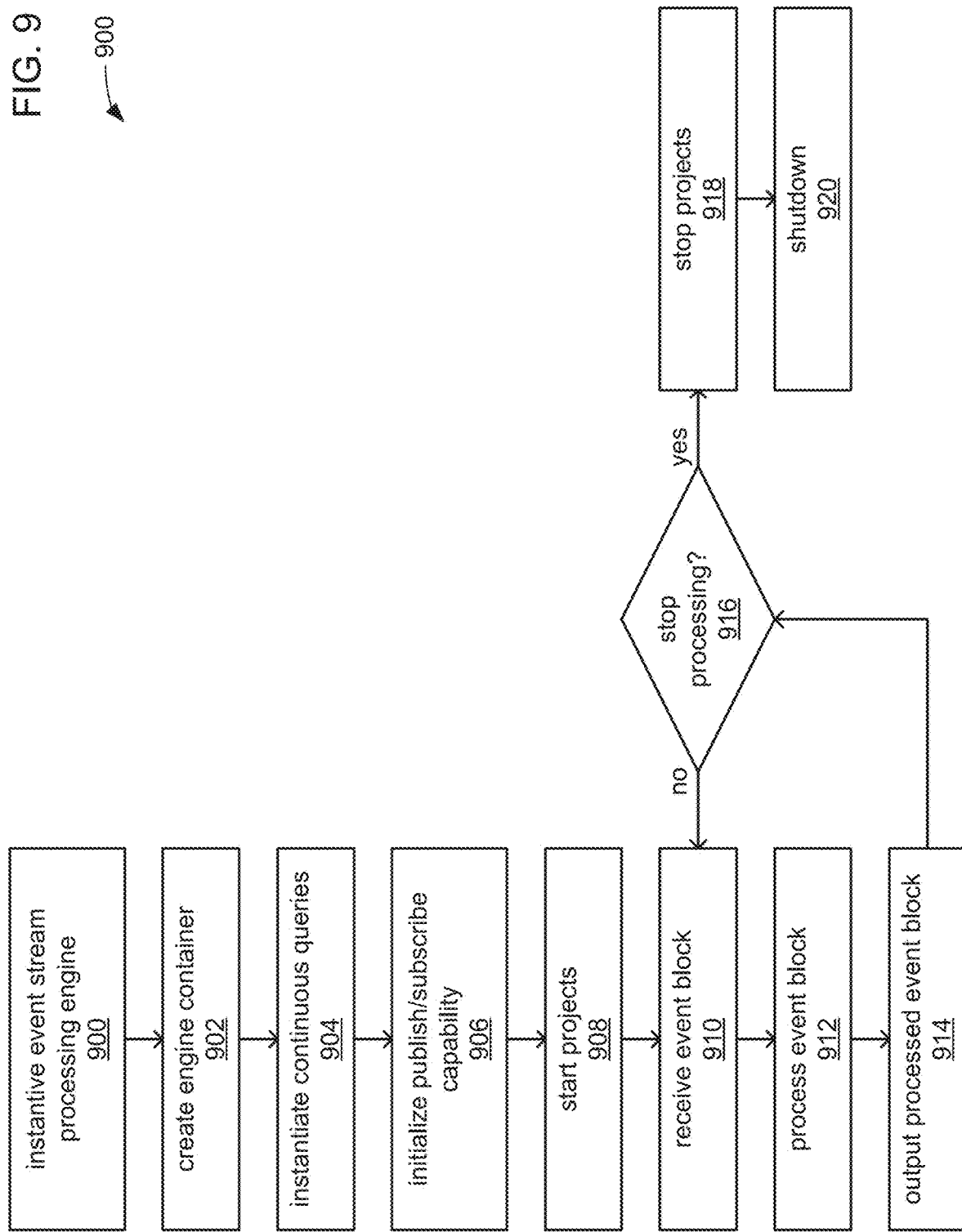
FIG. 9 illustrates a flow chart showing an example process including operations performed by an event stream processing engine, according to some embodiments of the present technology.
Figure 10:
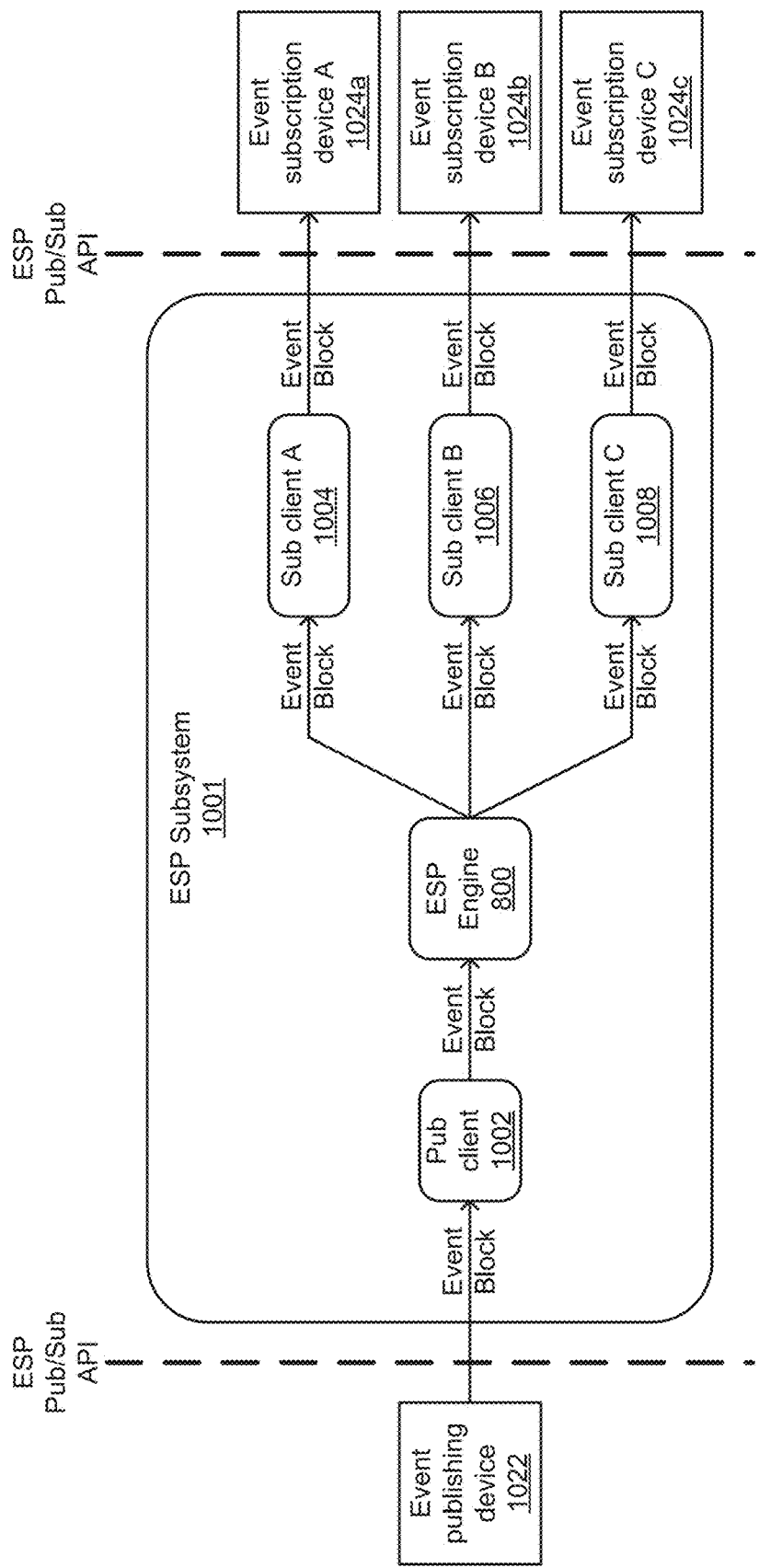
FIG. 10 illustrates an ESP system interfacing between a publishing device and multiple event subscribing devices, according to some embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® LOW Energy communication channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
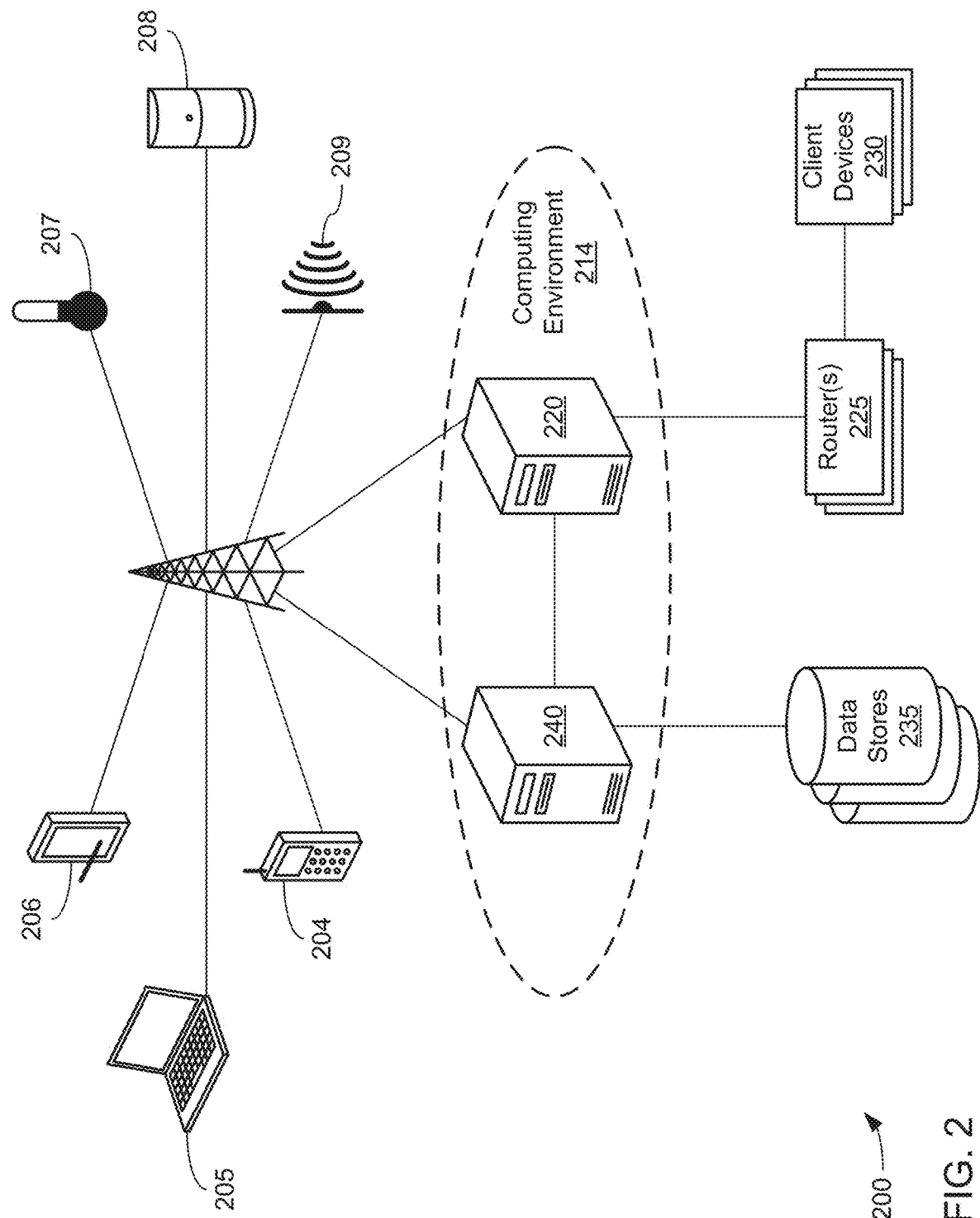
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
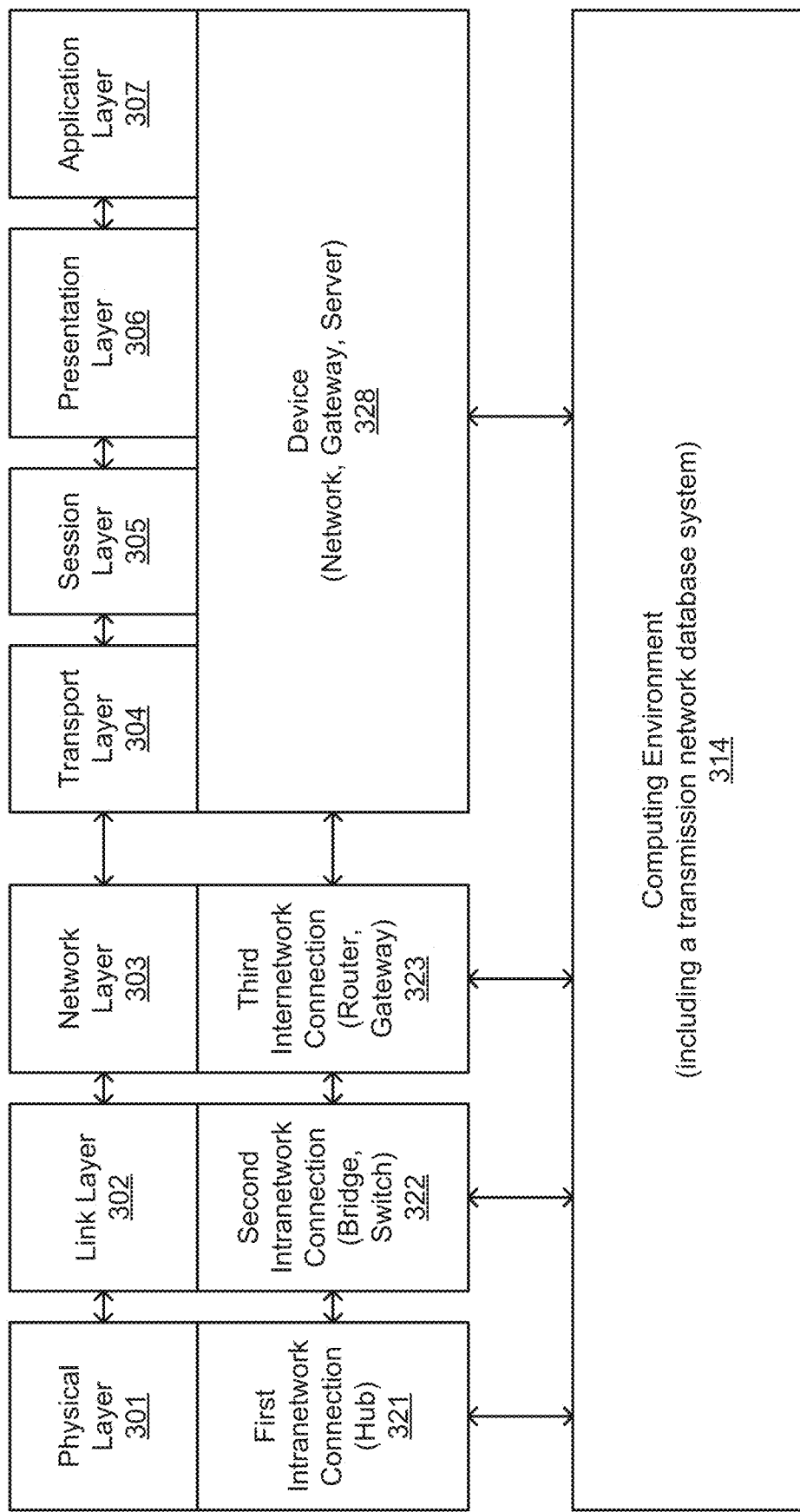
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
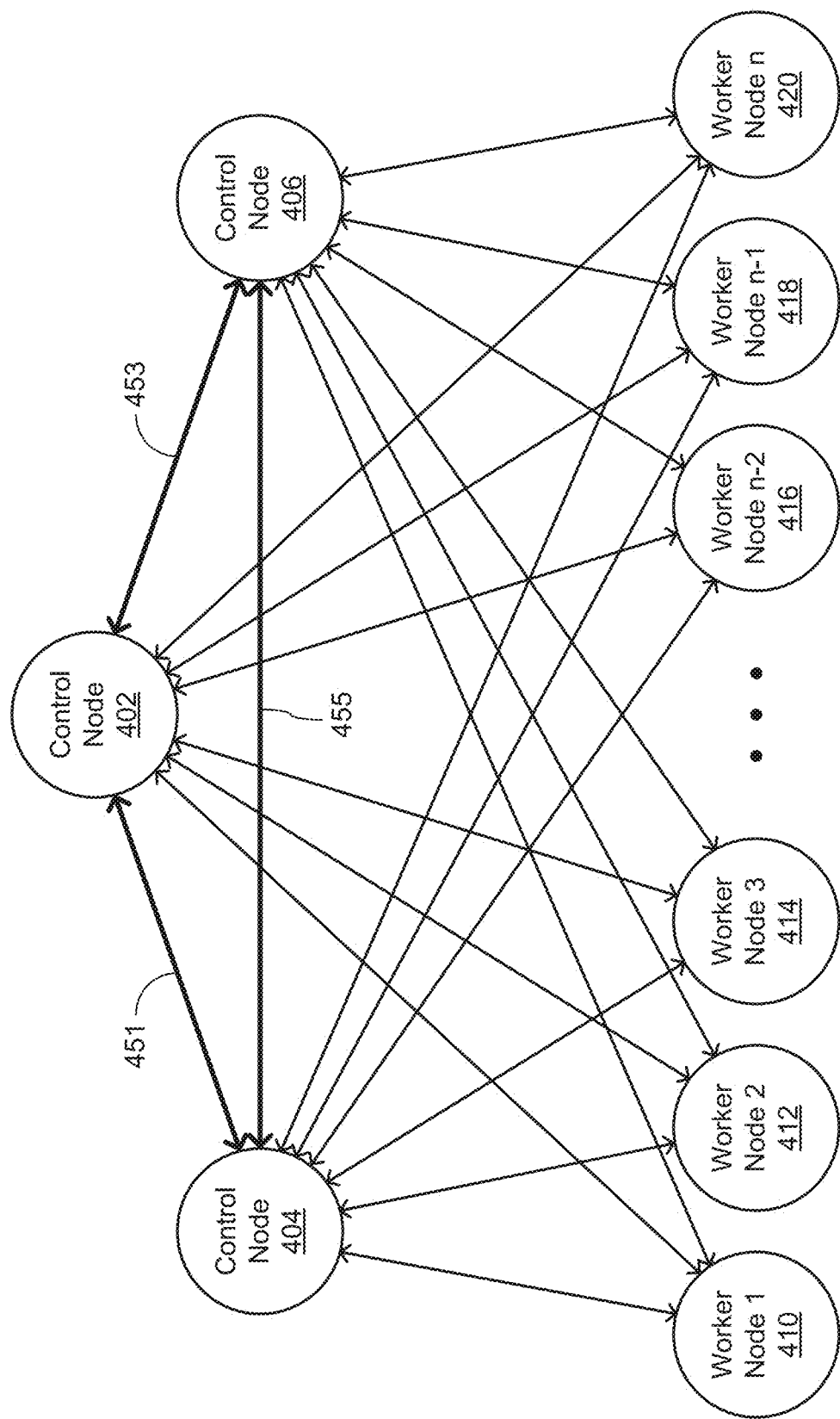
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
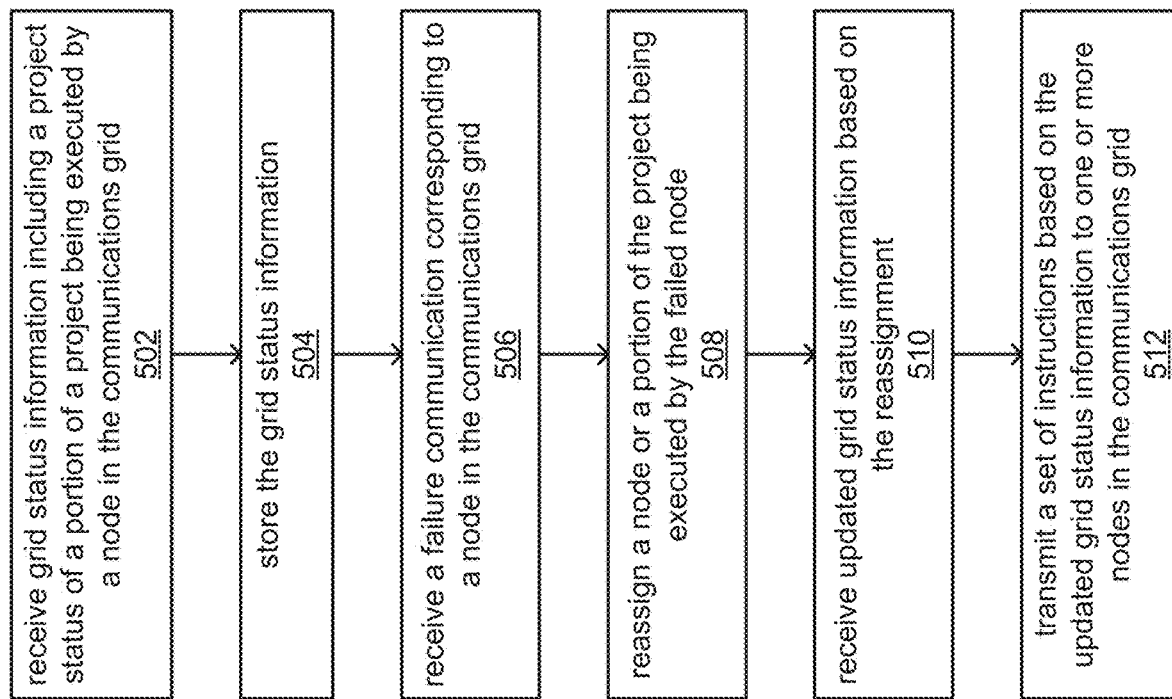
FIG. 5 illustrates a flow chart showing an example process for adjusting a communications grid or a work project in a communications grid after a failure of a node, according to some embodiments of the present technology.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
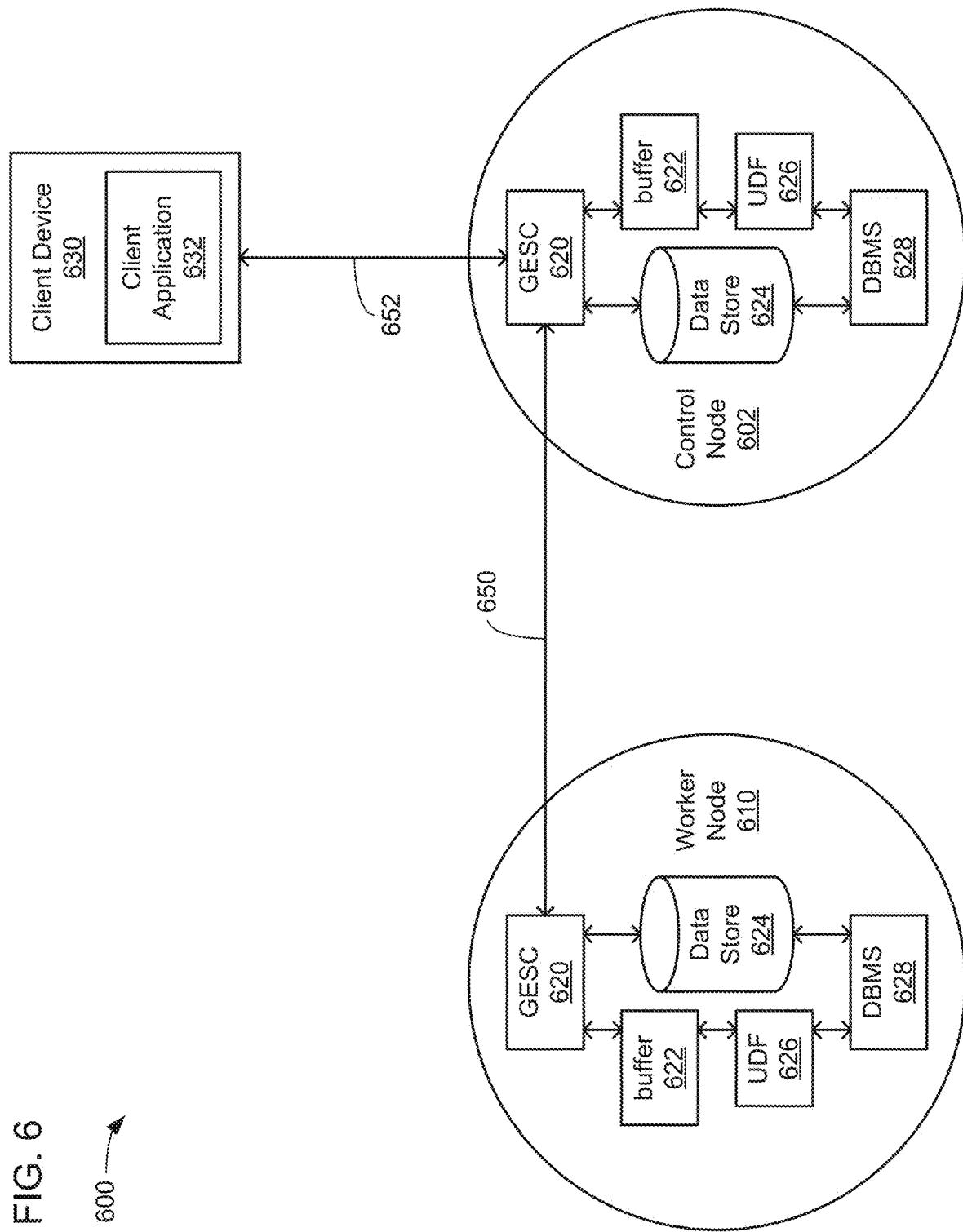
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However, in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client deice 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
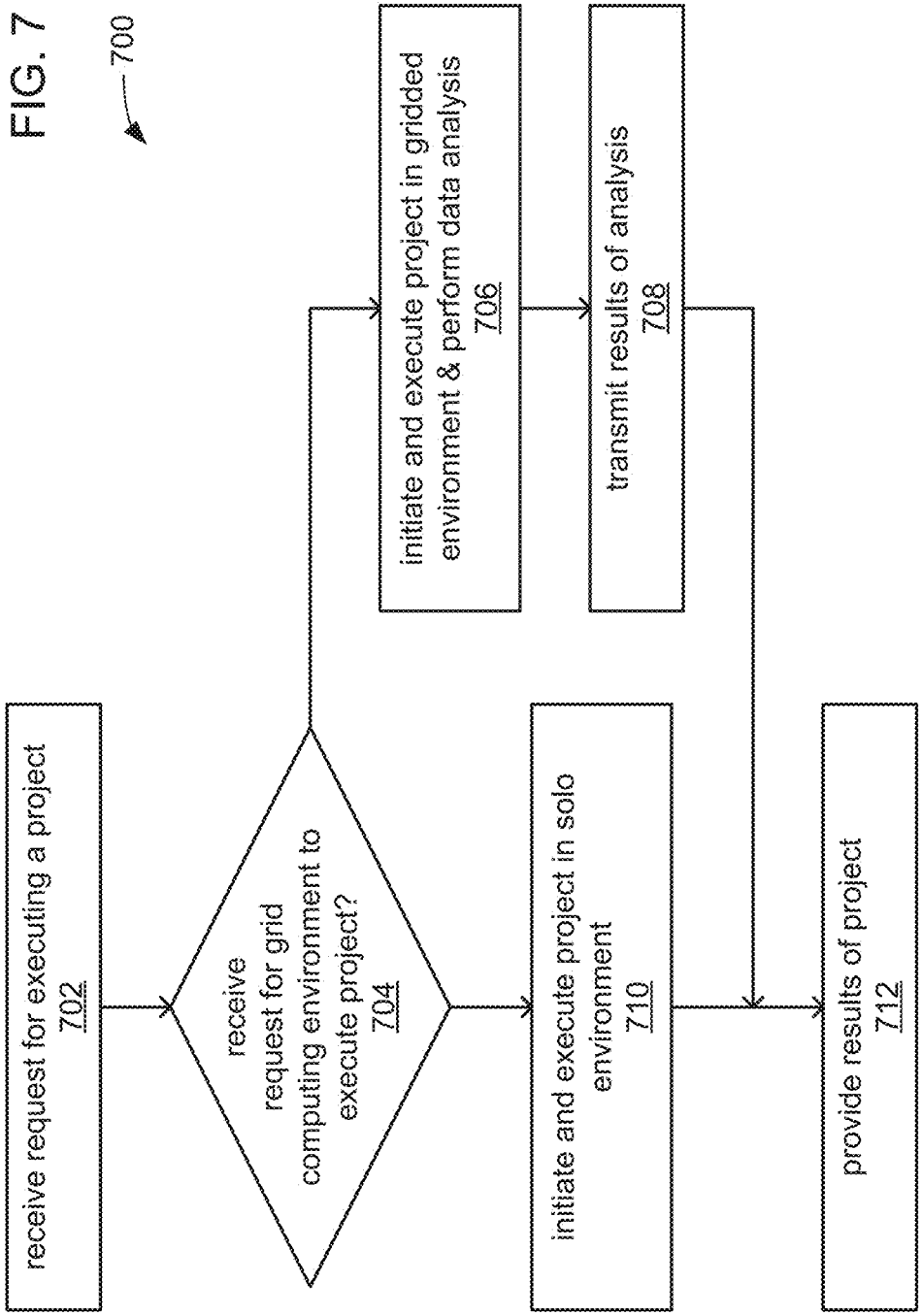
FIG. 7 illustrates a flow chart showing an example process for executing a data analysis or processing project, according to some embodiments of the present technology.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 851, event publishing device 1022, an event subscribing device A 1024*a*, an event subscribing device B 1024*b*, and an event subscribing device C 1024*c*. Input event streams are output to ESP device 851 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
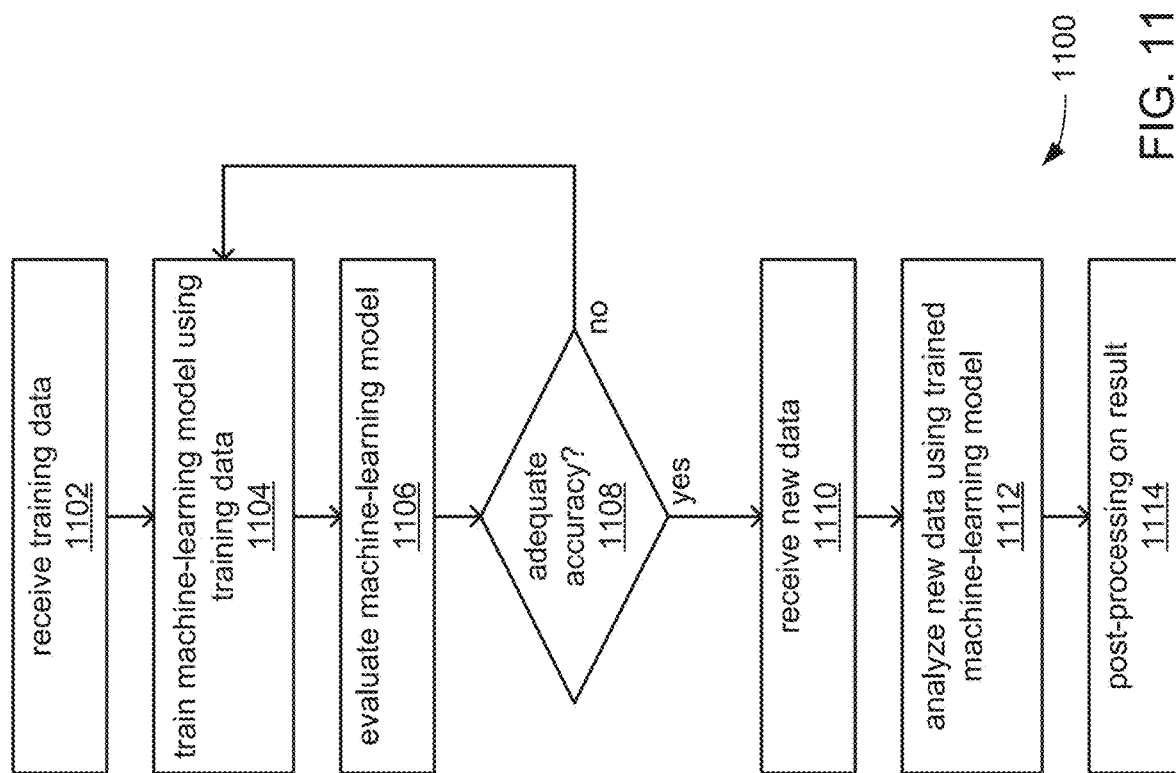
FIG. 11 illustrates a flow chart of an example of a process for generating and using a machine-learning model according to some aspects, according to some embodiments of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at 1108, the machine-learning model has an inadequate degree of accuracy for a particular task, the process can return to block 1104, where the machine-learning model can be further trained using additional training data or otherwise modified to improve accuracy. However, if, at 1108. the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
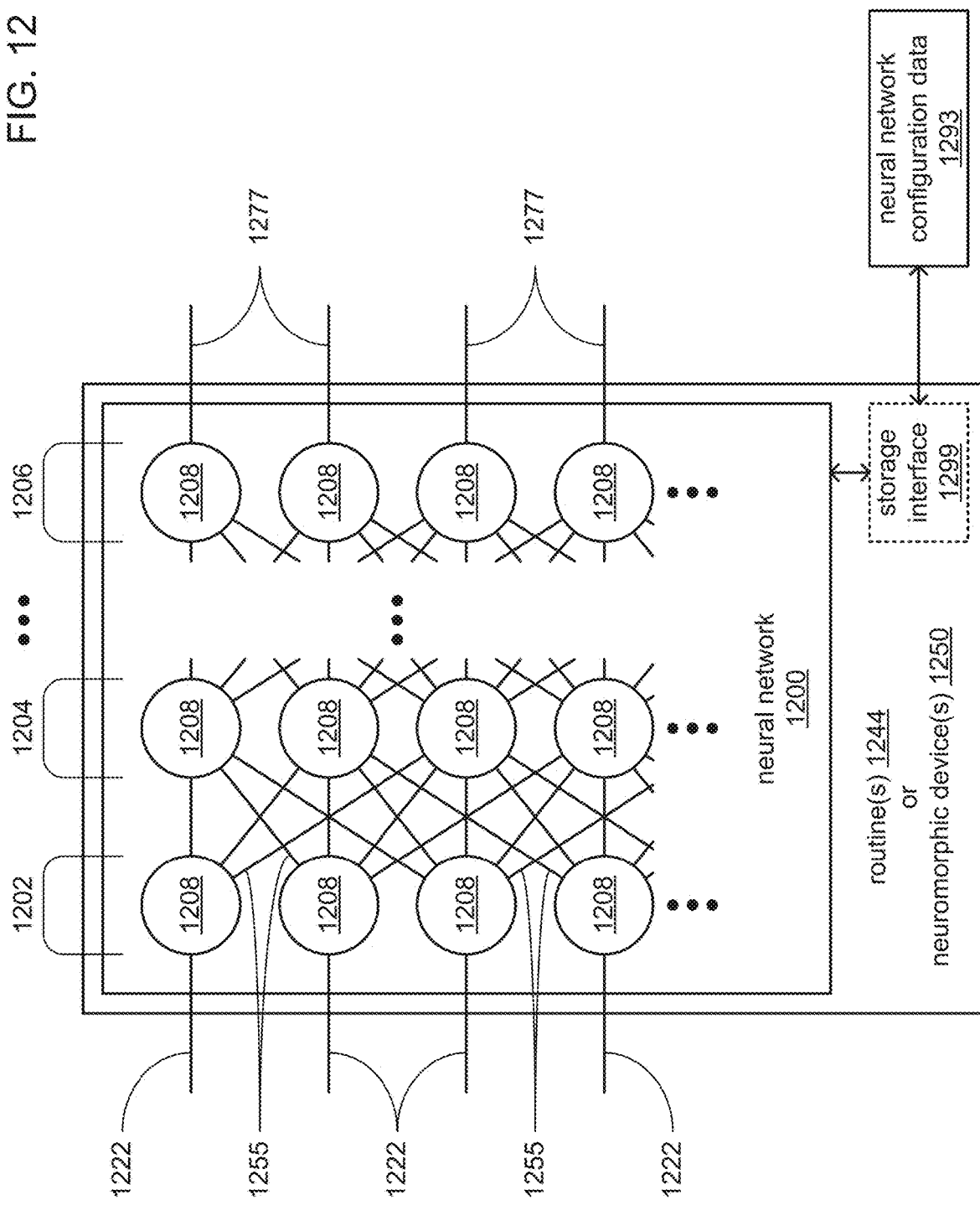
FIG. 12 illustrates an example of a machine-learning model as a neural network, according to some embodiments of the present technology.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively, or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
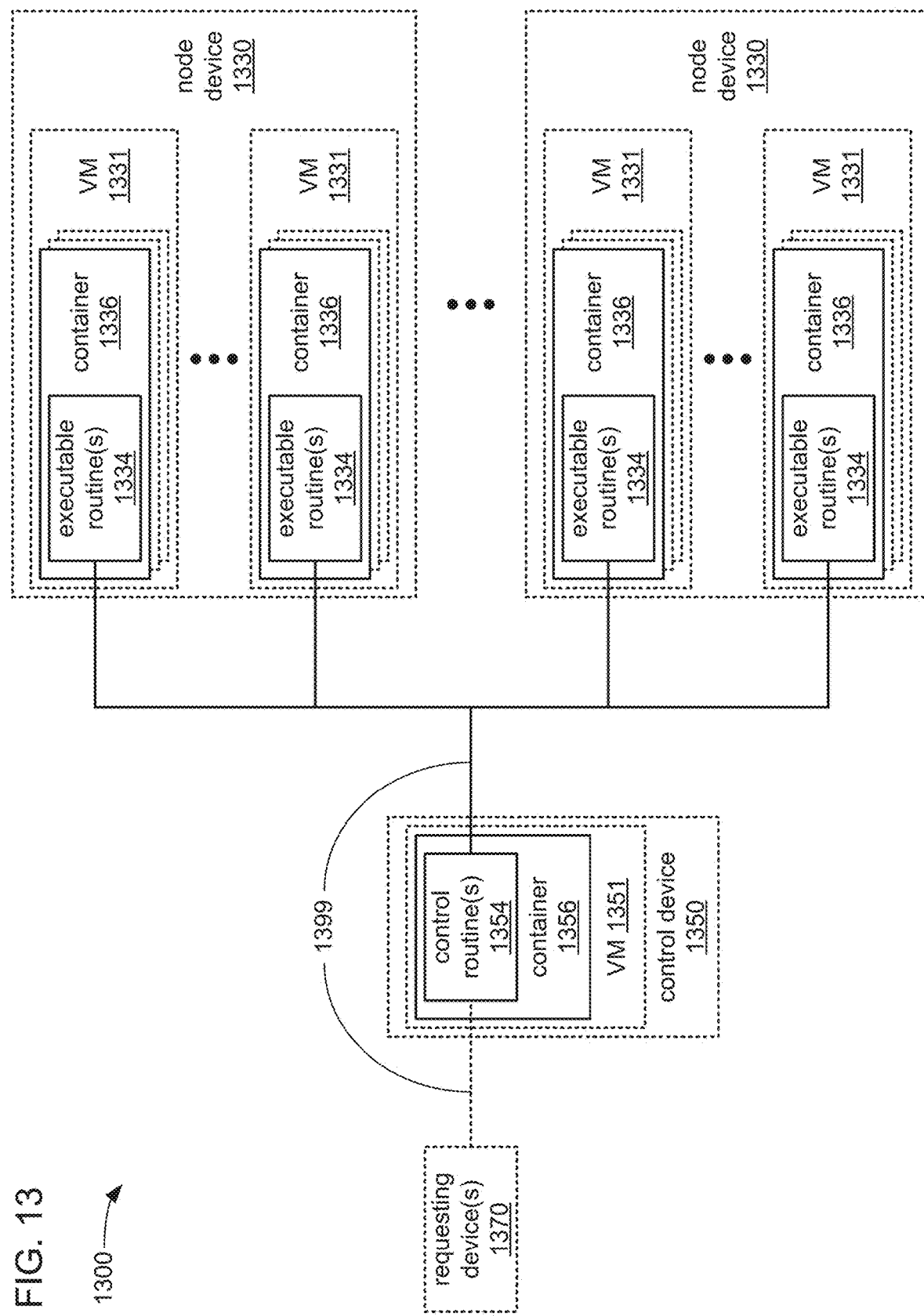
FIG. 13 illustrates various aspects of the use of containers as a mechanism to allocate processing, storage and/or other resources of a processing system to the performance of various analyses, according to some embodiments of the present technology.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforedescribed grid system 400), the processing, storage and/or other resources of each node device 1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively, or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively, or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1300 to each VM 1331 and/or container 1336 that is instantiated therein. Thus, it may be the control device(s) 1350 that effects a nested allocation of resources, such as the aforedescribed example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that either all of each such transaction is either entirely performed or is entirely not performed. As will be familiar to those skilled in the art, allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively, or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, CA, USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively, or additionally, such supporting routines may serve to provide access to one or more storage repositories (not specifically shown) in which at least data objects may be stored for use in performing the requested analyses.

Associated Processes

The systems, methods, computer program products, and embodiments described herein may be implemented in a variety of technology areas where data needs to be transferred between multiple computer processes running on a single computer. This includes, but is not limited to, cloud applications, data exchange systems, analytics platforms, streaming services, and any other type of system, service, or application that requires inter-process communication on a single computing device or machine.

Furthermore, as described in more detail herein, the systems, methods, computer program products, and embodiments may use multiple computer processes to execute analytical functions. The analytical functions may be encoded to use one or more algorithms written in a programming language suitable for performing the respective computational task. For example, an analytical function may be encoded to use an algorithm implemented in Python that leverages one or more machine learning frameworks such as PyTorch or TensorFlow, which are often better suited for machine learning applications than similar libraries available in other programming languages. At least one technical advantage of encoding analytical functions to use one or more algorithms written in a programming language "best" suited for the respective computational task may improve execution efficiency and reduce the complexity involved in developing analytical functions.

The systems, methods, computer program products, and embodiments may use a parent-child computer process relationship to execute an analytical function. In such systems, methods, computer program products, and embodiments, the parent computer process may execute instructions in a first programming language (e.g., C++) to perform data handling tasks (e.g., obtaining datasets, configuration data, etc.), invoke the analytical function, and launch a child computer process to execute the algorithm associated with the analytical function. Furthermore, in such systems, methods, computer program products, and embodiments, the child computer process may request data from the parent computer process, obtain the requested data, and execute the algorithm using the obtained data. At least one technical advantage of such a parent-child computer process relationship may enable the systems, methods, computer program products, and embodiments to execute analytical functions without being constrained to a single-language compute environment, allowing each computer process to operate in a runtime environment optimized for their respective tasks.

The systems, methods, computer program products, and embodiments may further transfer requests, commands, and data between the child computer process and the parent computer process using one or more cross-process queues. To transfer the requests, commands, and data between the child computer process and the parent computer process, the systems, methods, computer program products, and embodiments, may serialize the requests, commands, and data into a binary data format and write the serialized requests, serialized commands, and serialized data to the one or more cross-process queues. A subsequent computer process may function to read the serialized requests, serialized commands, and serialized data from the one or more cross-process queue and deserialize the serialized requests, the serialized commands, and the serialized data into a data structure compatible with the programming language and runtime environment associated with the subsequent computer process. At least one technical advantage of such serialization and deserialization may enable the conversion of data from a representation in a first programming language (e.g., C++) to a corresponding representation in a second programming language (e.g., Python), and vice versa. Another technical advantage of serializing data (e.g., converting the data into a compact binary data format) enables a faster data transfer between computer processes when compared to transferring the data in the corresponding native language representation (e.g., C++, Python, etc.). Accordingly, serializing the data into the corresponding binary data format reduces the amount of time needed to transfer the data from one computer process to another computer process and reduces the total amount of memory needed during the data transfer operation. Another technical advantage of deserializing data enables the receiving computer process to reconstruct the serialized data into a suitable data representation or format compatible with the receiving computer process, which allows the data to be available for immediate use and processing.

The systems, methods, computer program products, and embodiments may further invoke one or more application programming interface (API) functions to facilitate communication, coordination, and data exchange between the parent computer process and the child computer process. Such API functions may be designed to perform a variety of tasks, including creating requests for parameters or datasets, creating response messages, transmitting execution commands, executing data serialization and deserialization protocols, writing and reading messages to and from cross-process queues, logging execution events or errors, and transferring computational results. At least one technical advantage of such API functions may provide a reliable communication mechanism for transmitting requests, commands, response messages, and data between the parent computer process and the child computer process. Another technical advantage of invoking such API functions may provide enhanced computing performance by enabling parent and child computer processes to efficiently execute tasks such as data serialization tasks, deserialization tasks, and data transfer tasks through structured protocols, thereby reducing communication overhead, minimizing latency, and ensuring reliable inter-process communication.

The systems, methods, computer program products, and embodiments may further implement and use one or more cross-process queues to transfer data between a plurality of computer processes operating within a POSIX-compliant operating system. In traditional POSIX-compliant operating systems, transferring data between computer processes present significant technical challenges because each process operates within its own distinct memory address space, and memory addresses in one computer process do not correspond to the same physical memory locations in another computer process. Thus, transferring data across computer processes in traditional POSIX-compliant operating systems is not typically feasible because computer processes do not share the same memory address space. However, by implementing and using the one or more cross-process queues, the systems, methods, computer program products, and embodiments provide a mechanism that overcomes the traditional barriers of transferring data between computer processes in POSIX-compliant operating systems.

Furthermore, in such systems, methods, computer program products, and embodiments, fewer computing resources (e.g., fewer central processing units, fewer graphics processing units, etc.) may be needed to execute a computational task (e.g., analytical operation, analytical function, etc.) because each respective algorithm underpinning an analytical function may be encoded in a programming language best suited for the respective computational task. Encoding an algorithm in a programming language not well-suited for the respective computational task may lead to computational inefficiencies, as it may take significantly longer to compute a computational result and require more compute resources to achieve the same computational result. For instance, executing a machine learning operation in C++ instead of Python may result in more compute resources being used because C++ lacks access to specialized machine learning frameworks like TensorFlow or PyTorch, which are designed to efficiently handle machine learning-based computational tasks.

Furthermore, in such systems, methods, computer program products, and embodiments, fewer input/output (I/O) exchanges are required to execute a computational task (e.g., analytical operation, analytical function, etc.) because serialization and deserialization of data significantly reduce the number of operations needed to write data to the cross-process queue and read the data from the cross-process queue. For example, instead of transferring a 50 GB dataset encoded in a data structure of C++ or Python—where the transfer would require numerous, large, and fragmented read and write operations—the dataset may be serialized into a compact binary format that can be transferred in fewer read/write operations. Thereby, reducing the I/O overhead associated with inter-process communication, minimizing latency, and optimizing the use of memory and computational resources, enabling faster and more efficient execution of computational tasks.

Furthermore, in such systems, methods, computer program products, and embodiments, less memory may be required to store and transfer computational results during or after the execution of a computational task because the computational results are serialized into a binary data format before transmission. Transferring computational results in their native data structures, such as Python dictionaries or C++ objects, often involves additional metadata, padding, or unoptimized data representations that increase memory usage. By serializing the computational results into a binary data format, the memory footprint may be significantly reduced, as redundant metadata and structural overhead are eliminated. For example, a ten-gigabyte computational result represented in one or more data structures of Python may require substantial memory, whereas the serialized version may represent the same computational result with a fraction of the memory, enabling more efficient storage, faster data transfers, and improved resource utilization across computer processes.

Figure 14:
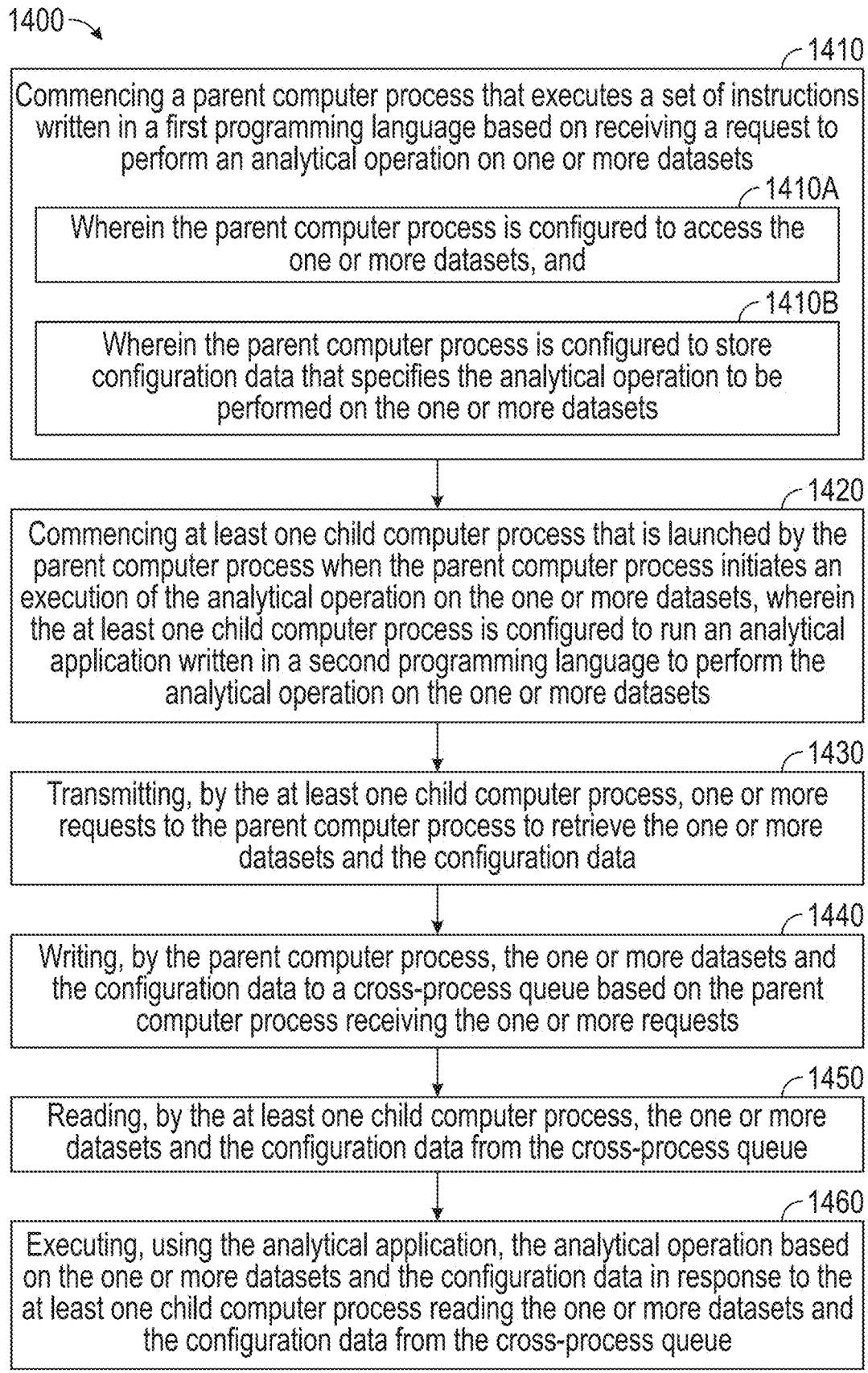
FIG. 14 illustrates a flow chart showing an example process executing an analytical operation using multiple computer processes, according to some embodiments of the present technology.

FIG. 14 illustrates one embodiment of a method 1400 for performing a computer procedure across multiple computer processes and multiple programming languages. It shall be appreciated that other embodiments contemplated within the scope of the present disclosure may involve more operations, fewer operations, different operations, or a different order of operations than as shown in FIG. 14.

Commencing a Parent Computer Process

In one or more embodiments, method 1400 may include process 1410. Process 1410, which may include commencing a parent computer process, may function to commence a parent computer process based on receiving a request to perform an analytical operation. An analytical operation, as generally referred to herein, may specify a computational task, a computer procedure, a computer function, or a set of computational steps to be performed by a system or service implementing method 1400. It shall be recognized that the phrase "parent computer process" may be interchangeably referred to herein as a "first computer process," a "computer process," an "operating system process," or the like.

In one or more embodiments, process 1410 may receive a request to perform an analytical operation from a user, a software application, or a software solution that may be directly or indirectly associated with the system or service implementing method 1400. The analytical operation, in one or more embodiments, may be a data visualization operation, a trend analysis operation, a machine learning model training operation, a statistical analysis operation, a data mining operation, a text mining operation, a text parsing operation, a text categorization operation, an image processing operation, a network analysis operation, an artificial neural network training operation, an artificial neural network scoring operation, a data clustering operation, a data cardinality operation, a principal component analysis operation, a quantile regression operation, a data preprocessing operation, a data transformation operation, a sentiment analysis operation, or the like. In one or more embodiments, to perform the analytical operation, the system or service implementing method 1400 may use multiple computer processes when the analytical operation uses one or more software libraries or algorithms incompatible with the parent computer process. It shall be recognized that process 1410 may obtain any other suitable type of request without departing from the scope of the disclosure.

In one or more embodiments, process 1410 may receive the request to perform the analytical operation via a graphical user interface that may be accessible by or provided to users of the system or service implementing method 1400. The graphical user interface, in one or more embodiments, may include one or more graphical user interface objects that may enable users to intuitively interact with the system or service. For instance, in a non-limiting example, process 1410 may receive a request to perform an analytical operation based on a user interacting with, providing input to, and/or selecting at least a subset of the one or more graphical user interface objects.

Additionally, or alternatively, in one or more embodiments, process 1410 may receive the request to perform the analytical operation via a network or application programming interface (API) call that may have originated from one or more microservices or one or more applications directly or indirectly associated with the system or service implementing method 1400. That is, in some embodiments, the application programming interface (API) call may include a payload comprising the request to perform the analytical operation.

Figure 15:
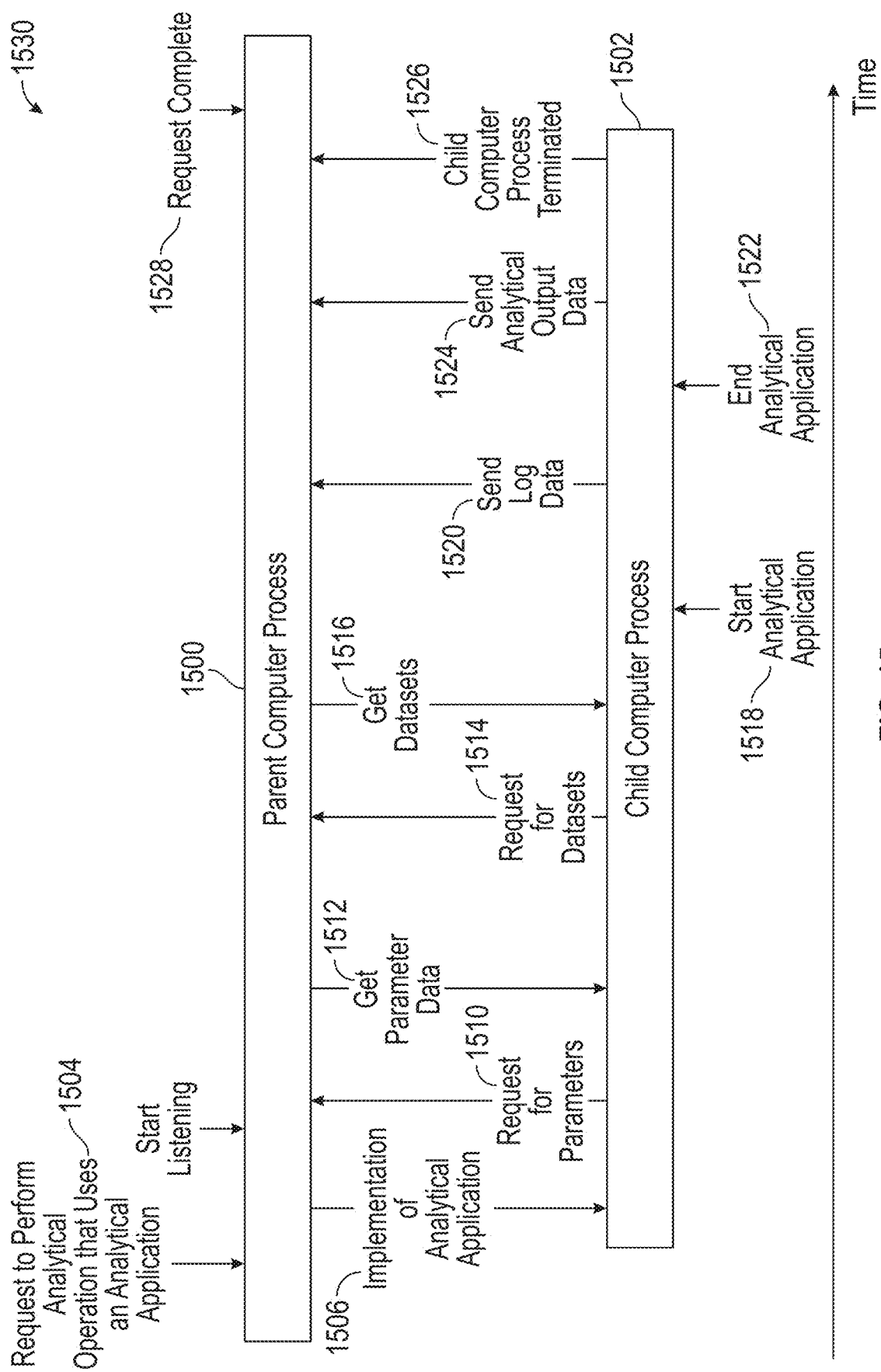
FIG. 15 illustrates an example schematic of an analytics service using a parent computer process and at least one child computer process to perform an analytical operation, according to some embodiments of the present technology.

Turning to FIG. 15, in one or more embodiments, analytics service 1530 may use multiple computer processes that execute computer instructions written in different programming languages to handle and execute inbound computational requests. For instance, in a non-limiting example, analytics service 1530 may receive analytical request 1504 and, in turn, commence or start parent computer process 1500. Parent computer process 1500, in one or more embodiments, may function as an analytics backend service capable of performing a plurality of backend operations or tasks (e.g., fetching data from a computer database, saving computational results to a computer database, logging events, etc.), as described in more detail herein. It shall be recognized that, in one or more embodiments, parent computer process 1500 may execute computer instructions of the analytics backend service in a first programming language (e.g., C++).

In one or more embodiments, analytics service 1530 may provide a plurality of predefined analytical operations (e.g., plurality of predefined analytical functions, plurality of predefined computer procedures, etc.) that are executable by analytics service 1530. In such an embodiment, each predefined analytical operation or at least a subset of the plurality of predefined analytical operations may be encoded or configured to use a distinct analytical application written in a programming language different from the first programming language (e.g., C++) to perform the respective analytical operation. For instance, in a non-limiting example, a first analytical operation (e.g., linear regression operation) of the plurality of predefined analytical operations may be configured to use a first analytical application written in Python to perform a linear regression task. In another non-limiting example, a second analytical operation (e.g., machine learning model training operation) of the plurality of predefined analytical operations may be configured to use a second analytical application written in Python to perform a model training task. In another non-limiting example, a third analytical operation of the plurality of predefined analytical operations may be configured to use an optimization algorithm written in Python to perform an optimization task. Stated another way, in one or more embodiments, each predefined analytical operation (e.g., analytical function or the like) of the subset may be encoded with a first set of instructions for performing a computational task in one programming language (e.g., Python) and a second set of instructions for performing data acquisition and configuration handling tasks in another programming language (e.g., C++).

Accordingly, in one or more embodiments, analytical request 1504 may specify an analytical operation from the plurality of predefined analytical operations to be performed by analytics service 1530. The analytical operation, in such an embodiment, may be encoded or configured to use an analytical application, written or developed in a programming language different from that of the analytics backend service and/or analytics service 1530, to perform the analytical operation. Furthermore, in such an embodiment, analytical request 1504 may specify one or more datasets on which the analytical operation is to be executed and/or configuration data that controls how the analytical operation is to be executed.

Configuration data, as generally referred to herein, may include a set of parameters, settings, or instructions that may define how the analytical operation (e.g., computer function or the like) is to be executed. For instance, in a non-limiting example, configuration data may include one or more of the analytical operation to be performed, one or more parameters (e.g., user-provided parameter values, default parameter values, function parameters, etc.) that control how the analytical operation is to be executed, and the one or more datasets on which the analytical operation is to be performed thereon.

In one or more embodiments, during the commencement of parent computer process 1500 or after parent computer process 1500 is commenced, parent computer process 1500 may function to load the one or more datasets and the configuration data associated with analytical request 1504 into memory of parent computer process 1500. For instance, in a non-limiting example, analytics service 1530 may receive analytical request 1504 that specifies a dataset, an analytical function (e.g., linear regression function) of the analytics service 1530 to perform on the dataset, and one or more parameters (e.g., a first set parameters that specify a target variable within the dataset to be predicted, a second set of parameters that specify one or more predictor variables within the dataset, etc.). Accordingly, in such a non-limiting example, based on analytics service 1530 receiving analytical request 1504, parent computer process 1500 may function to access or obtain the dataset from a computer database of the analytics backend service and, in turn, load or write the dataset into memory of parent computer process 1500 (e.g., process 1410A). Additionally, in such a non-limiting example, based on analytics service 1530 receiving analytical request 1504, parent computer process 1500 may function to load or write the one or more parameters specified within analytical request 1504 into memory of parent computer process 1500 (e.g., process 1410B).

It shall be recognized that, in another non-limiting example, analytical request 1504 may specify an analytical operation to be performed on one or more datasets, however, may not specify any user-provided parameters for the analytical operation. In such a non-limiting example, based on determining analytical request 1504 does not specify any parameters for the analytical operation, parent computer process 1500 may obtain a default set of parameters for the corresponding analytical operation from a configuration data repository or the like of the analytics backend service and, in turn, load or write the default set of parameters into memory of parent computer process 1500.

Commencing a Child Computer Process

In one or more embodiments, method 1400 may include process 1420. Process 1420, which may include commencing at least one child computer process, may function to commence one or more child computer processes when a subject parent computer process initiates an execution of an analytical operation associated with a respective analytical request. A child computer process, as generally referred to herein, may function to execute one or more analytical applications associated with a subject analytical operation to perform the requested computational task. It shall be recognized that the phrase "child computer process" may be interchangeably referred to herein as a "second computer process," an "auxiliary computer process," an "analytics execution process," or the like.

In one or more embodiments, analytics service 1530 may use a parent-child computer process relationship to perform an analytical operation when the analytical operation uses an analytical application that requires execution in a different runtime environment than that of the parent computer process. At least one technical benefit of such parent-child computer process relationship may enable the parent computer process to handle dataset and configuration data management in a first runtime environment (e.g., C++ runtime environment), while the child computer process performs the requested computation in a second runtime environment (e.g., Python runtime environment) by executing the associated analytical application. In other words, analytics service 1530 implementing method 1400 may enable analytical operations (e.g., analytical functions, computer procedures, etc.) to be created and executed in any suitable programming language, irrespective of the programming language used by analytics service 1530 or the analytics backend service.

Referring to FIG. 15, in one or more embodiments, analytics service 1530 may receive analytical request 1504 and, in turn, commence parent computer process 1500 that executes computer instructions written in a first programming language (e.g., C++). Analytical request 1504, in such an embodiment, may specify one or more datasets, an analytical operation (e.g., analytical function, etc.) to be performed on the one or more datasets, and configuration data that includes one or more parameters specifying conditions that control how the analytical operation (e.g., analytical function, etc.) is to be performed. It shall be further recognized that, in such an embodiment, to perform the analytical operation on the one or more datasets, the analytical operation may be encoded to use an analytical application written in a second programming language (e.g., Python).

Accordingly, in one or more embodiments, parent computer process 1500 may function to initiate an execution (e.g., call for an execution) of the analytical operation and, in turn, analytics service 1530 may commence a child computer process 1502 in response to parent computer process 1500 initiating the execution of the analytical operation. Stated another way, in one or more embodiments, parent computer process 1500 may launch child computer process 1502 when parent computer process 1500 initiates an execution (e.g., calls for an execution) of the analytical operation. At least one technical benefit of launching child computer process 1502 may enable the execution of analytical operations (e.g., analytical functions or the like) that use at least one analytical application written in a programming language (e.g., Python) incompatible with parent computer process 1500 (e.g., incompatible with the runtime environment of parent computer process 1500).

In other words, in one or more embodiments, during the commencement of child computer process 1502 or after child computer process 1502 is commenced, child computer process 1502 may be configured to run the at least one analytical application to perform the analytical operation invoked by parent computer process 1500. It shall be recognized that, in one or more embodiments, configuring child computer process 1502 to run the at least one analytical application may include loading one or more of a code interpreter for the target programming language (e.g., Python interpreter), one or more software libraries or dependencies (e.g., Pandas, NumPy, PyTorch, etc.) used by the at least one analytical application, and the at least one analytical application into memory of child computer process 1502. In other words, child computer process 1502 may be configured to run (e.g., execute) computer code written in the target programming language by creating a runtime environment compatible with the target programming language (e.g., the runtime environment may include the code interpreter for the target programming language, the one or more software libraries or dependencies used by the at least one analytical application, and the at least one analytical application).

For instance, in a non-limiting example, parent computer process 1500, executing instructions in a first programming language (e.g., C++), may initiate an execution of an analytical operation specified by analytical request 1504. The analytical operation, in such a non-limiting example, may be encoded or configured to use a pre-developed analytical application, written in a second programming language (e.g., Python), that is specifically designed to perform the analytical operation. Accordingly, based on parent computer process 1500 initiating the execution of the analytical operation, parent computer process 1500 may launch child computer process 1502 to run (e.g., execute or the like) the pre-developed analytical application to perform the analytical operation.

In another non-limiting example, parent computer process 1500, executing instructions in a first programming language (e.g., C++), may initiate an execution of a model training operation (e.g., analytical operation) specified by analytical request 1504. The model training operation, in such a non-limiting example, may be encoded or configured to use a pre-developed model training application, written in a second programming language (e.g., Python), that is specifically designed to execute a model training task. Accordingly, based on parent computer process 1500 initiating the execution of the model training operation, parent computer process 1500 may launch child computer process 1502 to run (e.g., execute or the like) the pre-developed model training application to perform the model training task.

In another non-limiting example, parent computer process 1500, executing instructions in a first programming language (e.g., C++), may initiate an execution of a data analysis operation (e.g., analytical operation) specified by analytical request 1504. The data analysis operation, in such a non-limiting example, may be encoded or configured to use a pre-developed algorithm (e.g., analytical application), written in a second programming language (e.g., Python), that is specifically designed to execute a target data analysis task. Accordingly, based on parent computer process 1500 initiating the execution of the data analysis operation, parent computer process 1500 may launch child computer process 1502 to run (e.g., execute or the like) the pre-developed algorithm to perform the target data analysis task.

In another non-limiting example, parent computer process 1500 may function to initiate an execution of an analytical operation specified by analytical request 1504. The analytical operation, in such a non-limiting example, may be encoded or configured to use an analytical application or an analytical algorithm specifically configured to perform the analytical operation. Accordingly, based on parent computer process 1500 initiating the execution of the analytical operation, parent computer process 1500 may launch child computer process 1502, which may be responsible for the implementation of analytical application 1506 or the analytical algorithm.

Transmitting Data Requests

In one or more embodiments, method 1400 may include process 1430. Process 1430, which may include transmitting one or more data requests, may function to transmit the one or more data requests from child computer process 1502 to parent computer process 1500. A data request, as generally referred to herein, may relate to a request to obtain, from parent computer process 1500, data of a target data type that the analytical application may need to perform the requested analytical operation. It shall be recognized that the phrase "data request" may be interchangeably referred to herein as a "request" or the like.

In one or more embodiments, after child computer process 1502 is commenced, child computer process 1502 may operate as a leader process to send the one or more data requests to parent computer process 1500, and parent computer process 1500 may operate as a listener process to receive and fulfill the one or more data requests.

Figure 16:
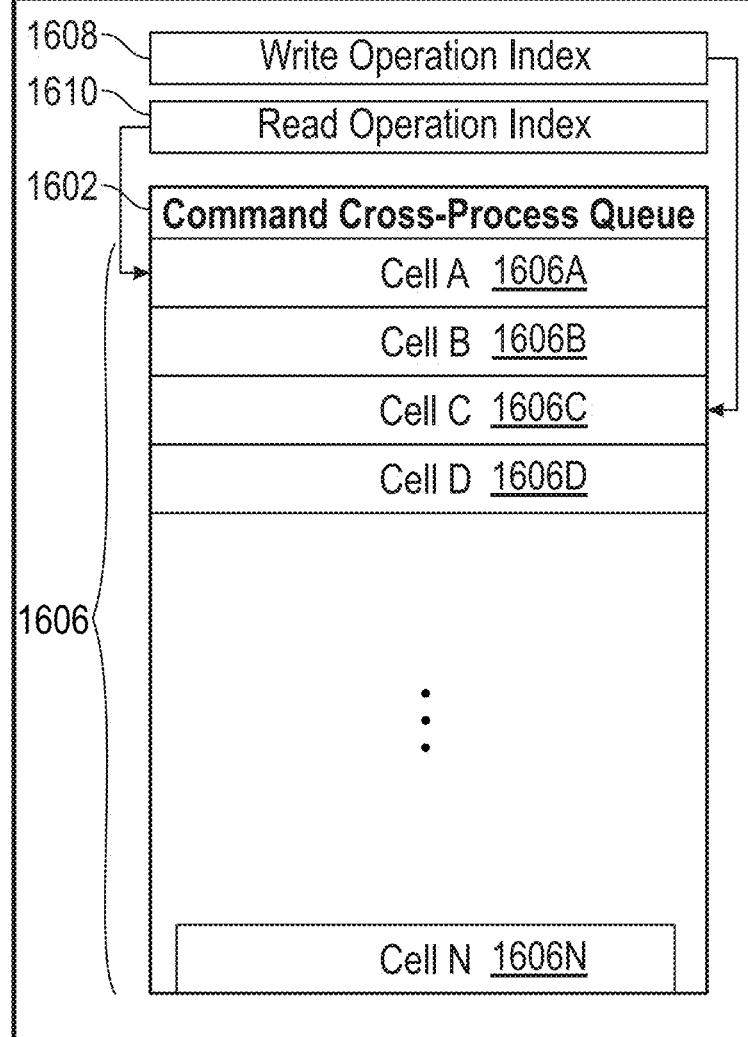
FIG. 16 illustrates an example schematic of a command cross-process queue, according to some embodiments of the present technology.

In one or more embodiments, process 1430 may use a command cross-process queue 1602 to transfer (e.g., transmit or the like) the one or more data requests from child computer process 1502 to parent computer process 1500, as shown generally by way of example in FIG. 16. Command cross-process queue 1602, in one or more embodiments, may be a single-producer, single-consumer queue that may enable a subject child computer process to write a data request to command cross-process queue 1602 and a subject parent computer process to read the data request from command cross-process queue 1602. In other words, in some embodiments, command cross-process queue 1602 may not be a multiple-producer, multiple-consumer queue that supports multiple computer processes writing data requests to command cross-process queue 1602 and multiple computer processes reading data requests from command cross-process queue 1602 at the same time.

In one or more embodiments, command cross-process queue 1602 may implement a timeout mechanism to prevent operations, such as reading or writing data requests, commands, or the like, to and/or from command cross-process queue 1602 from waiting indefinitely. For instance, in a non-limiting example, if a child computer process 1502 writes a data request (or command) to command cross-process queue 1602 and the parent computer process 1500 fails to read the data request (or the command) within the specified timeout period specified by the timeout mechanism, the write operation may fail, triggering an error or retry mechanism. This ensures a system or service implementing method 1400 remains responsive and avoids deadlocks caused by stalled computer processes. By enforcing a timeout, command cross-process queue 1602 may maintain reliable communication and allows for error recovery when delays or failures occur. In another non-limiting example, when child computer process 1502 writes a data request (or command) to command cross-process queue 1602, the write operation typically completes successfully if command cross-process queue 1602 has space. However, if parent computer process 1500 does not read the data request (or command) within a specified timeout period (e.g., 5-second timeout period), the read operation on parent computer process 1500 may fail. This timeout ensures parent computer process 1500 does not wait indefinitely for requests or commands, allowing the parent computer process 1500 to log the timeout event, retry the read operation, or invoke an error-handling routine.

Turning to FIG. 16, in one or more embodiments, command cross-process queue 1602 may be implemented in shared memory 1600 of computer 1604. Command cross-process queue 1602, in one or more embodiments, may include a plurality of cells 1606, such as cells 1606A-1606N. The plurality of cells 1606 may be used to temporarily store data for inter-process communication. It shall be recognized that each cell of the plurality of cells 1606 may be assigned a corresponding cell index value.

For instance, in a non-limiting example, command cross-process queue 1602 may include five (5) cells in which each cell is assigned a unique cell index value. In such a non-limiting example, a cell index value of zero (0) may correspond to the first cell of command cross-process queue 1602, a cell index value of one (1) may correspond to the second cell of command cross-process queue 1602, a cell index value of two (2) may correspond to the third cell of command cross-process queue 1602, a cell index value of three (3) may correspond to the fourth cell of command cross-process queue 1602, and a cell index value of four (4) may correspond to the fifth cell of command cross-process queue 1602.

Additionally, or alternatively, in one or more embodiments, a write operation index 1608 may be implemented within shared memory 1600 of computer 1604. The write operation index 1608, in one or more embodiments, may be configured to track which cells of the plurality of cells 1606 of command cross-process queue 1602 are available to have data written to them. In other words, in one or more embodiments, the write operation index 1608 may be configured to track index values of one or more cells of command cross-process queue 1602 that are available for writing.

Additionally, or alternatively, in one or more embodiments, a read operation index 1610 may be implemented within shared memory 1600 of computer 1604. The read operation index 1610, in one or more embodiments, may be configured to track which cells of the plurality of cells 1606 of command cross-process queue 1602 are available to have data read from them. In other words, in one or more embodiments, the read operation index 1610 may be configured to track index values of one or more cells of command cross-process queue 1602 that are available for reading.

Additionally, in one or more embodiments, cell synchronization data structure 1612 may be implemented within computer 1604. Cell synchronization data structure 1612, in one or more embodiments, may be configured to track a count of cells of the plurality of cells 1606 that are available to have data written to them (e.g., track a count of cells of the plurality of cells 1606 that are free) and track a count of cells of the plurality of cells 1606 that are available to have data read from them (e.g., track a count of cells of the plurality of cells 1606 that are not free).

It shall be recognized cell synchronization data structure 1612, write operation index 1608, and read operation index 1610 may govern the writing of data requests or commands to command cross-process queue 1602 and the reading of data requests or commands from command cross-process queue 1602, as described in more detail in method 2100.

It shall be further recognized that for implementing and using command cross-process queue 1602 and other components associated with command cross-process queue 1602, reference is made to U.S. patent application Ser. No. 18/737,592, filed on 7 Jun. 2024, titled SYSTEMS AND METHODS FOR IMPLEMENTING AND USING A CROSS-PROCESS QUEUE WITHIN A SINGLE COMPUTER, which is incorporated herein in its entirety by this reference.

In one or more embodiments, child computer process 1502 may function to create a request for parameters 1510 and, in turn, write the request for parameters 1510 to command cross-process queue 1602. A request for parameters, as generally referred to herein, may include a request to obtain, from parent computer process 1500, parameter data associated with analytical request 1504. In other words, child computer process 1502 may function to transmit, using command cross-process queue 1602, the request for parameters 1510 to parent computer process 1500, which may instruct parent computer process 1500 to transfer parameter data (e.g., parameter data values, default parameter values, user-provided parameter values or the like) associated with analytical request 1504 to child computer process 1502. It shall be recognized that, in one or more embodiments, the analytical application configured to run on child computer process 1502 may need the parameter data to execute the analytical application.

For instance, in a non-limiting example, analytical request 1504 may specify an analytical operation, such as a linear regression operation, and child computer process 1502 may be configured to execute the analytical application that corresponds to the analytical operation to perform the linear regression operation. In such a non-limiting example, before executing the analytical application, the analytical application may require a set of parameters, such as a predictor variable parameter, one or more response variable parameters, and a fitting method parameter. Accordingly, in one or more embodiments, child computer process 1502 may function to create the request for parameters 1510 (e.g., request for configuration data, etc.) and, in turn, write the request for parameters 1510 to command cross-process queue 1602.

In another non-limiting example, analytical request 1504 may specify an analytical operation, such as a machine learning-based clustering operation, and child computer process 1502 may be configured to execute the analytical application that corresponds to the analytical operation to perform the machine learning-based clustering operation. In such a non-limiting example, before executing the analytical application, the analytical application may require a set of parameters, such as a cluster number parameter, a cluster distance parameter, and an iteration limit parameter. Accordingly, in one or more embodiments, child computer process 1502 may function to create the request for parameters 1510 (e.g., request for configuration data, etc.) and, in turn, write the request for parameters 1510 to command cross-process queue 1602.

Additionally, or alternatively, in one or more embodiments, child computer process 1502 may function to create a request for datasets 1514 and, in turn, write the request for datasets 1514 to command cross-process queue 1602. A request for datasets, as generally referred to herein, may include a request to obtain one or more datasets associated with analytical request 1504 from parent computer process 1500. In other words, child computer process 1502 may function to transmit, using command cross-process queue 1602, the request for datasets 1514 to parent computer process 1500, which may instruct parent computer process 1500 to transfer the one or more datasets (e.g., data tables, etc.) associated with analytical request 1504 to child computer process 1502. It shall be recognized that, in one or more embodiments, the analytical application configured to run on child computer process 1502 may need the one or more datasets to execute the analytical application.

For instance, in a non-limiting example, analytical request 1504 may specify an analytical operation, such as a linear regression operation, to perform on one or more datasets, and child computer process 1502 may be configured to execute the analytical application that corresponds to the analytical operation to perform the linear regression operation. In such a non-limiting example, the analytical application may require the one or more datasets before performing the requested linear regression operation. Accordingly, in one or more embodiments, child computer process 1502 may function to create the request for datasets 1514 and, in turn, write the request for datasets 1514 to command cross-process queue 1602.

In another non-limiting example, analytical request 1504 may specify an analytical operation, such as a machine learning model training operation, to train a machine learning model on one or more datasets, and child computer process 1502 may be configured to execute the analytical application that corresponds to the analytical operation to perform the training of the machine learning model. In such a non-limiting example, the analytical application may require the one or more datasets before performing the requested model training. Accordingly, in one or more embodiments, child computer process 1502 may function to create the request for datasets 1514 and, in turn, write the request for datasets 1514 to command cross-process queue 1602.

It shall be recognized that, in one or more embodiments, child computer process 1502 may create and serialize the request for parameters 1510 and the request for datasets 1514 using one or more techniques described in method 2100 and method 3000.

Data Writing

In one or more embodiments, method 1400 may include process 1440. Process 1440, which may include data writing, may function to write, by parent computer process 1500, the one or more datasets and the configuration data associated with analytical request 1504 to data transfer cross-process queue 1712. Data transfer cross-process queue 1712, in one or more embodiments, may be a multiple-producer, multiple-consumer queue that may enable multiple producer processes to write data to data transfer cross-process queue 1712 and multiple consumer processes to read the data from data transfer cross-process queue 1712 at the same time.

Figure 17:
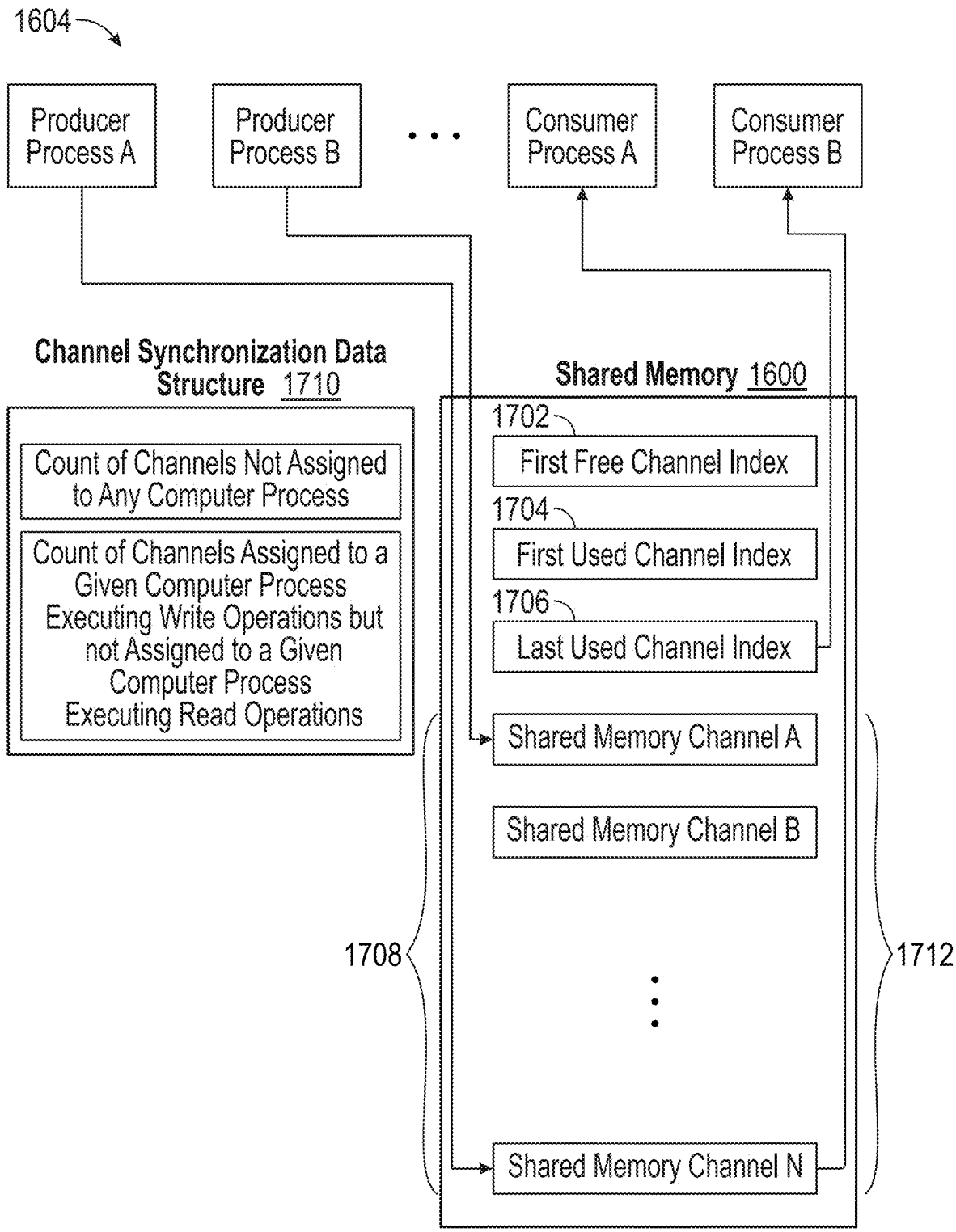
FIG. 17 illustrates an example schematic of a data transfer cross-process queue, according to some embodiments of the present technology.

In one or more embodiments, data transfer cross-process queue 1712 may include a plurality of shared memory channels 1708 implemented within computer 1604, as shown generally by way of example in FIG. 17. In such an embodiment, each shared memory channel of the plurality of shared memory channels 1708 may be assigned a corresponding channel index value. For instance, in a non-limiting example, an index value of zero (o) may correspond to the first shared memory channel of the multiple-producer, multiple-consumer cross-process queue, an index value of one (1) may correspond to the second shared memory channel of the multiple-producer, multiple-consumer cross-process queue, an index value of two (2) may correspond to the third shared memory channel of the multiple-producer, multiple-consumer cross-process queue, and an index value of three (3) may correspond to the fourth shared memory channel.

It shall be recognized that, in one or more embodiments, shared memory 1600 may be segmented into a plurality of distinct shared memory channels 1708 that may operate as individual in-memory components. In such an embodiment, each distinct shared memory channel of the plurality of shared memory channels 1708 may have a distinct cross-process queue (e.g., single-producer, single-consumer cross-process queue) that may be substantially similar to a structure of command cross-process queue 1602 described above. For instance, in a non-limiting example, data transfer cross-process queue 1712 may include three (3) distinct shared memory channels within shared memory 1600 (e.g., POSIX shared memory) of computer 1604, each of which, may include a distinct cross-process queue (e.g., single-producer, single-consumer cross-process queue).

Additionally, or alternatively, in one or more embodiments, a first free channel index 1702 may be implemented within shared memory 1600 (e.g., POSIX shared memory) of computer 1604. The first free channel index 1702, in one or more embodiments, may function to track an index value of a given shared memory channel that is at a head of a queue of shared memory channels that are available to write (e.g., the first free channel index 1702 may be configured to identify or indicate the foremost or next available shared memory channel available for writing).

Additionally, or alternatively, in one or more embodiments, a first used channel index 1704 may be implemented within shared memory 1600 (e.g., POSIX shared memory) of computer 1604. The first used channel index 1704, in one or more embodiments, may function to track an index value of a given shared memory channel that is at a head of a queue of shared memory channels that are available to read (e.g., the first used channel index 1704 may be configured to identify or indicate the foremost or next available shared memory channel within a data structure of shared memory channels that are available for reading).

Additionally, or alternatively, in one or more embodiments, a last used channel index 1706 may be implemented within shared memory 1600 (e.g., POSIX shared memory) of computer 1604. The last used channel index 1706, in one or more embodiments, may function to track an index value of a given shared memory channel that is at a tail of the queue of shared memory channels that are available to read (e.g., the last used channel index 1706 may be configured to identify or indicate which shared memory channel of the plurality of shared memory channels 1708 has been most recently used for writing data).

Additionally, or alternatively, in one or more embodiments, a channel synchronization data structure 1710 may be implemented within computer 1604. The channel synchronization data structure 1710, in one or more embodiments, may be configured to track a count of shared memory channels of the plurality of shared memory channels 1708 that are not assigned to any computer processes (e.g., the channel synchronization data structure 1710 may be configured to track a count of shared memory channels of the plurality of shared memory channels 1708 that are available to have data written to them). Furthermore, in one or more embodiments, the channel synchronization data structure 1710 may be configured to track a count of shared memory channels of the plurality of shared memory channels 1708 that are assigned to a given computer process executing write operations but not assigned to a given computer process executing read operations (e.g., the channel synchronization data structure 1710 may be configured to track a count of shared memory channels of the plurality of shared memory channels 1708 that available to have data read from them).

It shall be further recognized that for implementing and using data transfer cross-process queue 1712 and other components associated with data transfer cross-process queue 1712, reference is made to U.S. patent application Ser. No. 18/737,592, filed on 7 Jun. 2024, titled SYSTEMS AND METHODS FOR IMPLEMENTING AND USING A CROSS-PROCESS QUEUE WITHIN A SINGLE COMPUTER, which is incorporated herein in its entirety by this reference.

In one or more embodiments, parent computer process 1500 may function to read the request for parameters 1510 from command cross-process queue 1602 and, in turn, write the one or more parameters associated with analytical request 1504 to data transfer cross-process queue 1712. Stated another way, in one or more embodiments, parent computer process 1500 may function to read a request for configuration data from command cross-process queue 1602 and, in turn, write the corresponding configuration data associated with analytical request 1504 to data transfer cross-process queue 1712.

For instance, with continued reference to the above non-limiting example, after parent computer process 1500 reads the request for parameters 1510 from command cross-process queue 1602, parent computer process 1500 may function to write the one or more parameters stored in memory of parent computer process 1500 to data transfer cross-process queue 1712. In such a non-limiting example, parent computer process 1500 may store, in memory, the parameters specified by analytical request 1504 for performing the linear regression operation, such as the predictor variable parameter, the one or more response variable parameters, and the fitting method parameter. Accordingly, in such a non-limiting example, in response to parent computer process 1500 reading the request for parameters 1510 from command cross-process queue 1602, parent computer process 1500 may function to write the parameters (e.g., the predictor variable parameter, the one or more response variable parameters, and the fitting method parameter) to data transfer cross-process queue 1712.

In another non-limiting example, based on or in response to parent computer process 1500 reading the request for parameters 1510 from command cross-process queue 1602, parent computer process 1500 may function to write the one or more parameters stored in memory of parent computer process 1500 to data transfer cross-process queue 1712. In such a non-limiting example, parent computer process 1500 may store, in memory, the parameters (e.g., parameter values, etc.) specified by analytical request 1504 for performing the machine learning-based clustering operation, such as the cluster number parameter, the cluster distance parameter, and the iteration limit parameter. Accordingly, in such a non-limiting example, in response to parent computer process 1500 reading the request for parameters 1510 from command cross-process queue 1602, parent computer process 1500 may function to write the parameters (e.g., the cluster number parameter, the cluster distance parameter, and the iteration limit parameter) to data transfer cross-process queue 1712.

It shall be recognized that, in one or more embodiments, writing a set of parameters associated with analytical request 1504 may include serializing the set of parameters into a language-agnostic data format. In such an embodiment, the set of serialized parameters may be written to data transfer cross-process queue 1712. It shall be further recognized that parent computer process 1500 may function to serialize the set of parameters using one or more operations described in method 2100 and method 3000.

Additionally, or alternatively, in one or more embodiments, parent computer process 1500 may function to read the request for datasets 1514 from command cross-process queue 1602 and, in turn, write the one or more datasets associated with analytical request 1504 to data transfer cross-process queue 1712. Stated another way, in one or more embodiments, parent computer process 1500 may function to obtain a request for datasets and, in turn, write the one or more datasets associated with analytical request 1504 to data transfer cross-process queue 1712.

For instance, with continued reference to the above non-limiting example, after parent computer process 1500 reads the request for datasets 1514 from command cross-process queue 1602, parent computer process 1500 may function to write the one or more datasets stored in memory of parent computer process 1500 to data transfer cross-process queue 1712. In such a non-limiting example, parent computer process 1500 may store the one or more datasets specified by analytical request 1504 associated with the linear regression operation. Accordingly, in such a non-limiting example, in response to parent computer process 1500 reading the request for datasets 1514 from command cross-process queue 1602, parent computer process 1500 may function to write the one or more datasets to data transfer cross-process queue 1712.

In another non-limiting example, based on or in response to parent computer process 1500 reading the request for datasets 1514 from command cross-process queue 1602, parent computer process 1500 may function to write the one or more datasets stored in memory of parent computer process 1500 to data transfer cross-process queue 1712. In such a non-limiting example, parent computer process 1500 may store the one or more datasets specified by analytical request 1504 associated with the training of the machine learning model. Accordingly, in such a non-limiting example, in response to parent computer process 1500 reading the request for datasets 1514 from command cross-process queue 1602, parent computer process 1500 may function to write the one or more datasets to data transfer cross-process queue 1712.

It shall be recognized that, in one or more embodiments, writing the one or more datasets associated with analytical request 1504 may include serializing the one or more datasets into one or more serialized datasets. In such an embodiment, the one or more serialized datasets may be written to data transfer cross-process queue 1712. It shall be further recognized that parent computer process 1500 may function to serialize the one or more datasets using one or more operations described in method 2100 and method 3000.

It shall be further recognized that, in one or more embodiments, a cross-process queue (e.g., command cross-process queue 1602, data transfer cross-process queue 1712, etc.) may be configured using shared memory of computer 1604. The cross-process queue, in such an embodiment, may be an in-memory queuing mechanism that may enable a subject parent computer process and at least one child computer process to transfer data or information between the subject parent computer process and the at least one child computer process by reading and writing the data or the information to the cross-process queue.

Data Reading

In one or more embodiments, method 1400 may include process 1450. Process 1450, which may include data reading, may function to read, by child computer process 1502, the one or more datasets and the one or more parameters from data transfer cross-process queue 1712. Stated another way, in one or more embodiments, child computer process 1502 may function to read the one or more datasets and the configuration data from data transfer cross-process queue 1712.

In one or more embodiments, based on or in response to parent computer process 1500 writing the one or more datasets and the one or more parameters (e.g., configuration data) to data transfer cross-process queue 1712, child computer process 1502 may function to read the one or more datasets and the one or more parameters into memory of child computer process 1502 (e.g., get parameter data 1512, get datasets 1516). At least one technical benefit of reading the one or more datasets and the one or more parameters into memory of child computer process 1502 may provide the analytical application with the necessary data to perform the requested computational task.

For instance, in a non-limiting example, parent computer process 1500 may function to write the one or more parameters specified by analytical request 1504—such as the predictor variable parameter, the one or more response variable parameters, and the fitting method parameter—to data transfer cross-process queue 1712 based on parent computer process 1500 receiving the request for parameters 1510 and, in turn, child computer process 1502 may function to read, from data transfer cross-process queue 1712, the one or more parameters (e.g., the predictor variable parameter, the one or more response variable parameters, and the fitting method parameter) into memory of child computer process 1502.

Additionally, or alternatively, in such a non-limiting example, parent computer process 1500 may function to write the one or more datasets specified by analytical request 1504 to data transfer cross-process queue 1712 based on parent computer process receiving the request for datasets 1514 and, in turn, child computer process 1502 may function to read, from data transfer cross-process queue 1712, the one or more datasets into memory of child computer process 1502 (e.g., get datasets 1516).

In another non-limiting example, parent computer process 1500 may function to write the one or more parameters specified by analytical request 1504 associated with the machine learning model training operation to data transfer cross-process queue 1712 based on parent computer process 1500 receiving the request for parameters 1510 and, in turn, child computer process 1502 may function to read, from data transfer cross-process queue 1712, the one or more parameters into memory of child computer process 1502 (e.g., get parameter data 1512).

Additionally, or alternatively, in such a non-limiting example, parent computer process 1500 may function to write the one or more datasets specified by analytical request 1504 to data transfer cross-process queue 1712 based on parent computer process 1500 receiving the request for datasets 1514 and, in turn, child computer process 1502 may function to read, from data transfer cross-process queue 1712, the one or more datasets into memory of child computer process 1502 (e.g., get datasets 1516).

It shall be recognized that, in one or more embodiments, reading the one or more datasets associated with analytical request 1504 from data transfer cross-process queue 1712 may include deserializing one or more serialized datasets into one or more deserialized datasets that is compatible with the corresponding programming language (e.g., Python) of the analytical application configured to run on child computer process 1502. Similarly, in one or more embodiments, reading the one or more parameters associated with analytical request 1504 from data transfer cross-process queue 1712 may include deserializing one or more serialized parameters into one or more deserialized parameters that is compatible with the corresponding programming language (e.g., Python) of the analytical application configured to run on child computer process 1502. It shall be recognized that, in such an embodiment, child computer process 1502 may function to deserialize data using one or more techniques described in method 2100 and method 3000.

Executing the Analytical Operation

In one or more embodiments, method 1400 may include process 1460. Process 1460, which may include executing the analytical operation, may function to execute the analytical operation associated with analytical request 1504 on child computer process 1502. In one or more embodiments, child computer process 1502 may function to execute the analytical operation specified in analytical request 1504 by using the analytical application that the analytical operation is encoded or configured to use.

In one or more embodiments, based on or in response to child computer process 1502 reading the one or more parameters and the one or more datasets into memory of child computer process 1502, child computer process 1502 may function to execute, using the analytical application, the analytical operation based on the one or more datasets and the one or more parameters. Stated another way, in one or more embodiments, child computer process 1502 may function to process, using the analytical application, the one or more datasets and the one or more parameters to perform the analytical operation. Stated differently, in one or more embodiments, child computer process 1502 may function to execute computer instructions of the analytical application to process the one or more datasets in accordance with the one or more parameters.

For instance, with continued reference to the above non-limiting example, when analytical request 1504 specifies the linear regression operation, child computer process 1502 may be configured to execute the corresponding analytical application to perform the linear regression operation. In such a non-limiting example, child computer process 1502 may function to provide the dataset, the predictor variable parameter, the one or more response variable parameters, and the fitting method parameter-already in memory of child computer process 1502—to the corresponding analytical application, which may be configured to perform the linear regression operation based on at least the dataset, the predictor variable parameter, the one or more response variable parameters, and the fitting method parameter.

Stated another way, in one or more embodiments, the corresponding analytical application may be started (e.g., start analytical application 1518) on child computer process 1502 based on or in response to child computer process 1502 receiving the necessary datasets and parameters from parent computer process 1500. Once the corresponding analytical application is started on child computer process 1502, the corresponding analytical application may use the one or more datasets and the one or more parameters to perform the requested analytical operation (e.g., linear regression) and, in turn, compute an analytical output (e.g., parameter estimates (e.g., coefficients), R-squared values, etc.).

In another non-limiting example, when analytical request 1504 specifies the machine learning model training operation (e.g., training a classification model), child computer process 1502 may be configured to execute the corresponding analytical application to perform the machine learning model training operation. In such a non-limiting example, child computer process 1502 may function to provide a corpus of training data (e.g., dataset), as well as model training parameters such as the learning rate, number of epochs, batch size, and any other specified hyperparameters-already in memory of child computer process 1502—to the corresponding analytical application, which may be configured to train the machine learning model based on the dataset and specified parameters.

Stated another way, in one or more embodiments, the corresponding analytical application may be started (e.g., start analytical application 1518) on child computer process 1502 based on or in response to child computer process 1502 receiving the corpus of training data and parameters from parent computer process 1500. Once started, the corresponding analytical application may use the dataset and parameters to train the machine learning model and, in turn, generate an analytical output such as model weights, accuracy metrics, loss values, and/or a trained model file that may be used for model deployment.

In one or more embodiments, computer process 1502 may function to transmit or transfer the analytical output (e.g., send analytical output data 1524) to parent computer process 1500 using a cross-process queue (e.g., command cross-process queue 1602, data transfer cross-process queue 1712, etc.), as described in more detail in method 2100 and method 3000. Furthermore, in one or more embodiments, based on or in response to parent computer process 1500 receiving the analytical output, parent computer process 1500 may function to write the analytical output to a computer database of analytics service 1530. It shall be recognized that, in such an embodiment, child computer process 1502 may not have permissions to write the analytical output to the computer database and parent computer process 1500 may have the permissions to write the analytical output to the computer database.

Accordingly, in one or more embodiments, after the analytical output is written to the computer database of analytics service 1530, analytical request 1504 may be completed (e.g., request complete 1528) and, in turn, parent computer process 1500 may be terminated. Additionally, or alternatively, in one or more embodiments, child computer process 1502 may be terminated (e.g., child computer process terminated 1526) based on or in response to successfully transferring the analytical output (e.g., the analytical output data) to parent computer process 1500.

Stated another way, in one or more embodiments, upon completing the analytical operation, the analytical application may reach its endpoint (e.g., end analytical application 1522) and, in turn, child computer process 1502 may be terminated. In one or more embodiments, child computer process 1502 may function to send a termination signal (e.g., termination indication) or the like to parent computer process 1500 when child computer process 1502 is terminated successfully and, in turn, parent computer process 1500 may be terminated in response to receiving the termination signal (e.g., termination indication). It shall be noted that, in one or more embodiments, parent computer process 1500 may not be terminated until child computer process 1502 is successfully terminated.

It shall be further recognized that, in one or more embodiments, child computer process 1502 may function to generate one or more logs while the analytical application is executing (e.g., performing the analytical operation by the analytical application). The one or more logs may include information associated with a status of the execution of the analytical operation. Accordingly, in one or more embodiments, child computer process 1502 may function to transmit log data that includes the one or more logs (e.g., send log data 1520) to parent computer process 1500 via a cross-process queue (e.g., command cross-process queue 1602, data transfer cross-process queue 1712, etc.), as described in more detail in method 2100 and method 3000.

Figure 18:
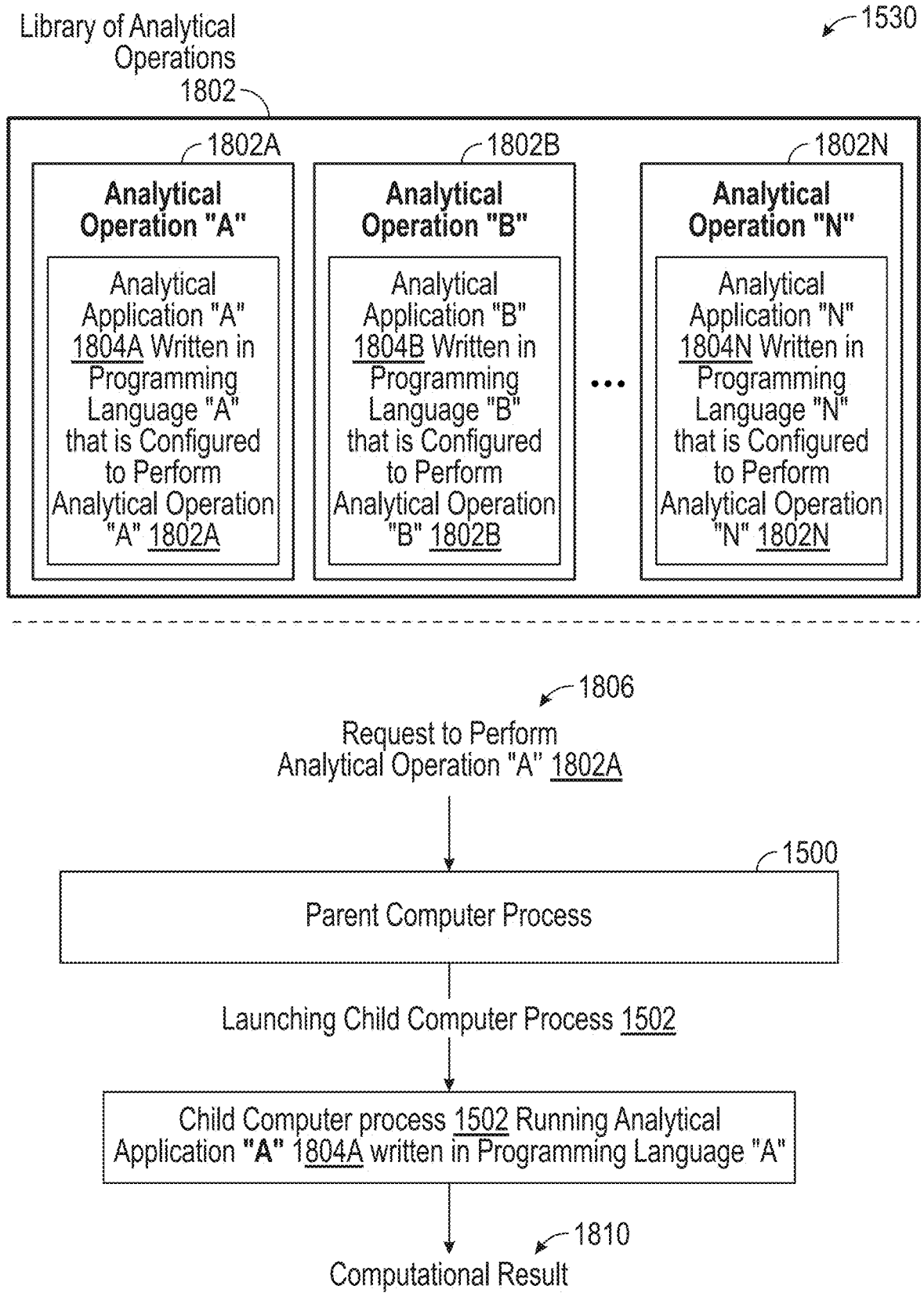
FIG. 18 illustrates an example of a library of analytical operations provided by the analytics service and an example of executing one of the analytical operations specified within the library of analytical operations, according to some embodiments of the present technology.

Turning to FIG. 18, in one or more embodiments, analytics service 1530 may provide a library of analytical operations 1802. In one or more embodiments, each distinct analytical operation of the library of analytical operations 1802 may be configured to perform a target type of data analysis or computation using an analytical application developed in a target programming language.

For instance, in a non-limiting example, analytical operation "A" 1802A may be configured to perform a first analytical task using analytical application "A" 1804A. Analytical application "A" 1804A, in one or more embodiments, may use one or more software libraries (e.g., PyTorch, NumPy, Pandas, TensorFlow, etc.) developed in programming language "A" (e.g., Python) that may assist with performing such analytical task.

In another non-limiting example, analytical operation "B" 1802B may be configured to perform a second analytical task using analytical application "B" 1804B. Analytical application "B" 1804B, in one or more embodiments, may use one or more software libraries developed in programming language "B" (e.g., R) that may assist with performing such analytical task.

In another non-limiting example, analytical operation "N" 1802N may be configured to perform a third analytical task using analytical application "N" 1804N. Analytical application "N" 1804N, in one or more embodiments, may use one or more software libraries developed in programming language "N" (e.g., Julia) that may assist with performing such task.

Accordingly, in one or more embodiments, parent computer process 1500 may function to receive a request 1806 to perform analytical operation "A" 1802A from a user and, in turn, parent computer process 1500 may initiate the execution of analytical operation "A" 1802A. Accordingly, in such embodiments, parent computer process 1500 may function to launch child computer process 1502—which may be configured to run analytical application "A" 1804A—based on parent computer process 1500 initiating the execution of analytical operation "A" 1802A. It shall be recognized that, in one or more embodiments, parent computer process 1500 and child computer process 1502 may be executed by analytics service 1530, which may be implemented by a distributed network of computers. It shall be further recognized, in some embodiments, child computer process 1502 may be executed by a remote service (e.g., third-party service, etc.) that operates independently of analytics service 1530 without departing from the scope of the disclosure.

In one or more embodiments, child computer process 1502, may execute analytical application "A" 1804A to perform one or more computational tasks defined by analytical operation "A" 1802A and, in turn, analytical application "A" 1804A may output computational result 1810. Computational result 1810, in one or more embodiments, may include a computational output such as a calculated value, data table, or any other suitable analytical output.

Figure 19:
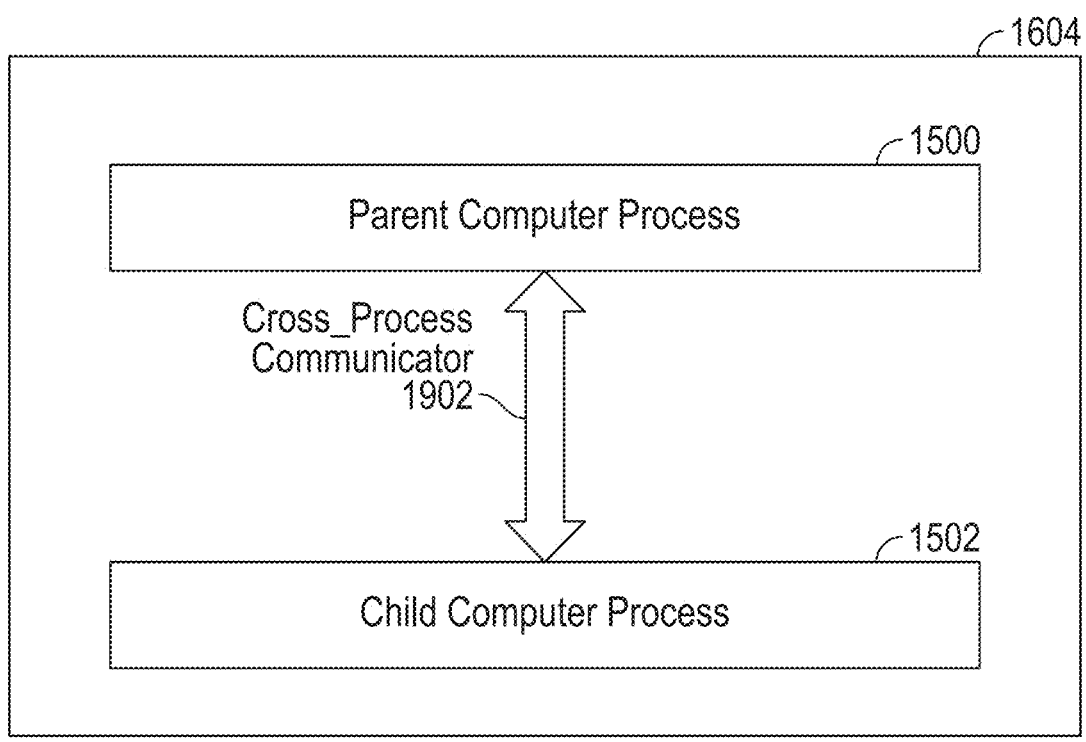
FIG. 19 illustrates an example schematic of using a cross-process communicator or middleware to transfer data, information, and commands between a parent computer process and a child computer process, according to some embodiments of the present technology.

It shall be recognized that, in one or more embodiments, parent computer process 1500 and child computer process 1502 may operate within an operating system of computer 1604 (e.g., single computer), as shown generally by way of example in FIG. 19. In such an embodiment, parent computer process 1500 and child computer process 1502 may communicate using cross-process communicator 1902. The cross-process communicator 1902, in one or more embodiments, may include an application programming interface and one or more cross-process queues that are operably configured to transfer data (e.g., messages, data blocks, etc.) between parent computer process 1500 and child computer process 1502.

In one or more embodiments, the application programming interface (API) may include a plurality of application programming interface (API) functions that may enable structured communication between parent computer process 1500 and child computer process 1502. In such an embodiment, child computer process 1502 may function to transmit or transfer, via a first cross-process queue (e.g., command cross-process queue 1602) of the one or more cross-process queues, one or more data requests or commands to parent computer process 1500 based on child computer process 1502 invoking one or more application programming interface functions of the plurality of application programming interface functions and, in turn, parent computer process 1500 may function to write data (e.g., configuration data, one or more datasets, etc.) to a second cross-process queue (e.g., data transfer cross-process queue 1712) of the one or more cross-process queues based on parent computer process 1500 reading the one or more data requests or commands from the first cross-process queue. It shall be recognized, in one or more embodiments, parent computer process 1500 may function to write the one or more datasets and the configuration data to the second cross-process queue based on a serialization protocol defined by the application programming interface.

Accordingly, in one or more embodiments, in response to parent computer process 1500 writing the one or more datasets and the configuration data to the second cross-process queue, child computer process 1502 may function to read the one or more datasets and the configuration data from the second cross-process queue based on a deserialization protocol defined by the application programming interface.

It shall be recognized, in one or more embodiments, the first cross-process queue (e.g., single-producer, single-consumer cross-process queue) and the second cross-process queue (e.g., multiple-producer, multiple-consumer cross-process queue) may be implemented in shared memory of computer 1604. Stated another way, in one or more embodiments, the first cross-process queue and the second cross-process may be implemented within random access memory (RAM) of computer 1604.

Figure 20:
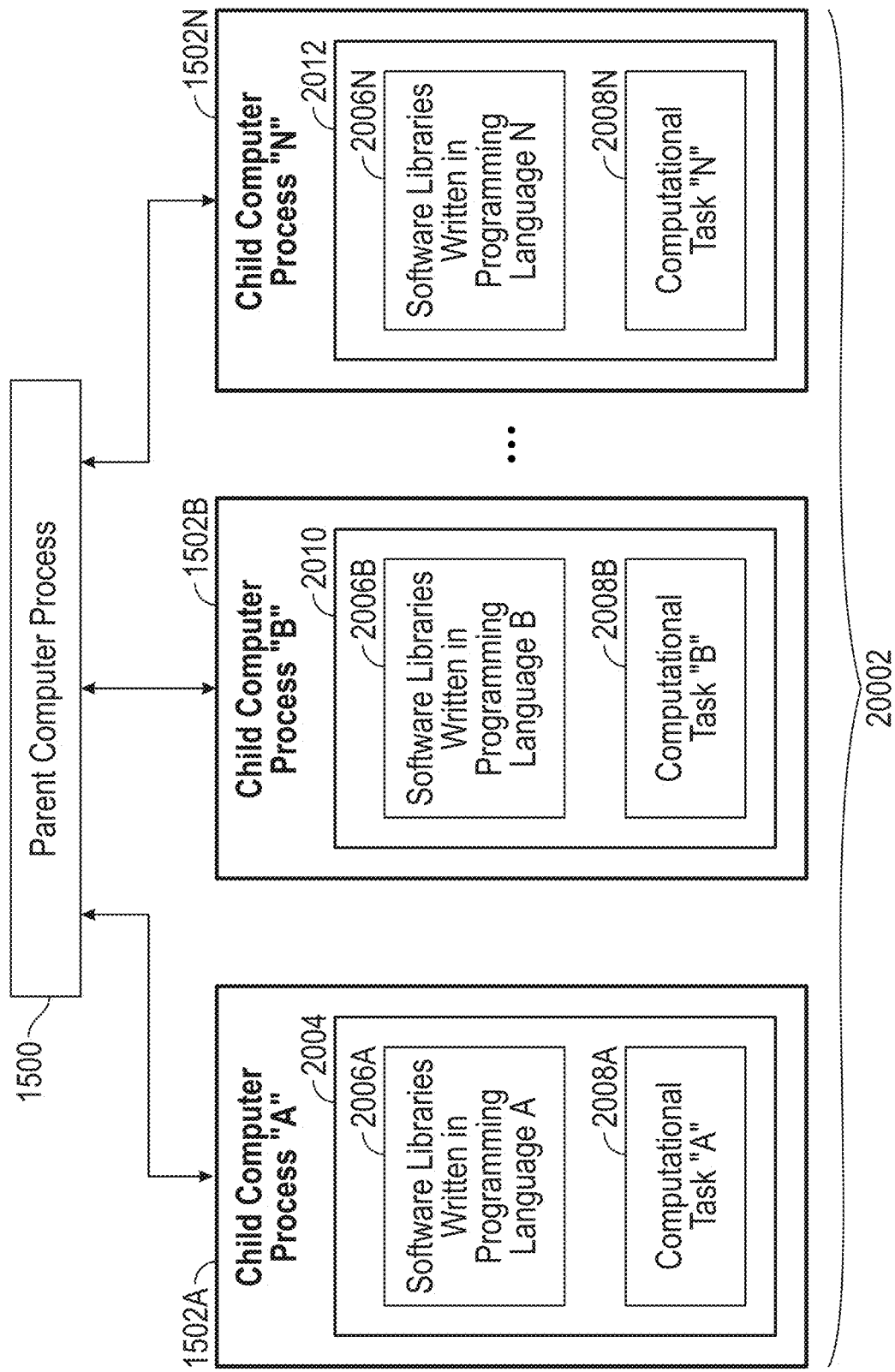
FIG. 20 illustrates an example schematic of using a single parent computer process and multiple child computer process to execute a computational task, according to some embodiments of the present technology.

Turning to FIG. 20, in one or more embodiments, parent computer process 1500 may function to launch a plurality of child computer processes 2002 when parent computer process 1500 initiates or calls for an execution of an analytical operation that uses a plurality of distinct analytical applications written in a plurality of distinct programming languages. In such an embodiment, each distinct child computer process of the plurality of child computer processes 2002 may be configured to use a distinct analytical application (e.g., distinct algorithm or the like) to perform a distinct task of the analytical operation.

For instance, in a non-limiting example, parent computer process 1500 may launch child computer process "A" 1502A to perform a first computational task (e.g., computational task "A" 2008A) of the analytical operation based on executing analytical application I 2004. Analytical application I 2004, in one or more embodiments, may be written in a first programming language (e.g., Python) and may use one or more software libraries (e.g., open-source libraries, etc.) written in the first programming language 2006A.

Additionally, in such a non-limiting example, parent computer process 1500 may launch child computer process "B" 1502B to perform a second computational task (e.g., computational task "B" 2008B) of the analytical operation based on executing analytical application II 2010. Analytical application II 2010, in one or more embodiments, may be written in a second programming language (e.g., R) and may use one or more software libraries (e.g., open-source libraries, etc.) written in the second programming language 2006B.

Additionally, in such a non-limiting example, parent computer process 1500 may launch child computer process "N" 1502N to perform a third computational task (e.g., computational task "N" 2008N) of the analytical operation based on executing analytical application III 2012. Analytical application III 2012, in one or more embodiments, may be written in a third programming language (e.g., Julia) and may use one or more software libraries (e.g., open-source libraries, etc.) written in the third programming language 2006N.

It shall be noted that, in one or more embodiments, parent computer process 1500 may simultaneously or sequentially launch child computer "A" 1502A, child computer "B" 1502B, and child computer "N" 1502N.

Accordingly, in one or more embodiments, each of the plurality of child computer processes 2002 may perform the respective computational task using the respective analytical application and, upon completion, transfer, using a cross-process queue (e.g., command cross-process queue 1602, data transfer cross-process queue 1712, etc.), the respective computational output to parent computer process 1500, which may aggregate, evaluate, or further process the computational outputs to complete the analytical operation as specified by the initial request.

It shall be recognized that, in one or more embodiments, analytical application I 2004, analytical application II 2010, and analytical application III 2012 may be written in the same programming language (e.g., Python) without departing from the scope of the disclosure. For instance, in a non-limiting example, parent computer process 1500 may launch multiple child computer processes (e.g., 1502A, 1502B, 1502N, etc.) to execute a computational task (e.g., scoring operation, etc.) on a target dataset having a plurality or records (e.g., 10,000 records, 100,000 records, etc.). Each child computer process, in such an embodiment, may concurrently perform a respective computational task (e.g., a substantially similar scoring operation, the same scoring operation, etc.) on a distinct subset of the target dataset using the respective analytical application (e.g., child computer process 1502A processing one subset using analytical application I 2004, child computer process 1502B processing another subset using analytical application II 2010, and so forth). Accordingly, upon completion, each child computer process may transmit a respective computational result for the respective subset to parent computer process 1500, which may aggregate the computational results to produce a final computational output (e.g., final scoring output) for the entire dataset. In other words, in one or more embodiments, the plurality of child computer processes 2002 may operate in parallel to process the target dataset, wherein each child computer processes performs the same type of computational task on a distinct subset of data of the target dataset.

Figure 21:
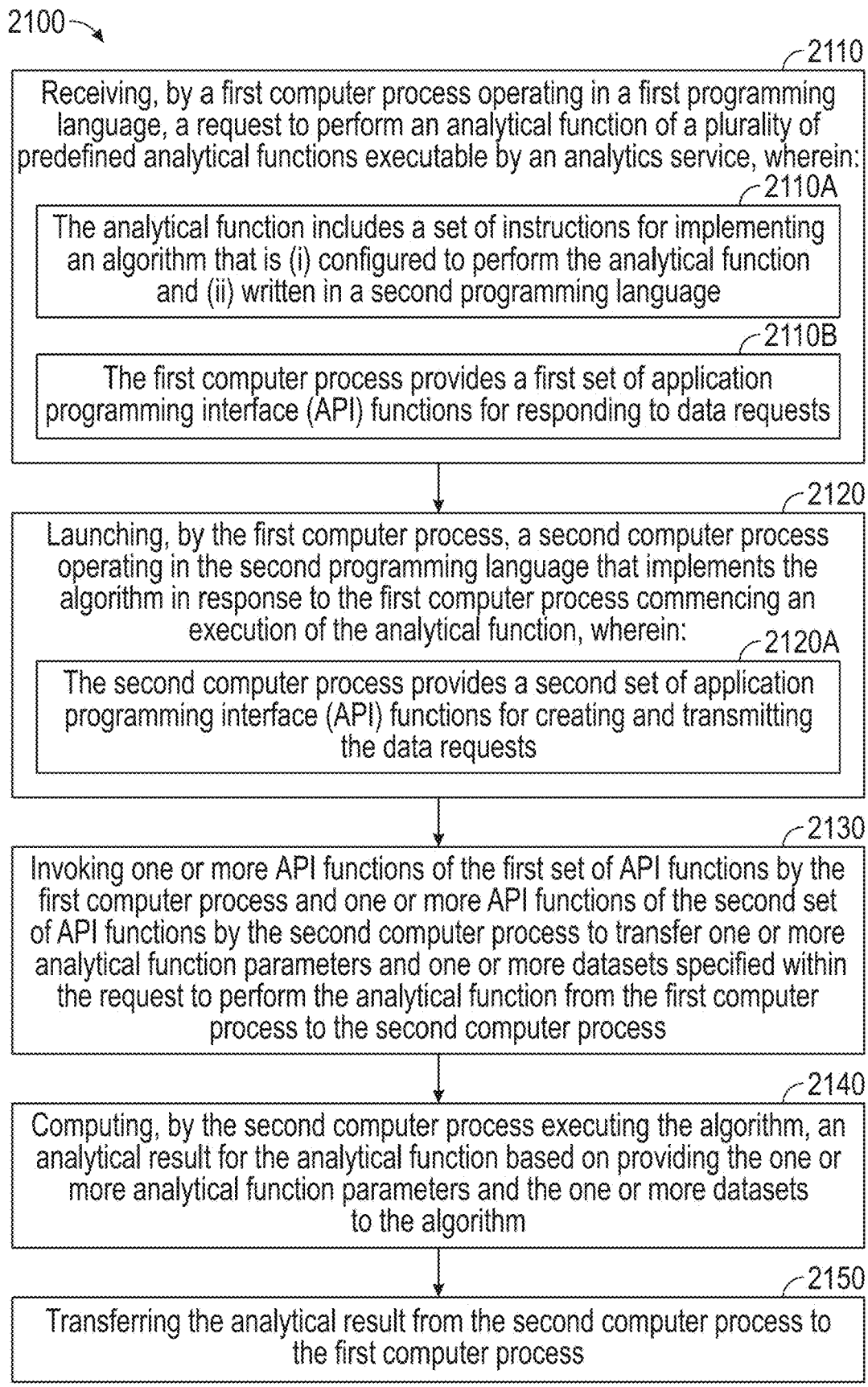
FIG. 21 illustrates a flow chart showing an example process executing an analytical function using an application programming interface, according to some embodiments of the present technology.

FIG. 21 illustrates one embodiment of a method 2100 for performing a computer function across a plurality of computer processes using an application programming interface (API) and one or more cross-process queues. It shall be appreciated that other embodiments contemplated within the scope of the present disclosure may involve more operations, fewer operations, different operations, or a different order of operations than as shown in FIG. 21.

Request to Perform an Analytical Function

In one or more embodiments, method 2100 may include process 2110. Process 2110, which may include receiving a request to perform an analytical function, may function to receive a request to perform an analytical function from a user, a software application, or a software solution associated with a system or service implementing method 2100. An analytical function, as generally referred to herein, may be configured to perform a computational operation or a set of operations using one or more predefined algorithms and, in turn, compute an analytical result. It shall be recognized that the phrase "analytical function" may be interchangeably referred to herein as an "analytical operation," or the like.

In one or more embodiments, analytics service 1530 may provide a plurality of predefined analytical functions that are executable by analytics service 1530. For instance, in a non-limiting example, a first analytical function of the plurality of predefined analytical functions may correspond to a linear regression function that may be encoded to use a linear regression algorithm to perform a linear regression-type computational task. Additionally, or alternatively, a second analytical function of the plurality of predefined analytical functions may correspond to a data classification function that may be encoded to use a random forest algorithm to perform a data classification-type computational task. Additionally, or alternatively, a third analytical function of the plurality of predefined analytical functions may correspond to a clustering function that may be encoded to use a k-means algorithm to perform a data clustering-type computational task. Additionally, or alternatively, a fourth analytical function of the plurality of predefined analytical functions may correspond to a machine learning model training function that may be encoded to use a neural network training algorithm to perform a model training-type computational task. It shall be recognized that analytics service 1530, in one or more embodiments, may include one or more additional analytical functions or a different set of analytical functions without departing from the scope of the disclosure.

For instance, in one or more embodiments, the plurality of predefined analytical functions may be extensible to enable users of analytics service 1530 to add custom analytical functions. A custom analytical function, as generally referred to herein, may be encoded to use a user-developed algorithm or a third-party algorithm written in any suitable programming language to perform a target analytical computation. For instance, in a non-limiting example, the plurality of predefined analytical functions of analytics service 1530 may be augmented to include a custom analytical function created by a user of analytics service 1530. The custom analytical function, in such a non-limiting example, may be configured to perform the target analytical computation using an algorithm, created by the user, in a target programming language (e.g., C++, Python, Rust, Julia, etc.).

Figure 22:
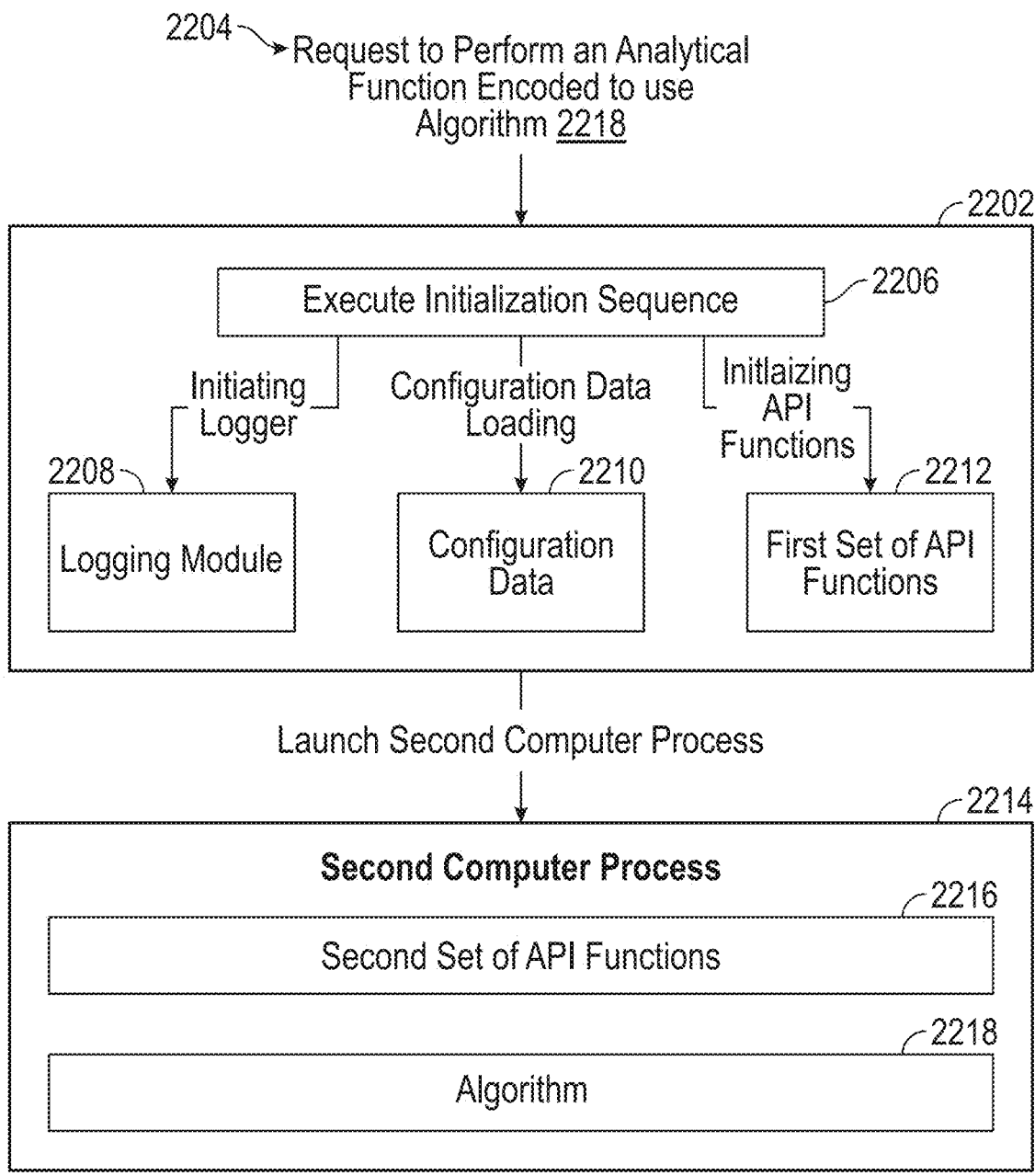
FIG. 22 illustrates an example schematic showing the first computer process and the second computer process, according to some embodiments of the present technology.

Turning to FIG. 22, in one or more embodiments, first computer process 2202 may be created based on receiving a request to perform an analytical function 2204. In one or more embodiments, in response to creating first computer process 2202, first computer process 2202 may function to execute an initialization sequence 2206. The initialization sequence 2206, in one or more embodiments, may be configured to load configuration data 2210 that corresponds to the analytical function into memory of first computer process 2202, initialize a logging module 2208, and provide a first set of application programming interface (API) functions 2212 for responding to data requests or commands, as described in more detail herein.

Configuration data 2210, in some embodiments, may include a set of parameters, settings, or instructions that may define how the analytical function (e.g., computer function or the like) is to be executed. In such an embodiment, configuration data 2210 may include a set of default parameters that may specify standard settings or behaviors that guide the execution of the analytical function and/or a set of user-provided parameters that may define user-specific settings for the analytical function that may be used alongside or in place of the set of default parameters. For instance, in a non-limiting example, configuration data 2210 may include algorithm parameters (e.g., model settings (e.g., learning rate, number of iterations, regularization terms, model type, etc.), specific methods or functions to be used (e.g., linear regression, decision trees, etc.), hyperparameters that define how algorithm(s) are applied to data (e.g., number of clusters in k-means, etc.)), data access information (e.g., paths to datasets (e.g., file locations, database connections, etc.), data format requirements (e.g., CSV, JSON, Parquet, etc.), access credentials or tokens for APIs or databases (e.g., username, password, API key, etc.)), execution parameters (e.g., resource allocation settings (e.g., memory usage, CPU/GPU resources, etc.), execution time limits (e.g., maximum execution duration, batch processing limits, etc.), parallelization settings (e.g., number of threads or worker nodes for distributed processing, etc.)), input/output settings (e.g., input data specifications (e.g., data format, data sources, etc.), output data format (e.g., table, graphical plot, file format for results, etc.), file paths or destinations for output (e.g., where results should be saved, etc.)), user-specific configurations (e.g., user preferences for data preprocessing (e.g., scaling methods, missing data handling, etc.), customized settings for report generation (e.g., summary statistics, chart types, etc.)), default configuration data (e.g., default behavior when no user input or user-provided parameters are provided (e.g., default algorithm parameters or settings), default directories for reading and saving data), and security and privacy parameters (e.g., user authentication and authorization settings, data access permissions (e.g., read/write access to datasets, etc.)).

The logging module 2208, in one or more embodiments, may be configured to track and record events, errors, and informational messages generated during the execution of the analytical function. The logging module 2208, in one or more embodiments, may function to record log events that occurred across a plurality of computer processes involved in or associated with the execution of the analytical function (e.g., parent computer process 1500 and any auxiliary computer processes, such as child computer process 1502, second computer process 2214, or the like).

The first set of application programming interface (API) functions 2212 provided by first computer process 2202, in one or more embodiments, may include a plurality of distinct application programming interface (API) functions operably configured to facilitate communication between first computer process 2202 and second computer process 2214 (e.g., process 2110B). In one or more embodiments, first computer process 2202 may invoke one or more application programming interface functions of the first set of application programming interface functions 2212 to transfer data (e.g., configuration data, parameters, datasets, etc.) from first computer process 2202 to second computer process 2214, as described in more detail herein.

In one or more embodiments, the analytical function associated with the request to perform the analytical function 2204 may include a set of instructions for implementing and using an algorithm operably configured to perform the analytical function (e.g., process 2110A). The algorithm, in such an embodiment, may be written in a target programming language, such as Python, R, or Julia, and may utilize one or more software libraries or software frameworks specific to the target programming language. It shall be noted that, in one or more embodiments, the set of instructions for implementing the algorithm may include the algorithmic code, the required libraries or frameworks used by the algorithm, and the runtime environment components necessary for executing the algorithm.

Launching Auxiliary Computer Processes

In one or more embodiments, method 2100 may include process 2120. Process 2120, which may include launching an auxiliary computer process, may function to launch one or more auxiliary computer processes in response to first computer process 2202 commencing an execution of the analytical function specified in the request to perform the analytical function 2204.

In one or more embodiments, in response to first computer process 2202 commencing an execution of the analytical function specified in the request to perform the analytical function 2204, first computer process 2202 may launch second computer process 2214. In such an embodiment, during the launch of second computer process 2214, first computer process 2202 may send the process identifier associated with first computer process 2202 to second computer process 2214. Accordingly, in such an embodiment, based on second computer process 2214 receiving the process identifier associated with first computer process 2202, second computer process 2214 may be connected with first computer process 2202 via the process identifier of first computer process 2202.

Stated another way, in some embodiments, based on second computer process 2214 receiving the process identifier of first computer process 2202, second computer process 2214 may be paired with first computer process 2202 based on the process identifier that corresponds to first computer process 2202. At least one technical benefit of pairing or connecting second computer process 2214 with first computer process 2202 may enable the parent-child computer process relationship described above.

It shall be recognized that, upon launch, second computer process 2214 may execute a set of instructions that initialize a second set of application programming interface (API) functions 2216. The second set of application programming interface (API) functions 2216 provided by second computer process 2214, in one or more embodiments, may be operably configured to create and transmit data requests to first computer process 2202 (e.g., process 2120A), as described in more detail herein.

In one or more embodiments, the analytical function specified in the request to perform the analytical function 2204 may be encoded to use an algorithm (e.g., analytical application) that may be written in a programming language incompatible for execution by first computer process 2202. In other words, the algorithm (e.g., algorithm 2218) may be written in a programming language that first computer process 2202 cannot directly execute due to a programming language mismatch (e.g., the first computer process executes instructions in C++ and the algorithm is written in Python). Accordingly, in one or more embodiments, based on or in response to first computer process 2202 invoking an execution of the analytical function, first computer process 2202 may function to launch second computer process 2214 that implements the algorithm (e.g., algorithm 2218) on second computer process 2214.

At least one technical benefit of using multiple computer processes to execute the analytical function may enable a first computer process to operate in a first programming language (e.g., C++) and a second computer process to operate in a second programming language (e.g., Python). In other words, first computer process 2202 may operate within a runtime environment compatible for performing tasks in a first programming language (e.g., C++), and second computer process 2214 may operate within a runtime environment compatible for executing the algorithm in a second programming language (e.g., Python).

Invoking Application Programming Interface (API) Functions

In one or more embodiments, method 2100 may include process 2130. Process 2130, which may include invoking one or more API functions, may function to invoke one or more API functions of the first set of API functions 2212 and one or more API functions of the second set of API functions 2216 to transfer one or more pieces of data from first computer process 2202 to second computer process 2214. An API function, as generally referred to herein, may be invoked by a computer process to perform a set of operations that facilitate an exchange of data between first computer process 2202 and second computer process 2214. It shall be recognized that, in one or more embodiments, the second set of API functions 2216 may be configured to create data transfer requests, and the first set of API functions 2212 may be configured to handle responses to the data transfer requests.

In one or more embodiments, before algorithm 2218 may be executed on second computer process 2214, algorithm 2218 may need one or more pieces of data (e.g., configuration data, parameters, datasets, etc.) stored in memory of first computer process 2202 or that may be accessible by first computer process 2202 (e.g., first computer process 2202 may be capable of sourcing or querying a computer database or any other suitable data repository of analytics service 1530 for the one or more pieces of data). For instance, in a non-limiting example, in response to pairing second computer process 2214 with first computer process 2202, second computer process 2214 may invoke one or more API functions of the second set of API functions 2216 to write one or more requests for function parameters and datasets to a first cross-process queue (e.g., command cross-process queue 1602) and, in turn, first computer process 2202 may invoke one or more API functions of the first set of API functions 2212 to write one or more response messages that includes the corresponding function parameters and the corresponding datasets to a second cross-process queue (e.g., data transfer cross-process queue 1712). Accordingly, in such a non-limiting example, second computer process 2214 may obtain the corresponding function parameters and the corresponding datasets in response to reading the one or more response messages from the second cross-process queue.

Stated another way, in one or more embodiments, the one or more API functions invoked by second computer process 2214 may include invoking a first API function to request one or more function parameters from first computer process 2202 and a second API function to request one or more datasets from first computer process 2202. For instance, in a non-limiting example, second computer process 2214 may invoke the first API function to retrieve the one or more function parameters, and after the second computer process receives the one or more function parameters, second computer process 2214 may invoke the second API function to request the datasets. It shall be further recognized, in some embodiments, the first API function and the second API function may be simultaneously invoked by second computer process 2214 without departing from the scope of the disclosure.

At least one technical benefit of using multiple cross-process queues may enable efficient handling of requests and data transfers between first computer process 2202 and second computer process 2214. The first cross-process queue, in some embodiments, may manage data requests in a sequential manner, while the second cross-process queue may enable large data blocks (e.g., large datasets, etc.) to be written simultaneously in chunks to the second cross-process queue rather than sequentially. This type of configuration reduces the time required to transfer large data blocks from first computer process 2202 to second computer process 2214.

Figure 23:
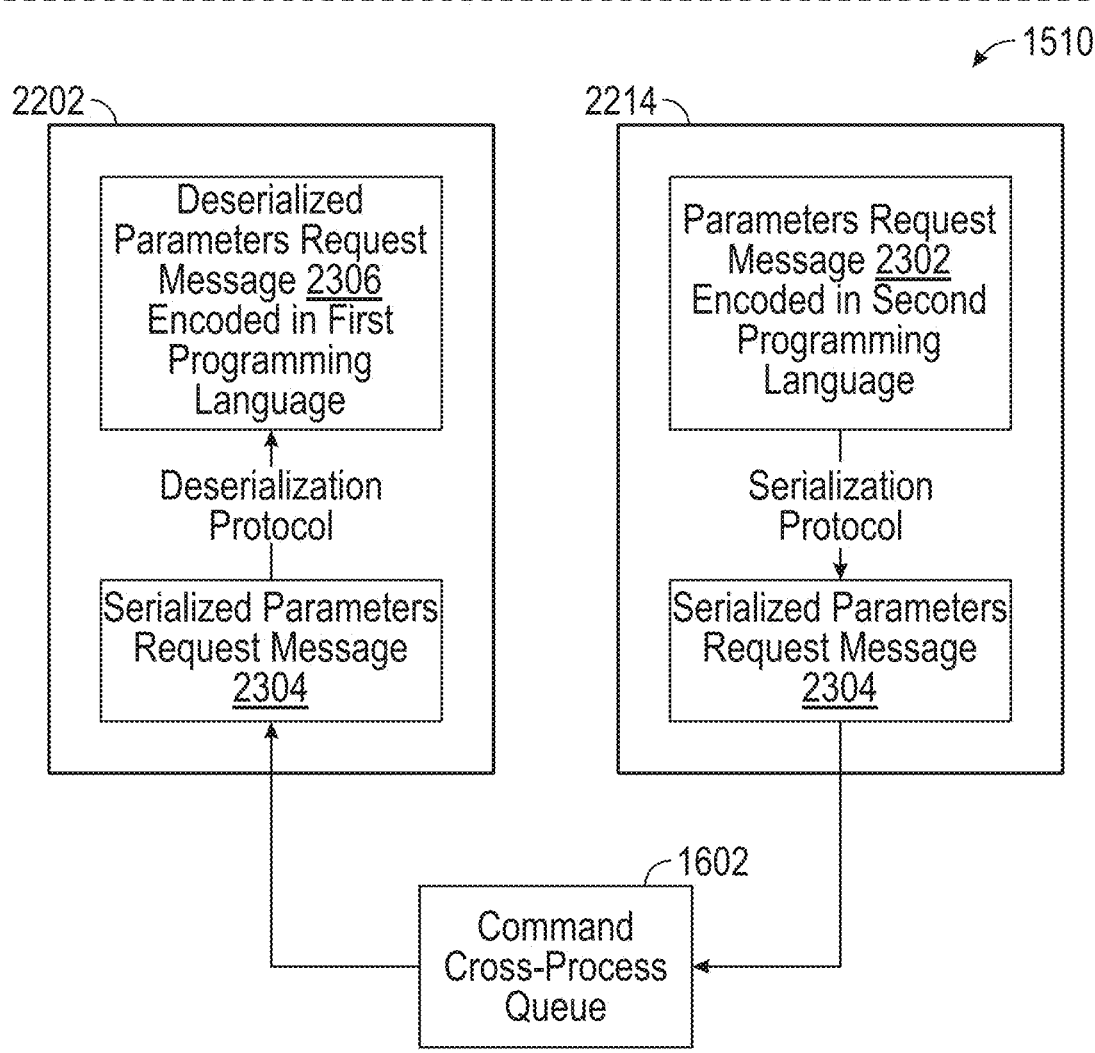
FIG. 23 illustrates an example schematic of transferring a request for parameters from a second computer process to a first computer process, according to some embodiments of the present technology.

Turning to FIG. 23, in one or more embodiments, second computer process 2214 may invoke a parameters request API function of the second set of API functions 2216 to transfer the request for parameters 1510 from second computer process 2214 to first computer process 2202. The parameters request API function, as generally referred to herein, may be configured to generate and transmit a request for one or more parameters (e.g., configuration data, etc.) that may be required by a given algorithm (e.g., algorithm 2218) for execution.

In one or more embodiments, in response to second computer process 2214 invoking the parameters request API function, the parameters request API function may create a parameters request message 2302. The parameters request message 2302, in one or more embodiments, may include a request to obtain, from first computer process 2202, parameter data (e.g., configuration data or the like) associated with the analytical function specified within request 2204. For instance, in a non-limiting example, the request to perform the analytical function 2204 may specify one or more parameters to provide algorithm 2218 as input and, in turn, second computer process 2214 may function to invoke the parameters request API function to obtain the one or more parameters. It shall be recognized that, in one or more embodiments, parameters request message 2302 may be encoded in a programming language compatible with second computer process 2214, such as the second programming language (e.g., Python).

Additionally, or alternatively, in one or more embodiments, based on the parameters request API function creating the parameters request message 2302, the parameters request API function may function to serialize parameters request message 2302 into a serialized parameters request message 2304. Serialized parameters request message 2304, in one or more embodiments, may be encoded in a binary data format. A binary data format, as generally referred to herein, may represent data as a sequence of binary digits (bits). It shall be recognized that, in one or more embodiments, parameters request message 2302 may be serialized into serialized parameters request message 2304 based on executing a serialization protocol of the parameters request API function, which may use one or more techniques described in method 3000.

At least one technical benefit of serializing parameters request message 2302 into serialized parameters request message 2304 may enable serialized parameters request message 2304 to be transferred to a target computer process (e.g., first computer process 2202, parent computer process 1500, etc.) irrespective of the programming language or runtime environment in which the target computer process operates.

Additionally, or alternatively, in one or more embodiments, based on the parameters request API function serializing parameters request message 2302 into serialized parameters request message 2304, the parameters request API function may function to write serialized parameters request message 2304 to command cross-process queue 1602. It shall be recognized that, in one or more embodiments, the parameters request API function may write serialized parameters request message 2304 to command cross-process queue 1602 using a data writer of the parameters request API function. At least one technical benefit of writing serialized parameters request message 2304 to command cross-process queue 1602 may enable cross-process communication between second computer process 2214 and first computer process 2202.

Figure 24:
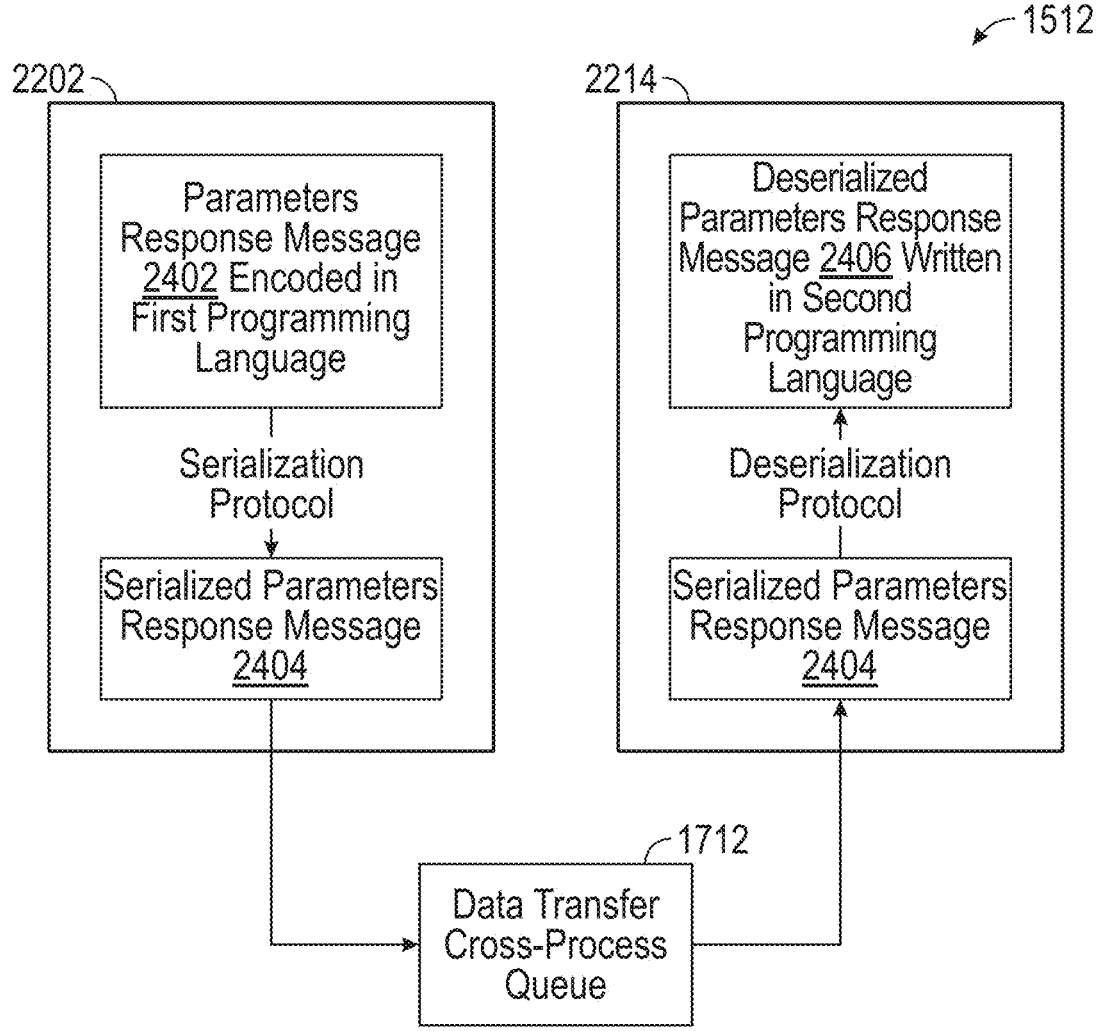
FIG. 24 illustrates an example schematic of transferring parameter data from a first computer process to a second computer process, according to some embodiments of the present technology.

Turning to FIG. 24, in one or more embodiments, first computer process 2202 may function to invoke a parameters response API function of the first set of API functions 2212 to transfer the requested parameter data stored in memory of first computer process 2202 or that may be accessible by first computer process to second computer process 2214. In one or more embodiments, first computer process 2202 may function as a listener to detect when data request messages (e.g., commands) are written to command cross-process queue 1602. For instance, in a non-limiting example, first computer process 2202 may function to detect serialized parameters request message 2304 within command cross-process queue 1602. In one or more embodiments, in response to detecting serialized parameters request message 2304 within command cross-process queue 1602, first computer process 2202 may invoke the parameters response API function of the first set of API functions 2212. The parameters response API function, as generally referred to herein, may be configured to generate a parameters response message that includes the requested parameter data (e.g., configuration data or the like).

In one or more embodiments, in response to first computer process 2202 invoking the parameters response API function, first computer process 2202 may function to read serialized parameters request message 2304 from command cross-process queue 1602. It shall be recognized, in one or more embodiments, first computer process 2202 may read serialized parameters request message 2304 from command cross-process queue 1602 using a data reader of the parameters response API function.

Additionally, or alternatively, in one or more embodiments, based on first computer process 2202 reading serialized parameters request message 2304 from command cross-process queue 1602, first computer process 2202 may function to deserialize serialized parameters request message 2304 into deserialized parameters request message 2306. Deserialized parameters request message 2306, in one or more embodiments, may be encoded in a programming language compatible with first computer process 2202, such as the first programming language (e.g., C++). It shall be recognized that, in one or more embodiments, first computer process 2202 may deserialize serialized parameters request message 2304 into deserialized parameters request message 2306 based on executing a deserialization protocol of the parameters response API function, which may use one or more techniques described in method 3000.

In one or more embodiments, deserialized parameters request message 2306 may include a representation of the original request for parameter data created by second computer process 2214, but now in a data format compatible with first computer process 2202. That is, in one or more embodiments, deserialized parameters request message 2306 may be in a form interpretable by first computer process 2202. Accordingly, in one or more embodiments, in response to deserializing serialized parameters request message 2304, first computer process 2202 may function to process and respond to deserialized parameters request message 2306 by retrieving parameter data (e.g., default function parameters, user-provided function parameters, configuration data, etc.) associated with the analytical function specified within request 2204. In other words, first computer process 2202, using the parameters response API function, may function to retrieve the parameter data stored in memory of first computer process 2202. It shall be noted that, in one or more embodiments, the parameter data may not be stored in memory of first computer process 2202, and the parameters response API function may function to retrieve the parameter data from a computer database or any other suitable data source of analytics service 1530.

Additionally, or alternatively, in one or more embodiments, based on retrieving the parameter data, first computer process 2202 may function to create a parameters response message 2402 that includes the parameter data stored in memory of first computer process 2202. In one or more embodiments, parameters response message 2402 may be created using the parameters response API function. It shall be noted that, in one or more embodiments, parameters response message 2402 may be encoded in the first programming language (e.g., C++) or in a format compatible with first computer process 2202.

Additionally, or alternatively, in one or more embodiments, based on creating parameters response message 2402 that includes the parameter data, first computer process 2202 may function to serialize parameters response message 2402 into serialized parameters response message 2404. Serialized parameters response message 2404, in one or more embodiments, may include the parameter data in a binary data format. It shall be recognized that, in one or more embodiments, first computer process 2202 may serialize parameters response message 2402 based on executing a serialization protocol of the parameters response API function.

At least one technical benefit of serializing parameters response message 2402 into serialized parameters response message 2404 may enable serialized parameters response message 2404 to be transferred to any auxiliary or child computer process irrespective of the programming language or runtime environment in which the receiving process operates.

Additionally, or alternatively, in one or more embodiments, based on the parameters response API function serializing parameters response message 2402 into serialized parameters response message 2404, first computer process 2202 may write serialized parameters response message 2404 to data transfer cross-process queue 1712. In one or more embodiments, first computer process 2202 may write serialized parameters response message 2404 to data transfer cross-process queue 1712 using a data writer of the parameters response API function.

Accordingly, in one or more embodiments, second computer process 2214 may detect serialized parameters response message 2404 within data transfer cross-process queue 1712 and, in turn, invoke a parameters response handler API function of the second set of API functions 2216 in response to detecting serialized parameters response message 2404 within data transfer cross-process queue 1712. In one or more embodiments, in response to invoking the parameters response handler API function, second computer process 2214 may function to read serialized parameters response message 2404 from data transfer cross-process queue 1712. It shall be recognized that, in one or more embodiments, second computer process 2214 may function to read serialized parameters response message 2404 from data transfer cross-process queue 1712 using a data reader of the parameters response handler API function.

Additionally, or alternatively, in one or more embodiments, in response to second computer process 2214 reading serialized parameters response message 2404 from data transfer cross-process queue 1712, second computer process 2214 may function to deserialize serialized parameters response message 2404 into deserialized parameters response message 2406. Deserialized parameters response message 2406, in one or more embodiments, may include the parameter data encoded in a programming language compatible with second computer process 2214, such as the second programming language (e.g., Python). It shall be recognized that, in one or more embodiments, second computer process 2214 may deserialize serialized parameters response message 2404 into deserialized parameters response message 2406 based on executing a deserialization protocol of the parameters response handler API function, which may use one or more techniques described in method 3000.

Accordingly, in one or more embodiments, in response to deserializing serialized parameters response message 2404 into deserialized parameters response message 2406, second computer process 2214 may function to extract the parameter data included within the deserialized parameters response message 2406, and, in turn, load or write the extracted parameter data into memory of second computer process 2214.

Stated another way, in one or more embodiments, in response to second computer process 2214 invoking the parameters request API function, serialized parameters request message 2304 may be transmitted or transferred to first computer process 2202 via command cross-process queue 1602. In one or more embodiments, after first computer process 2202 receives the serialized parameters request message 2304, first computer process 2202 may invoke the parameters response API function to write the serialized parameters response message 2404 that includes the requested parameter data to data transfer cross-process queue 1712. Accordingly, in one or more embodiments, second computer process 2214 may invoke the parameters response handler API function to read serialized parameters response message 2404 from data transfer cross-process queue 1712. In one or more embodiments, reading serialized parameters response message 2404 from data transfer cross-process queue 1712 may include reading, using a data reader of the parameters response handler API function, the requested parameter data encoded in the binary data format from data transfer cross-process queue 1712, and converting, using the data reader of the parameters response handler API function, the requested parameter data encoded in the binary data format to one or more representations in the second programming language.

Figure 25:
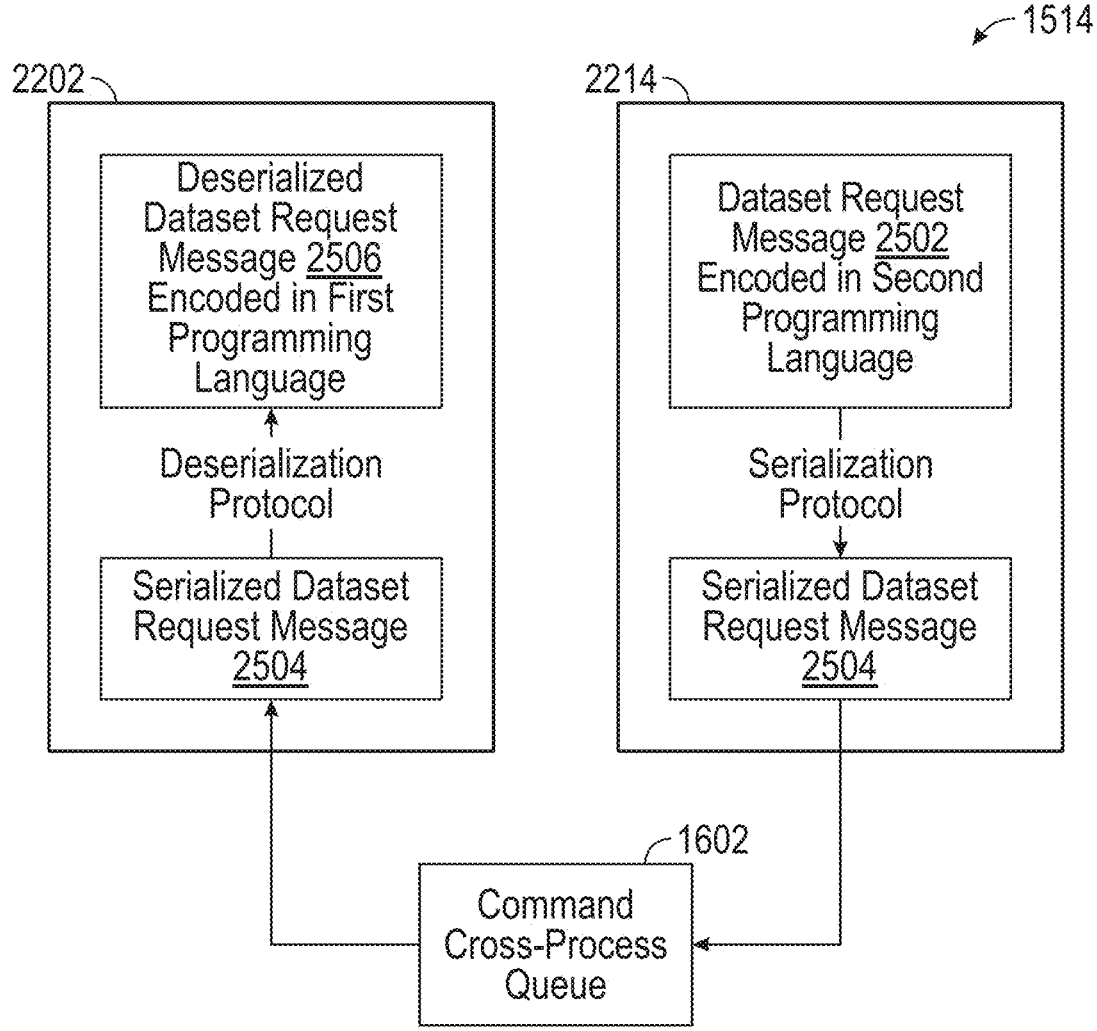
FIG. 25 illustrates an example schematic of transferring a request for datasets from a second computer process to a first computer process, according to some embodiments of the present technology.

Turning to FIG. 25, in one or more embodiments, second computer process 2214 may function to invoke a tabular data-request API function of the second set of API functions 2216 to transfer the request for datasets 1514 from second computer process 2214 to first computer process 2202. The tabular data-request API function, as generally referred to herein, may be configured to generate and transmit a request for one or more datasets (e.g., tabular data, etc.) that may be required by a given algorithm (e.g., algorithm 2218) for execution.

In one or more embodiments, in response to second computer process 2214 invoking the tabular data-request API function, the tabular data-request API function may function to create dataset request message 2502. The dataset request message 2502, in one or more embodiments, may include a request to obtain, from first computer process 2202, one or more datasets (e.g., tabular data or the like) specified within the request to perform the analytical function 2204. For instance, in a non-limiting example, the request to perform the analytical function 2204 may specify one or more datasets for the analytical function to process during the requested computation task and, in turn, second computer process 2214 may function to invoke the tabular data-request API function to obtain the one or more datasets. It shall be recognized that, in one or more embodiments, dataset request message 2502 may be encoded in a programming language compatible with second computer process 2214, such as the second programming language (e.g., Python).

Additionally, or alternatively, in one or more embodiments, based on the tabular data-request API function creating the dataset request message 2502, the tabular data-request API function may function to serialize dataset request message 2502 into serialized dataset request message 2504. Serialized dataset request message 2504, in one or more embodiments, may be encoded in a binary data format. It shall be recognized that, in one or more embodiments, dataset request message 2502 may be serialized into serialized dataset request message 2504 based on a serialization protocol of the tabular data-request API function, which may use one or more techniques described in method 3000.

At least one technical benefit of serializing dataset request message 2502 into serialized dataset request message 2504 may enable serialized dataset request message 2504 to be transferred to a target computer process (e.g., first computer process 2202, parent computer process 1500, etc.) irrespective of the programming language or runtime environment in which the target computer process operates.

Additionally, or alternatively, in one or more embodiments, based on the tabular data-request API function serializing dataset request message 2502 into serialized dataset request message 2504, the tabular data-request API function may function to write serialized dataset request message 2504 to command cross-process queue 1602. It shall be recognized that, in one or more embodiments, the tabular data-request API function may function to write serialized dataset request message 2504 to command cross-process queue 1602 using a data writer of the tabular data-request application programming interface function. At least one technical benefit of writing serialized dataset request message 2504 to command cross-process queue 1602 may enable cross-process communication between second computer process 2214 and first computer process 2204.

Figure 26:
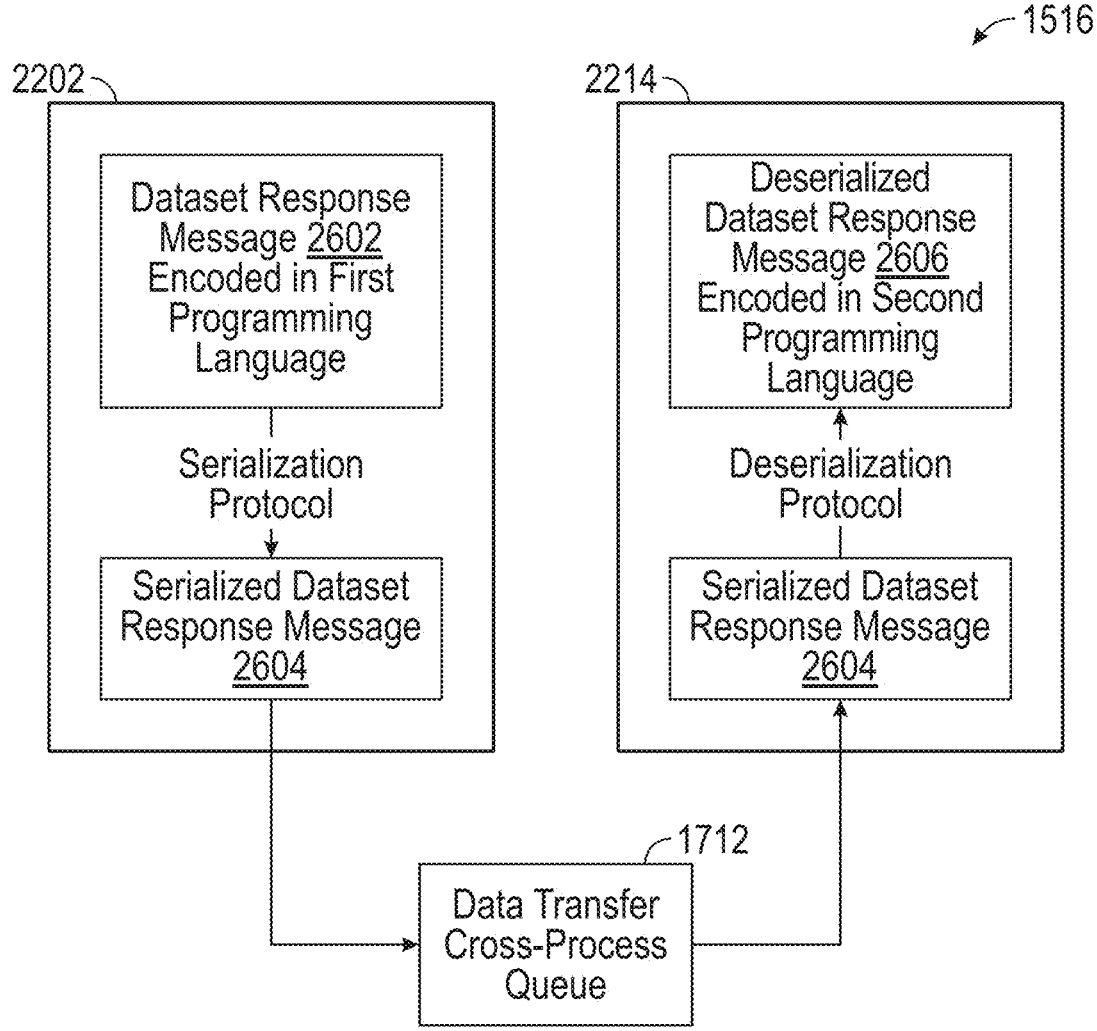
FIG. 26 illustrates an example schematic of transferring datasets from a first computer process to a second computer process, according to some embodiments of the present technology.

Turning to FIG. 26, in one or more embodiments, first computer process 2202 may function to invoke a tabular data-response API function of the first set of API functions 2212 to transfer the requested dataset or datasets stored in memory of first computer process 2202 or that may be accessible by first computer process 2202 to second computer process 2214. In one or more embodiments, first computer process 2202 may function as a listener to detect when data request messages (e.g., commands or the like) are written to command cross-process queue 1602. For instance, in a non-limiting example, first computer process 2202 may function to detect serialized dataset request message 2504 within command cross-process queue 1602. In one or more embodiments, in response to detecting serialized dataset request message 2504 within command cross-process queue 1602, first computer process 2202 may invoke the tabular data-response API function of the first set of API functions 2212. The tabular data-response API function, as generally referred to herein, may be configured to generate a dataset response message that includes the requested datasets (e.g., tabular data, etc.).

In one or more embodiments, in response to first computer process 2202 invoking the tabular data-response API function, first computer process 2202 may function to read serialized dataset request message 2504 from command cross-process queue 1602. It shall be recognized, in one or more embodiments, first computer process 2202 may read serialized dataset request message 2504 from command cross-process queue 1602 using a data reader of the tabular data-response API function.

Additionally, or alternatively, in one or more embodiments, based on first computer process 2202 reading serialized dataset request message 2504 from command cross-process queue 1602, first computer process 2202 may function to deserialize serialized dataset request message 2504 into deserialized dataset request message 2506. Deserialized dataset request message 2506, in one or more embodiments, may be encoded in a programming language compatible with first computer process 2202, such as the first programming language (e.g., C++). It shall be recognized that, in one or more embodiments, first computer process 2202 may deserialize serialized dataset request message 2504 into deserialized dataset request message 2506 based on executing a deserialization protocol of the tabular data-response API function, which may use one or more techniques described in method 3000.

In one or more embodiments, deserialized dataset request message 2506 may include a representation of the original request for datasets created by second computer process 2214, but now in a data format compatible with first computer process 2202. That is, in one or more embodiments, deserialized dataset request message 2506 may be in a form interpretable by first computer process 2202. Accordingly, in one or more embodiments, in response to deserializing serialized dataset request message 2504, first computer process 2202 may function to process and respond to deserialized dataset request message 2506 by retrieving one or more datasets associated with the analytical function specified within request 2204. In other words, first computer process 2202, using the tabular data-response API function, may function to retrieve the one or more datasets stored in memory of first computer process 2202. It shall be noted that, in one or more embodiments, the one or more datasets may not be stored in memory of first computer process 2202, and the tabular data-response API function may function to retrieve the one or more datasets from a computer database of analytics service 1530.

Additionally, or alternatively, in one or more embodiments, based on retrieving the one or more datasets, first computer process 2202 may function to create a dataset response message 2602 that includes the one or more datasets stored in memory of first computer process 2202 or retrieved from the computer database of analytics service 1530. In one or more embodiments, dataset response message 2602 may be created using the tabular data-response API function. It shall be noted that, in one or more embodiments, dataset response message 2602 may be encoded in the first programming language (e.g., C++) or in a format compatible with first computer process 2202.

Additionally, or alternatively, in one or more embodiments, based on creating the dataset response message 2602 that includes the one or more datasets, first computer process 2202 may function to serialize dataset response message 2602 into serialized dataset response message 2604. Serialized dataset response message 2604, in one or more embodiments, may include the one or more datasets in a binary data format. It shall be recognized that, in one or more embodiments, first computer process 2202 may serialize dataset response message 2602 based on executing a serialization protocol of the tabular data-response API function.

At least one technical benefit of serializing dataset response message 2602 into serialized dataset response message 2604 may enable serialized dataset response message 2604 to be transferred to any auxiliary or child computer process irrespective of the programming language or runtime environment in which the receiving process operates.

Additionally, or alternatively, in one or more embodiments, based on the tabular data-response API function serializing dataset response message 2602 into serialized dataset response message 2604, first computer process 2202 may write serialized dataset response message 2604 to data transfer cross-process queue 1712. In one or more embodiments, first computer process 2202 may write serialized dataset response message 2604 to data transfer cross-process queue 1712 using a data writer of the tabular data-response API function.

Accordingly, in one or more embodiments, second computer process 2214 may detect serialized dataset response message 2604 within data transfer cross-process queue 1712 and, in turn, invoke a dataset response handler API function of the second set of API functions 2216 in response to detecting serialized dataset response message 2604 within data transfer cross-process queue 1712. In one or more embodiments, in response to invoking the dataset response handler API function, second computer process 2214 may function to read serialized dataset response message 2604 from data transfer cross-process queue 1712. It shall be recognized that, in one or more embodiments, second computer process 2214 may function to read serialized dataset response message 2604 from data transfer cross-process queue 1712 using a data reader of the dataset response handler API function.

Additionally, or alternatively, in one or more embodiments, in response to second computer process 2214 reading serialized dataset response message 2604 from data transfer cross-process queue 1712, second computer process 2214 may function to deserialize serialized dataset response message 2604 into deserialized dataset response message 2606. Deserialized dataset response message 2606, in one or more embodiments, may include the one or more datasets encoded in a programming language compatible with second computer process 2214, such as the second programming language (e.g., Python). It shall be recognized that, in one or more embodiments, second computer process 2214 may deserialize serialized dataset response message 2604 into deserialized dataset response message 2606 based on executing a deserialization protocol of the dataset response handler API function, which may use one or more techniques described in method 3000.

Accordingly, in one or more embodiments, in response to deserializing dataset response message 2604 into deserialized dataset response message 2606, second computer process 2214 may function to extract the one or more datasets included within deserialized dataset response message 2606, and, in turn, load the extracted datasets into memory of second computer process 2214.

Stated another way, in one or more embodiments, in response to second computer process 2214 invoking the tabular data-request API function, serialized dataset request message 2504 may be transmitted or transferred to first computer process 2202 via command cross-process queue 1602. In one or more embodiments, after first computer process 2202 receives the serialized dataset request message 2504, first computer process 2202 may invoke the tabular data-response API function to write serialized dataset response message 2604 that includes the one or more datasets to data transfer cross-process queue 1712. Accordingly, in one or more embodiments, second computer process 2214 may invoke the dataset response handler API function to read serialized dataset response message 2604 from data transfer cross-process queue 1712. In one or more embodiments, reading serialized dataset response message 2604 from data transfer cross-process queue 1712 may include reading, using a data reader of the dataset response handler API function, the requested dataset data encoded in the binary data format from data transfer cross-process queue 1712, and converting, using the data reader of the dataset response handler API function, the requested dataset data encoded in the binary data format to one or more representations in the second programming language (e.g., converting each dataset included in serialized dataset response message 2604 to a corresponding pandas dataframe object, etc.).

Computing an Analytical Result

In one or more embodiments, method 2100 may include process 2140. Process 2140, which includes computing an analytical result, may function to compute, by second computer process 2214 executing algorithm 2218, an analytical result based on providing algorithm 2218 with one or more pieces of data transferred from first computer process 2202. An analytical result, as generally referred to herein, may be a computed output that a subject algorithm produces by executing a predefined set of instructions or operations.

The analytical result outputted by a subject algorithm, in one or more embodiments, may include one or more computational artifacts (e.g., one or more computational artifacts, two or more computational artifacts, three or more computational artifacts, four or more computational artifacts, etc.). For instance, in a non-limiting example, the analytical result may include one or more of a data table, a graphical chart, a numerical value, a predictive score, a machine learning-based inference, a correlation matrix, a regression coefficient table, a trend analysis, a time series forecast, a probability distribution, a cluster map, a decision boundary map, an automated decisioning decision (e.g., allow, deny, review), a principal component analysis (PCA) plot, and any other suitable computational artifact.

In one or more embodiments, second computer process 2214 may execute algorithm 2218 based on or in response to second computer process 2214 receiving one or more parameters and one or more datasets from first computer process 2202. For instance, in a non-limiting example, when the analytical function associated with the request to perform the analytical function 2204 is encoded to use algorithm 2218, second computer process 2214 may provide the one or more parameters and the one or more datasets as input to algorithm 2218 and, in turn, algorithm 2218 may output an analytical result based on the provided parameters and datasets (e.g., the parameters and datasets transferred from first computer process 2202).

It shall be recognized that, in such an embodiment, the one or more datasets and the one or more parameters may initially be encoded in one or more data structures of the first programming language (e.g., C++), making them incompatible for direct use by algorithm 2218, which may be encoded in the second programming language (e.g., Python). Accordingly, in one or more embodiments, during the transfer of the one or more datasets and the one or more parameters from first computer process 2202 to second computer process 2214, first computer process 2202 may function to serialize and write the one or more datasets and the one or more parameters to a cross-process queue (e.g., data transfer cross-process queue 1712) and, in turn, second computer process 2214 may read and deserialize the one or more serialized datasets and the one or more serialized parameters written to the cross-process queue into one or more corresponding data structures of the second programming language.

Stated another way, in one or more embodiments, process 2140 may function to compute, by second computer process 2214 executing algorithm 2218, an analytical result based on providing the deserialized parameters and the deserialized datasets to algorithm 2218.

In another non-limiting example, second computer process 2214 may execute algorithm 2218 based on or in response to second computer process 2214 receiving one or more parameters and/or one or more datasets from first computer process 2202. In such a non-limiting example, when the analytical function associated with the request to perform the analytical function 2204 is encoded to use algorithm 2218, second computer process 2214 may provide the one or more parameters and the one or more datasets to algorithm 2218 and, in turn, algorithm 2218 may output an analytical result that includes a first computational artifact of a first computational artifact type (e.g., data table) and a second computational artifact of a second computational artifact type (e.g., a graph). In such a non-limiting example, the first computational artifact may include a summary data table that includes one or more metrics derived from the one or more datasets (e.g., averages, standard deviations, or any other suitable statistical values), and the second computational artifact may include a visual graph that represents a trend or distribution within the one or more datasets.

Transferring Analytical Result

Figure 27:
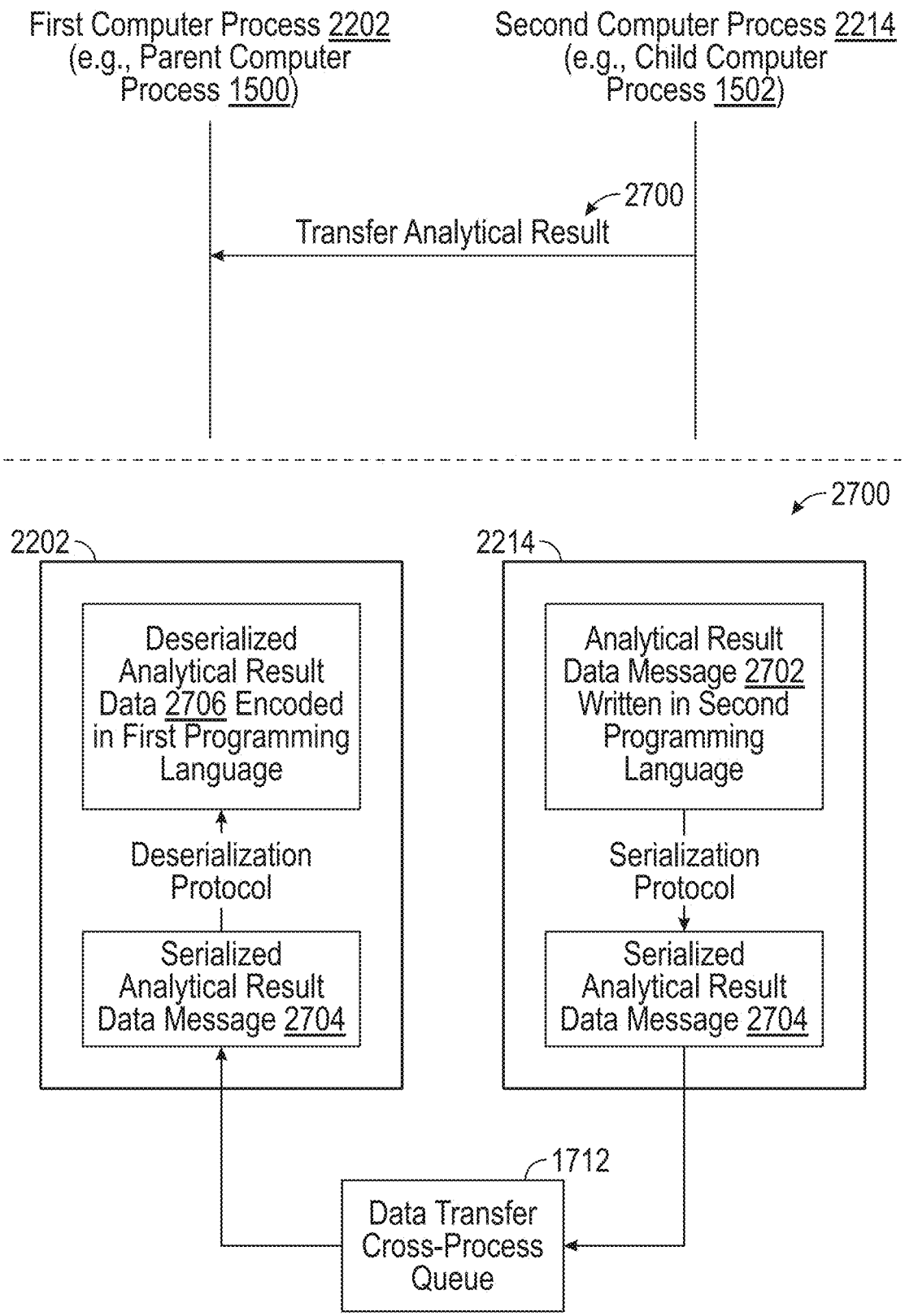
FIG. 27 illustrates an example schematic of transferring an analytical result from a second computer process to a first computer process, according to some embodiments of the present technology.

In one or more embodiments, method 2100 may include process 2150. Process 2150, which includes transferring analytical result 2700, may function to transfer the analytical result computed by algorithm 2218 from second computer process 2214 to first computer process 2202, as shown generally by way of example in FIG. 27. It shall be recognized that the phrase "transferring analytical result 2700" may be interchangeably referred to herein as "sending analytical output data 1524" or the like.

In one or more embodiments, child computer process 2214 may invoke an output data writer API function to transfer the analytical result computed by algorithm 2218 from second computer process 2214 to first computer process 2202. An output data writer API function, as generally referred to herein, may be a programming interface or a routine designed to transfer computational outputs (e.g., algorithmic outputs, analytical results, etc.) from one computer process to another computer process.

In one or more embodiments, algorithm 2218 may function to process raw input data to generate raw output data. In one or more embodiments, based on algorithm 2218 generating the raw output data, algorithm 2218 may transform the raw output data into a structured data format, such as a data table. In other words, in one or more embodiments, the analytical result computed by algorithm 2218 may include one or more data tables that includes the raw output data.

Accordingly, in one or more embodiments, based on or in response to algorithm 2218 computing or generating the analytical result, second computer process 2214 may function to invoke the output data writer API function to transfer the analytical result from second computer process 2214 to first computer process 2202. In one or more embodiments, in response to invoking the output data writer API function, second computer process 2214 may function to create analytical result data message 2702 that includes the analytical result computed by algorithm 2218. Analytical result data message 2702, in one or more embodiments, may be encoded or written in one or more data structures of a programming language compatible with second computer process 2214, such as Python. Stated another way, in one or more embodiments, second computer process 2214 may function to create analytical result data message 2702 using the output data writer API function.

In one or more embodiments, based on or in response to creating analytical result data message 2702, the output data writer API function may function to serialize analytical result data message 2702 into serialized analytical result data message 2704. Serialized analytical result data message 2704, in one or more embodiments, may include the analytical result (e.g., the one or more data tables that includes the raw output data) in a binary data format. It shall be recognized that, in one or more embodiments, analytical result data message 2702 may be serialized into serialized analytical result data message 2704 based on executing a serialization protocol of the output data writer API function, which may use one or more techniques described in method 3000.

In one or more embodiments, based on or in response to serializing analytical result data message 2702 into serialized analytical result data message 2704, second computer process 2214 may function to write serialized analytical result data message 2704 to data transfer cross-process queue 1712. In one or more embodiments, second computer process 2214 may write serialized analytical result data message 2704 to data transfer cross-process queue 1712 using a data writer of the output data writer API function. That is, in one or more embodiments, the output data writer API function may write serialized analytical result data message 2704 to data transfer cross-process queue 1712.

Accordingly, in one or more embodiments, first computer process 2202 may detect serialized analytical result data message 2704 within data transfer cross-process queue 1712 and, in turn, invoke an output data reader API function in response to detecting serialized analytical result data message 2704 within data transfer cross-process queue 1712. In one or more embodiments, in response to invoking the output data reader API function, first computer process 2202 may function to read serialized analytical result data message 2704 from data transfer cross-process queue 1712. It shall be recognized that, in one or more embodiments, first computer process 2202 may function to read serialized analytical result data message 2704 from data transfer cross-process queue 1712 using a data reader of the output data reader API function.

In one or more embodiments, reading the serialized analytical result data message 2704 from data transfer cross-process queue 1712 may include reading, using the data reader of the output data reader API function, the analytical result that includes the one or more data tables in the binary data format from data transfer cross-process queue 1712 and deserializing, using the data reader of the output data reader API function, the one or more data tables in the binary data format into one or more deserialized data tables encoded in one or more data structures of the first programming language (e.g., deserialized analytical result data 2706).

Accordingly, in one or more embodiments, first computer process 2202 may write the one or more deserialized data tables (e.g., deserialized analytical result data 2706) to a computer database of analytics service 1530. Stated another way, in one or more embodiments, based on or in response to first computer process 2202 reading the one or more deserialized data tables (e.g., deserialized analytical result data 2706) into memory of first computer process 2202, first computer process 2202 may write the one or more deserialized data tables into the computer database of analytics service 1530 (e.g., saving or loading the one or more deserialized data tables to a computer database that corresponds to the user that initiated the request). It shall be recognized that, in such an embodiment, second computer process 2214 may not have permissions to write the analytical result to the computer database and first computer process 2202 may have the permissions to write the analytical result (e.g., deserialized analytical result data 2706) to the computer database.

Additionally, or alternatively, in one or more embodiments, second computer process 2214 may invoke the output data writer API function to create analytical result data message 2702. Analytical result data message 2702, in one or more embodiments, may include the analytical result computed by algorithm 2218 and may specify a request for first computer process 2202 to save the analytical result to the computer database of analytics service 1530.

In one or more embodiments, based on or in response to creating analytical result data message 2702, the output data writer API function may function to serialize analytical result data message 2702 into serialized analytical result data message 2704. Serialized analytical result data message 2704, in one or more embodiments, may include the analytical result computed by algorithm 2218 in a binary data format and the request for first computer process 2202 to save the analytical result to the computer database in the same binary data format. It shall be recognized that, in one or more embodiments, analytical result data message 2702 may be serialized into serialized analytical result data message 2704 based on a serialization protocol of the output data writer API function.

Accordingly, in one or more embodiments, based on the output data writer API function serializing analytical result data message 2702 into serialized analytical result data message 2704, second computer process 2214 may write serialized analytical result data message 2704 to command cross-process queue 1602. In one or more embodiments, second computer process 2214 may write serialized analytical result data message 2704 to command cross-process queue 1602 using a data writer of the output data writer API function.

Accordingly, in one or more embodiments, first computer process 2202 may detect serialized analytical result data message 2704 within command cross-process queue 1602 and, in turn, invoke an output data reader API function in response to detecting serialized analytical result data message 2704 within command cross-process queue 1602. In one or more embodiments, in response to invoking the output data reader API function, first computer process 2202 may read serialized analytical result data message 2704 from command cross-process queue 1602. It shall be recognized that, in one or more embodiments, first computer process 2202 may read serialized analytical result data message 2704 from command cross-process queue 1602 using the output data reader API function.

In one or more embodiments, reading serialized analytical result data message 2704 from command cross-process queue 1602 may include reading, using a data reader of the output data reader API function, serialized analytical result data message 2704 from command cross-process queue 1602. Furthermore, in one or more embodiments, serialized analytical result data message 2704 may be deserialized into deserialized analytical result data 2706. Deserialized analytical result data 2706, in one or more embodiments, may include a representation of the analytical result in one or more data structures of the first programming language (e.g., C++) and a representation of the request for first computer process 2202 to save the analytical result to the computer database in one or more data structures of the first programming language (e.g., C++). Accordingly, in one or more embodiments, first computer process, using the output data reader API function, may read the deserialized analytical result data 2706 into memory of first computer process 2202.

Accordingly, based on or in response to first computer process 2202 identifying or detecting the deserialized request to save the analytical result to the computer database, first computer process 2202 may write the representation of the analytical result in the one or more data structures of the first programming language (e.g., C++) to the computer database of analytics service 1530.

It shall be further recognized that, in one or more embodiments, serialized analytical result data message 2704 may be deserialized into deserialized analytical result data 2706 based on executing a deserialization protocol of the output data reader API function, which may use one or more techniques described in method 3000.

Figure 28:
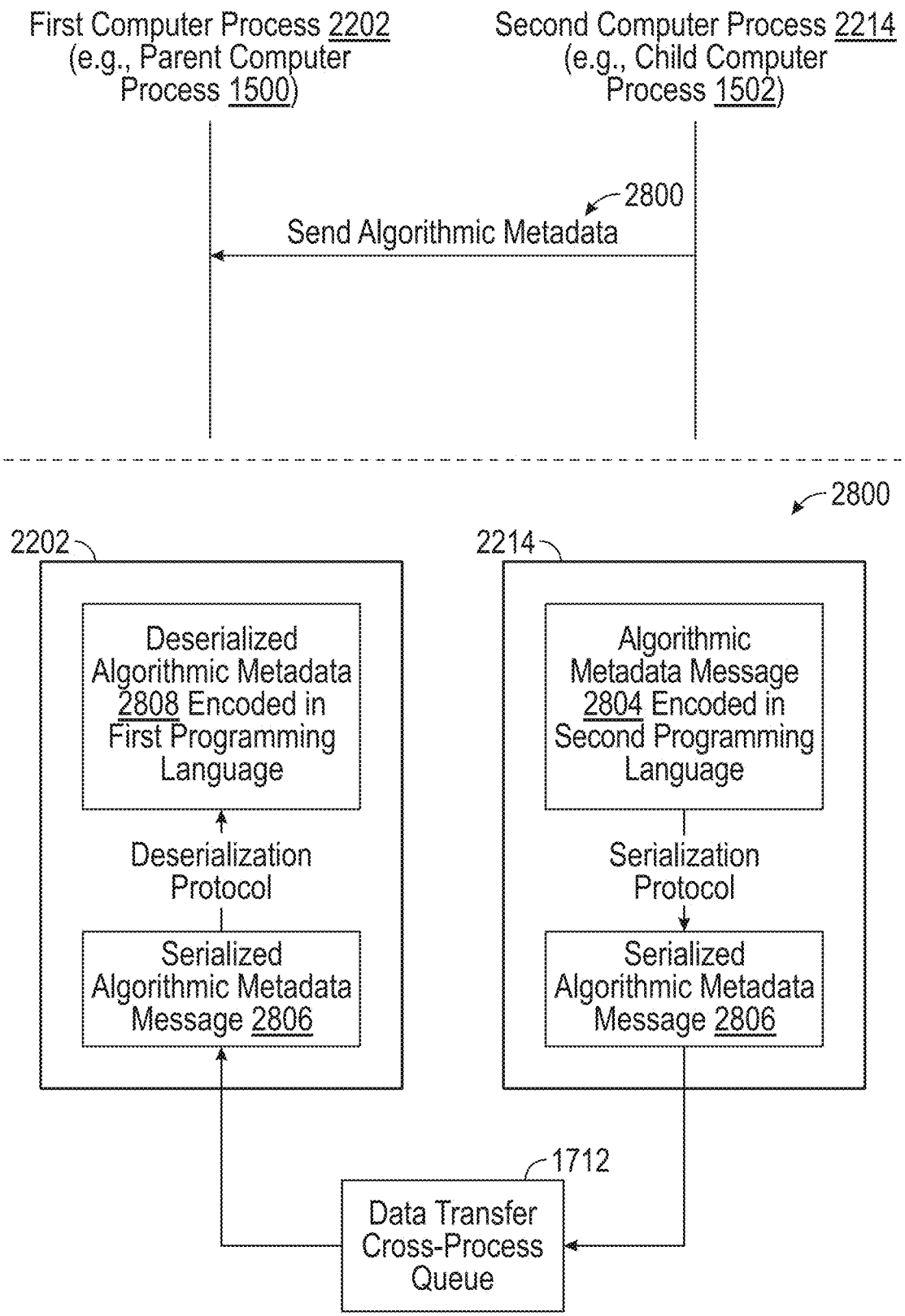
FIG. 28 illustrates an example schematic of transferring algorithmic metadata from a second computer process to a first computer process, according to some embodiments of the present technology.

Turning to FIG. 28, in one or more embodiments, second computer process 2214 may function to collect or obtain algorithmic metadata associated with or related to the execution of algorithm 2218. Algorithmic metadata, as generally referred to herein, may include information describing the execution, configuration, performance, and/or outputs of algorithm 2218. For example, the algorithmic metadata, in one or more embodiments, may include algorithm execution data (e.g., algorithm start and end times, total runtime or processing time, resource consumption (e.g., memory usage, utilization of one or more central processing units (CPU), utilization of one or more graphics processing unit (GPU), etc.), input/output data (e.g., details about input datasets (e.g., size, format, structure), information about analytical result or output artifacts (e.g., type, size, summary, etc.), configuration data (e.g., parameter values used during execution of algorithm 2218 (e.g., learning rates, number of clusters, hyperparameters), algorithmic-specific settings or options, etc.), version of algorithm 2218 used, and/or execution context (e.g., programming language or runtime environment (e.g., Python 3.9, Julia 1.6, etc.), hardware environment (e.g., CPU type, GPU model, RAM availability, etc.).

In one or more embodiments, process 2150 may further function to transfer algorithmic metadata 2800 associated with or related to the execution of algorithm 2218 from second computer process 2214 to first computer process 2202. It shall be recognized that the phrase "transferring algorithmic metadata 2800" may be interchangeably referred to herein as "transferring metadata" or the like.

In one or more embodiments, second computer process 2214 may invoke an algorithm metadata writer API function to transfer algorithmic metadata associated with the execution of algorithm 2218 from second computer process 2214 to first computer process 2202. An algorithm metadata writer API function, as generally referred to herein, may be a programming interface or a routine designed to transfer algorithmic metadata from one computer process to another computer process.

Accordingly, in one or more embodiments, based on or in response to second computer process 2214 obtaining algorithmic metadata associated with the execution of algorithm 2218, second computer process 2214 may invoke the algorithm metadata writer API function to transfer the algorithmic metadata from second computer process 2214 to first computer process 2202. In one or more embodiments, in response to invoking the algorithm metadata writer API function, second computer process 2214 may function to create algorithmic metadata message 2804 that includes the algorithmic metadata associated with the execution of algorithm 2218. Algorithmic metadata message 2804, in one or more embodiments, may be encoded or written in one or more data structures of a programming language compatible with second computer process 2214, such as Python. Stated another way, in one or more embodiments, second computer process 2214 may function to create algorithmic metadata message 2804 using the algorithm metadata writer API function.

In one or more embodiments, based on or in response to creating algorithmic metadata message 2804, the algorithm metadata writer API function may function to serialize algorithmic metadata message 2804 into serialized algorithmic metadata message 2806. Serialized algorithmic metadata message 2806, in one or more embodiments, may include the algorithmic metadata associated with the execution of algorithm 2218 in a binary data format rather than in the one or more data structures of the second programming language (e.g., Python). It shall be recognized that, in one or more embodiments, algorithmic metadata message 2804 may be serialized into serialized algorithmic metadata message 2806 based on executing a serialization protocol of the algorithm metadata writer API function, which may use one or more techniques described in method 3000.

In one or more embodiments, based on or in response to serializing algorithmic metadata message 2804 into serialized algorithmic metadata message 2806, second computer process 2214 may function to write serialized algorithmic metadata message 2806 to data transfer cross-process queue 1712. Stated differently, in one or more embodiments, second computer process 2214 may write serialized algorithmic metadata message 2806 to data transfer cross-process queue 1712 using a data writer of the algorithm metadata writer API function. That is, in one or more embodiments, the algorithm metadata writer API function may write serialized algorithmic metadata message 2806 to data transfer cross-process queue 1712.

Accordingly, in one or more embodiments, first computer process 2202 may detect serialized algorithmic metadata message 2806 within data transfer cross-process queue 1712 and, in turn, invoke an algorithm metadata reader API function in response to detecting serialized algorithmic metadata message 2806 within data transfer cross-process queue 1712. In one or more embodiments, in response to invoking the algorithm metadata reader API function, first computer process 2202 may function to read serialized algorithmic metadata message 2806 from data transfer cross-process queue 1712. It shall be recognized that, in one or more embodiments, first computer process 2202 may function to read serialized algorithmic metadata message 2806 from data transfer cross-process queue 1712 using a data reader of the algorithm metadata reader API function.

In one or more embodiments, reading the serialized algorithmic metadata message 2806 from data transfer cross-process queue 1712 may include reading, using the data reader of the algorithm metadata reader API function, the algorithmic metadata encoded in the binary data format from data transfer cross-process queue 1712, and deserializing, using the data reader of the algorithm metadata reader API function, the algorithmic metadata in the binary data format into deserialized algorithmic metadata 2808 that is encoded in one or more data structures of the first programming language (e.g., C++).

It shall be recognized, in one or more embodiments, deserialized algorithmic metadata 2808 may be saved to a computer database of analytics service 1530 in analogous ways described above.

It shall be further recognized that, in one or more embodiments, serialized algorithmic metadata message 2806 may be deserialized into deserialized algorithmic metadata message 2808 based on executing a deserialization protocol of the algorithm metadata reader API function, which may use one or more techniques described in method 3000.

Figure 29:
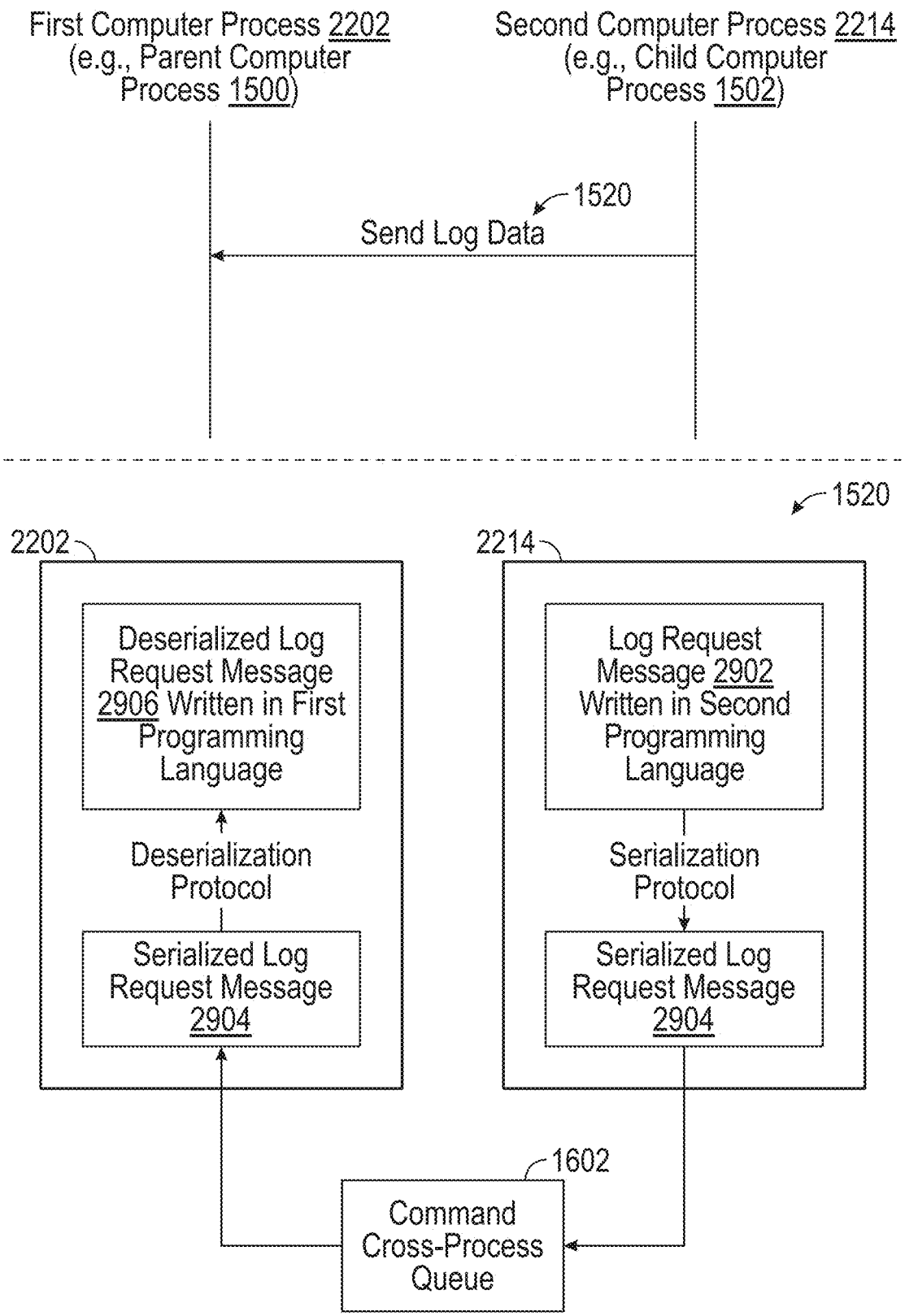
FIG. 29 illustrates an example schematic of transferring log data from a second computer process to a first computer process, according to some embodiments of the present technology.

Turning to FIG. 29, in one or more embodiments, second computer process 2214 may generate one or more log request messages before, during, and/or after the execution of algorithm 2218. In such an embodiment, each respective log request message generated by second computer process 2214 may be transferred to first computer process 2202 via command cross-process queue 1602. It shall be recognized that, in one or more embodiments, second computer process 2214 may function to send or transfer the one or more log request messages from second computer process 2214 to first computer process 2202. It shall be further recognized that the phrase "sending or transferring log request messages" may be interchangeably referred to herein as "sending or transferring log data 1520" or the like.

In one or more embodiments, second computer process 2214 may invoke a log writer API function to create a log request message that specifies a request for logging module 2208 to log a target event that occurred within second computer process 2214. The target event, in one or more embodiments, may occur before, during, or after the execution of algorithm 2218. For instance, in a non-limiting example, second computer process 2214 may function to create, before the execution of algorithm 2218, a log request message that indicates the one or more parameters and the one or more datasets were successfully transferred from first computer process 2202 to second computer process 2214. In another non-limiting example, second computer process 2214 may function to create a log request message that indicates algorithm 2218 may have been commenced. In another non-limiting example, second computer process 2214 may function to create, during the execution of algorithm 2218, one or more log request messages that indicates an execution status of algorithm 2218 (e.g., first iteration completed, second iteration completed, algorithm proceeding to next phase of computation, etc.). In other words, in one or more embodiments, log request messages generated by second computer process 2214 may provide information associated with a status of a respective computation.

In one or more embodiments, second computer process 2214 may detect a subject event, occurring within second computer process 2214, that satisfies logging criteria and, in turn, second computer process 2214 may invoke a log writer API function that creates log request message 2902 that includes event data associated with the subject event. A log request message, as generally referred to herein, may specify a request for first computer process 2202 to log a target event and the corresponding event data that occurred on second computer process 2214 using logging module 2208 (e.g., add the target event to logging module 2208).

In one or more embodiments, based on or in response to creating log request message 2902, the log writer API function may function to serialize log request message 2902 into serialized log request message 2904. Serialized log request message 2904, in one or more embodiments, may include the event data associated with the subject event encoded in a binary data format. It shall be recognized that, in one or more embodiments, log request message 2902 may be serialized into serialized log request message 2904 based on executing a serialization protocol of the log writer API function.

Accordingly, in one or more embodiments, based on the log writer API function serializing log request message 2902 into serialized log request message 2904, second computer process 2214 may write serialized log request message to command cross-process queue 1602. In one or more embodiments, second computer process 2214 may write serialized log request message 2904 to command cross-process queue 1602 using a data writer of the log writer API function.

Accordingly, in one or more embodiments, first computer process 2202 may detect serialized log request message 2904 within command cross-process queue 1602 and, in turn, invoke a log reader API function in response to detecting serialized log request message 2904 within command cross-process queue 1602. In one or more embodiments, in response to invoking the log reader API function, first computer process 2202 may read serialized log request message 2904 from command cross-process queue 1602. It shall be recognized that, in one or more embodiments, first computer process 2202 may read serialized log request message 2904 from command cross-process queue 1602 using the log reader API function.

In one or more embodiments, reading serialized log request message 2904 from command cross-process queue 1602 may include reading, using a data reader of the log reader API function, serialized log request message 2904 from command cross-process queue 1602. Furthermore, in one or more embodiments, serialized log request message 2904 may be deserialized into deserialized log request message 2906. Deserialized log request message 2906, in one or more embodiments, may include a representation of the event data in one or more data structures of the first programming language (e.g., C++). Accordingly, in one or more embodiments, first computer process 2202, using the log reader API function, may read the deserialized event data into memory of first computer process 2202.

It shall be further recognized that, in one or more embodiments, serialized log request message 2904 may be deserialized into deserialized log request message 2906 based on executing a deserialization protocol of the log reader API function, which may use one or more techniques described in method 3000.

Furthermore, in one or more embodiments, first computer process may function to surface the deserialized event data that corresponds to the subject event via logging module 2208. That is, in one or more embodiments, in accordance with the instructions specified by deserialized log request message 2906, the subject event and the associated deserialized event data may be logged within the logging module 2208 for storage, monitoring, or further analysis.

It shall be recognized that, in one or more embodiments, first computer process 2202 may function to surface, using logging module 2208, a set of log messages that includes one or more error events or one or more informational events that occurred within first computer process 2202 and second computer process 2214. The set of log messages, in such an embodiment, may include a first subset of log messages generated by the first computer process and a second subset of log messages generated by the second computer process.

FIG. 30 illustrates one embodiment of a method 3000 for transferring data blocks between multiple computer processes running on a single computer. It shall be appreciated that other embodiments contemplated within the scope of the present disclosure may involve more operations, fewer operations, different operations, or a different order of operations than as shown in FIG. 30.

Transferring Data Blocks

In one or more embodiments, method 3000 may include process 3110. Process 3110, which may include transferring data blocks, may function to transfer a plurality of data blocks between a plurality of computer processes operating within an operating system of a single computer. A single computer, as generally referred to herein, may be a computing device (e.g., a server, a desktop computer, a laptop computer, etc.) that is capable of simultaneously or sequentially running multiple computer processes using one or more hardware components and/or one or more software components of the computing device. It shall be recognized that the phrase "data block" may be interchangeably referred to herein as a "message," or the like.

In one or more embodiments, a system or service implementing method 3000 may transfer the plurality of data blocks from first computer process 2202 to second computer process 2214 using an application programming interface. The application programming interface, in one or more embodiments, may provide a plurality of application programming interface (API) functions that may be invoked to assist with transferring the plurality of data blocks from first computer process 2202 to second computer process 2214. At least one technical benefit of using the application programming interface and the associated application programming interface functions may enable the plurality of data blocks to be transferred from first computer process 2202 to second computer process 2214 even when first computer process 2202 and second computer process 2214 execute instructions in different programming languages.

In one or more embodiments, the application programming interface may include the first set of API functions 2212 and the second set of API functions 2216. In such an embodiment, the first set of API functions 2212 of the application programming interface may be accessible by first computer process 2202, and the second set of API functions 2216 of the application programming interface may be accessible by second computer process 2214. It shall be noted that, in one or more embodiments, the first set of API functions 2212 and the second set of API functions 2216 may operate in a complementary manner to enable computer processes to interpret data blocks (e.g., messages, etc.) exchanged during the execution of an analytical operation, analytical function, or the like.

In one or more embodiments, the transfer of the plurality of data blocks from first computer process 2202 to second computer process 2214 may occur sequentially or simultaneously. For instance, in a non-limiting example, second computer process 2214 may initiate a data transfer process by sending a request for a specific data block (e.g., request for parameters 1510) to first computer process 2202, which may respond by writing the requested data block to a subject cross-process queue. Once second computer process 2214 reads the data block from the subject cross-process queue, second computer process 2214 may send a new request (e.g., request for datasets 1514) for the next data block, continuing such process for each subsequent request and corresponding data block. In another non-limiting example, to simultaneously transfer the plurality of data blocks from first computer process 2202 to second computer process 2214, first computer process 2202 may concurrently execute, via a plurality of producer processes, a plurality of write operations that write the plurality of data blocks to a target cross-process queue, while second computer process 2214 may concurrently execute, via a plurality of consumer processes, a plurality of read operations that read the plurality of data blocks from the target cross-process queue.

In another non-limiting example, a system or service implementing method 3000 may implement a plurality of cross-process queues (e.g., plurality of data transfer cross-process queues) within shared memory 1600 of computer 1604 in response to obtaining the plurality of data blocks to be transferred from first computer process 2202 to second computer process 2214. For instance, in a non-limiting example, first computer process 2202 may use the application programming interface to create and implement the plurality of cross-process queues (e.g., the plurality of data transfer cross-process queues) within shared memory 1600 of computer 1604. It shall be noted that, in such an embodiment, each distinct cross-process queue may be assigned to a respective data block of the plurality of data blocks. Accordingly, in such a non-limiting example, the plurality of data blocks may be simultaneously transferred from first computer process 2202 to second computer process 2214 using the plurality of cross-process queues.

As described above, in one or more embodiments, first computer process 2202 may execute backend instructions of the analytics backend service in a first programming language (e.g., C++), while second computer process 2214 may be configured to execute algorithm 2218, written in a second programming language (e.g., Python), to process data transferred from first computer process 2202. The plurality of data blocks to be transferred from first computer process 2202 to second computer process 2214 may be encoded in one or more data structures of the first programming language. Accordingly, in such an embodiment, since second computer process 2214 may execute algorithm 2218 in a different programming language, the plurality of data blocks may not be in a format compatible with the second programming language and may need to be translated into a compatible format before algorithm 2218 can process the plurality of data blocks.

It shall be further recognized that, in one or more embodiments, process 3110 may perform a series of steps or operations to transfer each respective data block of the plurality of data blocks from first computer process 2202 to second computer process 2214, as described in more detail herein. The series of steps or operations, in one or more embodiments, may include creating a data block, serializing the data block, writing the serialized data block to a cross-process queue, reading the serialized data block from the cross-process queue, and deserializing the serialized data block.

Data Block Creation

Figure 31:
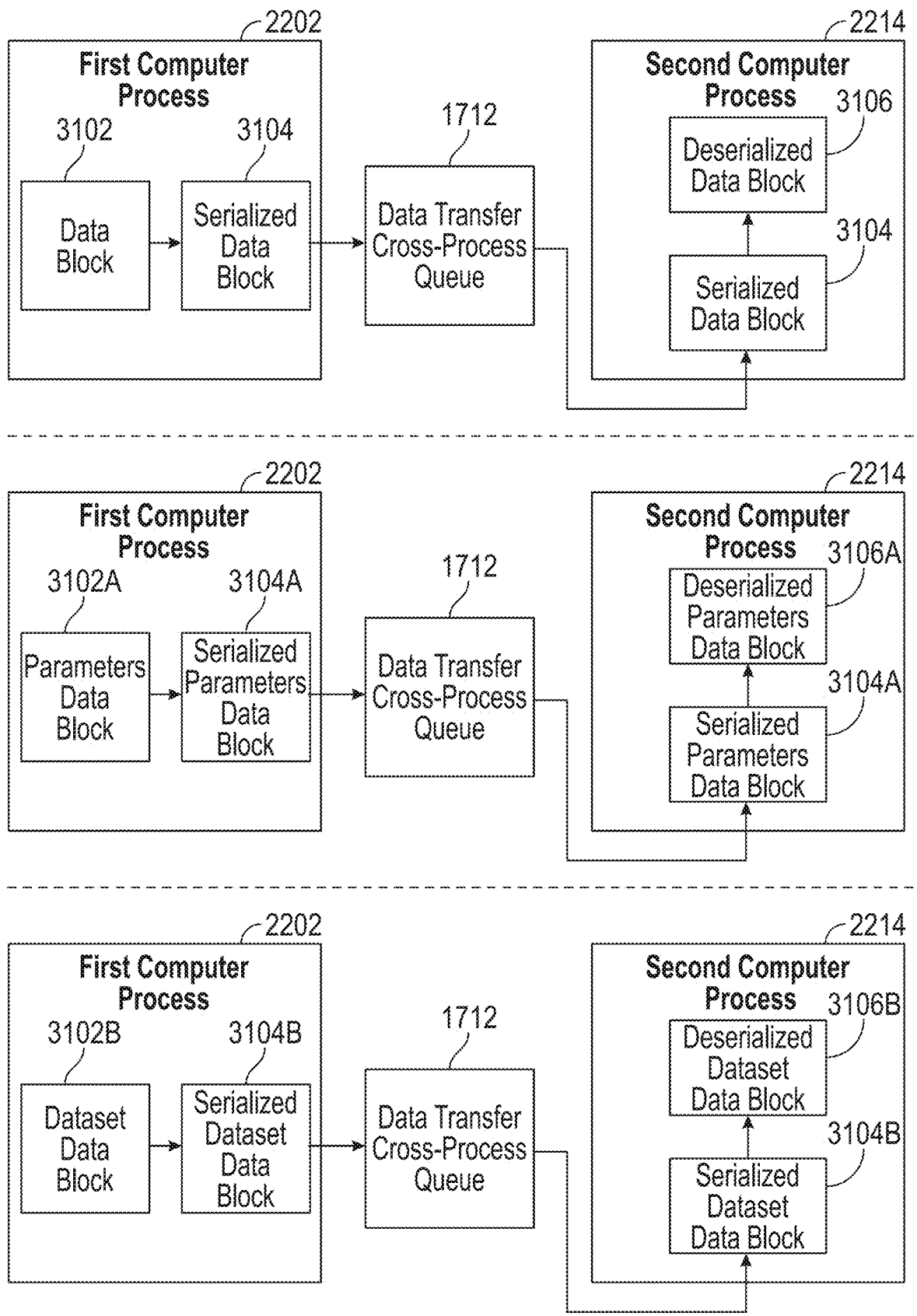
FIG. 31 illustrates an example schematic of using a data transfer cross-process queue to transfer a respective data block from a first computer process to a second computer process, according to some embodiments of the present technology.

Turning to FIG. 31, in one or more embodiments, in response to first computer process 2202 receiving a request to obtain data of a target data category, first computer process 2202 may obtain the data of the target data category from the analytics backend service as requested.

In one or more embodiments, the data of the target data category may be stored within memory of first computer process 2202 and, in turn, first computer process 2202 may invoke one or more API functions of the first set of API functions 2212 to query first computer process 2202 for the data of the target data category. For instance, in a non-limiting example, the request to obtain the data of the target data category may relate to a request to obtain one or more parameters (e.g., requests for parameters 1510) and, in turn, first computer process 2202 may invoke an API function (e.g., parameters response API function) of the first set of API functions 2212 to query first computer process 2202 for the requested parameters (e.g., the parameters may include parameter values entered by an end user and/or provided as default values). In another non-limiting example, the request to obtain the data of the target data category may relate to a request to obtain a dataset (e.g., requests for datasets 1514) and, in turn, first computer process 2202 may invoke an API function (e.g., tabular data-response API function) of the first set of API functions 2212 to query first computer process 2202 for the requested dataset.

Additionally, or alternatively, in one or more embodiments, the data of the target data category may be stored in a database of the analytics backend service and, in turn, first computer process 2202 may query the database of the analytics backend service for the data of the target data category. For instance, in a non-limiting example, the request to obtain the data of the target data category may relate to a request to obtain a dataset (e.g., requests for datasets 1514) and, in turn, first computer process 2202 may query the database of the analytics backend service for the dataset. In another non-limiting example, the request to obtain the data of the target data category may relate to a request to obtain one or more parameters (e.g., requests for parameters 1510) and, in turn, first computer process 2202 may query the database of the analytics backend service for the one or more parameters.

Accordingly, in one or more embodiments, based on or in response to retrieving the data of the target data category from the memory allocated to first computer process 2202 or from the database accessible by first computer process 2202, first computer process 2202 may function to create data block 3102 using the retrieved data, as shown generally by way of example in FIG. 31. In one or more embodiments, creating data block 3102 may include instantiating a data model that corresponds to the target data category and populating the instantiated data model with the retrieved data. In such an embodiment, data block 3102 may be encoded in one or more data structures of the first programming language, as first computer process 2202 executes instructions in the first programming language. It shall be recognized that, in one or more embodiments, the retrieved data may include one or more data matrices, one or more data vectors, or any other type of data without departing from the scope of the disclosure.

It shall be further recognized that, in one or more embodiments, analytics service 1530, in one or more embodiments, may include a plurality of predefined data models (e.g., plurality of predefined message schemas). Each predefined data model of the plurality of predefined data models, in one or more embodiments, may include a plurality of attributes (e.g., data fields or the like) along with the corresponding data type (e.g., integer, string, float, etc.) that defines a data structure for organizing and representing data associated with a respective data category. In other words, the data structure defined by each data model may provide a distinct schema for representing the corresponding data category, where the distinct schema specifies not only the attributes but also the associated data type (e.g., integer, string, float, etc.) for each respective attribute.

For instance, in one or more embodiments, the plurality of predefined data models may include a predefined data model for parameters (e.g., configurations). The predefined data model for parameters, in one or more embodiments, may specify a schema that includes a plurality of parameter-related attributes (e.g., parameter-related data fields), with each parameter-related attribute being associated with a corresponding data type (e.g., integer, string, float, etc.) that specifies the data format or data type required by the respective attribute. For instance, in a non-limiting example, a first parameter-related attribute of the plurality of parameter-related attributes may specify that the respective attribute requires data (e.g., an attribute value or the like) in a string format, while a second parameter-related attribute may specify that the respective attribute requires data (e.g., an attribute value) in an integer format.

Additionally, or alternatively, in one or more embodiments, the plurality of predefined data models may include a predefined data model for datasets. The predefined data model for datasets, in one or more embodiments, may specify a schema that includes a plurality of dataset-related attributes (e.g., dataset-related data fields), with each dataset-related attribute being associated with a corresponding data type (e.g., integer, string, float, etc.) that specifies the data format or data type required by the respective attribute. For instance, in a non-limiting example, a first dataset-related attribute of the plurality of dataset-related attributes may specify that the respective attribute requires data (e.g., an attribute value or the like) in a string format, while a second dataset-related attribute may specify that the respective attribute requires data (e.g., an attribute value) in an integer format.

In one or more embodiments, in response to first computer process 2202 receiving request for parameters 1510, first computer process 2202 may create parameters data block 3102A (e.g., parameters response message or the like). For instance, in a non-limiting example, based on first computer process 2202 receiving request for parameters 1510, first computer process 2202 may invoke the parameters response API function to create parameters data block 3102A. In such a non-limiting example, in response to invoking the parameters response API function, the parameters response API function may create parameters data block 3102A by retrieving parameter data associated with the request for parameters 1510, instantiating an instance of the predefined data model for parameters, and attributing a corresponding attribute value to each parameter-related attribute of the instantiated data model based on the retrieved parameter data (e.g., a first parameter-related attribute of the instantiated data model may be assigned one or more pieces of data included in the retrieved data, a second parameter-related attribute of the instantiated data model may be assigned one or more pieces of data included in the retrieved data, etc.).

In one or more embodiments, in response to first computer process 2202 receiving request for datasets 1514, first computer process 2202 may create dataset data block 3102B (e.g., dataset response message or the like). For instance, in a non-limiting example, based on first computer process 2202 receiving the request for datasets 1514, first computer process 2202 may invoke the tabular data-response API function to create dataset data block 3102B. In such a non-limiting example, in response to invoking the tabular data-response API function, the tabular data-response API function may create dataset data block 3102B by retrieving a dataset associated with the request for datasets 1514, instantiating an instance of the predefined data model for datasets, and attributing a corresponding attribute value to each dataset-related attribute of the instantiated data model based on the retrieved dataset (e.g., a column names attribute of the instantiated data model may be assigned the column names from the dataset, a column data types attribute of the instantiated data model may be assigned the data types of the dataset's columns, a data values attribute of the instantiated data model may be assigned the actual data values from the dataset, and an index attribute of the instantiated data model may be assigned the row labels or indices of the dataset, etc.).

Data Block Serialization

In one or more embodiments, method 3000 may include process 3110A. Process 3110A, which may include serializing data blocks, may function to serialize each respective data block of the plurality of data blocks to be transferred from first computer process 2202 to second computer process 2214. At least one technical benefit of serializing a respective data block into a corresponding serialized data block may enable any computer process in receipt of the corresponding serialized data block to interpret and deserialize the data within the corresponding serialized data block, regardless of the programming language used by the respective computer process.

In one or more embodiments, based on or in response to creating data block 3102, first computer process 2202 may serialize data block 3102, encoded in the first programming language (e.g., C++), into serialized data block 3104, which may be encoded in a programming language-agnostic data format. For instance, in a non-limiting example, process 3110A may serialize, using the application programming interface, data block 3102 into serialized data block 3104 based on a serialization protocol executed by the application programming interface. The serialization protocol, in one or more embodiments, may include a set of instructions, method, or rules for converting or translating a subject data block encoded in one or more data structures of a target programming language (e.g., C++, Python, etc.) into a corresponding serialized data block encoded in a programming language-agnostic data format, such as a binary-based data format.

Accordingly, in one or more embodiments, serializing data block 3102 into serialized data block 3104 may include translating each attribute of the plurality of attributes included in data block 3102 into a corresponding binary-based representation, translating each attribute value attributed to each attribute of the plurality of attributes included in data block 3102 into a corresponding binary-based representation, and translating the data type that corresponds to each attribute of the plurality of attributes included in data block 3102 into a corresponding binary-based representation. Stated another way, in one or more embodiments, serialized data block 3104 may include a binary-based representation of each attribute of the plurality of attributes included in data block 3102, a binary-based representation of the attribute value attributed to each attribute of the plurality of attributes included in data block 3102, and a binary-based representation of a data type that corresponds to each attribute of the plurality of attributes included in data block 3102.

For instance, in a non-limiting example, based on creating parameters data block 3102A, the parameters response API function may function to serialize parameters data block 3102A into serialized parameters data block 3104A (e.g., serialized parameters response message 2404). Serialized parameters data block 3104A, in one or more embodiments, may represent parameters data block 3102A as a sequence of bytes. It shall be recognized that, in one or more embodiments, the parameters response API function may function to serialize parameters data block 3102A into serialized parameters data block 3104A by executing a serialization protocol of the parameters response API function.

In another non-limiting example, based on creating dataset data block 3102B, the tabular data-response API function may function to serialize dataset data block 3102B into serialized dataset data block 3104B (e.g., serialized dataset response message 2604). Serialized dataset data block 3104B, in one or more embodiments, may represent dataset data block 3102B as a sequence of bytes. It shall be recognized that, in one or more embodiments, the tabular data-response API function may function to serialize dataset data block 3102B into serialized dataset data block 3104B by executing a serialization protocol of the tabular data-response API function.

Stated another way, in one or more embodiments, at least a subset of the first set of API functions 2212 may be invoked by first computer process 2202 to create a respective data block and serialize the respective data block.

Figure 32:
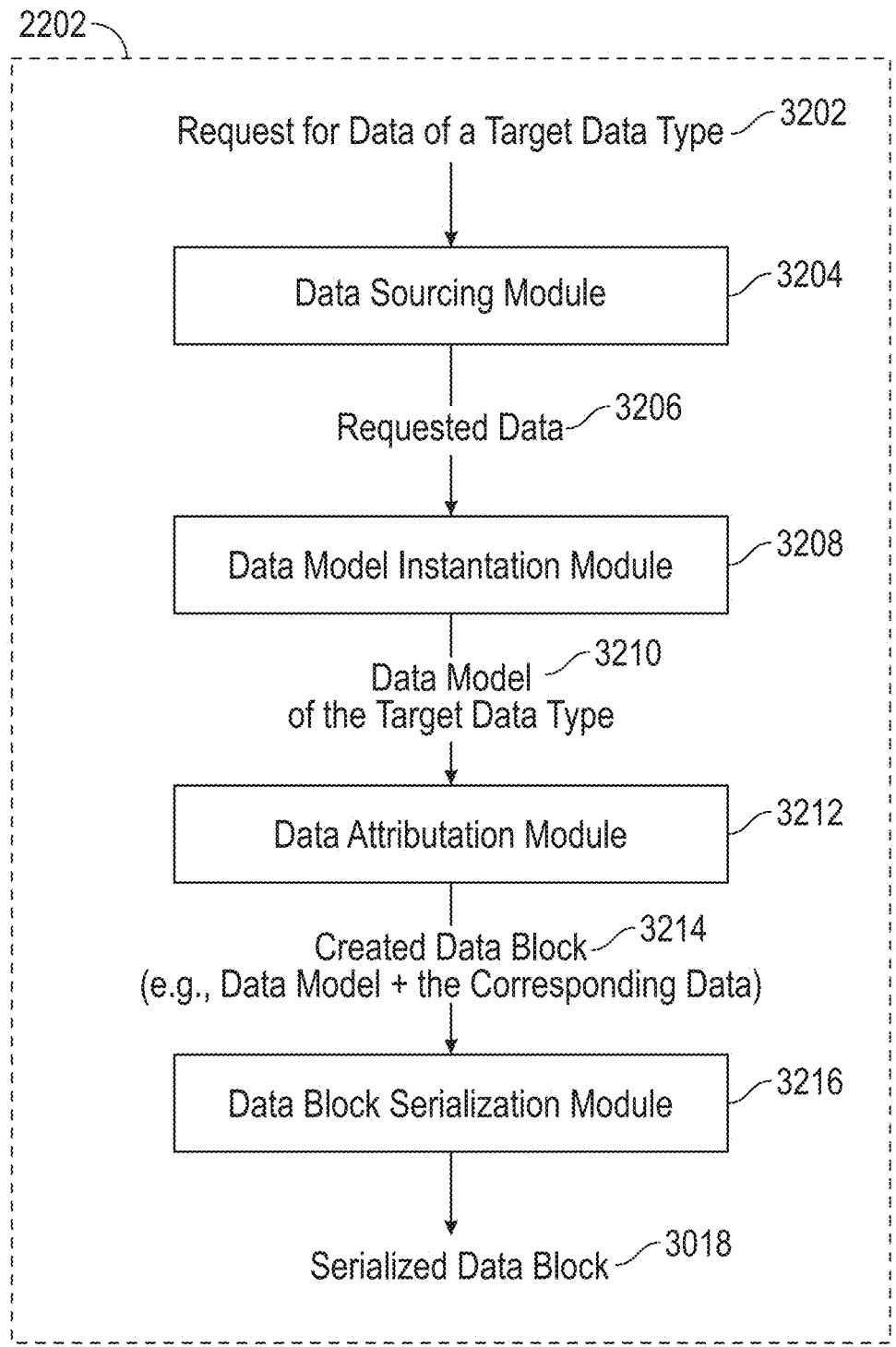
FIG. 32 illustrates an example schematic of serializing a respective data block, according to some embodiments of the present technology.

Turning to FIG. 32, in one or more embodiments, in response to first computer process 2202 receiving a request for data of a target data type 3202, first computer process 2202 may use data sourcing module 3204 to obtain the requested data 3206. Additionally, in such an embodiment, based on first computer process 2202 obtaining the requested data 3206 from data sourcing module 3204, first computer process may function to instantiate, using data model instantiation module 3208, an instance of a data model of the target data type 3210 encoded in the first programming language, as first computer process 2202 executes instructions in the first programming language.

Furthermore, in one or more embodiments, based on instantiating the instance of the data model of the target data type 3210 encoded in the first programming language, first computer process 2202 may use data attribution module 3212 to output created data block 3214. In such an embodiment, data attribution module 3212 may have created data block 3214 by populating the instantiated data model with the obtained data (e.g., requested data 3206). Accordingly, in one or more embodiments, first computer process 2202 may use data block serialization module 3216 to serialize created data block 3214 into a corresponding serialized data block 3018.

Data Block Writing

In one or more embodiments, method 3000 may include process 3110B. Process 3110B, which may include data block writing, may function to write a subject serialized data block to a cross-process queue in response to serializing the subject data block.

In one or more embodiments, based on creating serialized data block 3104, first computer process 2202 may write serialized data block 3104 to data transfer cross-process queue 1712. In such an embodiment, before first computer process 2202 writes serialized data block 3104 to data transfer cross-process queue 1712, process 3310B may use channel synchronization data structure 1710 to regulate or govern when first computer process 2202 has access to one or more of the plurality of shared memory channels. For instance, in a non-limiting example, when the count of shared memory channels of the plurality of shared memory channels is greater than zero, the channel synchronization data structure 1710 may allow an acquisition of a given shared memory channel of the plurality of shared memory channels by first computer process 2202.

In one or more embodiments, when the count of shared memory channels of the plurality of shared memory channels is greater than zero, an index value (or memory address) of a shared memory channel that is available for writing may be assigned to first computer process 2202. It shall be recognized that, in one or more embodiments, the index value (or memory address) of the shared memory channel assigned to first computer process 2202 may be the index value of the given shared memory channel that is at the head of the queue of shared memory channels tracked by first free channel index 1702. Accordingly, in such an embodiment, first computer process 2202 may write serialized data block 3104 to the shared memory channel of the plurality of shared memory channels that corresponds to the index value (or memory address).

It shall be recognized that, in one or more embodiments, during the commencement or after first computer process 2202 is commenced, first computer process 2202 may implement command cross-process queue 1602 and data transfer cross-process queue 1712 within shared memory 1600 of computer 1604. The command cross-process queue 1602, in such an embodiment, may be assigned a unique cross-process queue identifier that includes the process identifier of first computer process 2202. The data transfer cross-process queue 1712, in one or more embodiments, may be assigned a unique cross-process queue identifier that includes the process identifier of first computer process 2202. For instance, in a non-limiting example, cross-process queue 1602 and data transfer cross-process queue 1712 may be assigned unique identifiers such as "command_queue_12345" and "data_transfer_ queue_12345", respectively, where "12345" represents the process identifier of first computer process 2202. Accordingly, in such an embodiment, when first computer process 2202 writes serialized data block 3104 to data transfer cross-process queue 1712, first computer process 2202 may write serialized data block 3104 to the data transfer cross-process queue having the cross-process queue identifier that includes the process identifier of first computer process 2202 (e.g., data_transfer_queue_12345).

For instance, in a non-limiting example, based on creating serialized parameters data block 3104A, first computer process 2202 may write serialized parameters data block 3104A to data transfer cross-process queue 1712.

In another non-limiting example, based on creating serialized dataset data block 3104B, first computer process 2202 may write serialized dataset data block 3104B to data transfer cross-process queue 1712.

Data Block Reading

In one or more embodiments, method 3000 may include process 3110C. Process 3110C, which may include data block reading, may function to read a subject serialized data block from a respective cross-process queue in response to first computer process 2202 writing the subject serialized data block to the cross-process queue. For instance, in a non-limiting example, process 3110C may monitor data transfer cross-process queue 1712 for serialized data blocks and, upon detecting the availability of a serialized data block, process 3110C may invoke one or more API functions of the second set of API functions 2216 to retrieve the serialized data block from data transfer cross-process queue 1712.

In one or more embodiments, in response to first computer process 2202 writing serialized data block 3104 to data transfer cross-process queue 1712, second computer process 2214 may function to read the serialized data block 3104 from data transfer cross-process queue 1712. Accordingly, in such an embodiment, second computer process 2214 may read the serialized data block 3104 into memory of second computer process 2214. It shall be recognized that, in one or more embodiments, second computer process 2214 may invoke one or more API functions of the second set of API functions 2216 to read serialized data block 3104 into memory of second computer process 2214.

For instance, in a non-limiting example, in response to first computer process 2202 writing serialized parameters data block 3104A to data transfer cross-process queue 1712, second computer process 2214 may read serialized parameters data block 3104A from data transfer cross-process queue 1712. It shall be recognized that, in one or more embodiments, when first computer process 2202 starts second computer process 2214, first computer process 2202 may send the process ID (PID) of first computer process 2202 (e.g., "12345") to second computer process 2214 during the startup sequence. Accordingly, in such a non-limiting example, second computer process 2214 may be configured to monitor data transfer cross-process queue 1712 for serialized data blocks, as data transfer cross-process queue 1712 has the cross-process queue identifier that includes the process ID of first computer process 2202 (e.g., data_transfer_queue_12345).

In one or more embodiments, when second computer process 2214 detects serialized parameters data block 3104A within data transfer cross-process queue 1712, second computer process 2214 may invoke an API function (e.g., the parameters response handler API function) of the second set of API functions 2216 to read serialized parameters data block 3104A into memory of second computer process 2214.

In another non-limiting example, based on first computer process 2202 writing serialized dataset data block 3104B to data transfer cross-process queue 1712, second computer process 2214 may read the serialized dataset data block 3104B from data transfer cross-process queue 1712. As previously mentioned, in one or more embodiments, when first computer process 2202 launches second computer process 2214, first computer process 2202 may send the process ID (PID) of first computer process 2202 (e.g., "12345") to second computer process 2214 as part of the initialization process. Accordingly, in such a non-limiting example, second computer process 2214 may be configured to monitor data transfer cross-process queue 1712 for serialized data blocks, as data transfer cross-process queue 1712 has a cross-process queue identifier that includes the process ID of first computer process 2202 (e.g., data_transfer_ queue_12345).

In one or more embodiments, when second computer process 2214 detects serialized dataset data block 3104B within data transfer cross-process queue 1712, second computer process may function to invoke an API function (e.g., the dataset response handler API function) of the second set of API functions 2216 to read serialized dataset data block 3104B into memory of second computer process 2214.

In another non-limiting example, when second computer process 2214 detects serialized dataset data block 3104B in data transfer cross-process queue 1712, second computer process 2214 may read serialized dataset data block 3104B into memory of second computer process 2214. Accordingly, in such a non-limiting example, second computer process 2214 may function to invoke an API function of the second set of API functions 2216 to deserialize the serialized dataset data block 3104B, as described in more detail herein.

Data Block Deserialization

In one or more embodiments, method 3000 may include process 3110D. Process 3110D, which may include deserializing data blocks, may function to deserialize a subject serialized data block into a data format or data structure compatible with a target computer process. A deserialized data block, as generally referred to herein, may be a representation of the subject serialized data block in one or more data structures of the programming language in which the target computer process executes instructions. It shall be recognized that the phrase "deserialized data block" may be interchangeably referred to herein as "deserialized data," a "translated data block," or the like.

At least one technical benefit of deserializing a subject serialized data block into a corresponding deserialized data block may enable a computer process that reads or receives the serialized data block to interpret and utilize the data in a format compatible with the programming language in which the computer process executes instructions, regardless of the programming language in which the original data block was created.

In one or more embodiments, based on second computer process 2214 reading serialized data block 3104 from data transfer cross-process queue 1712, second computer process 2214 may deserialize serialized data block 3104 into deserialized data block 3106. Deserialized data block 3106, in one or more embodiments, may be a translated representation of serialized data block 3104, transformed into one or more data structures of the second programming language (e.g., Python). For instance, in a non-limiting example, process 3110D may deserialize, using the application programming interface, serialized data block 3104 into deserialized data block 3106 based on a deserialization protocol executed by the application programming interface. The deserialization protocol, in one or more embodiments, may include a set of instructions, method, or rules for converting or translating a target serialized data block into a corresponding deserialized data block that is in one or more representations of the second programming language.

For example, as described above, in one or more embodiments, based on first computer process 2202 receiving the request for data of the target data category, data block 3102 may have been created by instantiating the instance of the predefined data model that corresponds to the target data category and populating the instance of the predefined data model with the requested data. The instance of the predefined data model of the target data category, in such an embodiment, may be encoded in the first programming language. Subsequently, in such an embodiment, data block 3102, encoded in the first programming language (e.g., C++), may be serialized into serialized data block 3104 using a serialization protocol and, in turn, serialized data block 3104 may be written to data transfer cross-process queue 1712.

Accordingly, in such an embodiment, second computer process 2214 may read serialized data block 3104 from data transfer cross-process queue 1712 and deserialize serialized data block 3104 into deserialized data block 3106 using the application programming interface. Deserializing serialized data block 3104, in one or more embodiments, may involve translating serialized data block 3104 encoded in the binary-based data format to a corresponding data structure encoded in the second programming language (e.g., Python).

For instance, in a non-limiting example, second computer process 2214, using the application programming interface, may instantiate an instance of the predefined data model that corresponds to the target data category in the second programming language and populate the instance of the predefined data model that corresponds to the target data category in the second programming language with attribute values extracted from serialized data block 3104. In other words, the predefined data model instantiated in the second programming language may be the same or a substantially similar predefined data model as that used by first computer process 2202, but encoded and structured in a manner compatible with the second programming language (e.g., Python).

Stated another way, in one or more embodiments, deserializing serialized data block 3104 into deserialized data block 3106 may include translating serialized data block 3104, encoded in the binary-based data format, to the second programming language (e.g., Python). Translating serialized data block 3104 encoded in the binary-based data format to the second programming language, in such an embodiment, may include constructing an instance of the predefined data model that corresponds to the target data category in the second programming language and attributing a set of attribute values extracted from serialized data block 3104 to the instance of the data model in the second programming language. Each attribute value of the set of attribute values extracted from serialized data block 3104 may be converted to a corresponding representation compatible with the second programming language (e.g., a binary-encoded string value in serialized data block 3104 may be converted to a string object in Python, a binary-encoded integer value in serialized data block 3104 may be converted to an integer object in Python, and similarly, other data types may be mapped to their corresponding representations in the second programming language). Accordingly, in such an embodiment, each converted attribute value may then be attributed to a corresponding component or portion of the instance of the predefined data model that corresponds to the target data category in the second programming language.

For instance, in a non-limiting example, after reading serialized parameters data block 3104A from data transfer cross-process queue 1712, second computer process 2214 may deserialize serialized parameters data block 3104A into deserialized parameters data block 3106A using the parameters response handler API function. In such a non-limiting example, the parameters response handler API function may execute a parameters deserialization protocol that translates serialized parameters data block 3104A into a corresponding data block (e.g., deserialized parameters data block 3106A, deserialized parameters response message 2406) encoded in the second programming language. The parameters deserialization protocol, in one or more embodiments, may include a set of instructions, methods, or rules for converting or translating a serialized parameters data block, such as serialized parameters data block 3104A, into a corresponding deserialized parameters data block (e.g., deserialized parameters data block 3106A) that is in one or more representations of the second programming language.

In such a non-limiting example, the parameters deserialization protocol of the parameters response handler API function may create deserialized parameters data block 3106A by instantiating the predefined data model for parameters in the second programming language, extracting binary-encoded parameter-related attribute values from serialized parameters data block 3104A, converting the extracted parameter-related attribute values into their equivalent representations in the second programming language, and assigning the converted parameter-related attribute values to corresponding parameter-related attributes of the instantiated predefined data model for parameters in the second programming language.

In another non-limiting example, after reading serialized dataset data block 3104B from data transfer cross-process queue 1712, second computer process 2214 may deserialize serialized dataset data block 3104B into deserialized dataset data block 3106B using the dataset response handler API function. In such a non-limiting example, the dataset response handler API function may execute a dataset deserialization protocol that translates serialized dataset data block 3104B into a corresponding data block (e.g., deserialized dataset data block 3106B) encoded in the second programming language. The dataset deserialization protocol, in one or more embodiments, may include a set of instructions, methods, or rules for converting or translating a serialized dataset data block, such as serialized dataset data block 3104B, into a corresponding deserialized dataset data block (e.g., deserialized dataset data block 3106B, deserialized dataset response message 2606) that is in one or more representations of the second programming language.

In such a non-limiting example, the dataset deserialization protocol of the dataset response handler API function may create deserialized dataset data block 3106B by instantiating the predefined data model for datasets in the second programming language, extracting binary-encoded dataset-related attribute values from serialized dataset data block 3104B, converting the extracted dataset-related attribute values into their equivalent representations in the second programming language, and assigning the converted dataset-related attribute values to corresponding dataset-related attributes of the instantiated predefined data model for datasets in the second programming language.

Stated another way, in one or more embodiments, at least a subset of the second set of API functions 2216 may be invoked by second computer process 2214 to read a respective data block from a subject cross-process queue (e.g., data transfer cross-process queue 1712, etc.) and deserialize the respective data block.

Figure 33:
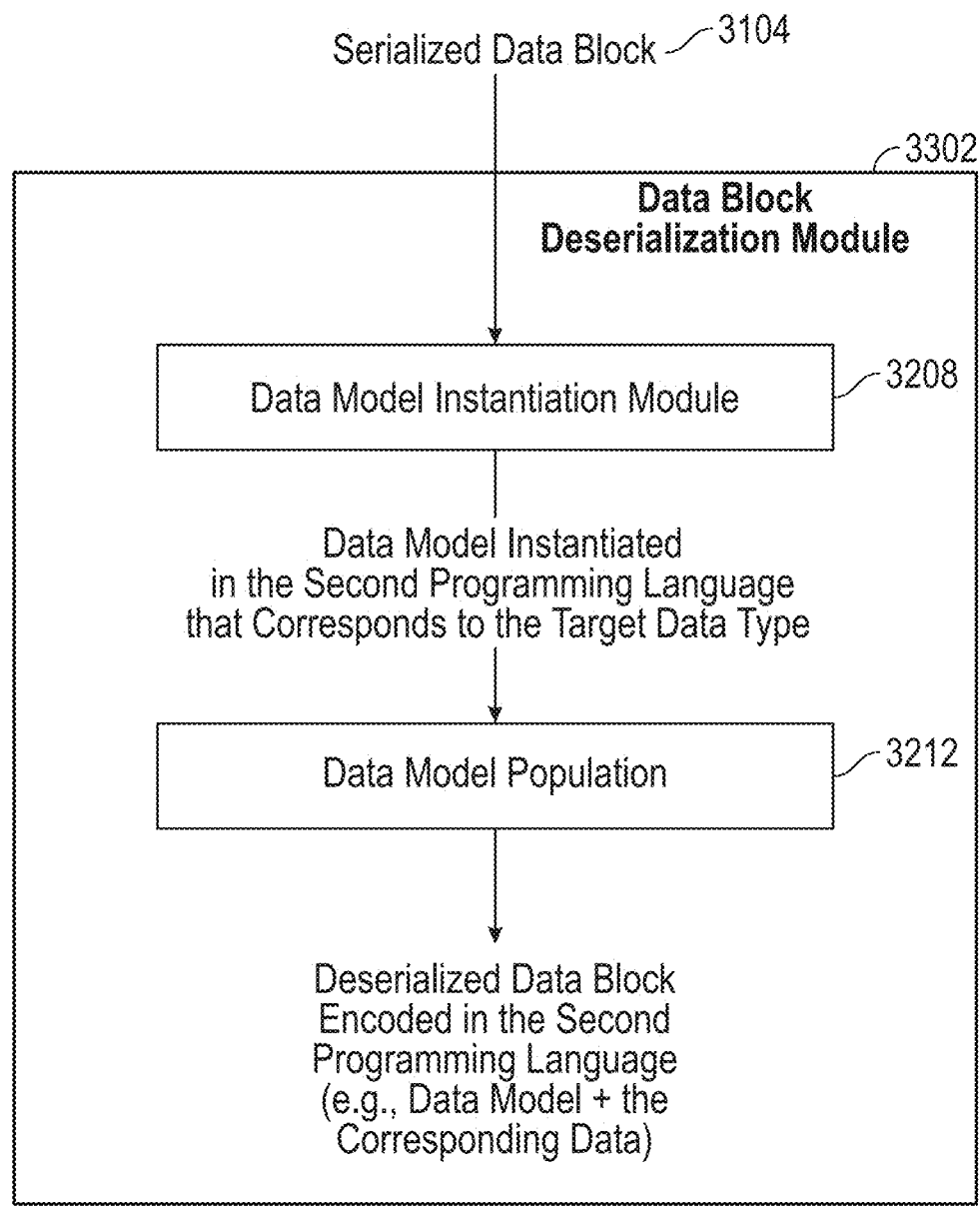
FIG. 33 illustrates an example schematic of deserializing a respective data block, according to some embodiments of the present technology.

Turning to FIG. 33, in one or more embodiments, deserializing a serialized data block (e.g., serialized data block 3104, serialized parameters data block 3104A, serialized dataset data block 3104B, etc.) into a deserialized data block (e.g., deserialized data block 3106, deserialized parameters data block 3106A, deserialized dataset data block 3106B, etc.) may involve multiple operations performed by second computer process 2214. In one or more embodiments, after second computer process 2214 reads the serialized data block into memory, second computer process 2214 may use data block deserialization module 3302 to perform a deserialization process. Accordingly, in one or more embodiments, the deserialization process may include instantiating a data model in the second programming language that corresponds to the target data type associated with the serialized data block using the data model instantiation module 3208. The instantiated data model, in such an embodiment, may then be populated with attributes values extracted from the serialized data block using the data model population module 3212, resulting in the deserialized data block.

Algorithm Execution

In one or more embodiments, method 3000 may include process 3120. Process 3120, which may include executing an algorithm, may function to execute, by second computer process 2214, algorithm 2218 based on providing deserialized data to algorithm 2218. In one or more embodiments, based on providing the deserialized data to algorithm 2218, algorithm 2218 may process the deserialized data to perform a computational task and, in turn, compute a computational result.

In one or more embodiments, in response to second computer process 2214 deserializing serialized data block 3104 into deserialized data block 3106, second computer process 2214 may execute algorithm 2218 based on providing at least a portion of deserialized data block 3106 to algorithm 2218 for data processing.

In another non-limiting example, second computer process 2214 may execute algorithm 2218 by providing one or more deserialized parameters included in deserialized parameters data block 3106A and one or more deserialized datasets included in deserialized dataset data block 3106B to algorithm 2218. The deserialized parameters may include algorithm configurations, operational thresholds, or processing instructions that control how algorithm 2218 operates. The deserialized dataset, in one or more embodiments, may serve as data input for algorithm 2218 and may include structured data such as tabular records, time-series data, or any other suitable type of data. Accordingly, in such a non-limiting example, algorithm 2218 may apply the specified configurations and thresholds from the deserialized parameters to control or guide a processing of the one or more deserialized datasets to produce one or more computational artifacts.

It shall be recognized that, in one or more embodiments, the system or service implementing method 3000 may transfer, using the application programming interface, a plurality of data blocks (e.g., second plurality of data blocks) from second computer process 2214 to first computer process 2202. For instance, in a non-limiting example, transferring a respective data block may include serializing, using the application programming interface, the respective data block into a programming language-agnostic format using a serialization protocol executed by the application programming interface. In such a non-limiting example, second computer process 2214 may write the serialized data block to command cross-process queue 1602 in response to serializing the respective data block. It shall be noted that, in one or more embodiments, second computer process 2214 may serialize the respective data block into the programming language-agnostic format by invoking an API function of the second set of API functions 2216 that executes the serialization protocol.

Accordingly, in one or more embodiments, first computer process 2202 may read the serialized data block from command cross-process queue 1602. In such an embodiment, first computer process 2202 may use the application programming interface (e.g., invoke an API function of the first set of API functions 2212) to deserialize the serialized data block retrieved from command cross-process queue 1602 into a data format or representation compatible with the first programming language (e.g., C++).

Figure 34:
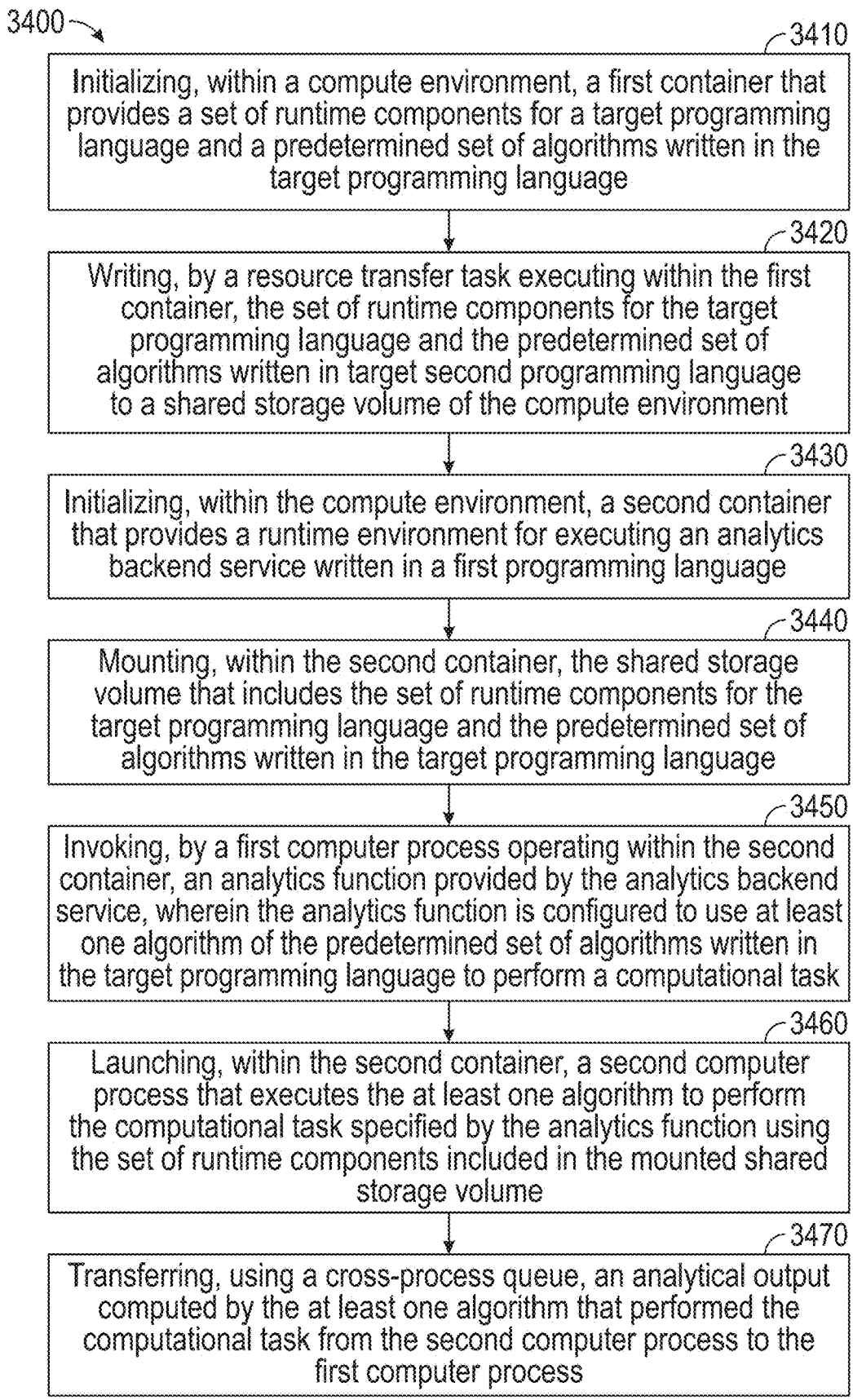
FIG. 34 illustrates a flow chart showing an example process of initializing a plurality of containers to execute a computational task, according to some embodiments of the present technology.

FIG. 34 illustrates one embodiment of a method 3400 for executing analytical functions in a compute environment using containers. It shall be appreciated that other embodiments contemplated within the scope of the present disclosure may involve more operations, fewer operations, different operations, or a different order of operations than as shown in FIG. 34.

Initializing a First Container

In one or more embodiments, method 3400 may include process 3410. Process 3410, which may include initializing a first container within a compute environment, may function to initialize a first container that may provide a set of runtime components for a target programming language and a predetermined set of algorithms written in the target programming language to a shared storage volume of the compute environment. It shall be recognized that the phrase "first container" may be interchangeably referred to herein as "container "A"," an "initialization container," an "init container," or the like.

In one or more embodiments, a system or service implementing method 3400 may use a container orchestration service (e.g., Kubernetes® or the like) to deploy pod 3504 within compute environment 3502. A pod (e.g., Kubernetes® pod or the like), as generally referred to herein, may include one or more containers that may share the same network namespace, networking resources, storage volume, and runtime dependencies. It shall be noted that, in one or more embodiments, each container within a subject pod may operate as an isolated runtime unit, capable of running specific computer processes, applications, services, or tasks.

Figure 35:
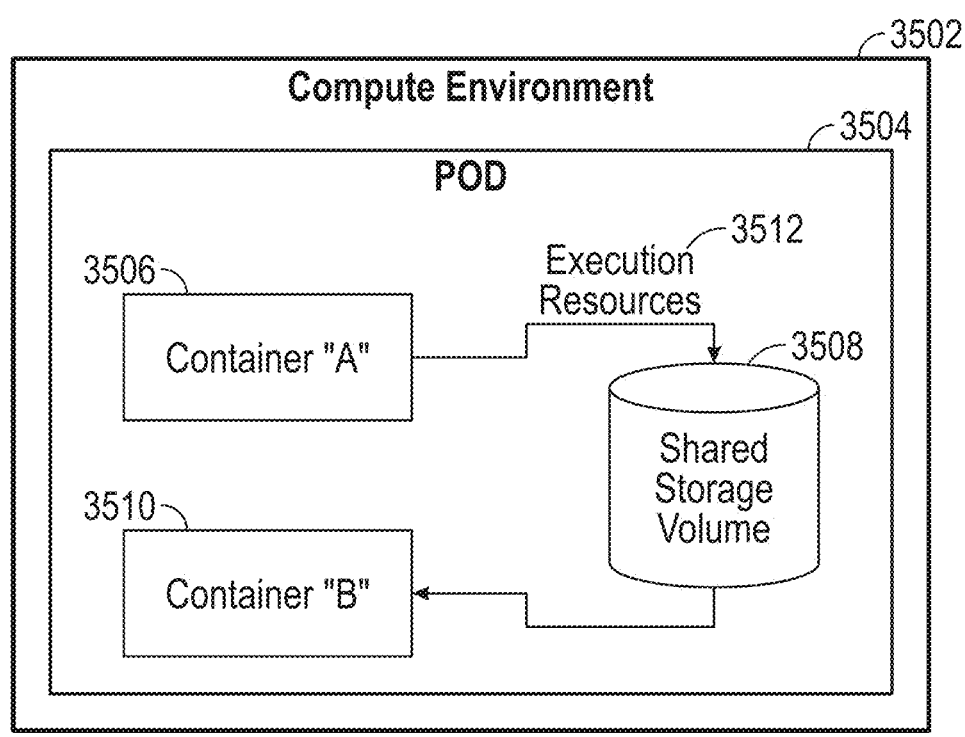
FIG. 35 illustrates an example schematic of providing execution resources to a target container, according to some embodiments of the present technology.

Turning to FIG. 35, in one or more embodiments, pod 3504 may be deployed within compute environment 3502 based on executing a pod configuration file. A pod configuration file, as generally referred to herein, may specify a set of deployment specifications or deployment parameters for deploying a respective pod, including, but not limited to, compute resource allocations (e.g., amount of CPU, amount of memory, etc.), a set of container images, one or more shared storage volumes to be mounted, and network configurations required for the respective pod to function within compute environment 3502. The pod configuration file, in one or more embodiments, may further include a container initialization sequence that may specify an order in which the set of containers are initialized, created, or deployed within the respective pod.

For instance, in a non-limiting example, the pod configuration file may include an instruction to initialize container "A" 3506 based on a first container image. A container image, as generally referred to herein, may be a predefined file that may be used to create an instance of a target container within compute environment 3502. The first container image, in one or more embodiments, may include a predetermined set of algorithms written in a target programming language and a set of runtime components for the target programming language.

The predetermined set of algorithms, in one or more embodiments, may include a plurality of algorithms that are encoded for use by the plurality of analytical functions provided by analytics service 1530. That is, in such an embodiment, the predetermined set of algorithms may include each distinct algorithm (e.g., analytical application or the like) configured to be executed or used by each analytical function of the plurality of analytical functions provided by analytics service 1530. For instance, in a non-limiting example, analytics service 1530 may provide a first analytical function that is encoded or configured to use a first algorithm written in the target programming language to perform a first computational task, a second analytical function that is encoded or configured to use a second algorithm written in the target programming language to perform a second computational task, a third analytical function that is encoded or configured to use a third algorithm written in the target programming language to perform a third computational task. Accordingly, in such a non-limiting example, the first container image may include the first algorithm associated with the first analytical function, the second algorithm associated with the second analytical function, and the third algorithm associated with the third analytical function. It shall be noted that, in one or more embodiments, the first container image may include more algorithms, fewer algorithms, or a different set of algorithms without departing from the scope of the disclosure.

The set of runtime components for the target programming language, in one or more embodiments, may be operably configured to provide the runtime environment required for executing code (e.g., computer instructions) written in the target programming language. The set of runtime components, in one or more embodiments, may include a code interpreter (e.g., Python interpreter) that may read and execute code written in the target programming language, one or more software libraries (e.g., PyTorch, NumPy, Pandas, etc.) implemented by the plurality of algorithms to perform their respective computational tasks, and any other suitable software packages (e.g., python packages), executables (e.g. python executables), or the like that may be needed to support the execution of the plurality of algorithms of the predetermined set of algorithms. For instance, with continued reference to the above non-limiting example, the target programming language may be Python, and the first container image may further include a Python interpreter, a repository of software libraries (e.g., open-source software libraries, third-party software libraries, etc.) written in Python that may be used by one or more algorithms of the plurality of algorithms to perform at least a portion of their respective computational task.

In one or more embodiments, in response to deploying pod 3504 within compute environment 3502, pod 3504 may be started (e.g., commenced). Pod 3504, in such an embodiment, may initialize container "A" 3506 by starting or creating a container that corresponds to the first container image, as defined in the pod configuration file. Container "A" 3506, in one or more embodiments, upon initialization may provide the set of runtime components for the target programming language and the predetermined set of algorithms written in the target programming language. Accordingly, in one or more embodiments, in response to initializing container "A" 3506, the predetermined set of algorithms and the set of runtime components included in the first container image or Container "A" 3506 may be written, copied, or loaded into shared storage volume 3508, as described in more detail herein. At least one technical benefit of writing, copying, or loading the predetermined set of algorithms and the set of runtime components (e.g., execution resources 3512) to shared storage volume 3508 may enable other containers or computer processes within compute environment 3502 to access and use the runtime components and algorithms required for executing analytical functions, as needed.

It shall be recognized that, in one or more embodiments, the first container image may be periodically scanned for security vulnerabilities to identify if any security threats exist within the software components, open-source libraries, third-party libraries, or algorithms included in the first container image. In such an embodiment, periodically scanning the first container image for security vulnerabilities may include assessing a security risk of one or more open-source libraries included in the first container image. Additionally, or alternatively, in one or more embodiments, periodically scanning the first container image for security vulnerabilities may include assessing a security threat of each algorithm of the plurality of predetermined set of algorithms included in the first container image.

It shall be further recognized that, in one or more embodiments, the first container image may be configured with a set of container permissions that restricts an end user from modifying the first container image.

Writing Execution Resources to Shared Storage Volume

In one or more embodiments, method 3400 may include process 3420. Process 3420, which may include writing execution resources to shared storage volume 3508, may function to write the execution resources 3512 provided by container "A" 3506 to shared storage volume 3508. A shared storage volume, as generally referred to herein, may be a storage resource (backed by a physical or virtual storage device) that provides an allocated space for storing data and can be mounted into one or more containers within a pod. It shall be recognized that the phrase "shared storage volume" may be interchangeably referred to herein as a "data storage unit," a "mountable storage resource," or the like.

In one or more embodiments, during or after the initialization of the first container, a resource transfer task executing within the first container may write execution resources 3512 provided by the first container to shared storage volume 3508. For instance, in a non-limiting example, during or after the initialization of container "A" 3506, a resource transfer task executing within container "A" 3506 may write the predetermined set of algorithms written in the target programming language and the set of runtime components for the target programming language to shared storage volume 3508. Stated another way, in such a non-limiting example, the resource transfer task executing within container "A" 3506 may function to copy or load the predetermined set of algorithms written in the target programming language and the set of runtime components for the target programming language to shared storage volume 3508. It shall be recognized that, in one or more embodiments, writing or copying, via the resource transfer task, the set of runtime components for the target programming language to shared storage volume 3508 may include writing or copying the plurality of software libraries (e.g., open-source software libraries, third-party software libraries, etc.) that are used by the predetermined set of algorithms to shared storage volume 3508, as well as writing or copying a code interpreter for the target programming language to the same shared storage volume.

In one or more embodiments, after the resource transfer task is completed, the execution resources 3512, such as the predetermined set of algorithms written in the target programming language and the set of runtime components for the target programming language, may be stored within shared storage volume 3508. The execution resources 3512 may be accessed by other containers or computer processes within pod 3504 or compute environment 3502 by mounting shared storage volume 3508 to their respective filesystems, as described in more detail herein.

It shall be further recognized, that in one or more embodiments, container "A" 3506 may be in an active state while the resource transfer task is writing, copying, or loading the predetermined set of algorithms written in the target programming language and the set of runtime components for the target programming language to the shared storage volume 3508 of compute environment 3502. It shall be further recognized that, in one or more embodiments, in response to the resource transfer task completing the writing, copying, or loading the predetermined set of algorithms and the set of runtime components to the shared storage volume 3508 of compute environment 3502, container "A" 3506 may be transitioned from the active state to an inactive state (e.g., completed state), which may include terminating container "A" 3506. Accordingly, in such an embodiment, in response to transitioning container "A" 3506 to the inactive state, the compute resources previously allocated to container "A" 3506 (e.g., CPU, memory, etc.) may be deallocated and made available for other containers or computer processes within compute environment 3502.

Initializing a Second Container

In one or more embodiments, method 3400 may include process 3430. Process 3430, which may include initializing a second container, may function to initialize a second container that may provide a runtime environment for executing an analytics backend service written in a first programming language. It shall be recognized that the phrase "second container" may be interchangeably referred to herein as "container "B"," an "analytics container," or the like.

In one or more embodiments, based on starting or deploying pod 3504 in compute environment 3502, pod 3504 may function to initialize and run container "B" 3510 after container "A" 3506 completes the resource transfer task. Stated another way, in one or more embodiments, the system or service implementing method 3400 may use the container orchestration service (e.g., Kubernetes® or the like) to initialize and run container "B" 3510 within compute environment 3502.

For instance, with reference to the above non-limiting example, the pod configuration file that corresponds to pod 3504 may include an instruction to initialize container "B" 3510 based on a second container image different from the first container image. The second container image, in one or more embodiments, may include a set of runtime components for executing the analytics backend service in the first programming language (e.g., C++). The set of runtime components in the second container image may include the code for the analytics backend service written in the first programming language (e.g., C++), along with one or more software libraries written in the first programming language, configuration files, executables, and other resources that may be needed to support the execution of the analytics backend service written in the first programming language.

Accordingly, in one or more embodiments, pod 3504 may initialize container "B" 3510 by starting or creating a container that corresponds to the second container image. Container "B" 3510, in one or more embodiments, upon initialization may provide a runtime environment for the analytics backend service. It shall be recognized that, in one or more embodiments, initializing container "B" 3510 (e.g., second container or the like) within compute environment 3502 may include loading one or more software libraries written in the first programming language (e.g., C++) that are required by the analytics backend service, loading algorithmic code associated with the analytics backend service written in the first programming language, and configuring (e.g., creating or the like) the runtime environment to execute tasks or operations associated with the analytics backend service.

At least one technical benefit of initializing container "B" 3510 to execute the analytics backend service may provide a dedicated runtime environment for optimally handling and executing analytical requests within the system or service implementing method 3400.

It shall be recognized that, in one or more embodiments, container "A" 3506 and container "B" 3510 may be different containers within compute environment 3502. That is, in such an embodiment, container "B" 3510 may operate independently of container "A" 3506. At least one technical benefit of container "A" 3506 and container "B" 3510 operating independently of each other may enable a more secure computing environment. For instance, in a non-limiting example, if a security threat or vulnerability is detected in container "A" 3506, the security threat or vulnerability may be localized to container "A" 3506 based on container "A" 3506 operating independently of container "B" 3510. In other words, the security threat or vulnerability does not compromise container "B" 3510 as container "B" 3510 operates independently of container "A" 3506. Such segregation between the operations of container "A" 3506 and container "B" 3510 may minimize the risk of cross-container contamination, ensuring that container "B" 3510 can securely execute the analytics backend service and process analytical requests without interruption or degradation in performance, even in the event of a security threat affecting container "A" 3506.

Shared Storage Volume Mounting

In one or more embodiments, method 3400 may include process 3440. Process 3440, which may include mounting shared storage volume 3508, may function to mount shared storage volume 3508 within the second container. Mounting a subject storage volume within a subject container, as generally referred to herein, may refer to a process of incorporating the subject storage volume into a file system of the subject container. At least one technical benefit of mounting the subject shared storage volume within the subject container may enable the resources stored within the subject shared storage volume to be accessible and used by the subject container.

In one or more embodiments, process 3440 may function to mount, within container "B" 3510, the shared storage volume 3508 that includes the set of runtime components for the target programming language and the predetermined set of algorithms written in the target programming language. For instance, in a non-limiting example, shared storage volume 3508 may be mounted to a directory path within a file system of container "B" 3510. Stated another way, in one or more embodiments, the shared storage volume 3508 may be mounted into the file system of container "B" 3510 in a manner that allows container "B" 3510 to access and use the set of runtime components for the target programming language and the predetermined set of algorithms written in the target programming language.

Accordingly, in response to mounting shared storage volume 3508 within container "B" 3510, container "B" 3510 may access one or more resources or items stored within the mounted shared storage volume to perform various computational tasks, such as executing analytical operations and analytical functions as described in more detail in method 1400, method 2100, and method 3000. It shall be recognized that mounting, as generally referred to herein, may refer to the process of making a storage resource, such as a storage volume or the like, available for access within a container's filesystem by associating or mapping the storage resource to a specified directory path.

Invoking an Analytics Function

In one or more embodiments, method 3400 may include process 3450. Process 3450, which may include invoking an analytics function, may function to invoke an analytics function provided by the analytics backend service. It shall be recognized that the phrase "analytics function" may be interchangeably referred to herein as an "analytical function" or the like.

In one or more embodiments, analytics service 1530 or analytics backend service may provide a plurality of analytics functions (e.g., plurality of predefined analytical functions, etc.) that are executable by the analytics service 1530. In such an embodiment, each analytics function or at least a subset of the plurality of analytics functions may be encoded or configured to use at least one algorithm written in a programming language, different from the programming language in which the analytics backend service or analytics service 1530 operates (e.g., the analytics backend service or analytics service 1530 operates in C++, while one or more of the analytics functions utilize algorithms written in Python to perform their respective computational tasks). This enables the system or service implementing method 3400 to leverage the strengths of multiple programming languages, using a first programming language (e.g., C++) to handle data-intensive backend processing tasks with high performance and efficiency, while utilizing Python's extensive analytical software libraries (e.g., open-source libraries, third-party libraries, etc.) for specialized operations and computational tasks. For instance, in a non-limiting example, a first analytics function of the plurality of analytics functions may be configured to use a first algorithm written in Python to perform a first computational task. In another non-limiting example, a second analytics function of the plurality of analytics functions may be configured to use a second algorithm written in Python to perform a second computational task. In another non-limiting example, a third analytics function of the plurality of analytics functions may be configured to use a third algorithm written in Python to perform a third computational task.

Figure 36:
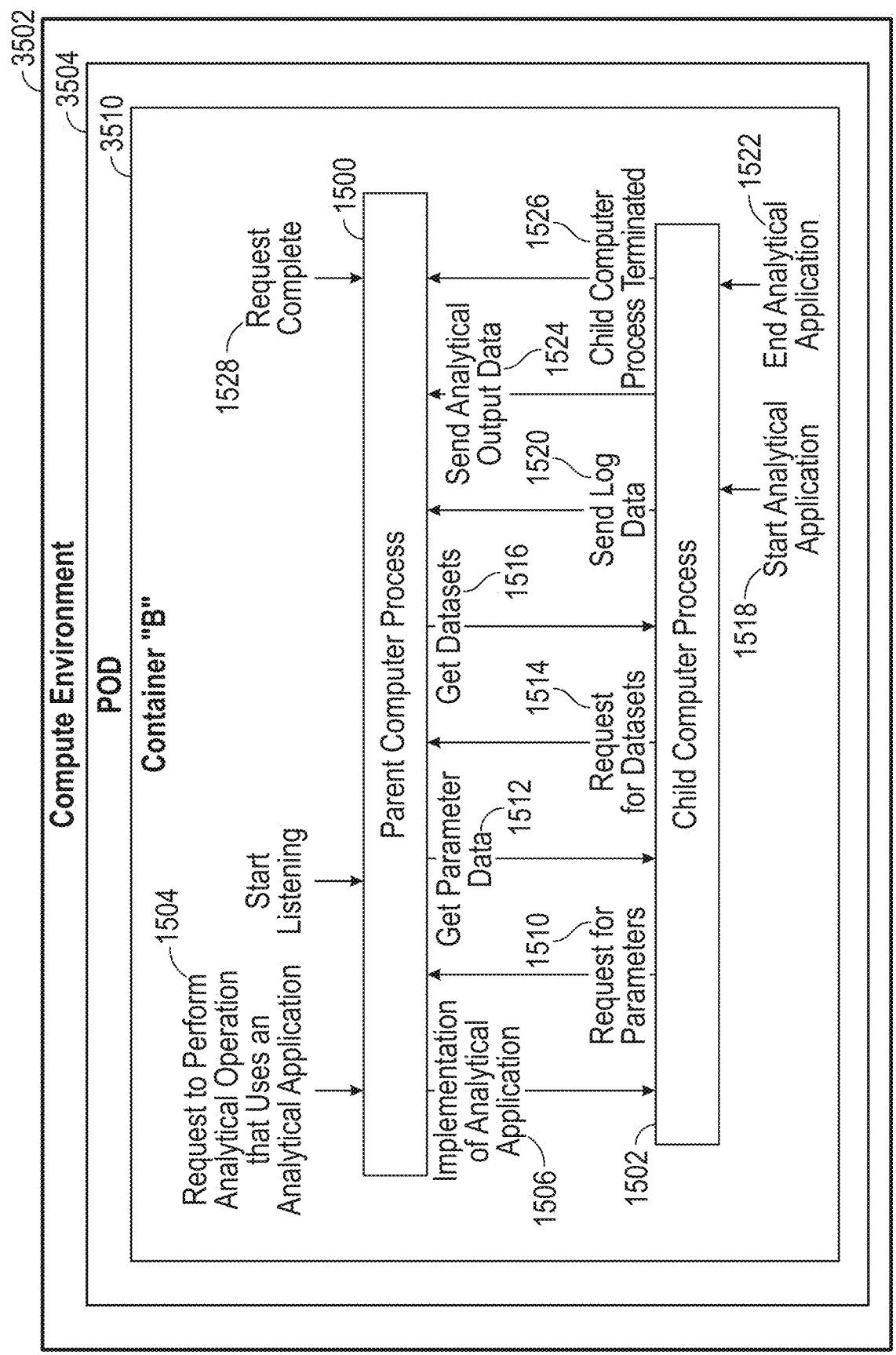
FIG. 36 illustrates an example schematic of multiple computer processes that execute instructions written in different programming languages operating within a single container, according to some embodiments of the present technology.

Turning to FIG. 36, in one or more embodiments, parent computer process 1500 (e.g., first computer process 2202 or the like) may be commenced within container "B" 3510 based on receiving a request to perform a target computational task using an analytics function provided by analytics service 1530. The analytics function, in such an embodiment, may be encoded or configured to use algorithm 2218 or any other suitable algorithm written in a target programming language (e.g., Python) to perform the target computational task. It shall be recognized that, in such an embodiment, parent computer process 1500 may execute instructions in a programming language (e.g., C++) different than the target programming language of the algorithm (e.g., Python).

Accordingly, in such an embodiment, parent computer process 1500 cannot directly execute or run algorithm 2218 because algorithm 2218 is encoded in a programming language (e.g., Python) that requires execution through a different runtime environment than that of parent computer process 1500.

Launching an Auxiliary Computer Process

In one or more embodiments, method 3400 may include process 3460. Process 3460, which may include launching an auxiliary computer process, may function to launch an auxiliary computer process within container "B" 3510 to execute algorithm 2218 to perform the requested computational task. The auxiliary computer process, in such an embodiment, may operate alongside parent computer process 1500 within container "B" 3510.

In one or more embodiments, container "B" 3510 may be configured to run computer processes that execute code or instructions written in different programming languages by including the runtime environments, interpreters, and software libraries necessary for each distinct programming language. For instance, in a non-limiting example, a single container (e.g., container "B" 3510) may be configured to execute parent computer process 1500 that executes instructions in the first programming language (e.g., C++) while concurrently executing the auxiliary computer process that executes instructions in the target programming language (e.g., Python). It shall be recognized that, in one or more embodiments, to enable such operation, container "B" 3510 may include a distinct runtime environment for each programming language (e.g., a Python runtime environment with a Python interpreter and associated Python libraries, and a C++ runtime environment with a C++ compiler and associated C++ libraries).

In one or more embodiments, based on or in response to parent computer process 1500 invoking the analytics function associated with the request to perform the target computational task, parent computer process 1500 may launch child computer process 1502 (e.g., second computer process 2214), which is operably configured to execute algorithm 2218. That is, in such an embodiment, child computer process 1502 may provide the execution context for running algorithm 2218 within the runtime environment configured for the target programming language (e.g., Python).

For instance, in a non-limiting example, based on or in response to launching child computer process 1502, child computer process 1502 may function to access the set of runtime components for the target programming language from the shared storage volume 3508 mounted within container "B" 3510 and, in turn, initialize the runtime environment for the target programming language within memory allocated to child computer process 1502. In such a non-limiting example, after initializing the runtime environment for the target programming language, child computer process 1502 may function to access algorithm 2218 from the shared storage volume 3508 mounted within container "B" 3510 and, in turn, load algorithm 2218 into the initialized runtime environment for execution. Accordingly, in such a non-limiting example, once algorithm 2218 is loaded into the initialized runtime environment, child computer process 1502 may execute algorithm 2218 to perform the requested computational task.

It shall be recognized that, in one or more embodiments, initializing the runtime environment for the target programming language may include loading the code interpreter for the target programming language (e.g., Python interpreter) into the memory allocated to child computer process 1502, along with any required software libraries, software dependencies, or configurations required by the algorithm 2218 for execution.

In another non-limiting example, based on or in response to launching child computer process 1502, child computer process 1502 may function to access the code interpreter (e.g., Python interpreter) from the set of runtime components stored within the shared storage volume 3508 mounted within container "B" 3510 and, in turn, child computer process 1502 may initialize the code interpreter (e.g., Python interpreter) within memory of child computer process 1502. Accordingly, in such a non-limiting example, child computer process 1502 may function to access or retrieve algorithm 2218 from the shared storage volume 3508 mounted within container "B" 3510 and execute algorithm 2218 using the code interpreter (e.g., Python interpreter).

In another non-limiting example, based on or in response to launching child computer process 1502, child computer process 1502 may function to access the code interpreter for the target programming language (e.g., Python interpreter) and algorithm 2218 written in the target programming language from the shared storage volume 3508 mounted within container "B" 3510. In one or more embodiments, upon accessing the code interpreter and algorithm 2218, the code interpreter and algorithm 2218 may be initialized within memory of child computer process 1502. Accordingly, in such an embodiment, the code interpreter, once initialized, may enable child computer process 1502 to execute algorithm 2218 to perform the requested computational task. In other words, the code interpreter, once initialized, may enable child computer process 1502 to read and execute the instructions of algorithm 2218 in the target programming language.

It shall be recognized that, in one or more embodiments, before executing algorithm 2218, child computer process 1502 may request one or more pieces of data, such as parameters and datasets, from parent computer process 1500 and receive the one or more pieces of data to provide as input to algorithm 2218 in analogous ways described above.

It shall be further recognized that, in one or more embodiments, container "A" 3506 may be initialized within compute environment 3502 before child computer process 1502 is commenced and invokes the analytics function.

It shall be further recognized that, in one or more embodiments, command cross-process queue 1602 and data transfer cross-process queue 1712 may be implemented, configured or located within shared memory of container "B" 3510. Stated another way, in some embodiments, command cross-process queue 1602 and data transfer cross-process queue 1712 may reside in the memory (e.g., memory space) allocated to container "B" 3510.

Transferring Analytical Output

In one or more embodiments, method 3400 may include process 3470. Process 3470, which may include transferring an analytical output, may function to transfer, using a cross-process queue, an analytical output computed by algorithm 2218 that performed the requested computational task from child computer process 1502 to parent computer process 1500. It shall be recognized that process 3470 may function to transfer the analytical output computed by algorithm 2218 in analogous ways described above.

For instance, in a non-limiting example, the analytical output computed by algorithm 2218 may be serialized into a binary data format and written to the cross-process queue (e.g., command cross-process queue 1602, data transfer cross-process queue 1712) by child computer process 1502. In such a non-limiting example, parent computer process 1500 may function to read the serialized analytical output from the cross-process queue and deserialize the serialized analytical output into one or more representations of the first programming language. Accordingly, in such a non-limiting example, parent computer process 1500 may function to write the deserialized analytical output to a computer database of the analytics backend service.

Stated another way, in one or more embodiments, process 3470 may function to transfer the analytical output computed by algorithm 2218 from second computer process 2214 to first computer process 2202. In such an embodiment, in response to the first computer process 2202 obtaining the analytical output, first computer process 2202 may function to write the analytical output to a computer database of the analytics backend service. It shall be recognized that, in such an embodiment, second computer process 2214 may not have permissions to write the analytical output to the computer database and first computer process 2202 may have the permissions to write the analytical output to the computer database.

In one or more embodiments, transferring the analytical output computed by algorithm 2218 from second computer process 2214 to first computer process 2202 may include using a cross-process queue (e.g., command cross-process queue 1602, data transfer cross-process queue 1712, etc.) that is located within and/or configured using memory, shared memory, or the like allocated or assigned to container "B" 3510. In other words, the analytical output may be transferred using the cross-process queue configured within container "B" 3510. It shall be recognized that the cross-process queue configured within container "B" 3510 may not be accessible by container "A" 3506.

Additionally, or alternatively, in one or more embodiments, transferring the analytical output computed by the at least one algorithm that performed the computational task may include using shared memory of a computer that is executing the second computer process and the first computer process.

Figure 37:
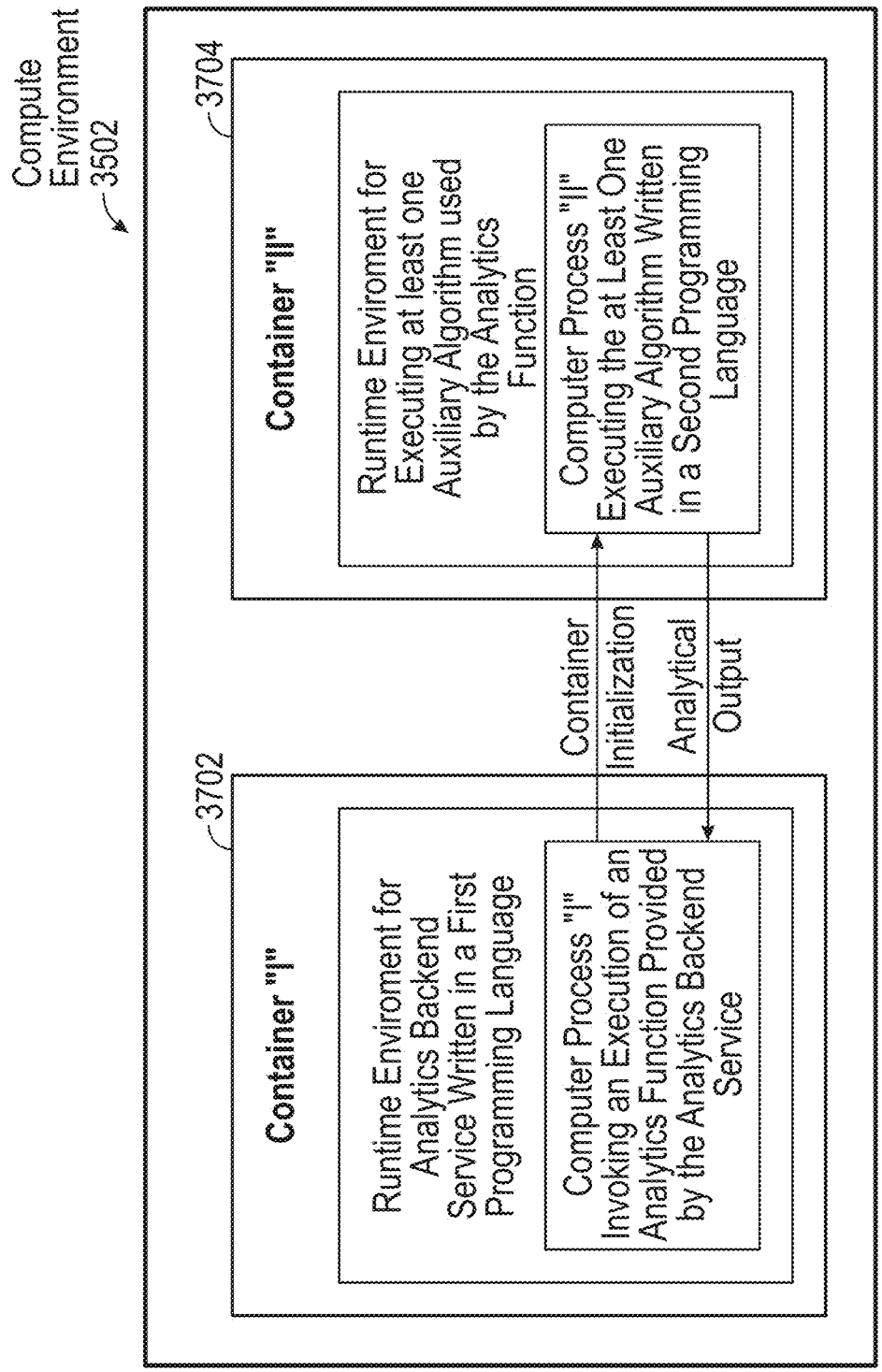
FIG. 37 illustrates an example schematic of initializing a plurality of containers to execute a computational task, according to some embodiments of the present technology.

Turning to FIG. 37, in one or more embodiments, container "I" 3702 may be initialized within compute environment 3502. Container "I" 3702, in one or more embodiments, may provide a first runtime environment for executing computer instructions of the analytics backend service written in a first programming language (e.g., C++). Accordingly, in such an embodiment, computer process "I" (e.g., first computer process 2202, parent computer process 1500, etc.) may function to invoke an analytics function provided by the analytics backend service that is configured to use at least one algorithm written in a second programming language (e.g., Python) to perform a computational task. Stated another way, in one or more embodiments, a system or service implementing method 3400 may function to invoke, by computer process "I" operating with container "I" 3702, the analytics function that is configured to use the at least one algorithm written in the second programming language.

Accordingly, in one or more embodiments, in response to computer process "I" invoking the analytics function, the system or service implementing method 3400 may function to initialize container "II" 3704 that may provide a second runtime environment for executing the at least one algorithm used by the analytics function (e.g., analytical function or the like). In one or more embodiments, a system or service implementing method 3400 may function to commence computer process "II" within container "II" 3704. Computer process "II", in one or more embodiments, may execute the at least one algorithm to perform the computational task specified by the analytics function. Furthermore, in such an embodiment, an analytical output may be computed by the at least algorithm (e.g., auxiliary algorithm or the like) in response to executing the at least one algorithm.

In one or more embodiments, in response to the at least algorithm computing the analytical output, the analytical output may be transferred from computer process "II" to computer process "I" using a cross-process queue (e.g., command cross-process queue 1602, data transfer cross-process queue 1712, etc.). Additionally, or alternatively, in one or more embodiments, transferring the analytical output computed by the at least algorithm 2218 from computer process "II" to computer process "I" may include using a socket that may provide a communication channel between computer process "II" and computer process "I". In other words, the socket provides a bidirectional communication for exchanging data between computer process "II" and computer process "I".

It shall be recognized that, in one or more embodiments, container "I" 3702 is a different container than container "II" 3704.

Figure 38:
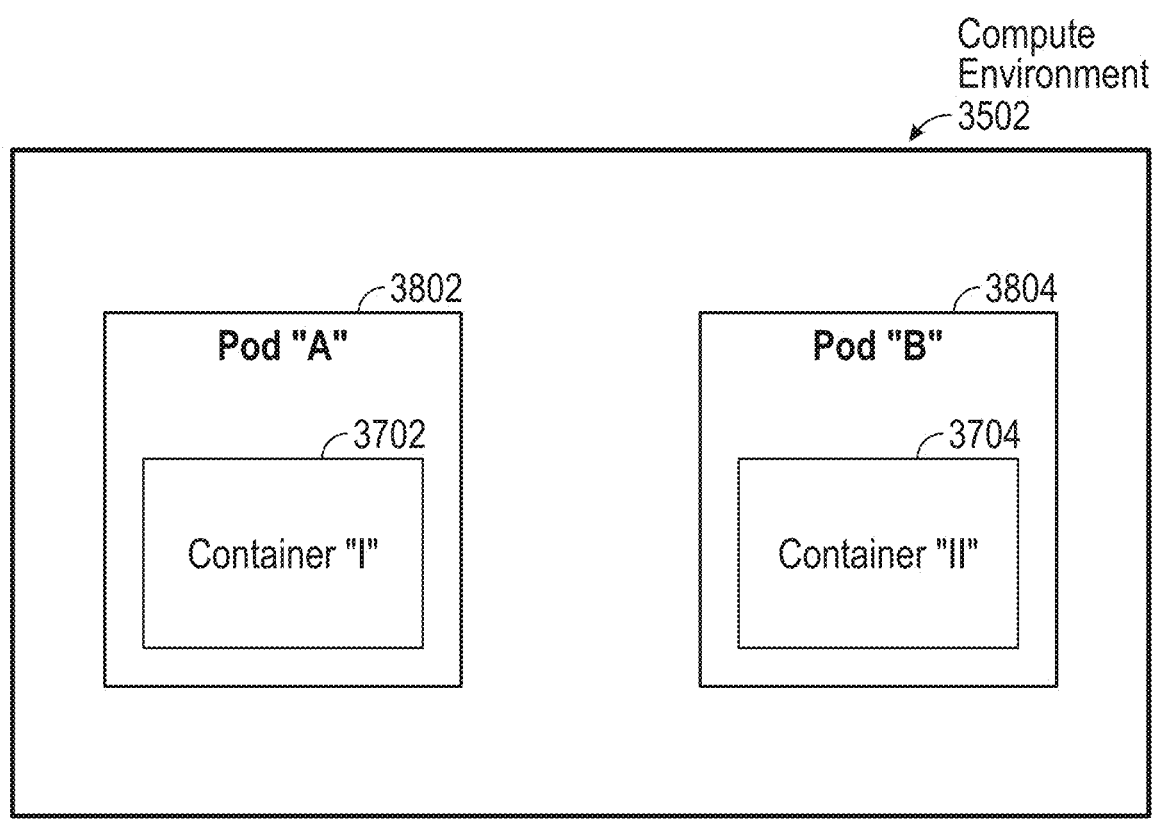
FIG. 38 illustrates an example schematic of initializing a plurality of containers using a plurality of pods, according to some embodiments of the present technology.

Turning to FIG. 38, in one or more embodiments, the system or service implementing method 3400 may function to deploy one or more pods within compute environment 3502 based on one or more pod configuration files, respectively. In such an embodiment, the one or more pod configuration files may include a container image of the analytics backend service and a container image of an auxiliary compute service that includes the at least one algorithm written in the second programming language. Accordingly, in such an embodiment, in response to deploying the one or more pods within compute environment 3502, the one or more pods may function to initialize container "I" 3702 based on the container image of the analytics backend service and initialize container "II" 3704 based on the container image of the auxiliary compute service. For instance, in a non-limiting example, a system or service implementing method 3400 may function to deploy pod "A" 3802 that initializes container "I" 3702, and deploy pod "B" 3804 that initializes container "II" 3704. It shall be recognized that, in such an embodiment, container "II" 3704 may be initialized after container "I" 3702.

It shall be recognized that, in such an embodiment, pod "A" 3802 and pod "B" 3804 may use a socket for transferring data between pod "A" 3802 and "B" 3804. A socket, as generally referred to herein, may be an application programming interface (API) that may provide a bidirectional communication endpoint for inter-process or network communication, allowing for data transfers between at least two devices or processes using a specific transport protocol, such as a Transmission Control Protocol (TCP) or a User Datagram Protocol (UDP).

It shall also be further noted that the system and methods of the embodiment and variations described herein can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as that are offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments. For example, aspects/operations of methods 1400, 2100, 3000, and 3400 may be interchanged, substituted, and/or added between these methods.

Figure 39:
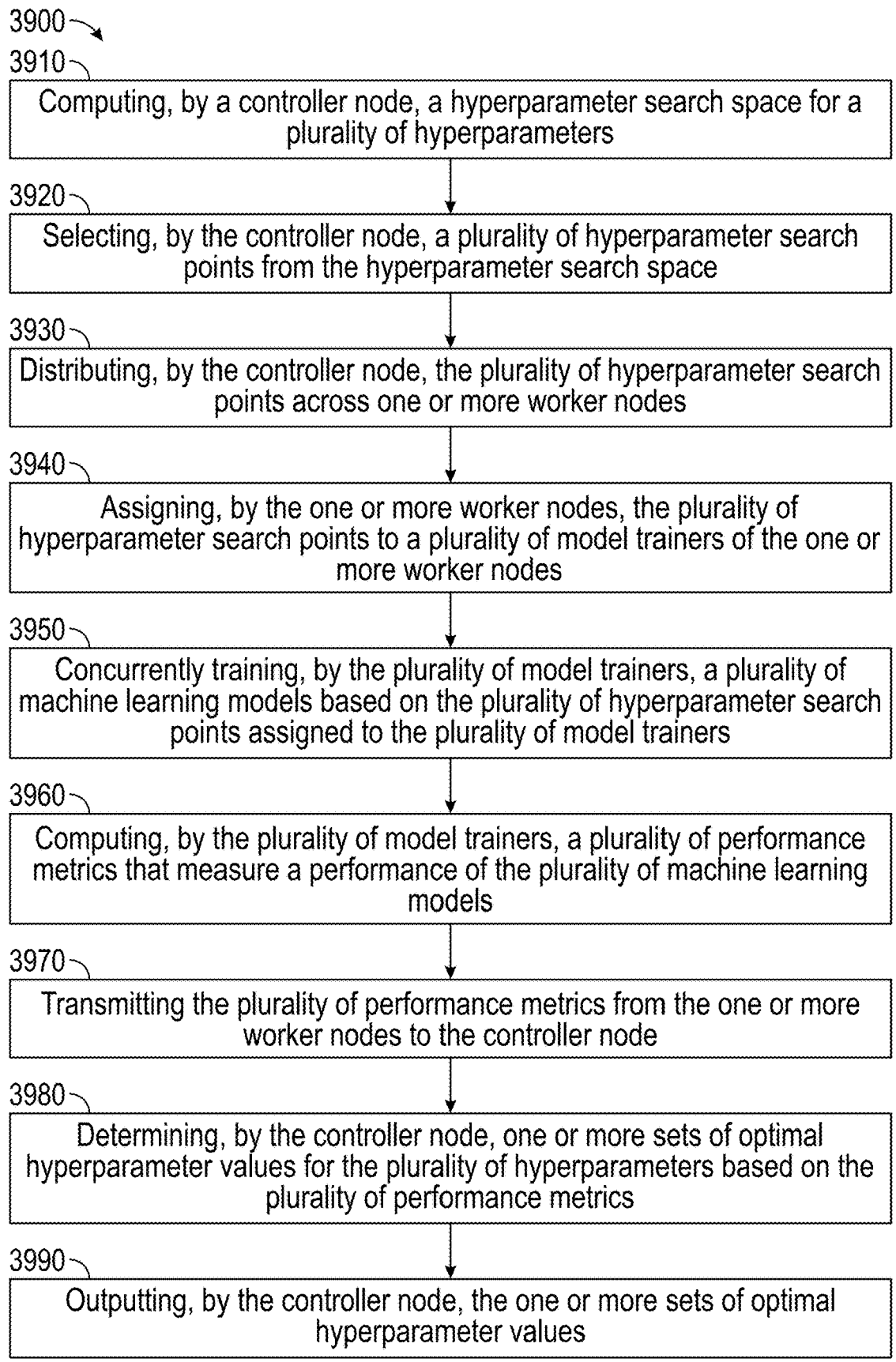
FIG. 39 illustrates an example flowchart of a method for exploring a hyperparameter search space through parallel training across a controller node and a plurality of worker nodes, according to some embodiments of the present technology.

FIG. 39 illustrates a method 3900 for exploring a hyperparameter search space through parallel training across a controller node and a plurality of worker nodes. It shall be appreciated that other embodiments contemplated within the scope of the present disclosure may involve more operations, fewer operations, different operations, or a different order of operations than illustrated in FIG. 39.

One of ordinary skill in the art will appreciate that method 3900 provides many technical advantages and practical applications over existing parallelizable techniques. Conventional parallelizable techniques, such as data parallelism and pipeline parallelism, often introduce inefficiencies that hinder the scalability and performance of hyperparameter tuning tasks. Specifically, data parallelism may involve distributing subsets of data samples across multiple graphics processing units (GPUs), where gradients are accumulated, and weights are updated in an independent manner. However, such approach requires frequent synchronization of weights, leading to substantial communication overhead and latency.

On the other hand, pipeline parallelism may assign subsets of model layers to different GPUs. While suitable for tasks such as model inference, the sequential nature of layer execution in pipeline parallelism limits its utility for hyperparameter tuning. During backpropagation, inter-GPU communication becomes a significant bottleneck, slowing down the training process. Such inefficiencies make it difficult to efficiently explore large hyperparameter search spaces or handle computationally demanding workloads.

Method 3900 overcomes the bottlenecks inherent in data and pipeline parallelism. Specifically, unlike data parallelism, method 3900 may reduce or mitigate the need for frequent synchronization of weights across devices by enabling GPUs to operate independently on a distinct subset of hyperparameter search points. Similarly, method 3900 may overcome the limitations of pipeline parallelism by assigning the training of a model to an individual GPU, rather than distributing different layers of a model across multiple GPUs.

As illustrated in FIG. 39, method 3900 may include operation 3910. Operation 3910 may compute, by a controller node, a hyperparameter search space for a plurality of hyperparameters. The controller node of operation 3910, in some embodiments, may be similar to controller node 4002 illustrated in FIG. 40A. Controller node 4002, as generally used herein, may refer to a server, computer, or other type of computing device that is responsible for coordinating the exploration of a hyperparameter search space across a distributed system 4000.

In some embodiments, controller node 4002 may be in communication with one or more worker nodes (e.g., a server or computer) of distributed system 4000. For example, in the example of FIG. 40A, controller node 4002 may be in communication with a plurality of worker nodes 4006-4012. Worker nodes 4006-4012, in some embodiments, may receive an instruction from controller node 4002 to perform a job or task (e.g., train a machine learning model, process a dataset, and/or the like). In response, worker nodes 4006-4012, may perform the requested task and transmit information back to controller node 4002 once that task is completed (e.g., a result or output of performing such task).

Figure 40A:
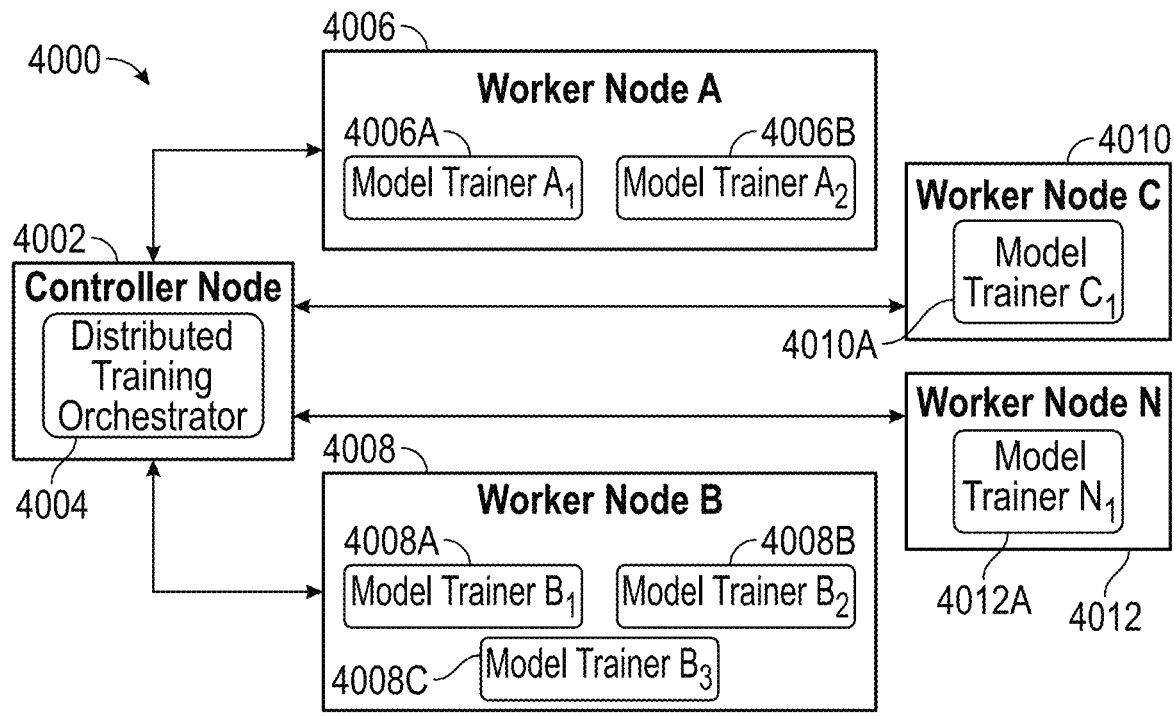
FIG. 40A illustrates an example of a distributed system comprising a controller node and one or more worker nodes, according to some embodiments of the present technology.

Additionally, as illustrated in FIG. 40A, controller node 4002 may include distributed training orchestrator 4004. Distributed training orchestrator 4004, as will be described in more detail herein, may refer to an algorithm that includes repeatedly selecting and submitting hyperparameter search points for training across the plurality of worker nodes 4006-4012. For example, distributed training orchestrator 4004 may implement a loop that continues until a predefined condition is met (e.g., until a specified number of hyperparameter search points have been evaluated, a maximum allowable training time has elapsed, etc.). In a respective iteration of the loop, distributed training orchestrator 4004 may select a plurality of hyperparameter search points and asynchronously transmit the selected hyperparameter search points to one or more of the plurality of worker nodes 4006-4012.

Figure 40B:
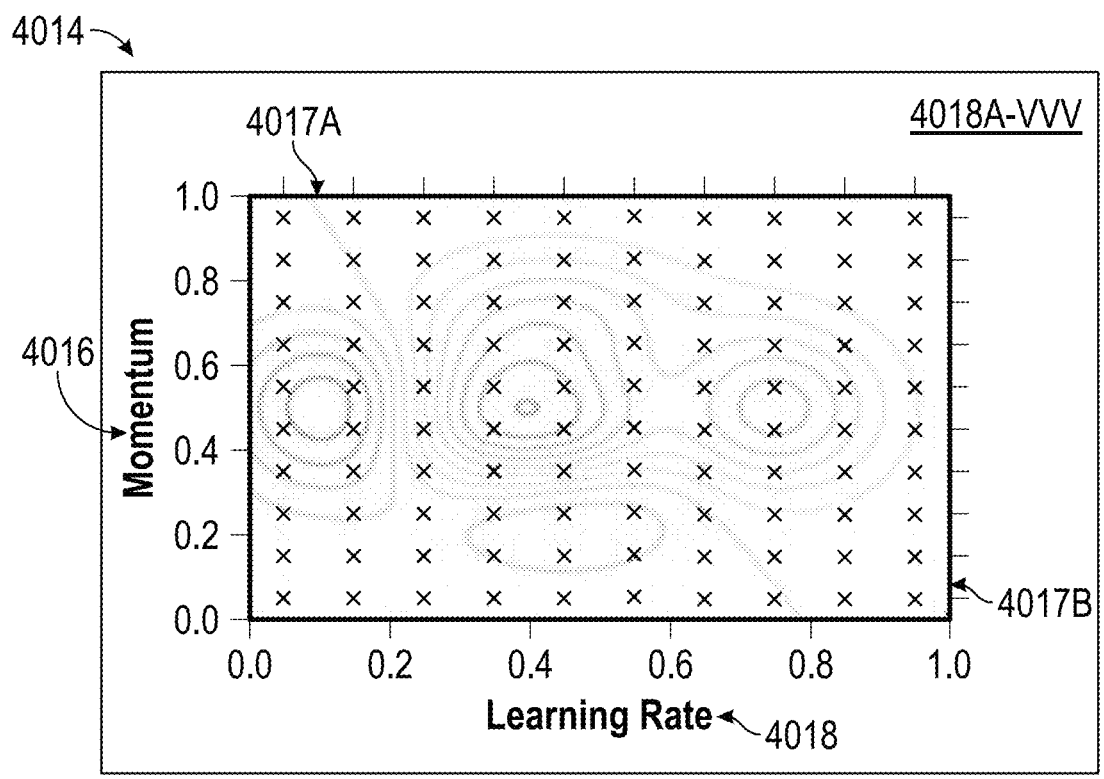
FIG. 40B illustrates an example of a hyperparameter search space, according to some embodiments of the present technology.

In some embodiments, the hyperparameter search space computed by operation 3910 may be similar to the hyperparameter search space 4014 illustrated in FIG. 40B. Specifically, as illustrated in FIG. 40B, the hyperparameter search space 4014 may be computed for a plurality of hyperparameters 4016-4018. Hyperparameters 4016-4018, as generally used herein, may refer to parameters that are configured before the training of a machine learning model. Unlike model parameters, such as weights and biases, hyperparameters 4016-4018 may influence the way the machine learning model learns. Identifying optimal values for hyperparameters 4016-4018 may enable faster training convergence and mitigate (e.g., reduce) common model training issues such as overfitting or underfitting the machine learning model.

As illustrated in FIG. 40B, hyperparameters 4016-4018 may correspond to a momentum hyperparameter and a learning rate hyperparameter, respectively. However, it shall be noted that hyperparameters 4016-4018 are not intended to be limiting and that hyperparameters 4016-4018 may correspond to additional or different hyperparameters without departing from the scope of the disclosure. For example, hyperparameters 4016-4018 may additionally, or alternatively, include regularization strength, dropout rate, number of layers in a neural network, batch size, and/or the like.

In some embodiments, the hyperparameter search space 4014 may include a plurality of dimensions 4017A-4017B. Dimension 4017A (sometimes referred to as a first dimension) may correspond to hyperparameter 4016 and include possible values for hyperparameter 4016. Conversely, dimension 4017B (sometimes referred to as a second dimension) may correspond to hyperparameter 4018 and include possible values for hyperparameter 4018. Specifically, as illustrated in FIG. 40B, dimensions 4017A-4017B may include values ranging from 0.0 to 1.0 as possible values for hyperparameters 4016-4018, respectively. It shall be noted that the number of dimensions illustrated in FIG. 40B is not intended to be limiting and that hyperparameter search space 4014 may include additional or different dimensions if operation 3910 was to instead compute hyperparameter search space 4014 for additional or different hyperparameters.

In some embodiments, hyperparameter search space 4014 may include a plurality of hyperparameter search points 4018A-4018VVV. Hyperparameter search points 4018A-4018VVV may be located at intersections of possible values of hyperparameters 4016-4018. A respective hyperparameter search point of the plurality of hyperparameter search points 4018A-4018VVV may include or correspond to a respective set of values for hyperparameters 4016-4018. For example, hyperparameter search point 4018A may include or correspond to a first set of values for hyperparameters 4016-4018 (e.g., 0.01 for hyperparameter 4016 and 0.01 for hyperparameter 4018). Conversely hyperparameter search point 4018VVV may include or correspond to a second set of values for hyperparameters 4016-4018 (e.g., 0.01 for hyperparameter 4016 and 0.99 for hyperparameter 4018). Other hyperparameter search points of hyperparameter search points 4018A-4018VVV may include or correspond to different sets of values for hyperparameters 4016-4018 in analogous ways described above.

Figure 40C:
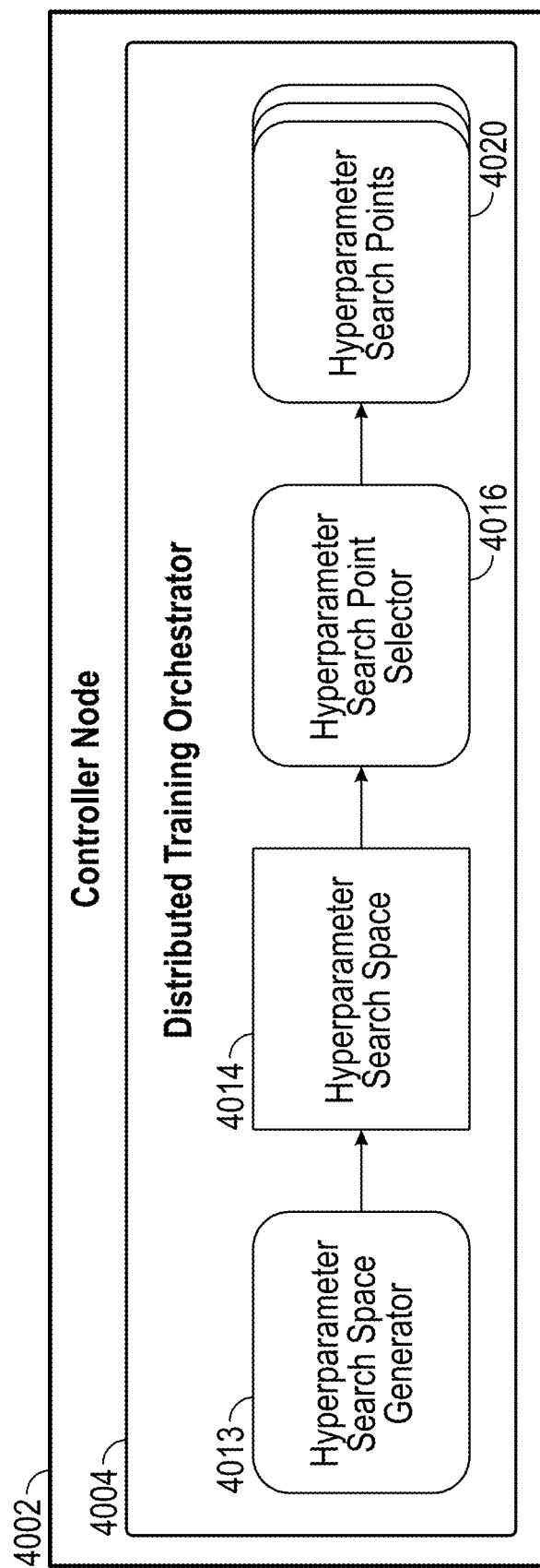
FIG. 40C illustrates an example of a controller node comprising a distributed training orchestrator, according to some embodiments of the present technology.

As illustrated in FIG. 40C, hyperparameter search space 4014 may be computed by hyperparameter search space generator 4013 of distributed training orchestrator 4004. Hyperparameter search space generator 4013 may receive an input comprising a possible value range for each of the plurality of hyperparameters 4016-4018. Based on receiving the input, hyperparameter search space generation 4013 may discretize each possible value range provided for the plurality of hyperparameters 4016-4018 into a set of possible hyperparameter values and, in turn, output hyperparameter search space 4014 (e.g., a grid or other data structure) that includes a plurality of hyperparameter search points 4018A-4018VVV for the plurality of hyperparameters 4016-4018.

Referring to FIG. 39, method 3900 may proceed from operation 3910 to operation 3920. Operation 3920 may select, by the controller node, a plurality of hyperparameter search points from the hyperparameter search space. The plurality of hyperparameter search points of operation 3920 may be selected in similar ways as hyperparameter search points 4020 in FIG. 40C.

As illustrated in FIG. 40C, hyperparameter search point selector 4016 may select hyperparameter search points 4020 from hyperparameter search space 4014. As described previously in FIG. 40B, hyperparameter search space 4014 may include a plurality of hyperparameter search points 4018A-4018VVV. Thus, in some embodiments, hyperparameter search point selector 4016 may implement a sampling technique to determine the plurality of hyperparameter search points 4020 to select from hyperparameter search space 4014.

The sampling strategy implemented by hyperparameter search point selector 4016 may include sampling techniques such as a random sampling technique, grid search sampling technique, a Latin Hypercube Sampling (LHS) technique, a genetic algorithm sampling technique, and/or a hybrid sampling technique that combines one or more of the aforementioned sampling techniques.

Figure 40D:
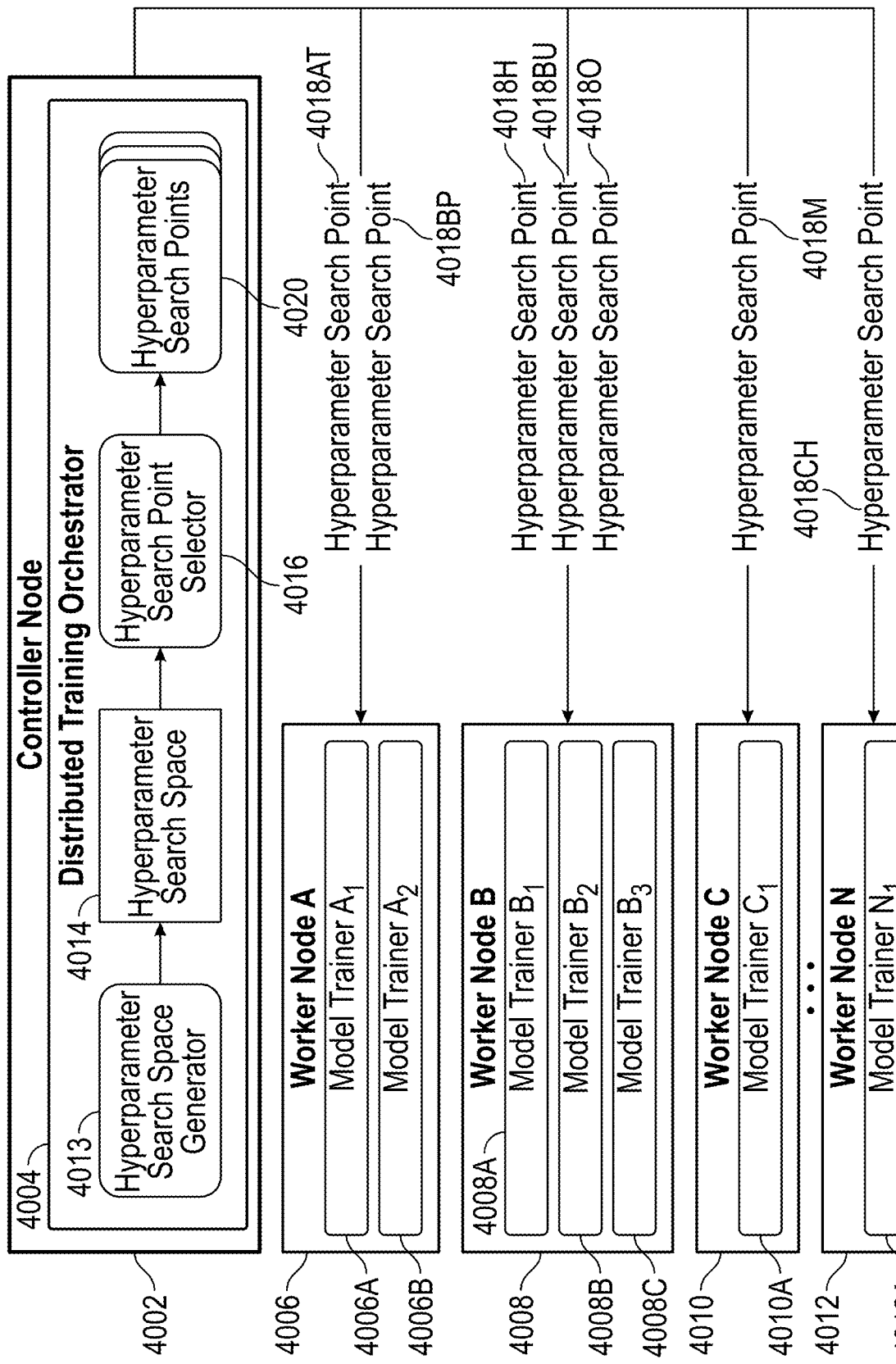
FIGS. 40D and 40E illustrate a controller node and a plurality of worker nodes determining an optimal hyperparameter search point from a plurality of possible hyperparameter search points, according to some embodiments of the present technology.

In some embodiments, the hyperparameter search points 4020 may correspond to a subset of hyperparameter search points within hyperparameter search space 4014 (e.g., a subset of hyperparameter search points 4018A-4018VVV). Alternatively, in some embodiments, the hyperparameter search points 4020 may include each hyperparameter search point within the hyperparameter search space 4014 (e.g., the hyperparameter search points 4018A-4018VVV). For example, as shown in FIG. 40D, the plurality of hyperparameter search points 4020 may include hyperparameter search points 4018AT, 4018BP, 4018H, 4018BU, 4018O, 4018M, and 4018CH. It shall be noted that FIG. 40D is not intended to be limiting and that the plurality of hyperparameter search points 4020 may include additional, different, or fewer hyperparameter search points from hyperparameter search space 4014 without departing from the scope of the disclosure.

Referring to FIG. 39, method 3900 may proceed from operation 3920 to 3930. Operation 3930 may distribute, by the controller node, the plurality of hyperparameter search points across one or more worker nodes. As described above, the plurality of hyperparameter search points may include or correspond to hyperparameter search points 4018AT, 4018BP, 4018H, 4018BU, 4018O, 4018M, and 4018CH. Thus, in a non-limiting example of operation 3930, hyperparameter search points 4018AT, 4018BP, 4018H, 4018BU, 4018O, 4018M, and 4018CH may be distributed across one or more worker nodes.

As illustrated in FIG. 40D, the one or more worker nodes used by operation 3930 may include the plurality of worker nodes 4006-4012 (described previously in FIG. 40A). Controller node 4002 may distribute a respective hyperparameter search point (e.g., a single hyperparameter search point) to a respective worker node of the plurality of worker nodes 4006-4012. For instance, as illustrated in FIG. 40D, controller node 4002 may distribute hyperparameter search point 4018M to worker node C 4010. Additionally, as also shown in FIG. 40D, controller node 4002 may distribute hyperparameter search point 4018CH to worker node N 4012.

Additionally, or alternatively, controller node 4002 may distribute a plurality of hyperparameter search points (e.g., multiple hyperparameter search points) to a respective worker node of the plurality of worker nodes 4006-4012. For instance, as shown in FIG. 40D, controller node 4002 may distribute hyperparameter search points 4018AT and 4018BP to worker node A 4006. Additionally, as also shown in FIG. 40D, controller node 4002 may distribute hyperparameter search points 4018H, 4018BU, and 4018O to worker node B 4008. It shall be noted that the above example(s) are not intended to be limiting and that controller node 4002 may distribute hyperparameter search points 4018AT, 4018BP, 4018H, 4018BU, 4018O, 4018M, and 4018CH across the plurality of worker nodes 4006-4012 in other ways without departing from the scope of the disclosure.

In some embodiments, a respective hyperparameter search point of the hyperparameter search space 4014 may be associated with a respective (e.g., search) area of the hyperparameter search space 4014. When the respective hyperparameter search point is associated with a first area of the hyperparameter search space 4014, controller node 4002 may assign such respective hyperparameter search point to a first worker node of the plurality of worker nodes 4006-4012. Conversely, when the respective hyperparameter search point is associated with a second area of the hyperparameter search space 4014 (e.g., different from the first area of the hyperparameter search space 4014), controller node 4002 may assign such respective hyperparameter search point to a second worker node of the plurality of worker nodes 4006-4012.

For example, in FIG. 40D, hyperparameter search points 4018AT and 4018BP may be associated with the first area of hyperparameter search space 4014. Thus, in some embodiments, controller node 4002 may distribute hyperparameter search points 4018AT and 4018BP to worker node A 4006 (e.g., the respective worker node responsible for processing hyperparameter search points located within the first area of the hyperparameter search space 4014). Conversely, in some embodiments, hyperparameter search points 4018H, 4018BU, and 4018O may be associated with the second area of the hyperparameter search space 4014. Thus, as also shown in FIG. 40D, controller node 4002 may distribute the hyperparameter search points 4018H, 4018BU, and 4018O to worker node B 4008 (e.g., a respective worker node responsible for processing hyperparameter search points located within the second area of the hyperparameter search space 4014). It shall be noted that controller node 4002 may distribute hyperparameter search points 4018M and 4018CH to worker nodes C-N 4010-4012, respectively, for similar reasons.

Additionally, or alternatively, operation 3930 may include instructing, by the controller node, one or more worker nodes to concurrently train a plurality of machine learning models based on the plurality of hyperparameter search points. For example, controller node 4002 may send commands to worker nodes A-N 4006-4012 to initiate the training of machine learning models corresponding to the hyperparameter search points 4018AT, 4018BP, 4018H, 4018BU, and 4018O assigned to the plurality of worker nodes 4006-4012.

Figure 40E:
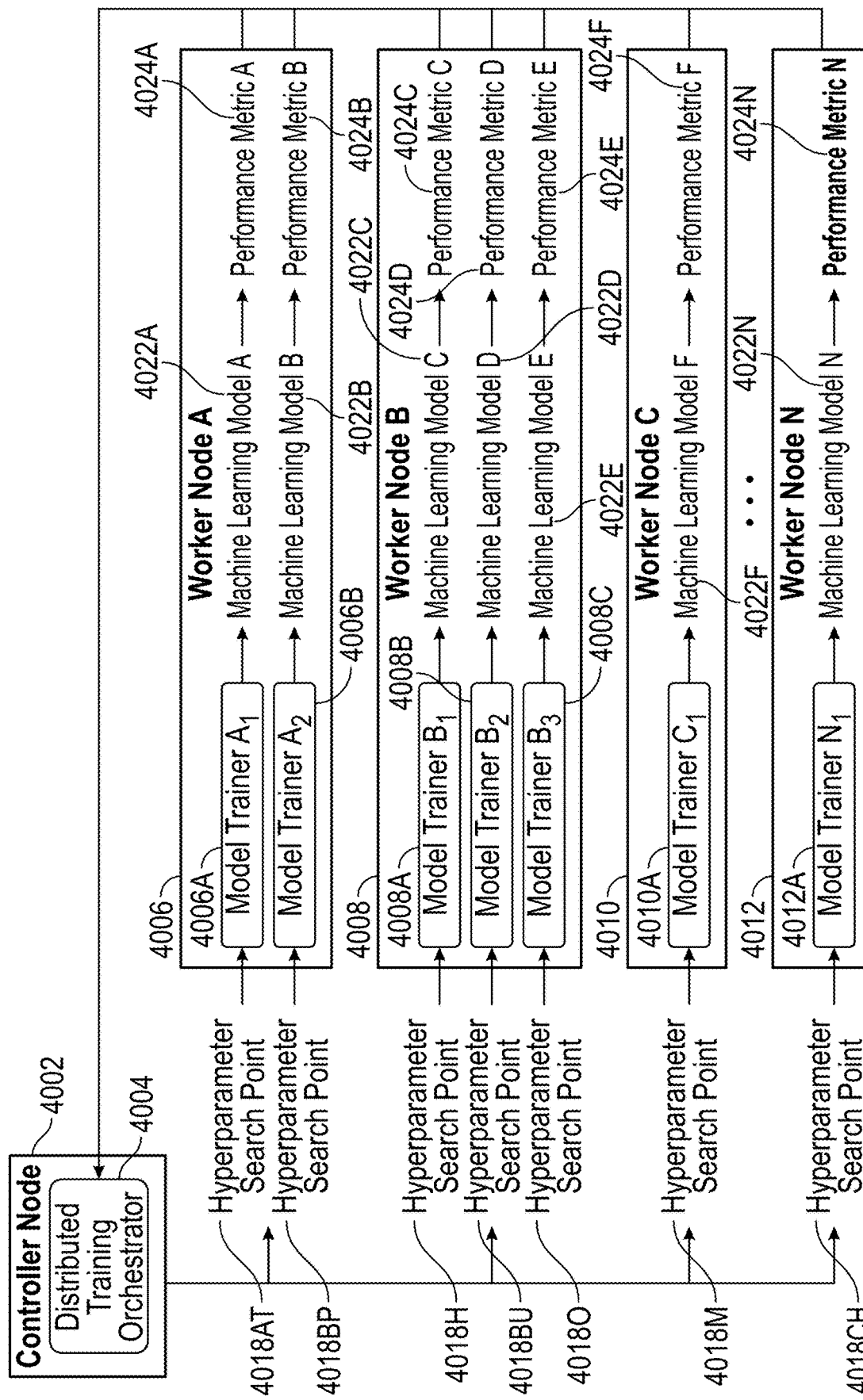

Referring to FIG. 39, method 3900 may proceed from operation 3930 to operation 3940. Operation 3940 may assign, by the one or more worker nodes, the plurality of hyperparameter search points to a plurality of model trainers of the one or more worker nodes. The plurality of model trainers in operation 3940, as illustrated in FIG. 40E, may include model trainers $A_1$ and $A_2$ 4006A-4006B of worker node A 4006, model trainers $B_1$, $B_2$, and $B_3$ 4008A-4008C of worker node B 4008, model trainer $C_1$ 4010A of worker node C 4010, and model trainer $N_1$ 4012A of worker node N 4012. It shall be noted that the example of FIG. 40E is not intended to be limiting and that worker nodes A-N 4006-

4012 may include additional, different, or fewer model trainers than illustrated in FIG. 40E without departing from the scope of the disclosure.

In some embodiments, a respective hyperparameter search point of operation 3940 may be assigned (e.g., allocated) to a respective model trainer. For example, as described previously in FIG. 40E, controller node 4002 may distribute hyperparameter search point 4018M to worker node C 4010. Accordingly, based on receiving hyperparameter search point 4018M, worker node C 4010 may subsequently assign hyperparameter search point 4018M to model trainer $C_1$ 4010A.

It shall be noted that, in some embodiments, worker node C 4010 may not immediately assign hyperparameter search point 4018M to model trainer $C_1$ 4010A if model trainer $C_1$ 4010A is currently in use or engaged in a different operation. Accordingly, in some embodiments, worker node C 4010 may instead queue hyperparameter search point 4018M and delay the assignment until model trainer $C_1$ 4010A becomes available.

In some embodiments, a subset of the plurality hyperparameter search points in operation 3940 may be assigned to model trainers associated with different worker nodes. For example, as described previously in FIG. 40E, controller node 4002 may distribute hyperparameter search point 4018M (e.g., a first hyperparameter search point) and hyperparameter search point 4018CH (e.g., a second hyperparameter search point) to worker node C 4010 and worker node N 4012, respectively. Accordingly, based on such a distribution by controller node 4002, worker node C 4010 may assign hyperparameter search point 4018M to model trainer $C_1$ 4010A (e.g., a model trainer associated with worker node C 4010). Conversely, worker node N 4012 may assign hyperparameter search point 4018CH to model trainer $N_1$ 4012A (e.g., a model trainer associated with worker node N 4012).

In some embodiments, a subset of the plurality of hyperparameter search points in operation 3940 may be assigned to model trainers associated with a same worker node. For example, as described previously in FIG. 40E, controller node 4002 may distribute hyperparameter search points 4018AT and 4018BP (e.g., a first and a second hyperparameter search point) to worker node A 4006. Accordingly, based on such a distribution by controller node 4002, worker node A 4006 may assign hyperparameter search point 4018AT to model trainer $A_1$ 4006A. Conversely, worker node A 4006 may assign hyperparameter search point 4018BP to model trainer $A_2$ 4006B.

Furthermore, as also shown in FIG. 40E, controller node 4002 may distribute hyperparameter search points 4018H, 4018BU, and 40180 to worker node B 4008. Accordingly, based on such a distribution by controller node 4002, worker node B 4008 may assign hyperparameter search points 4018H, 4018BU, and 40180 to model trainers $B_1$, $B_2$, and $B_3$ 4008A-4008C, respectively.

It shall be noted that the above example(s) are not intended to be limiting and that the plurality of hyperparameter search points in operation 3940 may be assigned in other ways than illustrated in FIG. 40E without departing from the scope of the disclosure.

Referring to FIG. 39, method 3900 may proceed from operation 3940 to operation 3950. Operation 3950 may concurrently train, by the plurality of model trainers, a plurality of machine learning models based on the plurality of hyperparameter search points assigned to the plurality of model trainers. The plurality of machine learning models trained in operation 3950 may include or be similar to the plurality of machine learning models A-N 4022A-4022N illustrated in FIG. 40E.

In some embodiments, the plurality of machine learning models A-N 4022A-4022N may correspond to convolutional neural networks (CNNs), recurrent neural networks (RNNs), long short-term memory (LSTM) networks, and/or the like. Additionally, or alternatively, the plurality of machine learning models A-N 4022A-4022N may include gradient boosting models such as XGBoost or LightGBM, deep reinforcement learning models, transformer-based models such as BERT or GPT, and/or the like. It shall be noted that these examples are not intended to be limiting and that the plurality of machine learning models A-N 4022A-4022N may correspond to additional or different models without departing from the scope of the disclosure.

In some embodiments, a respective model trainer of model the plurality of model trainers 4006A-4006B, 4008A-4008C, 4010A, and 4012A may train a machine learning model based on an assigned hyperparameter search point. For example, as described previously, worker node A 4006 may assign hyperparameter search point 4018AT to model trainer $A_1$ 4006A. Accordingly, based on such an assignment by worker node A 4006, model trainer $A_1$ 4006A may train machine learning model A 4022A based on hyperparameter search point 4018AT.

Similarly, as also shown in FIG. 40E, worker node A 4006 may assign hyperparameter search point 4018BP to model trainer $A_2$ 4006B. Thus, based on such an assignment by worker node A 4006, model trainer $A_2$ 4006B may train machine learning model B 4022B based on hyperparameter search point 4018BP. It shall be noted that machine learning models A and B 4022A-4022B may be trained concurrently (e.g., model trainer $A_1$ 4006A may train machine learning model A 4022A while model trainer $A_2$ 4006B trains machine learning B 4022B).

It shall also be noted that the remaining model trainers 4008A-4008C, 4010A, and 4012A may also concurrently train machine learning models C-N 4022C-4022N in an analogous manner. Specifically, model trainer $B_1$ 4008A may train machine learning model C 4022C based on hyperparameter search point 4018H. Model trainer $B_2$ 4008B may train machine learning model D 4022D based on hyperparameter search point 4018BU. Model trainer $B_3$ 4008C may train machine learning model E 4022E based on hyperparameter search point 40180. Model trainer $C_1$ 4010A may train machine learning model F 4022F based on hyperparameter search point 4018M. Lastly, model trainer $N_1$ 4012A may train machine learning model N 4022N based on hyperparameter search point 4018CH.

In some embodiments, training a respective machine learning model of the plurality of machine learning models 4022A-4022N may include configuring one or more hyperparameters of the respective machine learning model (e.g., hyperparameters 4016-4018 in FIG. 40B). For instance, based on worker node A 4006 assigning hyperparameter search point 4018AT to model trainer $A_1$ 4006A, model trainer $A_1$ 4006A may subsequently configure one or more hyperparameters of machine learning model A 4022A according to (e.g., based on) the set of hyperparameter values corresponding to hyperparameter search point 4018AT.

The set of values corresponding to hyperparameter search point 4018AT may include a first value for hyperparameter 4016 (e.g., a value of 0.8 for momentum) and a second value for hyperparameter 4018 (e.g., a value of 0.4 for learning rate)—as described previously in FIG. 40B. Thus, in some embodiments, configuring hyperparameter 4016 for machine learning model A 4022A may include configuring (e.g., setting) the value of hyperparameter 4016 to the first value. Conversely, configuring hyperparameter 4018 for machine learning model A 4022A may include configuring (e.g., setting) the value of hyperparameter 4018 to the second value.

In another non-limiting example, the set of values corresponding to hyperparameter search point 4018BP may include a third value for hyperparameter 4016 (e.g., a value of 0.1 for momentum) and a fourth value for hyperparameter 4018 (e.g., a value of 0.9 for learning rate). Thus, in such an example, model trainer $A_2$ 4006B may configure machine learning model B 4022B by at least configuring (e.g., setting) the value of hyperparameter 4016 to the third value and the value of hyperparameter 4018 to the fourth value.

In yet another non-limiting example, the set of values corresponding to hyperparameter search point 4018H may include a fifth value for hyperparameter 4016 (e.g., a value of 0.15 for momentum) and a sixth value for hyperparameter 4018 (e.g., a value of 0.25 for learning rate). Thus, in such an example, model trainer $B_1$ 4008A may configure machine learning model C 4022C by at least configuring (e.g., setting) the value of hyperparameter 4016 to the fifth value and the value of hyperparameter 4018 to the sixth value. It shall be noted that the remaining model trainers $B_2$ 4008B, $B_3$ 4008C, $C_1$ 4010A, and $N_1$ 4012A may configure machine learning models D-N 4022D-4022N in analogous ways as model trainers $A_1$ 4006A, $A_2$ 4006B, and $B_1$ 4008A.

In some embodiments, a respective model trainer of the plurality of model trainers 4006A-4006B, 4008A-4008C, 4010A, and 4012A may include a computational processing unit. The computational processing unit may comprise one or more graphics processing units (GPUs), one or more central processing units (CPUs), or a combination thereof. Additionally, in some embodiments, the computational processing unit may be configured (e.g., used) to train a respective machine learning model. For example, a computational processing unit of model trainer $A_1$ 4006A may comprise one or more graphics processing units (GPUs) that are configured or used to train machine learning model A 4022A.

Conversely, a computational processing unit of model trainer $A_2$ 4006B may comprise one or more graphics processing units (GPUs) that are configured or used to train machine learning model B 4022B. It shall be noted that a computational processing unit of the remaining model trainers 4008A-4008C, 4010A, and 4012A may analogously include one or more graphics processing units (GPUs), one or more central processing units (CPUs), or a combination thereof.

The computational processing units of the plurality of model trainers 4006A-4006B, 4008A-4008C, 4010A, and 4012A may support concurrent training of the plurality of machine learning models 4022A-4022N. Specifically, as shown in FIG. 40E, the computational processing units of the plurality of model trainers 4006A-4006B, 4008A-4008C, 4010A, and 4012A may train the plurality of machine learning models 4022A-4022N concurrently. Concurrently training the plurality of machine learning models 4022A-4022N, as generally used herein, may refer to the simultaneous or parallel training of the plurality of machine learning models 4022A-4022N via the plurality of model trainers 4006A-4006B, 4008A-4008C, 4010A, and 4012A.

Referring to FIG. 39, method 3900 may proceed from operation 3950 to operation 3960. Operation 3960 may compute, by the plurality of model trainers, a plurality of performance metrics that measure a performance of the plurality of machine learning models. The plurality of performance metrics computed in operation 3960 may be similar to the plurality of performance metrics 4024A-4024N illustrated in FIG. 40E.

In some embodiments, the plurality of performance metrics 4024A-4024N may correspond to a respective machine learning model of the plurality of machine learning models 4022A-4022N. For example, performance metric A 4024A may correspond to machine learning model 4022A. Conversely, performance metric B 4024B may correspond to machine learning model 4022B. It shall be noted that performance metrics C-N 4024C-4024N may correspond to machine learning models 4022C-4022N in analogous ways.

As will be described in more detail in operation 3980, a respective performance metric may directly or indirectly indicate an efficacy of a respective hyperparameter search point. For example, performance metric A 4024A may directly or indirectly indicate an efficacy of hyperparameter search point 4018AT. Specifically, a higher value for performance metric A 4024A may indicate that the hyperparameter values specified in hyperparameter search point 4018AT were effective in optimizing the training of machine learning model A 4022A. Conversely, a lower value for performance metric A 4024A may indicate that the hyperparameter values specified in hyperparameter search point 4018AT was less effective in optimizing the training machine learning model A 4022A.

Similarly, performance metric B 4024B may directly or indirectly indicate an efficacy of hyperparameter search point 4018BP. A higher value for performance metric B 4024B may indicate that the hyperparameter values specified in hyperparameter search point 4018BP were effective in optimizing the training of machine learning model B 4022B. Conversely, a lower value for performance metric B 4024B may indicate that the hyperparameter values specified in hyperparameter search point 4018AT were less effective in optimizing the training machine learning model B 4022B. The performance metrics C-N 4024C-4024N may respectively indicate an efficacy of hyperparameter search points 4018H, 4018BU, 40180, 4018M, and 4018CH in analogous ways.

Additionally, as shown in FIG. 40E, the plurality of performance metrics A-N 4024A-4024N may be computed by the plurality of model trainers 4006A-4006B, 4008A-4008C, 4010A, and 4012A, respectively. For instance, model trainer $A_1$ 4006A may compute performance metric A 4024A based on training results of machine learning model A 4022A. Similarly, model trainer $A_2$ 4006B may compute performance metric B 4024B based on training results of machine learning model B 4022B.

In some embodiments, the plurality of performance metrics A-N 4024A-4024N may correspond to a loss metric. A loss metric, as generally used herein, may measure an error between predictions of a respective machine learning model and actual target values (e.g., ground truth values) during training. For example, performance metric A 4024A may correspond to a loss metric that measures an error between predictions of machine learning model A 4022A and actual target values (e.g., ground truth values) during training. Conversely, performance metric B 4024B may correspond to a loss metric that measures an error between predictions of machine learning model B 4022B and actual target values (e.g., ground truth values) during training. Analogously, performance metrics C-N 4024C-4024N may correspond to loss metrics that measure errors of machine learning models 4022C-4022N, respectively.

Additionally, or alternatively, the plurality of performance metrics A-N 4024A-4024N may include or correspond to other model metrics without departing from the scope of the disclosure. For example, the plurality of performance metrics A-N 4024A-4024N may additionally include or correspond to accuracy metrics, precision metrics, recall metrics, F1-scores, AUC-ROC scores, log-loss, cross-entropy loss, mean squared error (MSE), mean absolute error (MAE), and/or the like.

Referring to FIG. 39, method 3900 may proceed from operation 3960 to operation 3970. Operation 3970 may transmit the plurality of performance metrics from the one or more worker nodes to the controller node. The plurality of performance metrics transmitted in operation 3970 may include or be similar to the plurality of performance metrics A-N 4024A-4024N described previously in FIG. 40E.

Specifically, as shown in FIG. 40E, the plurality of worker nodes A-N 4006-4012 may transmit the plurality of performance metrics A-N 4024A-4024N to controller node 4002. The plurality of performance metrics A-N 4024A-4024N may be transmitted asynchronously or in a batch. For instance, performance metric A 4024A may be computed before performance metric B 4024B. Accordingly, worker node A 4006 may asynchronously transmit performance metric A 4024A to controller node 4002 as soon as performance metric A 4024A is computed, without waiting for worker node A 4006 to compute performance metric B 4024B. Similarly, worker nodes B-N 4008-4012 may transmit performance metrics C-N 4024C-4024N in an analogous manner.

Additionally, as shown in FIG. 40E, controller node 4002 may receive the plurality of performance metrics A-N 4024A-4024N transmitted by worker nodes 4006-4012. Controller node 4002 may receive the plurality of performance metrics A-N 4024A-4024N asynchronously or in batches. For instance, controller node 4006 may receive performance metric A 4024A before receiving performance metric B 4024B. Alternatively, controller node 4002 may receive performance metrics C-E 4024C-4024E from worker node B 4008 in a single batch (e.g., all at once). Controller node 4002 may receive performance metrics F-N 1524F-1524N in analogous ways.

Referring to FIG. 39, method 3900 may proceed from operation 3970 to 3980. Operation 3980 may determine, by the controller node, one or more sets of optimal hyperparameter values for the plurality of hyperparameters based on the plurality of performance metrics. A set of optimal hyperparameter values, as generally used herein, may refer to a configuration of hyperparameter values that results in improved or maximized performance of a machine learning model.

In a non-limiting example, the one or more sets of optimal hyperparameter values in operation 3980 may be determined based on the plurality of performance metrics 4024A-4024N illustrated in FIG. 40E. Specifically, as illustrated in FIG. 40E, controller node 4002 (e.g., via distributed training orchestrator 4004) may determine one or more sets of optimal hyperparameter values based on the plurality of performance metrics A-N 4024A-4024N.

In some embodiments, determining the one or more sets of optimal hyperparameter values based on the plurality of performance metrics A-N 4024A-4024N may include determining a performance metric of the plurality of performance metrics A-N 4024A-4024N that satisfies a pre-defined performance criterion. For example, as shown in FIG. 40E, controller node 4002 may determine that performance metric N 4024N may satisfy the pre-defined performance criterion.

In some embodiments, controller node 4002 may determine that performance metric N 4024N satisfies the pre-defined performance criterion when such respective performance metric corresponds a lowest value (e.g., lowest loss) among a remainder of the plurality of performance metrics A-N 4024A-4024N or falls within a pre-defined range of lowest values. Conversely, controller node 4002 may determine that performance metric N 4024N does not satisfy the pre-defined performance criterion when such respective performance metric does not correspond to the lowest value (e.g., lowest loss) or fails to meet the specified range of lowest values.

Alternatively, performance metric N 4024N may satisfy the pre-defined performance criterion if such performance metric corresponds to a highest value (e.g., highest accuracy, precision, recall) among a remainder of the plurality of performance metrics A-N 4024A-4024N or falls within a pre-defined range of highest values. Conversely, performance metric N 4024N may not satisfy the pre-defined performance criterion when such respective performance metric does not correspond to the highest value or fails to meet the specified range of highest values.

It shall be noted that FIG. 40E is not intended to be limiting and that controller node 4002 may determine that additional or different performance metrics may satisfy the pre-defined performance criterion without departing from the scope of the disclosure. For example, the pre-defined performance criterion may correspond to a multi-objective criterion. For instance, in a non-limiting example, controller node 4002 may determine that performance metric N 4024N (e.g., a loss metric) satisfies a loss-minimization objective (e.g., a first criterion, such as minimizing mean squared error or cross-entropy loss), while performance metric F 4024F or another performance metric computed by model trainer $C_1$ 4010A (e.g., an accuracy metric) satisfies an accuracy-maximization objective (e.g., a second criterion, such as maximizing accuracy or precision). In such an example, the steps of operation 3980 may be performed for the identified performance metric 4024F, the other performance metric computed by model trainer $C_1$ 4010A, and/or the performance metric 4024N (as opposed to a single performance metric).

In some embodiments, determining the one or more sets of optimal hyperparameter values based on the plurality of performance metrics A-N 4024A-4024N may further include identifying a hyperparameter search point used to train a machine learning model associated with performance metric N 4024N. As described previously in FIG. 40E, the machine learning model associated with performance metric N 4024 may correspond to machine learning model N 4022N. Thus, in some embodiments, the hyperparameter search point identified by controller node 4002 may correspond to the hyperparameter search point 4018CH that was used to train machine learning model N 4022N.

It shall be noted that if controller node 4002 additionally, or alternatively, determined that one or more other performance metrics satisfied the pre-defined performance criterion, controller node 4002 may additionally, or alternatively, identify hyperparameters directly or indirectly associated with such other performance metrics in analogous ways.

In some embodiments, determining the one or more sets of optimal hyperparameter values based on the plurality of performance metrics A-N 4024A-4024N may further include selecting hyperparameter values associated with the hyperparameter search point 4018CH as one of the one or more sets of optimal hyperparameter values. For instance, for the reasons described previously hyperparameter search point 4018CH may include a first value for hyperparameter 4016 (e.g., momentum=0.35) and a second value for hyperparameter 4018 (e.g., learning rate=0.15). Thus, in some embodiments, controller node 4002 may select the first value for hyperparameter 4016 and the second value for hyperparameter 4018 as a set of optimal hyperparameter values for the plurality of hyperparameters 4016-4018 (e.g., the set of optimal hyperparameter values for minimizing loss).

In a multi-objective optimization scenario, controller node 4002 may also determine that hyperparameter search point 4018M satisfies a different objective of the multi-objective performance criterion based on performance metric F 4024F (e.g., maximizes accuracy). Hyperparameter search point 4018M may include a third value for hyperparameter 4016 (e.g., momentum=0.45) and a fourth value for hyperparameter 4018 (e.g., learning rate=0.25). Thus, in some embodiments, controller node 4002 may select the first value for hyperparameter 4016 and the second value for hyperparameter 4018 of hyperparameter search point 4018CH as the set of optimal hyperparameter values for minimizing loss (e.g., a first objective criterion), and separately select the third value for hyperparameter 4016 and the fourth value for hyperparameter 4018 of hyperparameter search point 4018M as the set of optimal hyperparameter values for maximizing accuracy. Additionally, or alternatively, Referring to FIG. 39, method 3900 may proceed from operation 3980 to operation 3990. Operation 3990 may output, by the controller node, the one or more sets of optimal hyperparameter values. For example, as described previously in FIG. 40E, the one or more sets of optimal hyperparameter values may include a set of hyperparameter values associated with hyperparameter search points 4018M and/or a set of hyperparameter values associated with hyperparameter search point 4018CH. Thus, in a non-limiting example of operation 3990, controller node 4002 may output the set of hyperparameter values associated with hyperparameter search points 4018M and/or the set hyperparameter values associated with hyperparameter search point 4018CH.

In some embodiments, outputting the set of hyperparameter values associated with hyperparameter search points 4018M and/or 4018CH may include transmitting the set of hyperparameter values associated with hyperparameter search points 4018M and/or 4018CH to an external system, application, or interface for further processing. For example, controller node 4002 may transmit the hyperparameter values to a deployment system configured to use the values for initializing a machine learning model.

Alternatively, the set of hyperparameter values associated with hyperparameter search points 4018M and/or 4018CH may be outputted to a database or similar storage system for future use or reference. For instance, controller node 4002 may log the set of hyperparameter values associated with hyperparameter search points 4018M and/or 4018CH alongside corresponding performance metrics to facilitate comparisons or further optimization processes.

In yet another non-limiting example, the set of hyperparameter values associated with hyperparameter search points 4018M and/or 4018CH may be outputted via a command-line interface (CLI), an application programming interface (API), or a graphical user interface (GUI). For instance, controller node 4002 may output the set of hyperparameter values associated with hyperparameter search points 4018M and/or 4018CH through a command-line interface for use in automated scripts, through an API for integration with external applications, or through a GUI for interactive visualization and/or manual evaluation by a user.

It shall be noted that, in the method(s) described herein where one or more steps (e.g., processes) are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system, computer readable storage medium, and computer-program product can repeat the steps of a method as many times as are needed to ensure that all of the contingent steps have been performed.

In some portions of the disclosure, operations 3910-3990 may be referred to as operations (A)-(I), respectively. Furthermore, operation (H) (e.g., operation 3980) may determine the one or more sets of optimal hyperparameter values by repeating operations (B)-(G) (e.g., operations 3920-3970) for one or more additional selections of hyperparameter search points until the one or more sets of optimal hyperparameter values are detected. For instance, as described in operation 3920, a subset of hyperparameter search points may be selected from hyperparameter search space 4014.

Accordingly, repeating operations (B)-(G) for one or more additional selections of hyperparameter search points may include selecting a new subset of hyperparameter search points from the hyperparameter search space, distributing the newly selected subset to one or more worker nodes, assigning the distributed hyperparameter search points to model trainers, training a plurality of machine learning models based on the assigned hyperparameter search points, computing performance metrics for the trained machine learning models, and transmitting the computed performance metrics to the controller node for evaluation. It shall be noted that this iterative process may continue until the one or more sets of optimal hyperparameter values are identified based on the performance metrics.

It should be noted that a computer-program product may include a non-transitory machine-readable storage medium storing computer instructions that, when executed by one or more operations, may perform operations corresponding to the processes and sub-processes of method 3900. Additionally, or alternatively, a computer-implemented method may include operations corresponding to processes and sub-processes of 3900. Additionally, or alternatively, a computer-implemented system may include one or more processors, a memory, and a computer-readable medium operably coupled to the one or more processors, the computer-readable medium having computer-readable instructions stored thereon that, when executed by the one or more processors, cause a computing device to perform operations corresponding to the processes and sub-processes of method 3900. Additionally, or alternatively, an apparatus may comprise at least one processor and a storage to store instructions that, when executed by the at least one processor, cause the at least one processor to perform any of the processes and sub-processes of 3900.

Figure 41:
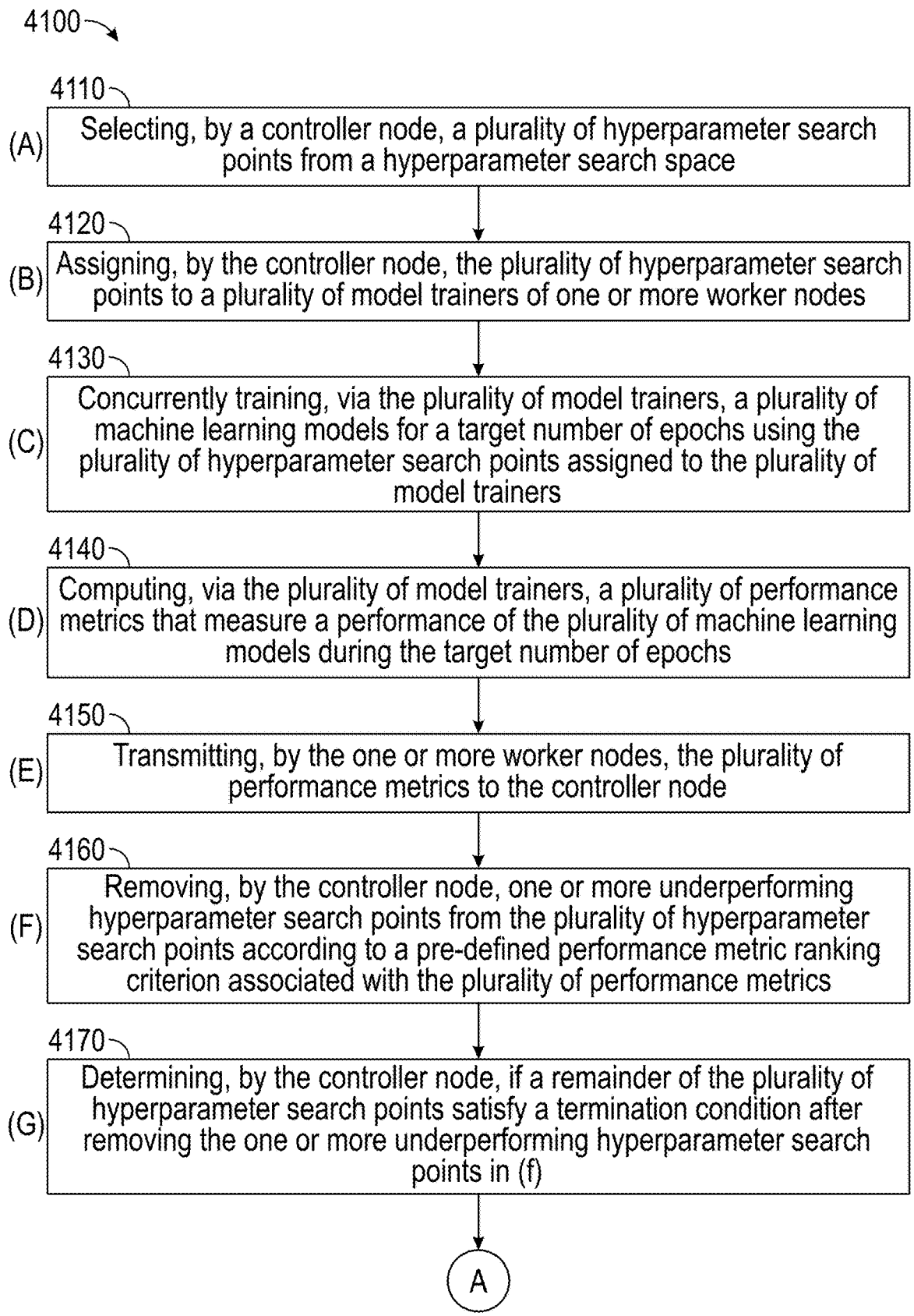
FIG. 41 illustrates an example flowchart of a method for identifying one or more optimal hyperparameter search points through iterative removal of underperforming hyperparameter search points, according to some embodiments of the present technology.
Figure 41:
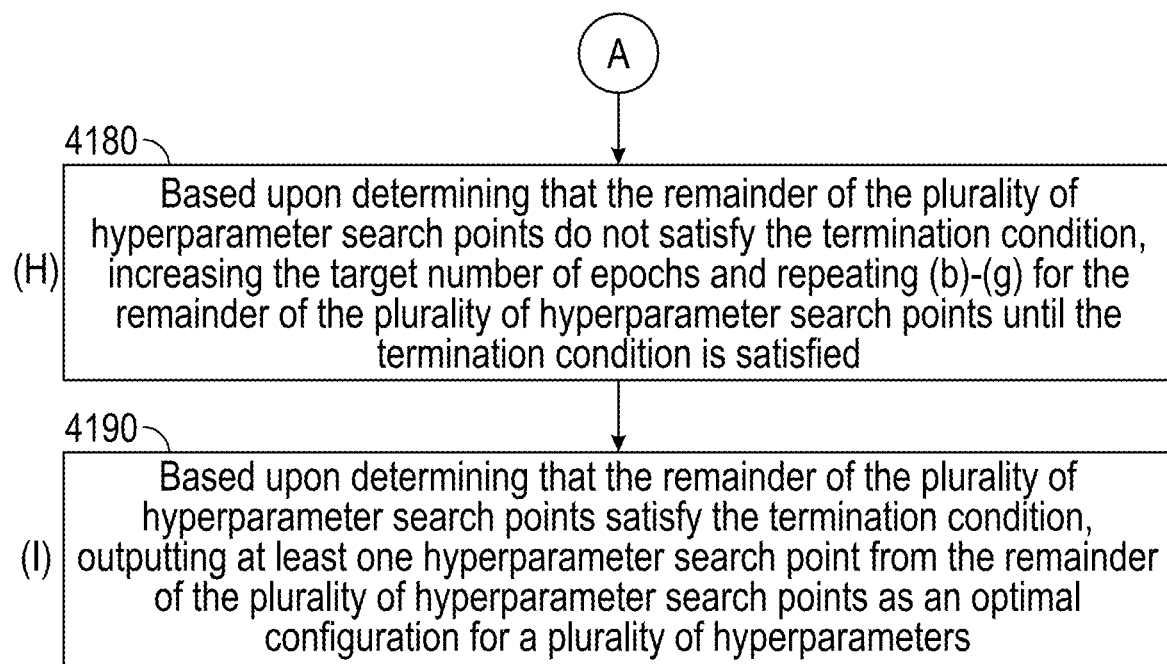

FIG. 41 illustrates a method 4100 for identifying one or more optimal hyperparameter search points through iterative removal of underperforming hyperparameter search points. It shall be appreciated that other embodiments contemplated within the scope of the present disclosure may involve more operations, fewer operations, different operations, or a different order of operations than illustrated in FIG. 41.

One of ordinary skill in the art will appreciate that method 4100 may provide numerous technical advantages and practical applications over traditional manual or exhaustive hyperparameter optimization techniques. Conventional methods typically allocate equal computational resources to all hyperparameter configurations, regardless of their performance potential. This uniform allocation often leads to substantial inefficiencies, as resources are wasted on configurations that ultimately fail to produce competitive results. Moreover, these conventional methods do not adapt dynamically, making them impractical for exploring the increasingly large and complex hyperparameter spaces associated with modern machine learning models.

Method 4100 addresses these challenges by incorporating an adaptive resource allocation strategy that iteratively evaluates and removes underperforming hyperparameter configurations. Through this iterative pruning process, resources are progressively reallocated to hyperparameter configurations that demonstrate greater promise. Thus, the approach of method 4100 reduces overall computational burden and accelerates the discovery of optimal hyperparameter configurations, as only the most promising hyperparameter search points receive further evaluation.

As illustrated in FIG. 41, method 4100 may include operation 4110 (sometimes referred to as operation (A)). Operation 4110 may select, by a controller node, a plurality of hyperparameter search points from a hyperparameter search space. The plurality of hyperparameter search points selected in operation 4110 may correspond or be similar to the plurality of hyperparameter search points A-N 4208A-4208N illustrated in FIG. 42A. It shall be noted that the example of FIG. 42A is not intended to be limiting and that operation 4110 may select additional, fewer, or different hyperparameter search points than illustrated in FIG. 42A without departing from the scope of the disclosure.

Figure 42A:
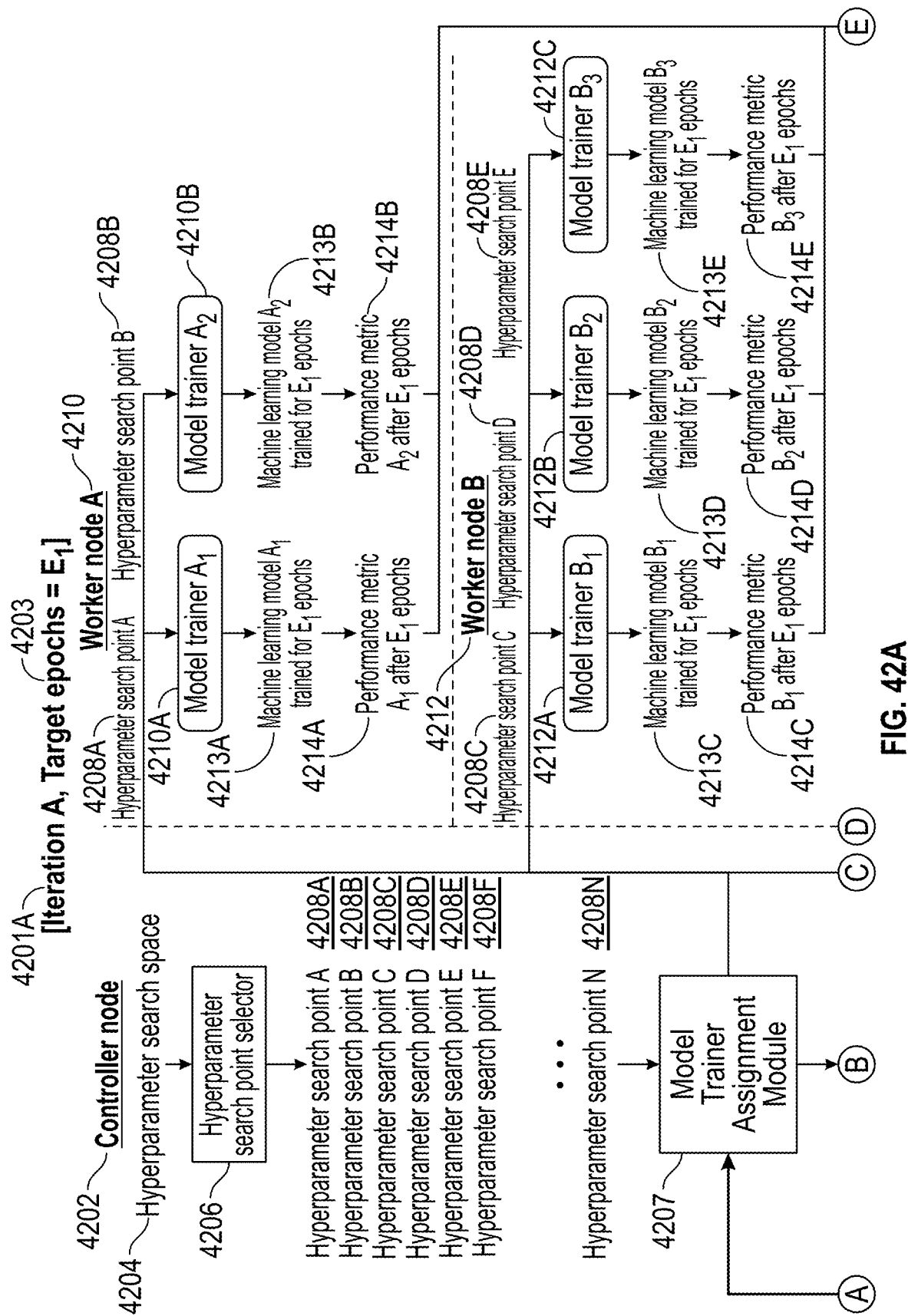
FIGS. 42A-42C illustrate examples of iteratively removing one or more underperforming hyperparameter search points over one or more iterations, according to some embodiments of the present technology.
Figure 42A:
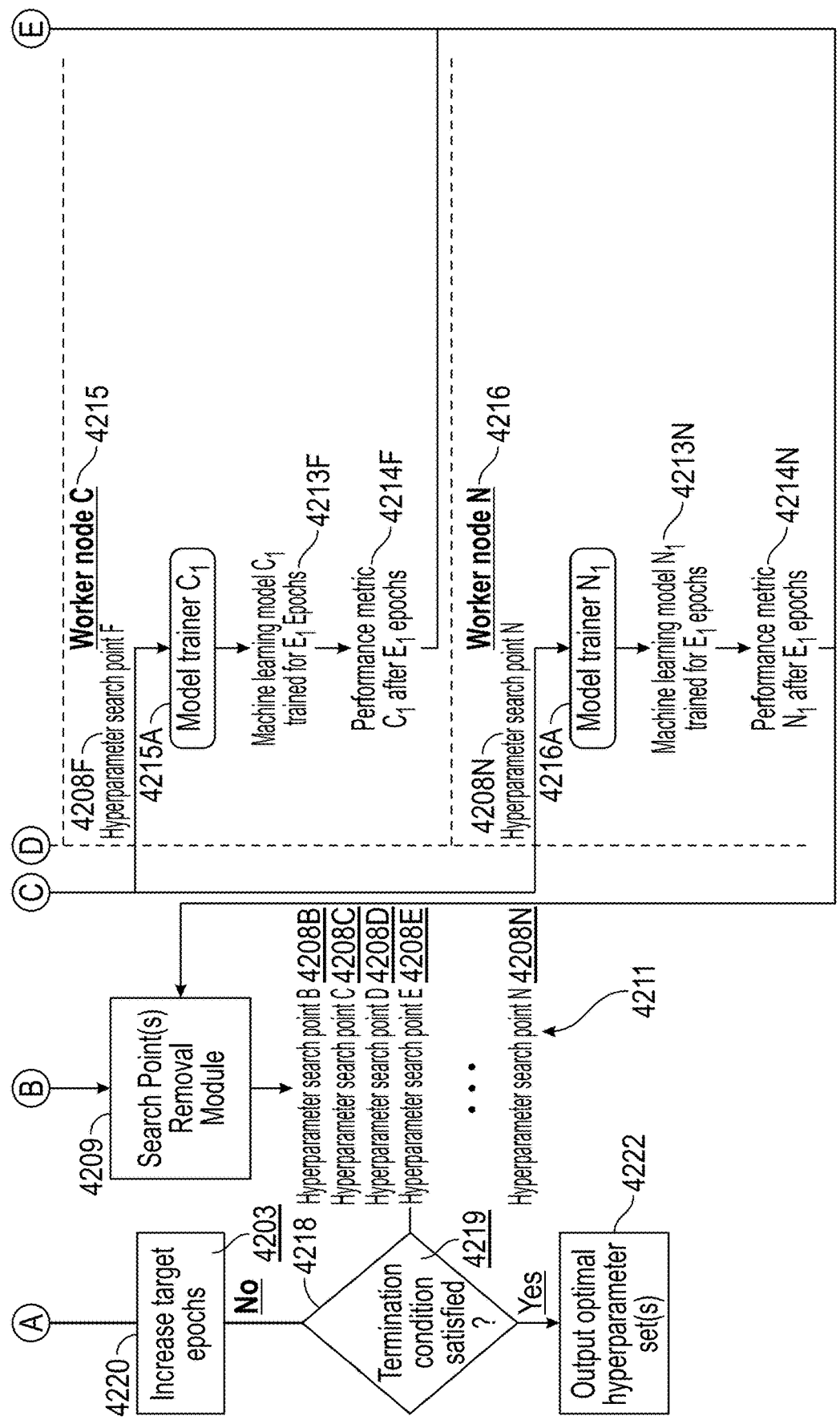

As shown in FIG. 42A, controller node 4202 may use hyperparameter search point selector 4206 to select the plurality of hyperparameter search points A-N 4208A-4208N from hyperparameter search space 4204. Controller node 4202, hyperparameter search space 4204, and hyperparameter search point selector 4206 may correspond, or share one or more characteristics with, controller node 4002 illustrated in FIG. 40A, hyperparameter search space 4014 illustrated in FIG. 40B, and hyperparameter search point selector 4016 illustrated in FIG. 40C, respectively. Similarly, controller node 4202 may select the plurality of hyperparameter search points A-N 4208A-4208N for similar reasons as hyperparameter search points 4018AT, 4018BP, 4018H, 4018BU, 4018O, 4018M, and 4018CH illustrated in FIG. 40D.

In some embodiments, the plurality of hyperparameter search points 4208A-4208N may represent a starting pool of hyperparameter search points. For instance, in a non-limiting example, the plurality of hyperparameter search points A-N 4208A-4208N may correspond to hyperparameter search points initially sampled from the hyperparameter search space 4204. In turn, as will be described in greater detail herein with reference to operation 4180, method 4100 may process the plurality of hyperparameter search points A-N 4208A-4208N over one or more iterations 4201A-4201N to determine one or more optimal hyperparameter search points from the plurality of hyperparameter search points A-N 4208A-4208N.

In some embodiments, the plurality of hyperparameter search points A-N 4208A-4208N may include at least a pre-defined number of hyperparameter search points from the hyperparameter search space 4204. For example, the plurality of hyperparameter search points A-N 4208A-4208N may include 100% (e.g., all) of the hyperparameter search points within the hyperparameter search space 4204. Alternatively, in some embodiments, the plurality of hyperparameter search points A-N 4208A-4208N may include 75% of the hyperparameter search points within the hyperparameter search space 4204. In yet another example, the plurality of hyperparameter search points A-N 4208A-4208N may include 50% of the hyperparameter search points within the hyperparameter search space 4204.

It shall be noted that the above example(s) are not intended to be limiting and that the plurality of hyperparameter search points A-N 4208A-4208N may include a different amount of hyperparameter search points without departing from the scope of the disclosure (e.g., 95%, 85%, 65%, 45%, 20%, 10%, etc.). It shall also be noted that, in some embodiments, the hyperparameter search point selector 4206 may select the hyperparameter search points A-N 4208A-4208N in a randomized manner (e.g., when the pre-defined amount of hyperparameter search points to select from hyperparameter search space 4204 is less than 100%).

Referring to FIG. 41, method 4100 may proceed from operation 4110 to operation 4120 (sometimes referred to as operation (B)). Operation 4120 may assign, by the controller node, the plurality of hyperparameter search points to a plurality of model trainers of one or more worker nodes. The plurality of hyperparameter search points assigned in operation 4120 may correspond or be similar to the plurality of hyperparameter search points A-N 4208A-4208N described previously in FIG. 42A. It shall be noted that the example of FIG. 42A is not intended to be limiting and that operation 4120 may assign additional, fewer, or different hyperparameter search points than illustrated in FIG. 42A without departing from the scope of the disclosure.

In some embodiments, controller node 4202 may assign a respective hyperparameter search point of the plurality hyperparameter search points A-N 4208A-4208N to a respective model trainer. For example, as shown in FIG. 42A, controller node 4202 may provide the plurality of hyperparameter search points A-N 4208A-4208N to a model trainer assignment module 4207. In turn, as also illustrated in FIG. 42A, the model trainer assignment module 4207 may respectively assign the hyperparameter search points A and B 4208A-4208B to model trainers $A_1$ and $A_2$ 4210A-4210B of worker node A 4210, hyperparameter search points C, D, and E 4208C-4208E to model trainers $B_1$, $B_2$, and $B_3$ 4212A-4212C of worker node B 4212, hyperparameter search point F 4208F to model trainer $C_1$ 4215A of worker node C 4215, and/or hyperparameter search point N 4208N to model trainer $N_1$ 4216A of worker node N 4216.

Additionally, or alternatively, controller node 4202 may distribute and assign the plurality of hyperparameter search points 4208A-4208N in similar ways described in operations 3930 and 3940 of method 3900. It shall be noted that worker nodes A-N 4210-4216 may correspond to, or share one or more characteristics with, the worker nodes A-N 4006-4012 illustrated in FIG. 40A, respectively. Similarly, model trainers $A_1$ 4210A, $A_2$ 4210B, $B_1$ 4212A, $B_2$ 4212B, $B_3$ 4212C, $C_1$ 4215A, and $N_1$ 4216A may correspond to, or share one or more characteristics with, the model trainers $A_1$ 4006A, $A_2$ 4006B, $B_1$ 4008A, $B_2$ 4008B, $B_3$ 4008C, $C_1$ 4010A, and $N_1$ 4012A illustrated in FIG. 40A, respectively.

In some embodiments, if a number of available model trainers is fewer than the plurality of hyperparameter search points A-N 4208A-4208N, a subset of the hyperparameter search points A-N 4208A-4208N may be routed to a queue until a model trainer becomes available. For instance, in a non-limiting example, worker node C 4215 and worker node N 4216 may not be available (e.g., due to being busy processing other hyperparameter search points, offline, under maintenance, etc.). Thus, in some embodiments, controller node 4202 may instead assign hyperparameter search points F-N 4208F-4208N to a queue while hyperparameter search points A-E 4208A-4208E are being processed by the plurality of model trainers $A_1$-$A_2$ 4210A-4210B and $B_1$-$B_3$ 4212A-4212C, respectively. It shall be noted that such a queue may decouple the number of hyperparameter search points from the number of available model trainers, thus enabling method 4100 to handle large hyperparameter search spaces without requiring a one-to-one mapping of hyperparameter search points to model trainers.

The hyperparameter search points F-N 4208F-4208N may remain in the queue until the plurality of model trainers $A_1$-$A_2$ 4210A-4210B and $B_1$-$B_3$ 4212A-4212C become available. For instance, after model trainer $A_1$ 4210A finishes a training task associated with hyperparameter search point A 4208A, controller node 4202 may detect the availability of model trainer $A_1$ 4210A and, subsequently, assign hyperparameter search point F 4208F to model trainer $A_1$ 4210A. Similarly, after model trainer $B_1$ 4212A finishes a training task associated with hyperparameter search point C 4208C, controller node 4202 may detect the availability of model trainer $B_1$ 4212A and, subsequently, assign hyperparameter search point N 4208N to model trainer $B_1$ 4212A.

It shall be noted that, in some portions of the disclosure, one or more of above-mentioned operations of controller node 4202 may collectively be referred to as instructing, by the controller node, one or more worker nodes to concurrently train a plurality of machine learning models for a target number of epochs using the plurality of hyperparameter search points. For example, controller node 4202 may send commands to worker nodes A-N 4210-4216 to initiate the (e.g., concurrent) training of machine learning models $A_1$-$N_1$ 4213A-4213N described herein.

Referring to FIG. 41, method 4100 may proceed from operation 4120 to operation 4130 (sometimes referred to as operation (C)). Operation 4130 may concurrently train, via the plurality of model trainers, a plurality of machine learning models for a target number of epochs using the plurality of hyperparameter search points assigned to the plurality of model trainers. The plurality of machine learning models concurrently trained in operation 4130 may include or correspond to the plurality of machine learning models $A_1$-$N_1$ 4213A-4213N illustrated in FIG. 42A. It shall be noted that the example of FIG. 42A is not intended to be limiting and that operation 4130 may concurrently train additional, fewer, or different machine learning models than illustrated in FIG. 42A without departing from the scope of the disclosure.

As shown in FIG. 42A, the plurality of model trainers $A_1$-$N_1$ 4210A-4210B, 4212A-4212C, 4215A, and 4216A may concurrently train the plurality of machine learning models $A_1$-$N_1$ 4213A-4213N. Concurrently training the plurality of machine learning models $A_1$-$N_1$ 4213A-4213N, as generally used herein, may refer to training the plurality of machine learning models $A_1$-$N_1$ 4213A-4213N simultaneously or substantially simultaneously across the plurality of model trainers $A_1$-$N_1$ 4210A-4210B, 4212A-4212C, 4215A, and 4216A. For example, model trainer $A_1$ 4210A may train machine learning model $A_1$ 4213A while model trainers $A_2$ 4210B, $B_1$-$B_3$ 4212A-4212C, $C_1$ 4215A, and $N_1$ 4216A simultaneously train machine learning models $A_2$-$N_1$ 4213B-4213N.

In some embodiments, a number of machine learning models trained by the plurality of model trainers $A_1$-$N_1$ 4210A-4210B, 4212A-4212C, 4215A, and 4216A may correspond or be equivalent to a number of hyperparameter search points included in the plurality of hyperparameter search points A-N 4208A-4208N. For instance, if the plurality of hyperparameter search points A-N 4208A-4208N correspond to 7, 10, 20, 40, 100, 200, 400, 800, etc. hyperparameter search points, the plurality of machine learning models $A_1$-$N_1$ 4213A-4213N may similarly correspond to 5, 7, 10, 20, 40, 100, 200, 400, 800, etc. machine learning models, respectively.

In some embodiments, as also illustrated in FIG. 42A, the plurality of model trainers $A_1$-$N_1$ 4210A-4210B, 4212A-4212C, 4215A, and 4216A may concurrently train the plurality of machine learning models $A_1$-$N_1$ 4213A-4213N for a target number of epochs 4203. The target number of epochs 4203, as generally used herein, may control how many epochs the plurality of model trainers $A_1$-$N_1$ 4210A-4210B, 4212A-4212C, 4215A, and 4216A use to train the plurality of machine learning models $A_1$-$N_1$ 4213A-4213N in a respective iteration of method 4100. For example, in some embodiments, the target number of epochs 4203 may be set to $E_1$ epochs (e.g., 1, 2, 4, 5, 10, 15, 20, etc. epochs). Accordingly, during iteration A 4201A of method 4100, the plurality of model trainers $A_1$-$N_1$ 4210A-4210B, 4212A-4212C, 4215A, and 4216A may concurrently train each of the plurality of machine learning models $A_1$-$N_1$ 4213A-4213N for $E_1$ epochs (e.g., 1, 2, 4, 5, 10, 15, 20, etc. epochs), respectively.

In some embodiments, a respective model trainer of the plurality of model trainers $A_1$-$N_1$ 4210A-4210B, 4212A-4212C, 4215A, and 4216A may train a machine learning model based on an assigned hyperparameter search point. For example, as described previously, model trainer assignment module 4207 may assign hyperparameter search point A 4208A to model trainer $A_1$ 4210A during iteration A 4201A. Thus, in some such embodiments, model trainer $A_1$ 4210A may use hyperparameter search point A 4208A to train machine learning model $A_1$ 4213A for the target number of epochs 4203. Conversely, as also shown in FIG. 42A, model trainer assignment module 4207 may assign hyperparameter search point B 4208B to model trainer $A_2$ 4210B during iteration A 4201A. Thus, in some such embodiments, model trainer $A_2$ 4210B may use hyperparameter search point B 4208B to train machine learning model $A_2$ 4213B for the target number of epochs 4203.

It shall be noted that the other model trainers $B_1$-$N_1$ 4212A-4212C, 4215A, and 4216A may concurrently train machine learning models $B_1$-$N_1$ 4213C-4213N in analogous ways. Specifically, model trainer $B_1$ 4212A may train machine learning model $B_1$ 4213C using hyperparameter search point C 4208C. Model trainer $B_2$ 4212B may train machine learning model $B_2$ 4213D using hyperparameter search point D 4208D. Model trainer $B_3$ 4212C may train machine learning model $B_3$ 4213E using hyperparameter search point E 4212E. Model trainer $C_1$ 4215A may train machine learning model $C_1$ 4213F using hyperparameter search point F 4208F. Lastly, model trainer $N_1$ 4216A may train machine learning model $N_1$ 4213N using hyperparameter search point N 4208N.

In some embodiments, using hyperparameter search point A 4208A to train machine learning model $A_1$ 4213A for the target number of epochs 4203 may include using the hyperparameter values associated with hyperparameter search point A 4208A. For example, for the same reasons described in method 3900, hyperparameter search point A 4208A may include or specify hyperparameter values for the plurality of hyperparameters 4016-4018. Specifically, the hyperparameter values specified in hyperparameter search point A 4208A may include a first value for hyperparameter 4016 (e.g., momentum=0.6) and a second value for hyperparameter 4018 (e.g., learning rate=0.2). Thus, in some embodiments, model trainer $A_1$ 4210B may train machine learning model $A_1$ 4213A using the first value for hyperparameter 4016 and the second value for hyperparameter 4018.

Conversely, in some embodiments, using hyperparameter search point B 4208B to train machine learning model $A_2$ 4213B for the target number of epochs 4203 may include using the hyperparameter values associated with hyperparameter search point B 4208B. For example, for the same reasons described in method 3900, hyperparameter search point B 4208B may include or specify hyperparameter values for the plurality of hyperparameters 4016-4018. Specifically, the hyperparameter values specified in hyperparameter search point B 4208B may include a third value for hyperparameter 4016 (e.g., momentum=0.25) and a fourth value for hyperparameter 4018 (e.g., learning rate=0.75). Thus, in some embodiments, model trainer $A_2$ 4210B may train machine learning model $A_2$ 4213B using the third value for hyperparameter 4016 and the fourth value for hyperparameter 4018.

Analogously, the other model trainers $B_1$-$N_1$ 4212A-4212C, 4215A, and 4216A illustrated in FIG. 42A may use the hyperparameter values associated with hyperparameter search points C-N 4208C-4208N to train machine learning models $C_1$-$N_1$ 4213C-4213N, respectively. Specifically, model trainer $B_1$ 4212A may train machine learning model $B_1$ 4213C using the hyperparameter values associated with hyperparameter search point C 4212C. Model trainer $B_2$ 4212B may train machine learning model $B_2$ 4213D using the hyperparameter values associated with hyperparameter search point D 4212D. Model trainer $B_3$ 4212C may train machine learning model $B_3$ 4213E using the hyperparameter values associated with hyperparameter search point E 4212E. Model trainer $C_1$ 4215A may train machine learning model $C_1$ 4213F using the hyperparameter values associated with hyperparameter search point F 4208F. Lastly, model trainer $N_1$ 4216A may train machine learning model $N_1$ 4213N using the hyperparameter values associated with hyperparameter search point N 4208N.

In some embodiments, the plurality of machine learning models $A_1$-$N_1$ 4213A-4213N may include or correspond to convolutional neural networks (CNNs), recurrent neural networks (RNNs), long short-term memory (LSTM) networks, and/or the like. Additionally, or alternatively, the plurality of machine learning models $A_1$-$N_1$ 4213A-4213N may include gradient boosting models such as XGBoost or LightGBM, deep reinforcement learning models, transformer-based models such as BERT or GPT, and/or the like. It shall be noted that these examples are not intended to be limiting and that the plurality of machine learning models $A_1$-$N_1$ 4213A-4213N may correspond to additional or different models without departing from the scope of the disclosure.

Referring to FIG. 41, method 4100 may proceed from operation 4130 to operation 4140 (sometimes referred to as operation (D)). Operation 4140 may compute, via the plurality of model trainers, a plurality of performance metrics that measure a performance of the plurality of machine learning models during the target number of epochs. The plurality of performance metrics computed in operation 4140 may correspond to or be similar to the plurality of performance metrics $A_1$-$N_1$ 4214A-4214N illustrated in FIG. 42A (and/or the plurality of performance metrics A-N 4024A-4024N illustrated in FIG. 40E). It shall be noted that the example of FIG. 42A is not intended to be limiting and that operation 4140 may compute additional, fewer, or different performance metrics than illustrated in FIG. 42A without departing from the scope of the disclosure.

As shown in FIG. 42A, the plurality of model trainers $A_1$-$N_1$ 4210A-4210B, 4212A-4212C, 4215A, and 4216A may (e.g., concurrently) compute the plurality of performance metrics $A_1$-$N_1$ 4214A-4214N, respectively. Concurrently computing the plurality of performance metrics $A_1$-$N_1$ 4214A-4214N, as generally used herein, may refer to computing the plurality of performance metrics $A_1$-$N_1$ 4214A-4214N simultaneously or substantially simultaneously across the plurality of model trainers $A_1$-$N_1$ 4210A-4210B, 4212A-4212C, 4215A, and 4216A. For example, model trainer A 4210A may compute performance metric $A_1$ 4214A while model trainers $A_2$-$N_1$ 4210B, 4212A-4212C, 4215A, and 4216A compute performance metrics $A_2$-$N_1$ 4214B-4214N, respectively.

In some embodiments, a respective performance metric of the plurality of performance metrics $A_1$-$N_1$ 4214A-4214N may correspond to a respective machine learning model of the plurality of machine learning models 4213A-4213N. For example, performance metric $A_1$ 4214A may correspond to machine learning model $A_1$ 4213A. Conversely, performance metric $A_2$ 4214B may correspond to machine learning model $A_2$ 4213B. It shall be noted that the remaining performance metrics $B_1$-$N_1$ 4214C-4214N illustrated in FIG. 42A may correspond to machine learning models $B_1$-$N_1$ 4213C-4214N in analogous ways.

Additionally, in some embodiments, a respective performance metric of the plurality of performance metrics $A_1$-$N_1$ 4214A-4214N may measure a performance of a corresponding machine learning model during the target number of epochs (e.g., after training the corresponding machine learning model for the target number of epochs). For example, as described previously in FIG. 42A, model trainer $A_1$ 4210A may train machine learning model $A_1$ 4213A on hyperparameter search point A 4208A for the target number of epochs 4203. Thus, in some embodiments, performance metric $A_1$ 4214A corresponding to machine learning model $A_1$ 4213A may measure a performance of machine learning model $A_1$ 4213A during (e.g., after training for) the target number of epochs 4203. Conversely, as also described previously in FIG. 42A, model trainer $A_2$ 4210B may train machine learning model $A_2$ 4213B on hyperparameter search point B 4208B for the target number of epochs 4203. Thus, in some embodiments, performance metric $A_2$ 4214B corresponding to machine learning model $A_2$ 4213B may measure a performance of machine learning model $A_2$ 4213B during (e.g., after training for) the target number of epochs 4203.

It shall be noted that the remaining performance metrics $B_1$-$N_1$ 4212A-4212C, 4214A, and 4216A may measure the performance of machine learning models $B_1$-$N_1$ 4213C-4213N during the target number of epochs 4203 in analogous ways. Specifically, performance metric $B_1$ 4214C may measure the performance of machine learning model $B_1$ 4213C during the target number of epochs 4203. Performance metric $B_2$ 4214D may measure the performance of machine learning model $B_2$ 4213D during the target number of epochs 4203. Performance metric $B_3$ 4214E may measure the performance of machine learning model $B_3$ 4213E during the target number of epochs 4203. Performance metric $C_1$ 4214F may measure the performance of machine learning model $C_1$ 4213F during the target number of epochs 4203. Lastly, performance metric $N_1$ 4214N may measure the performance of machine learning model $N_1$ 4213N during the target number of epochs 4203.

In some embodiments, the performance of the plurality of machine learning models $A_1$-$N_1$ 4213A-4213N during the target number of epochs 4203 may correspond to an accuracy, loss, precision, recall, and/or an F1 score of the plurality of machine learning models 4213A-4213N during the target number of epochs 4203, respectively. It shall be noted that the above example(s) are not intended to be limiting and that the plurality of performance metrics $A_1$-$N_1$ 4214A-4214N may measure the performance of the plurality of machine learning models $A_1$-$N_1$ 4213A-4213N during the target number of epochs 4203 in different ways without departing from the scope of the disclosure.

Referring to FIG. 41, method 4100 may proceed from operation 4140 to operation 4150 (sometimes referred to as operation (E)). Operation 4150 may transmit, by the one or more worker nodes, the plurality of performance metrics to the controller node. The plurality of performance metrics transmitted in operation 4150 may correspond or be similar to the plurality of performance metrics $A_1$-$N_1$ 4214A-4214N illustrated in FIG. 42A. It shall be noted that the example of FIG. 42A is not intended to be limiting and that operation 4150 may transmit additional, fewer, or different performance metrics than illustrated in FIG. 42A without departing from the scope of the disclosure.

As shown in FIG. 42A, the plurality of worker nodes A-N 4210-4216 may transmit the plurality of performance metrics $A_1$-$N_1$ 4214A-4214N to controller node 4202. The plurality of performance metrics $A_1$-$N_1$ 4214A-4214N may be transmitted asynchronously or in a batch. For instance, performance metric $A_1$ 4214A may be computed before performance metric $A_2$ 4214B. Accordingly, worker node A 4210 may asynchronously transmit performance metric $A_1$ 4214A to controller node 4202 as soon as performance metric $A_1$ 4214A is computed, without waiting for worker node A 4210 to compute performance metric $A_2$ 4214B. Similarly, worker nodes B-N 4212-4216 may transmit performance metrics $B_1$-$N_1$ 4214C-4214N in an analogous manner.

Additionally, as shown in FIG. 42A, controller node 4202 may receive the plurality of performance metrics $A_1$-$N_1$ 4214A-4214N (e.g., at hyperparameter search point(s) removal module 4209). Controller node 4202 may receive the plurality of performance metrics $A_1$-$N_1$ 4214A-4214N asynchronously or in batches. For instance, controller node 4202 may receive performance metric $A_1$ 4214A before receiving performance metric $A_2$ 4214B. Alternatively, controller node 4202 may receive performance metrics $B_1$-$B_3$ 4214C-4214E from worker node B 4008 in a single batch (e.g., all at once). It shall be noted that controller node 4002 may receive performance metrics $C_1$-$N_1$ 4214F-4214N in analogous ways.

Referring to FIG. 41, method 4100 may proceed from operation 4150 to operation 4160 (sometimes referred to as operation (F)). Operation 4160 may remove, by the controller node, one or more underperforming hyperparameter search points from the plurality of hyperparameter search points according to a pre-defined performance metric ranking criterion associated with the plurality of performance metrics. The one or more underperforming hyperparameter search points removed by operation 4160 may include hyperparameter search point A 4208A and hyperparameter search point F 4208F illustrated in FIG. 42A. It shall be noted that the example of FIG. 42A is not intended to be limiting and that operation 4160 may remove additional, fewer, or different underperforming hyperparameter search points than illustrated in FIG. 42A without departing from the scope of the disclosure.

As illustrated in FIG. 42A, controller node 4202 may remove hyperparameter search point A 4208A and hyperparameter search point F 4208F via hyperparameter search point(s) removal module 4209. Specifically, as shown in FIG. 42A, controller node 4202 may provide the plurality of hyperparameter search points A-N 4208A-4208N and the plurality of performance metrics $A_1$-$N_1$ 4214A-4214N as input to hyperparameter search point(s) removal module 4209. Based on receiving the input, hyperparameters h point(s) removal module 4209 may remove hyperparameter search point A 4208A and hyperparameter search point F 4208F from the plurality of hyperparameter search points A-N 4208A-4208N based on (e.g., according to) a pre-defined performance metric ranking criterion associated with the plurality of performance metrics $A_1$-$N_1$ 4214A-4214N.

In some embodiments, hyperparameter search point(s) removal module 4209 may determine if a respective performance metric of the plurality of performance metrics $A_1$-$N_1$ 4214A-4214N satisfies the pre-defined performance metric ranking criterion. For example, hyperparameter search point(s) removal module 4209 may determine if hyperparameter search point A 4208A satisfies the pre-defined performance metric ranking criterion. Similarly, hyperparameter search point(s) removal module 4209 may also determine if hyperparameter search point B 4208B satisfies the pre-defined performance metric ranking criterion. It shall be noted that hyperparameter search point(s) removal module 4209 may perform analogous determinations for the remaining hyperparameter search points C-N 4208C-4208N illustrated in FIG. 42A.

Specifically, in some embodiments, determining if a respective performance metric of the plurality of performance metrics $A_1$-$N_1$ 4214A-4214N satisfies the pre-defined performance metric ranking criterion may include determining if the respective performance metric exceeds a minimum percentile threshold of the pre-defined performance metric ranking criterion. Hyperparameter search point(s) removal module 4209 may determine that the respective performance exceeds the minimum percentile threshold of the pre-defined performance metric ranking criterion when such respective performance metric ranks above a pre-defined percentage of other performance metrics in the plurality of performance metrics $A_1$-$N_1$ 4214A-4214N (e.g., 1%, 2%, 5%, 10%, 20%, 40%, 80%, etc.). Conversely, hyperparameter search point(s) removal module 4209 may determine that the respective performance satisfies does not exceed the minimum percentile threshold of the pre-defined performance metric ranking criterion when such respective performance metric does not rank above the pre-defined percentage of other performance metrics in the plurality of performance metrics $A_1$-$N_1$ 4214A-4214N (e.g., 1%, 2%, 5%, 10%, 20%, 40%, 80%, etc.).

For example, as described above, performance metric $A_1$ 4214A may measure a loss of machine learning model $A_1$ 4213A. Thus, in some embodiments, hyperparameter search point(s) removal module 4209 may determine that performance metric $A_1$ 4214A exceeds the minimum percentile threshold of the pre-defined performance metric ranking criterion when a loss value associated with performance metric $A_1$ 4214A is lower than the pre-defined percentage of other performance metrics in the plurality of performance metrics $A_1$-$N_1$ 4214A-4214N. Conversely, hyperparameter search point(s) removal module 4209 may determine that performance metric $A_1$ 4214A does not exceed the minimum percentile threshold of the pre-defined performance metric ranking criterion when the loss value associated with performance metric $A_1$ 4214A is higher than the pre-defined percentage of other performance metrics in the plurality of performance metrics $A_1$-$N_1$ 4214A-4214N.

In yet another non-limiting example, as also described above, performance metric $A_1$ 4214A may measure an accuracy of machine learning model $A_1$ 4213A. Thus, in some embodiments, hyperparameter search point(s) removal module 4209 may determine that performance metric $A_1$ 4214A exceeds the minimum percentile threshold of the pre-defined performance metric ranking criterion when an accuracy value associated with performance metric $A_1$ 4214A is higher than the pre-defined percentage of other performance metrics in the plurality of performance metrics $A_1$-$N_1$ 4214A-4214N. Conversely, hyperparameter search point(s) removal module 4209 may determine that performance metric $A_1$ 4214A does not exceed the minimum percentile threshold of the pre-defined performance metric ranking criterion when the accuracy value associated with performance metric $A_1$ 4214A is lower than the pre-defined percentage of other performance metrics in the plurality of performance metrics $A_1$-$N_1$ 4214A-4214N.

In some embodiments, if hyperparameter search point(s) removal module 4209 determines that a respective performance metric of the plurality of performance metrics $A_1$-$N_1$ 4214A-4214N does not exceed the minimum percentile threshold of the pre-defined performance metric ranking criterion, hyperparameter search point(s) removal module 4209 may identify a hyperparameter search point associated with such performance metric as an underperforming hyperparameter search point and, in turn, remove the hyperparameter search point from the plurality of hyperparameter search points A-N 4208A-4208N.

For example, for the reasons described previously, hyperparameter search point(s) removal module 4209 may determine that performance metric $A_1$ 4214A does not exceed the minimum percentile threshold of the pre-defined performance metric ranking criterion. Thus, in some embodiments, hyperparameter search point(s) removal module 4209 may identify a hyperparameter search point associated with performance metric $A_1$ 4214A as an underperforming hyperparameter search point. For example, hyperparameter search point(s) removal module 4209 may identify that hyperparameter search point A 4208A is associated with performance metric $A_1$ 4214A because model trainer $A_1$ 4210A trained machine learning model $A_1$ 4213A, and performance metric $A_1$ 4214A is measuring a performance of machine learning model $A_1$ 4213A.

Furthermore, as illustrated in FIG. 42A, hyperparameter search point(s) removal module 4209 may identify hyperparameter search point A 4208A as an underperforming hyperparameter search point and remove hyperparameter search point A 4208A from the plurality of hyperparameter search points A-N 4208A-4208N. It shall be noted that if hyperparameter search point(s) removal module 4209 instead determined that hyperparameter search point A 4208A exceeds the minimum percentile threshold of the pre-defined performance metric ranking criterion, hyperparameter search point(s) removal module 4209 may forgo identifying hyperparameter search point A 4208A as the underperforming hyperparameter search point and forgo removing hyperparameter search point A 4208A from the plurality of hyperparameter search points A-N 4208A-4208N.

Additionally, as shown in FIG. 42A, hyperparameter search point(s) removal module 4209 may determine that performance metric $A_2$ 4214B does not exceed the minimum percentile threshold of the pre-defined performance metric ranking criterion. Thus, in some embodiments, hyperparameter search point(s) removal module 4209 may identify a hyperparameter search point associated with performance metric $A_2$ 4214B as an underperforming hyperparameter search point. For example, hyperparameter search point(s) removal module 4209 may identify that hyperparameter search point B 4208B is associated with performance metric $A_2$ 4214B because model trainer $A_2$ 4210B trained machine learning model $A_2$ 4213B, and performance metric $A_1$ 4214A is measuring a performance of machine learning model $A_2$ 4213B.

Furthermore, as illustrated in FIG. 42A, hyperparameter search point(s) removal module 4209 may identify hyperparameter search point F 4208F as an underperforming hyperparameter search point and remove hyperparameter search point F 4208F from the plurality of hyperparameter search points A-N 4208A-4208N. It shall be noted that if hyperparameter search point(s) removal module 4209 instead determined that hyperparameter search point F 4208F exceeds the minimum percentile threshold of the pre-defined performance metric ranking criterion, hyperparameter search point(s) removal module 4209 may forgo identifying hyperparameter search point F 4208F as the underperforming hyperparameter search point and forgo removing hyperparameter search point F 4208F from the plurality of hyperparameter search points A-N 4208A-4208N.

It shall also be noted that the hyperparameter search point(s) removal module 4209 may analogously perform the above-described operations for the other hyperparameter search points B-E 4208B-4208E and N 4208N illustrated in FIG. 42A.

Referring to FIG. 41, method 4100 may proceed from operation 4160 to operation 4170 (sometimes referred to as operation (G)). Operation 4170 may determine, by the controller node, if a remainder of the plurality of hyperparameter search points satisfies a termination condition after removing the one or more underperforming hyperparameter search points in (F). The remainder of the plurality of hyperparameter search points may correspond or be similar to the remainder of the plurality of hyperparameter search points 4211 illustrated in FIG. 42A. It shall be noted that the example of FIG. 42A is not intended to be limiting and that the remainder of the plurality of hyperparameter search points 4211 may include additional, different, or fewer hyperparameter search points than illustrated in FIG. 42A without departing from the scope of the disclosure.

In some embodiments, the remainder of the plurality of hyperparameter search points 4211 may include one or more hyperparameter search points that were not removed by hyperparameter search points removal module 4209. For example, as described previously, hyperparameter search points removal module 4209 may remove hyperparameter search points A 4208A and F 4208F from the plurality of hyperparameter search points A-N 4208A-4208N. Thus, as shown in FIG. 42A, the remainder of the plurality of hyperparameter search points 4211 may include hyperparameter search points B-E 4208B-4208E (e.g., a subset of the plurality of hyperparameter search points A-N 4208A-4208N) and may not include (e.g., retain) hyperparameter search points A 4208A and F 4208F for the reasons described above.

Additionally, as shown in FIG. 42A, controller node 4202 may perform a determination 4218 that determines if the remainder of the plurality of hyperparameter search points 4211 satisfies termination condition 4219. Determination 4218 may determine that the remainder of the plurality of hyperparameter search points 4211 does not satisfy termination condition 4219 when the remainder of the plurality of hyperparameter search points 4211 includes more than a threshold number of hyperparameter search points (e.g., 1, 2, 3, 4, 5, etc. hyperparameter search points). Conversely, determination 4218 may determine that the remainder of the plurality of hyperparameter search points 4211 satisfies the termination condition 4219 when the plurality of hyperparameter search points 4211 does not include more than a threshold number of hyperparameter search points (e.g., 1, 2, 3, 4, 5, etc. hyperparameter search points).

Specifically, as shown in FIG. 42A, the remainder plurality of hyperparameter search points 4211 may include more than one hyperparameter search point. Accordingly, when the threshold number of hyperparameter search points equals one (1) (e.g., a first threshold value), determination 4218 may determine that the remainder of the plurality of hyperparameter search points 4211 does not satisfy termination condition 4219. Conversely, if the remainder plurality of hyperparameter search points 4211 would have instead included one hyperparameter search point (e.g., not a plurality of hyperparameter search points), determination 4218 may instead determine that the remainder of the plurality of hyperparameter search points 4211 satisfies termination condition 4219.

Referring to FIG. 41, method 4100 may proceed from operation 4170 to operation 4180 (sometimes referred to as operation (H)). Based on upon determining that the remainder of the plurality of hyperparameter search points do not satisfy the termination condition, operation 4180 may increase the target number of epochs and repeat (B)-(G) for the remainder of the plurality of hyperparameter search points until the termination condition is satisfied. Repeating (B)-(G) for the remainder of the plurality of hyperparameter search points may include repeating (B)-(G) for the remainder of the plurality of hyperparameter search points 4211 illustrated in FIG. 42A.

As shown in FIG. 42A, based on determination 4218 determining that the remainder of the plurality of hyperparameter search points 4211 did not satisfy the termination condition 4219, the controller node 4202 may increase the target number of epochs 4203 at block 4220. For example, controller node 4202 may increase the target number of epochs 4203 from a first number of epochs $E_1$ (e.g., 1, 2, 4, 5, 10, 15, 20, etc. epochs) in FIG. 42A to a second number of epochs $E_2$ in FIG. 42B, greater than the first number of epochs $E_1$ (e.g., 2, 4, 8, 10, 20, 30, 30, etc. epochs).

Figure 42B:
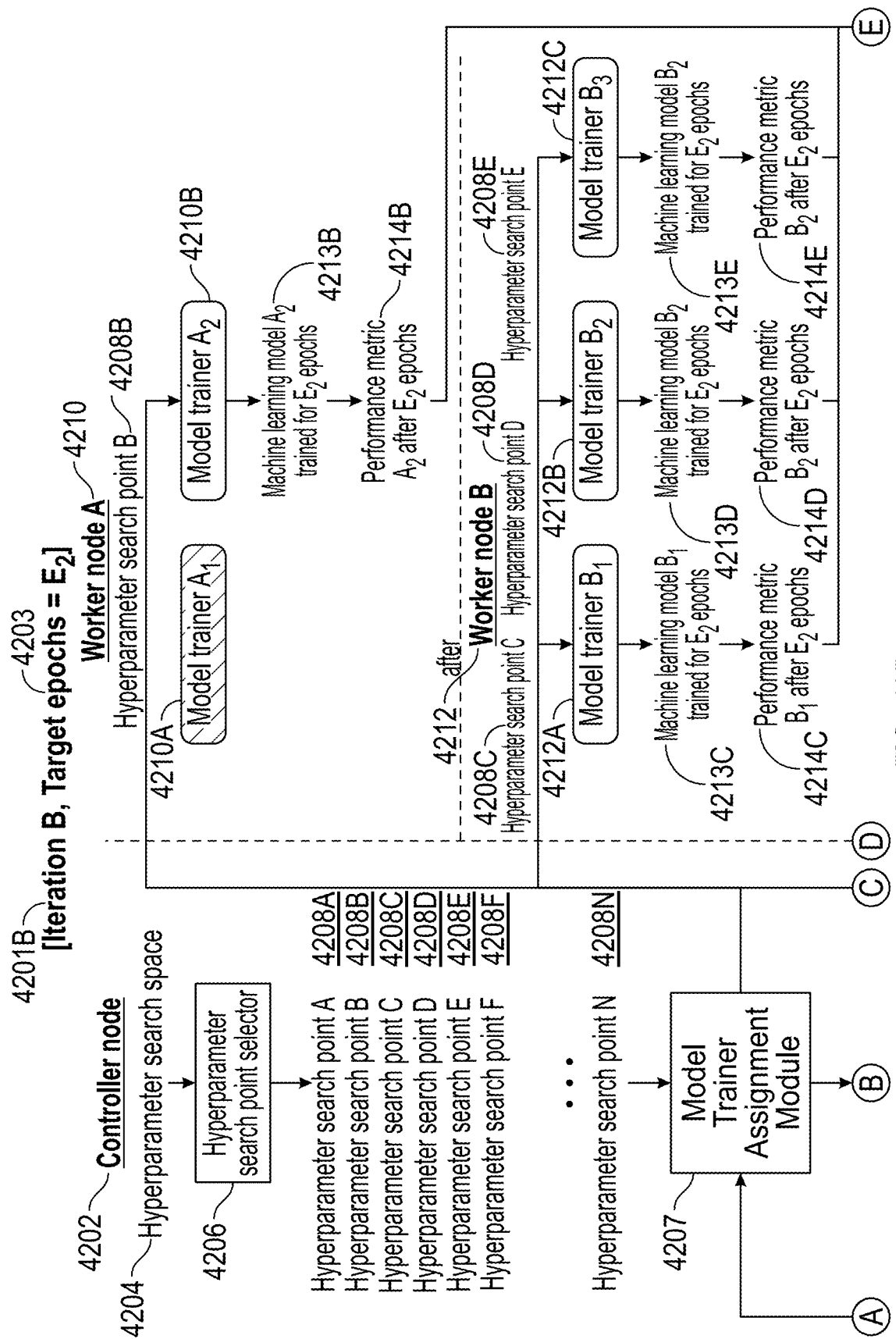
Figure 42B:
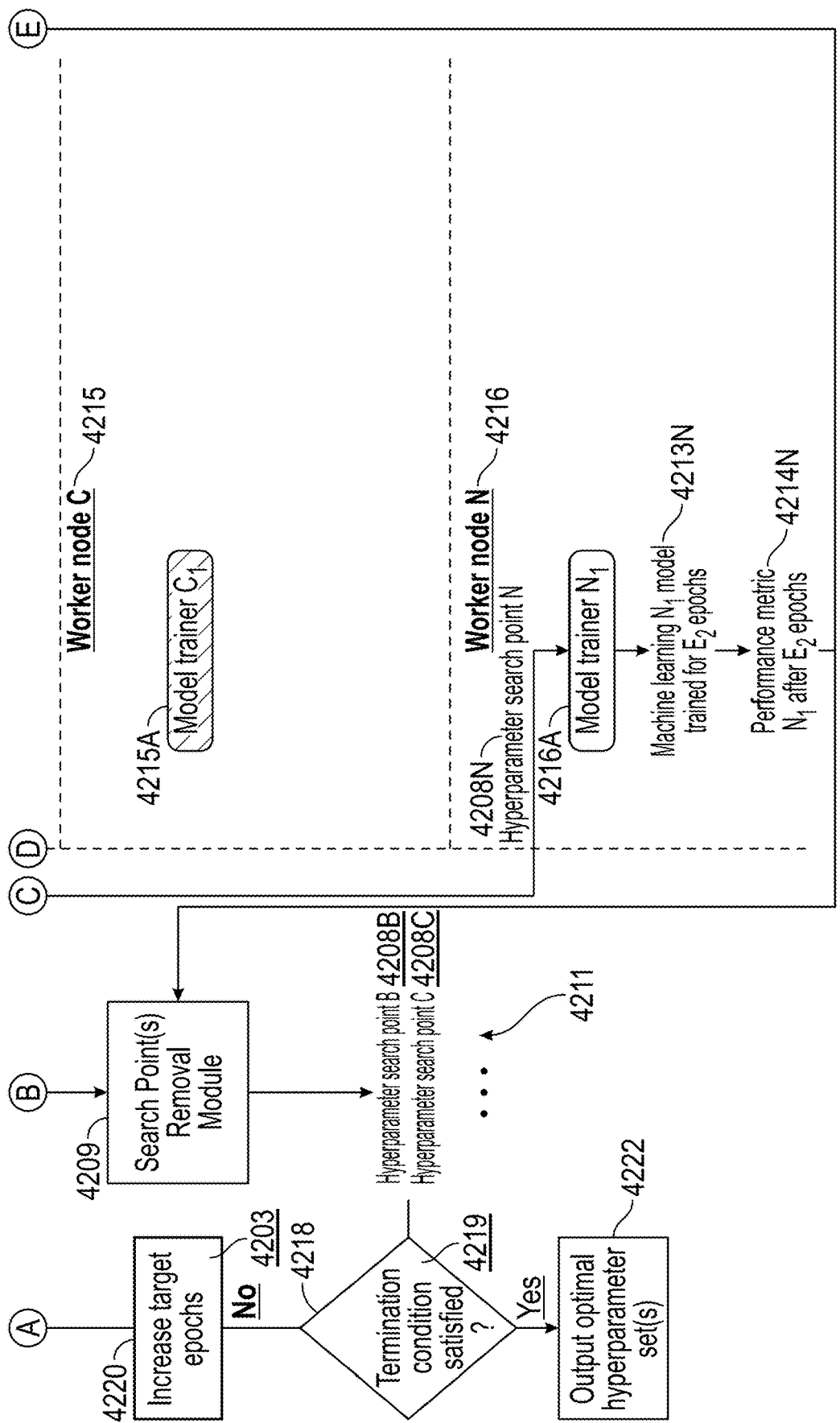

In some embodiments, iteration B 4201B illustrated in FIG. 42B may repeat operations (B)-(G) for the remainder of the plurality of hyperparameter search points 4211 illustrated in FIG. 42A. Iteration B 4201B may perform analogous operations to iteration A 4201A illustrated in FIG. 42A. For example, iteration A 4201A may perform one or more of operations 4110-4190 for the plurality of hyperparameter search points A-N 4208A-4208N illustrated in FIG. 42A. Similarly, iteration B 4201B may perform one or more of operations 4110-4190 for the remainder of the plurality of hyperparameter search points 4211 illustrated in FIG. 42A (e.g., a subset carried forward from iteration A 4201A).

In some embodiments, repeating operation (B) of (B)-(G) in iteration B 4201B may include assigning the remainder of the plurality of hyperparameter search points 4211 to the plurality of worker nodes A-N 4210-4216. Model trainer assignment module 4207 may assign a respective hyperparameter search point to a same worker node that the respective hyperparameter search point was assigned to in iteration A 4201A (e.g., an iteration preceding iteration B 4201B).

For example, as described previously, model trainer assignment module 4207 may assign hyperparameter search point B 4208B to model trainer $A_2$ 4210B in iteration A 4201A. Thus, as also illustrated in FIG. 42B, model trainer assignment module 4207 may again assign (e.g., re-assign) hyperparameter search point B 4208B to model trainer $A_2$ 4210B in iteration B 4201B. It shall be noted that model trainer assignment module 4207 may assign the other hyperparameter search points C-E 4208C-4208E to model trainers $B_1$-$B_3$ 4212A-4212C, and hyperparameter search point N 4208N to model trainer $N_1$ 4216A, respectively, for analogous reasons.

It shall be noted that a hyperparameter search point removed by hyperparameter search point(s) removal module 4209 in iteration A 4201A may not be reassigned to model trainers $A_1$ 4210A, $A_2$ 4210B, $B_1$ 4212A, $B_2$ 4212B, $B_3$ 4212C, $C_1$ 4215A, and $N_1$ 4216A in iteration B 4201B. For example, for the reasons described previously, the remainder of the plurality of hyperparameter search points 4211 in FIG. 42A may not include hyperparameter search point A 4208A. Accordingly, as shown in FIG. 42B, model trainer assignment module 4207 may not assign hyperparameter search point A 4208A to model trainer $A_1$ 4210A in iteration B 4201B. Additionally, model trainer assignment module 4207 may not assign hyperparameter search point F 4208F to model trainer $N_1$ 4208N for analogous reasons.

In some embodiments, repeating operation (C) of (B)-(G) in iteration B 4201B may include concurrently training one or more machine learning models associated with the remainder of the plurality of hyperparameter search points 4211 in FIG. 42A for an increased number of target epochs 4203. For example, the machine learning models associated with the remainder of the plurality of hyperparameter search points 4211 in FIG. 42A may include machine learning models $A_2$ 4213B, $B_1$-$B_3$ 4213C-4213E, and $N_1$ 4213N. In iteration A 4201A, the plurality of model trainers $A_2$ 4210B, $B_1$-$B_3$ 4212A-4212C, and $N_1$ 4216A may concurrently train the machine learning models $A_2$ 4213B, $B_1$-$B_3$ 4213C-4213E, and $N_1$ 4213N associated with hyperparameter search points B-E 4208B-4208E and hyperparameter search point N 4208N for the target number of epochs 4203 in FIG. 42A (e.g., $E_1$ epochs), respectively.

Conversely, in iteration B 4201B illustrated in FIG. 42B, the plurality of model trainers $A_2$ 4210B, $B_1$-$B_3$ 4212A-

4212C, and $N_1$ 4216A may concurrently train the machine learning models $A_2$ 4213B, $B_1$-$B_3$ 4213C-4213E, and $N_1$ 4213N associated with hyperparameter search points B-E 4208B-4208E and hyperparameter search point N 4208N for the target number of epochs 4203 in FIG. 42B (e.g., $E_2$ epochs), respectively. It shall be noted that the model trainers $A_2$ 4210B, $B_1$-$B_3$ 4212A-4212C, and $N_1$ 4213N may concurrently train machine learning models $A_2$ 4213B, $B_1$-$B_3$ 4213C-4213E, and $N_1$ 4213N in the same or similar ways described previously in operation 4130.

In some embodiments, in iteration B 4201B illustrated in FIG. 42B, model trainer $A_2$ 4210B may resume training of machine learning model 4213B for the second number of epochs $E_2$. For example, as shown in iteration A 4201A illustrated in FIG. 42A, model trainer $A_2$ 4210B may train machine learning model $A_2$ 4213B for the first number of epochs $E_1$. Furthermore, in iteration B 4201B illustrated in FIG. 42B, model trainer $A_2$ 4210B may not restart training of machine learning model $A_2$ 4213B from zero (o) epochs. Instead, model trainer $A_2$ 4210B may resume training of machine learning model $A_2$ 4213B from the end of the first number of epochs $E_1$ and continue to train machine learning model $A_2$ 4213B until the second number of epochs $E_2$ is reached.

It shall be noted that model trainer $A_2$ 4210B may preserve, in computer memory (e.g., RAM), a state of machine learning model $A_2$ 4213B across iterations A 4201A and B 4201B (e.g., keep a state of machine learning model $A_2$ 4213B alive). Specifically, model trainer $A_2$ 4213B may retain, in computer memory, the model weights, biases, optimizer states, and/or other relevant intermediate variables from iteration A 4201A (e.g., the number of epochs associated with such parameters). Such preservation may enable model trainer model trainer $A_2$ 4210B to (e.g., seamlessly) resume training from the point where iteration A 4201A concluded, thereby reducing or eliminating the need for model trainer $A_2$ 4213B to reload a training checkpoint associated with model trainer $A_2$ 4213B.

It shall be noted that a training checkpoint, as generally used herein, may refer to a saved state of a machine learning model during training that includes model parameters (e.g., weights and biases), optimizer states, and/or other intermediate variables necessary to resume the training process from a specific point.

Similarly, in iteration A 4201A illustrated in FIG. 42A, model trainer $B_1$ 4212A may train machine learning model $B_1$ 4213C for the first number of epochs $E_1$. Thus, in analogous ways described above, model trainer $B_1$ 4212A in iteration B 4201B may not restart training of machine learning model $B_1$ 4213C from zero (o) epochs. Instead, model trainer $B_1$ 4212A may resume training of machine learning model $B_1$ 4213C from the end of the first number of epochs $E_1$ and continue to train machine learning model $B_1$ 4213C until the second number of epochs $E_2$ is reached. It shall be noted that model trainers $B_2$-$B_3$ 4212B-4212C, and $N_1$ 4213N may concurrently train machine learning models $B_2$-$B_3$ 4213D-4213E, and $N_1$ 4213N, respectively, in analogous ways as model trainers $A_2$ 4210B and $B_1$ 4213C.

In some embodiments, model trainer $A_1$ 4210A may forgo resuming training of machine learning model $A_1$ 4213A for the second number of epochs $E_2$. For example, as described previously, hyperparameter search point(s) removal module 4209 may remove hyperparameter search point A 4208A from the plurality of hyperparameter search points A-N 4208A-4208N in iteration A 4201A (e.g., hyperparameter search point A 4208A may not remain in the plurality of hyperparameter search points 4211 after iteration A 4201A). Consequently, as shown in FIG. 42B, model trainer $A_1$ 4210A may forgo resuming training of the machine learning model $A_1$ 4213A for the second number of epochs $E_2$ in iteration B 4201B (e.g., because hyperparameter search point A 4208A is no longer included in the remainder the plurality of hyperparameter search points 4211). It shall be noted that model trainer $C_1$ 4215A may forgo resuming training of machine learning model $C_1$ 4213F for analogous reasons.

Alternatively, in some embodiments, model trainer $A_1$ 4210A may load a training checkpoint associated with machine learning model $A_1$ 4213A before resuming training in iteration B 4201B—in similar ways described in method 4300. The training checkpoint, in some embodiments, may have been saved to computer memory, by model trainer $A_1$ 4210A, after completing the first number of epochs E, in iteration A 4201A. In analogous ways described above, the training checkpoint associated with machine learning model $A_1$ 4213A may include the model weights, biases, optimizer states, the number of epochs completed, and other relevant intermediate variables that enable model trainer $A_1$ 4210A to resume training seamlessly without restarting from the initial epoch (e.g., resume seamlessly from $E_1$ epochs).

It shall be noted that the model trainers $A_2$ 4210B, $B_1$-$B_3$ 4212A-4212C, and $N_1$ 4213N may resume training of machine learning models $A_2$ 4213B, $B_1$-$B_3$ 4213C-4213E, and $N_1$ 4213N in analogous ways described for machine learning model $A_1$ 4213A. Furthermore, it shall also be noted that loading and saving training checkpoints may result in significant technical benefits.

Specifically, training checkpoints may allow model trainers $A_1$ 4210A, $A_2$ 4210B, $B_1$ 4212A, $B_2$ 4212B, $B_3$ 4212C, $C_1$ 4215A, and $N_1$ 4216A to offload (e.g., save) model states to persistent storage instead of retaining them in RAM. This may be particularly advantageous as model weights and associated variables can be substantial in size, especially for large and complex models. Retaining such states in RAM may limit the number of models that can be trained concurrently due to memory constraints. By using training checkpoints, the model trainers $A_1$ 4210A, $A_2$ 4210B, $B_1$ 4212A, $B_2$ 4212B, $B_3$ 4212C, $C_1$ 4215A, and $N_1$ 4216A can efficiently manage memory usage, enabling more models to be trained in parallel. Additionally, storing checkpoints on persistent storage may ensure that intermediate training states are preserved, reducing the risk of data loss and enabling seamless recovery in case of unexpected system failures or interruptions.

In some embodiments, repeating operation (D) of (B)-(G) in iteration B 4201B may include re-computing performance metric $A_2$ 4214B. Specifically, in iteration 4201B illustrated in FIG. 42B, model trainer $A_2$ 4210B may re-compute performance metric $A_2$ 4214B to measure the performance of machine learning model $A_2$ 4213B for the second number of epochs $E_2$ (as opposed to measuring the performance of machine learning model $A_2$ 4213B for the first number of epochs E, in iteration A 4201A). It shall be noted that model trainers $B_1$-$B_3$ 4212A-4212C and $N_1$ 4216A may re-compute performance metrics $B_1$-$B_3$ 4214C-4214E and $N_1$ 4214N in analogous ways.

In some embodiments, repeating operation (E) of (B)-(G) in iteration B 4201B may include transmitting, to controller node 4202, a subset of the plurality of performance metrics $A_1$-$N_1$ 4214A-4214N. For example, as described above, model trainer $A_2$ 4210B may re-compute performance metric $A_2$ 4214B to measure the performance of machine learning model $A_2$ 4214C for the second number of epochs $N_2$. Accordingly, as shown in FIG. 42B, worker node A 4210 comprising model trainer $A_2$ 4210B may transmit, to controller node 4202, the re-computed performance metric $A_2$ 4214B (e.g., an update to performance metric $A_2$ 4214B). It shall be noted that worker nodes A 4210, B, 4212, and C 4216 may transmit updates to performance metrics $B_1$-$B_3$ 4214C-4214E and $N_1$ 4214N in analogous ways.

In some embodiments, repeating operation (F) of (B)-(G) in iteration B 4201B may include removing one or more additional hyperparameter search points from the remainder of the plurality of hyperparameter search points 4211. For example, in iteration A 4201A illustrated in FIG. 42A, the remainder of the plurality of hyperparameter search points 4211 may include hyperparameter search points B-E 4208B-4208E and N 4208N. However, in iteration B 4201B illustrated in FIG. 42B, hyperparameter search point(s) removal module 4209 may further remove hyperparameter search points D 4208D, E 4208E, and N 4208N (e.g., leaving only hyperparameter search points B and C 4208B-4208C in the remainder of the plurality of hyperparameter search points 4211).

It shall be noted that hyperparameter search point(s) removal module 4209 may remove hyperparameter search points D 4208D, E 4208E, and N 4208N from the remainder of the plurality of hyperparameter search points 4211 for similar reasons described in operation 4160. Additionally, it shall also be noted that, in some portions of the disclosure, one or more additional underperforming hyperparameter search points removed in iteration B 4201B may be referred to as a second set of hyperparameter search points or the like.

In some embodiments, repeating operation (G) of (B)-(G) in iteration B 4201B may include determining if the remainder of the plurality of hyperparameter search points 4211 satisfy termination condition 4219 described in operation 4170. Specifically, after removing hyperparameter search points D 4208D, E 4208E, and N 4208N from the remainder of the plurality of hyperparameter search points 4211, controller node 4202 may perform determination 4218 to determine if the remainder of the plurality of hyperparameter search points 4211 in FIG. 42B satisfies termination condition 4219. Controller node 4202 may determine whether the remainder of the plurality of hyperparameter search points 4211 in FIG. 42B satisfies termination condition 4219 for reasons similar to those described for the remainder of the plurality of hyperparameter search points 4211 in FIG. 42A.

In some embodiments, operation 4180 may repeat operations (B)-(G) one or more additional times until the remainder of the plurality of hyperparameter search points 4211 satisfies termination condition 4219. For example, in iteration B 4201B illustrated in FIG. 42B, determination 4218 may determine that the remainder of the plurality of hyperparameter search points 4211 does not satisfy termination condition 4219. Accordingly, as shown in FIG. 42C, operation 4180 may perform another iteration of method 4100.

Figure 42C:
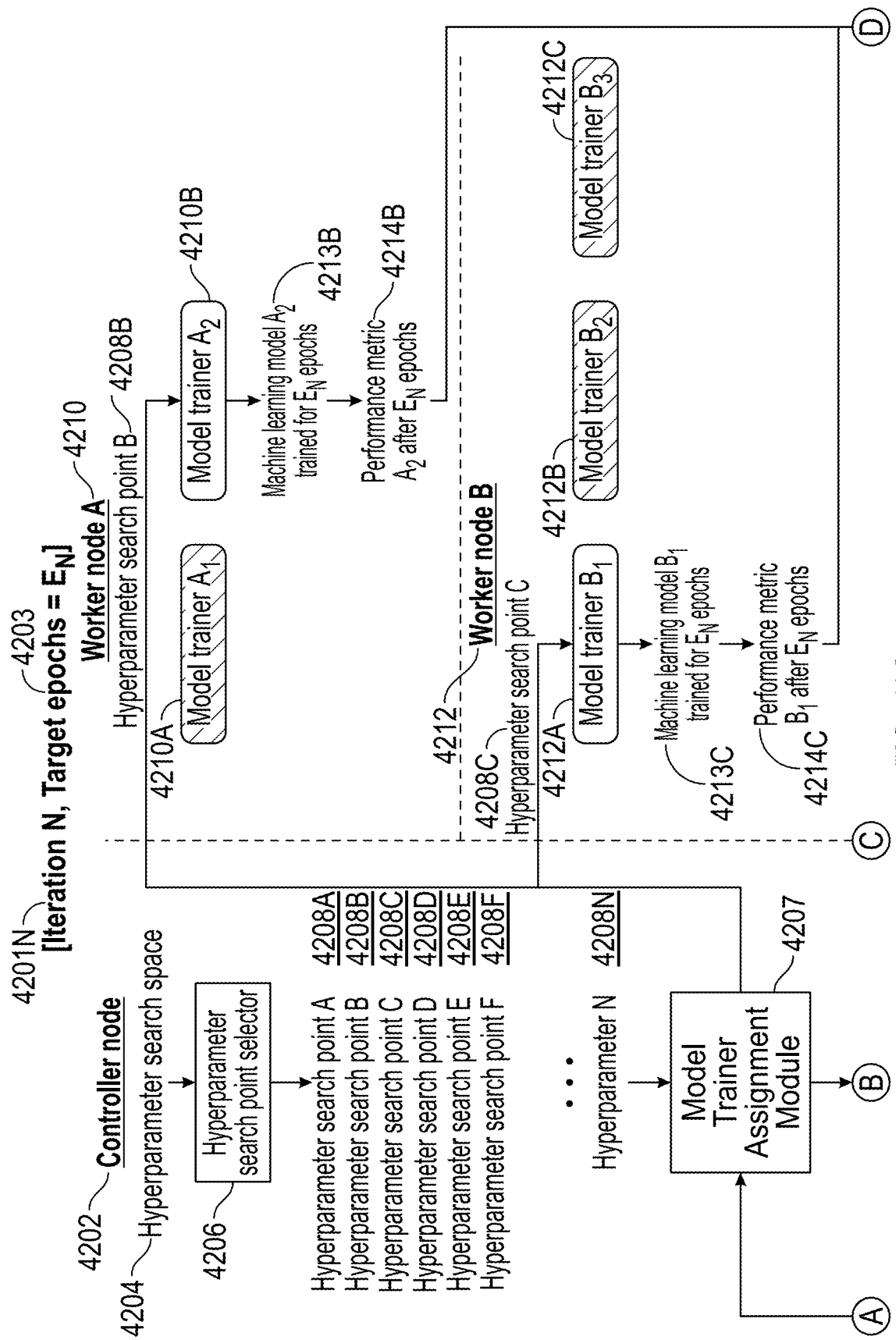
Figure 42C:
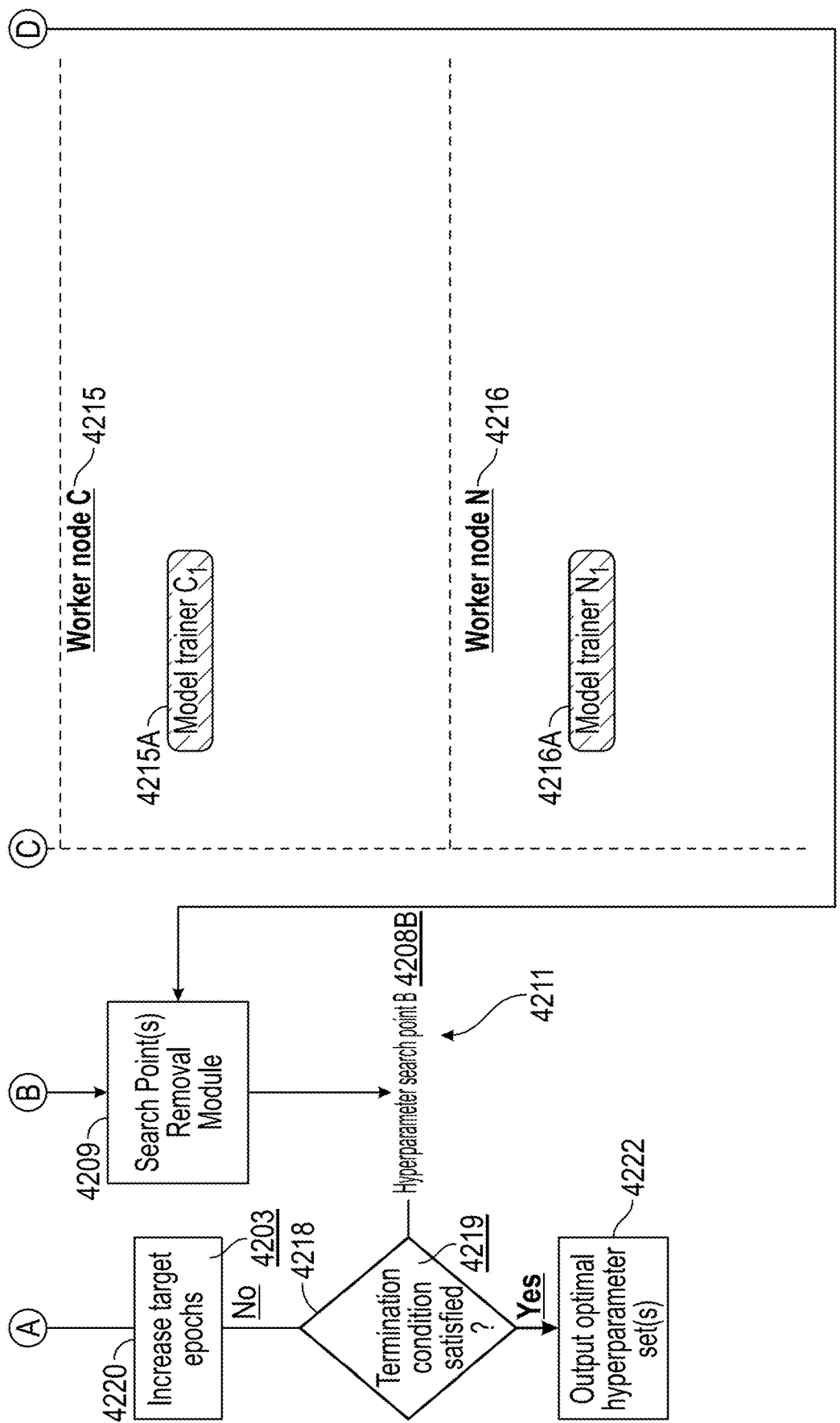

In some embodiments, the one or more additional iterations of method 4100 may include iteration N 4201N illustrated in FIG. 42C. Iteration N 4201N may perform one or more of operations 4110-4190 in analogous ways as iterations A and B 4201A-4201B. Specifically, as illustrated in FIG. 42C, the target number of epochs 4203 may increase from the second number of epochs $E_2$ to a third number of epochs $E_3$ in similar ways described previously for the first number of epochs $E_1$ and the second number of epochs $E_2$. Additionally, in iteration N 4201N, model trainer assignment module 4207 may assign the remainder of the plurality hyperparameter search points 4211 illustrated in FIG. 42B (e.g., hyperparameter search points B and C 4208B-4208C) to model trainers $A_2$ and $B_1$ 4210B-4212A for similar reasons described in earlier iterations A and B 4201A-4201N.

Furthermore, model trainers $A_2$ 4210B and $B_1$ 4212A may resume concurrent training of machine learning models 4213B-4213C for the third number of epochs $E_3$ in analogous ways described previously for concurrent training in iterations A and B 4201A-4201B. Conversely, model trainers $A_1$ 4210A, $B_2$ 4212B, $B_3$ 4212C, $C_1$ 4215A, and $N_1$ 4216A may forgo resuming training of machine learning models 4213A, 4213D, 4213E, 4213F, and 4213N, respectively, for similar reasons described for iterations A and B 4201A-4201B.

Additionally, in iteration N 4201N, model trainers $A_2$ 4210B and $B_1$ 4212A may re-compute performance metrics 4214B and 4214C, respectively, to measure the performance of machine learning models 4213B and 4213C for the third number of epochs $E_3$. The re-computation may occur in similar ways described previously for iterations A and B 4201A-4201B. Additionally, hyperparameter search point(s) removal module 4209 may remove one or more underperforming hyperparameter search points from the remainder of the plurality of hyperparameter search points 4211 in iteration N 4201N in similar ways as described for iterations A and B 4201A-4201B.

Furthermore, controller node 4202 may determine whether the remainder of the plurality of hyperparameter search points 4211 satisfies termination condition 4219 in iteration N 4201N in similar ways as described previously for iterations A and B 4201A-4201B.

Referring to FIG. 41, method 4100 may proceed from operation 4170 or 4180 to operation 4190. Based upon determining that the remainder of the plurality of hyperparameter search points satisfy the termination condition, operation 4190 may output at least one hyperparameter search point from the remainder of the plurality of hyperparameter search points as an optimal configuration for a plurality of hyperparameters. The at least one hyperparameter search point outputted by operation 4190 may include, but should not be limited to, hyperparameter search point B 4208B illustrated in FIG. 42C.

As shown in FIG. 42C, controller node 4202 may output hyperparameter search point B 4208B at block 4222. Controller node 4202 may proceed from determination 4218 to block 4222 based upon (e.g., when) determination 4218 determines that the remainder of the plurality of hyperparameter search points 4211 satisfies termination condition 4219. Specifically, in some embodiments, controller node 4202 may output hyperparameter search point B 4208B as an optimal configuration because hyperparameter search point B 4208B remained in the remainder of the plurality of hyperparameter search points 4211 after one or more iterations of removing underperforming hyperparameter search points (e.g., iterations A, B, and N 4201A-4201N). It shall be noted that the example of FIG. 42C is not intended to be limiting and that operation 4190 may output additional or different hyperparameter search points than illustrated in FIG. 42C without departing from the scope of the disclosure.

In some embodiments, outputting hyperparameter search point B 4208B may include transmitting a set of hyperparameter values associated with hyperparameter search point B 4208B to an external system, application, or interface for further processing. For example, controller node 4002 may transmit the hyperparameter values for hyperparameters 4016-4018 to a deployment system configured to use the values for initializing a machine learning model.

Alternatively, controller node 4202 may output the set of hyperparameter values associated with hyperparameter search point B 4208B to a database or similar storage system for future use or reference. For instance, controller node 4202 may log the set of hyperparameter values associated with hyperparameter search point B 4208B alongside corresponding performance metrics to facilitate comparisons or further optimization processes.

In yet another non-limiting example, the set of hyperparameter values associated with hyperparameter search point B 4208B may be outputted via a command-line interface (CLI), an application programming interface (API), or a graphical user interface (GUI). For instance, controller node 4202 may output the set of hyperparameter values associated with hyperparameter search point B 4208B through a command-line interface for use in automated scripts, through an API for integration with external applications, or through a GUI for interactive visualization and/or manual evaluation by a user.

Additionally, in some embodiments, operation 4190 may support online monitoring of the hyperparameter tuning process. Specifically, controller node 4202 may generate a dynamic table of results that updates in real-time while tuning is still in progress. The table may include hyperparameters associated with the plurality of hyperparameter search points 4208A-4208N, the number of epochs trained for each hyperparameter search point of the plurality of hyperparameter search points 4208A-4208N, and corresponding performance metrics such as loss or other evaluation metrics.

Operation 4190 may display a progress of the hyperparameter tuning process through a user interface. For example, controller node 4202 may transmit the dynamic table to a graphical user interface (GUI) accessible via a web application or similar online platform, allowing users to observe real-time updates, analyze trends, and assess the tuning process without waiting for the hyperparameter tuning process to be fully completed.

It shall also be appreciated that other embodiments contemplated within the scope of the present disclosure may involve more processes, fewer processes, different processes, or a different order of processes than illustrated in FIG. 41. It should be noted that a computer-program product may include a non-transitory machine-readable storage medium storing computer instructions that, when executed by one or more operations, may perform operations corresponding to the processes and sub-processes of method 4100. Additionally, or alternatively, a computer-implemented method may include operations corresponding to processes and sub-processes of 4100. Additionally, or alternatively, a computer-implemented system may include one or more processors, a memory, and a computer-readable medium operably coupled to the one or more processors, the computer-readable medium having computer-readable instructions stored thereon that, when executed by the one or more processors, cause a computing device to perform operations corresponding to the processes and sub-processes of method 4100. Additionally, or alternatively, an apparatus may comprise at least one processor and a storage to store instructions that, when executed by the at least one processor, cause the at least one processor to perform any of the processes and sub-processes of 4100.

Figure 43:
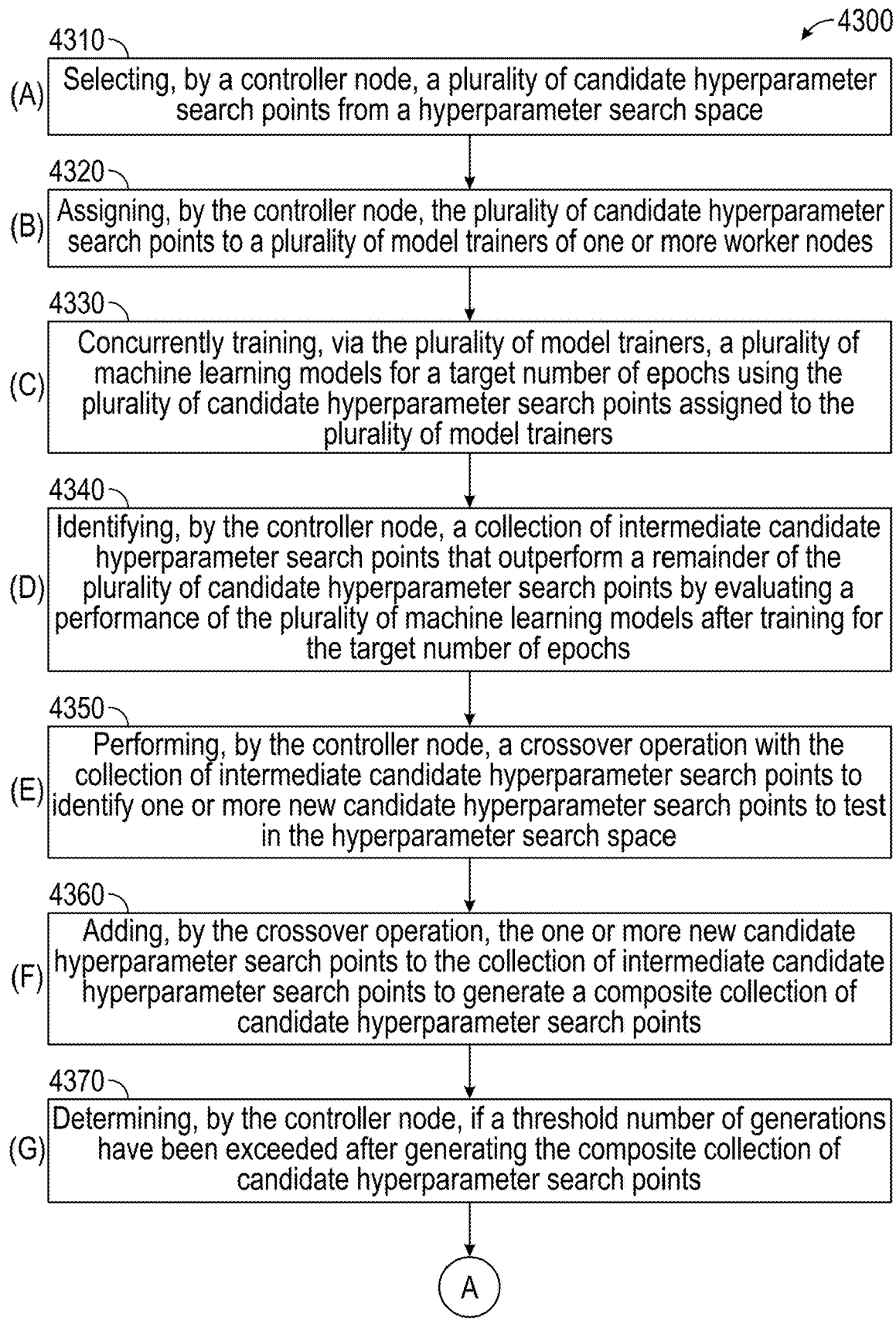
FIG. 43 illustrates an example flowchart of a method for a multi-process architecture that enables hyperparameter space parallelism, according to some embodiments of the present technology.
Figure 43:
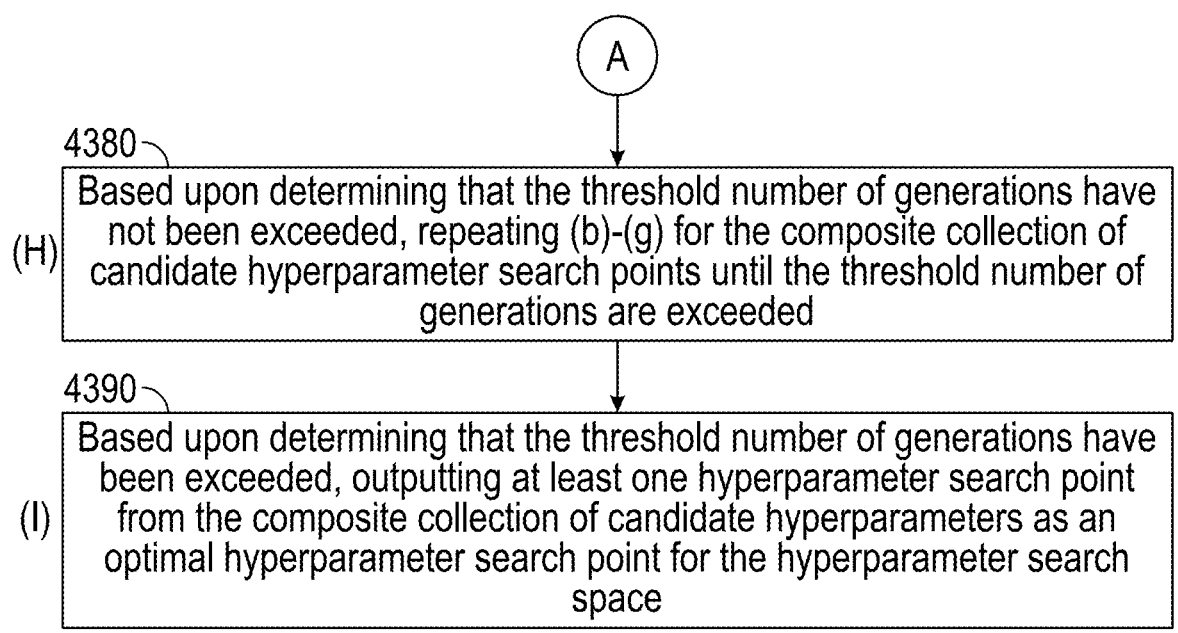

FIG. 43 illustrates one embodiment of method 4300 for a multi-process architecture that enables hyperparameter space parallelism. It shall be appreciated that other embodiments contemplated within the scope of the present disclosure may involve more processes, fewer processes, different processes, or a different order of processes than illustrated in FIG. 43. It should be noted that a computer-program product may include a non-transitory machine-readable storage medium storing computer instructions that, when executed by one or more operations, may perform operations corresponding to the processes and sub-processes of method 4300. Additionally, or alternatively, a computer-implemented method may include operations corresponding to processes and sub-processes of 4300. Additionally, or alternatively, a computer-implemented system may include one or more processors, a memory, and a computer-readable medium operably coupled to the one or more processors, the computer-readable medium having computer-readable instructions stored thereon that, when executed by the one or more processors, cause a computing device to perform operations corresponding to the processes and sub-processes of method 4300. Additionally, or alternatively, an apparatus may comprise at least one processor and a storage to store instructions that, when executed by the at least one processor, cause the at least one processor to perform any of the processes and sub-processes of 4300.

One of ordinary skill in the art will appreciate that method 4300 may provide many technical advantages and practical applications over other techniques for determining optimal hyperparameter search points. For instance, other techniques may be performed sequentially (e.g., may involve a single graphics processing unit (GPU) or processor training a first machine learning model according to a first hyperparameter search point to determine a first performance metric value and the single processor training a second machine learning model according to a second hyperparameter search point after finishing training of the first machine learning model). However, the techniques described herein may enable parallelism in the hyperparameter space by enabling multiple GPUs to train respective machine learning models according to different hyperparameter search points simultaneously. Performing techniques that utilize parallelism may be associated with reduced latency compared to performing techniques that determine optimal hyperparameter search points in a sequential manner.

Additionally, the techniques described herein may have technical advantages over conventional uses of multiple GPUs for tuning or training related tasks. For instance, multiple GPUs may be utilized to perform data parallelism, in which each GPU is responsible for a subset of data samples and gradient accumulation and weights are updated independently, or pipeline parallelism (e.g., model parallelism), in which each GPU hosts a subset of layers. However, the frequent synchronization of weights associated with data parallelism may incur communication overhead and backpropagation associated with pipeline parallelism may limit performance (e.g., effectiveness) of pipelining for tuning or training related tasks. By contrast, the techniques described herein utilize hyperparameter space parallelism, in which each GPU may train a respective subset of hyperparameters (e.g., a respective hyperparameter search point). Such techniques may avoid the frequent synchronization of weights associated with pipeline parallelism and the backpropagation that limits the performance of pipeline parallelism.

As shown in FIG. 43, process 4310 of method 4300 may select, by a controller node, a set of candidate hyperparameter search points from a hyperparameter search space. A "controller node" may refer to a central or primary node in a distributed computing or network architecture responsible for managing and coordinating the operations of other nodes (e.g., worker nodes). A "hyperparameter" may refer to a parameter that configures or controls a learning process associated with a machine learning model. Examples of hyperparameters may include, but not be limited to, a learning rate, a batch size, a number of epochs, a type of optimizer, or a parameter to a gradient descent algorithm (e.g., a momentum). A set of hyperparameter values may be bundled together into to form a corresponding hyperparameter vector. A "hyperparameter search space" may refer to a set that includes each potential hyperparameter vector value (e.g., according to a range defined for each hyperparameter within the hyperparameter vector) and a "hyperparameter search point" may refer to a specific point within the hyperparameter search space (e.g., a vector in the hyperparameter search space whose hyperparameters have specific values). A candidate hyperparameter search point may refer to a hyperparameter search point selected by the controller node at process 4310.

Figure 44A:
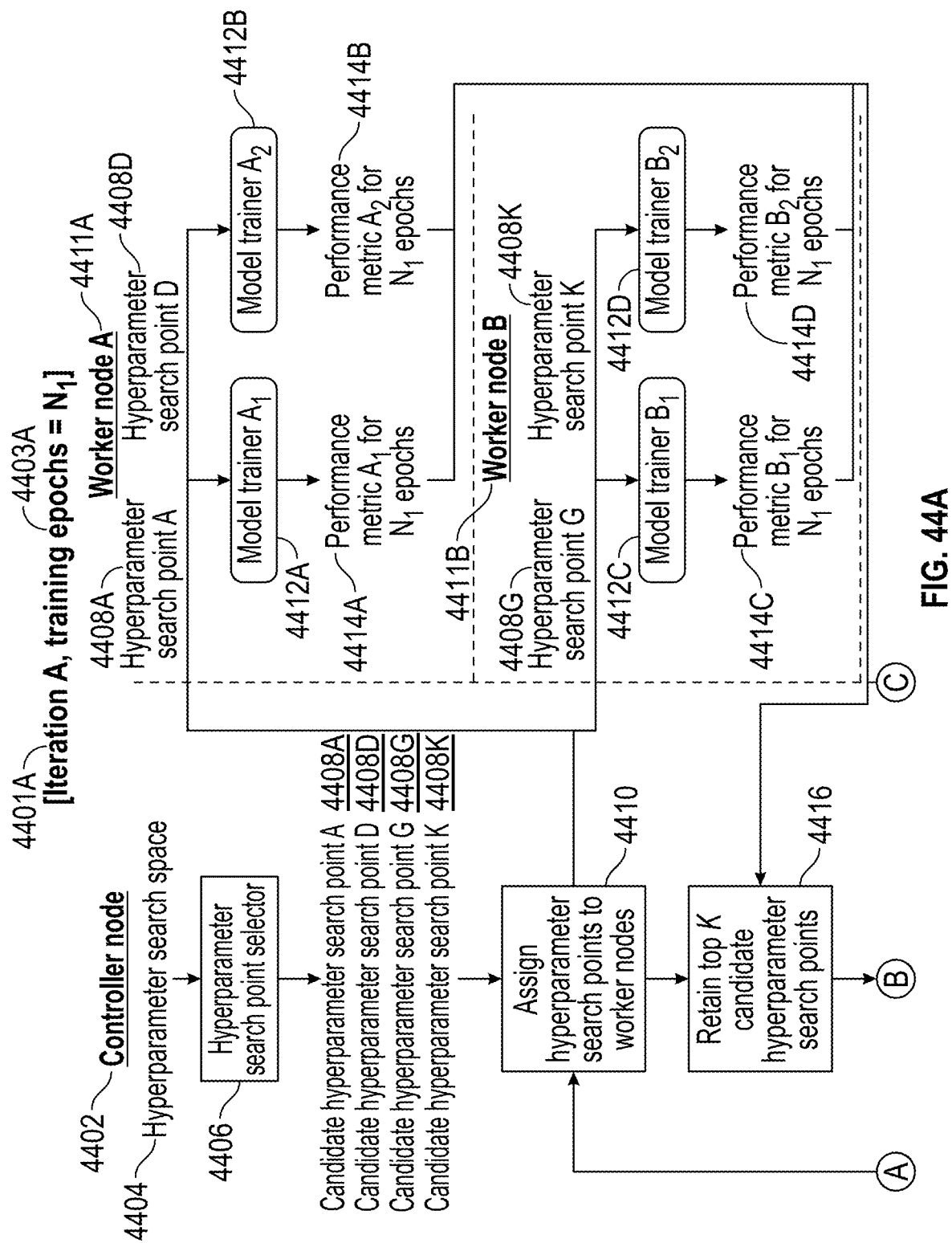
FIGS. 44A-44B illustrate examples of expanding the exploration of hyperparameter search points over one or more iterations, according to some embodiments of the present technology.
Figure 44A:
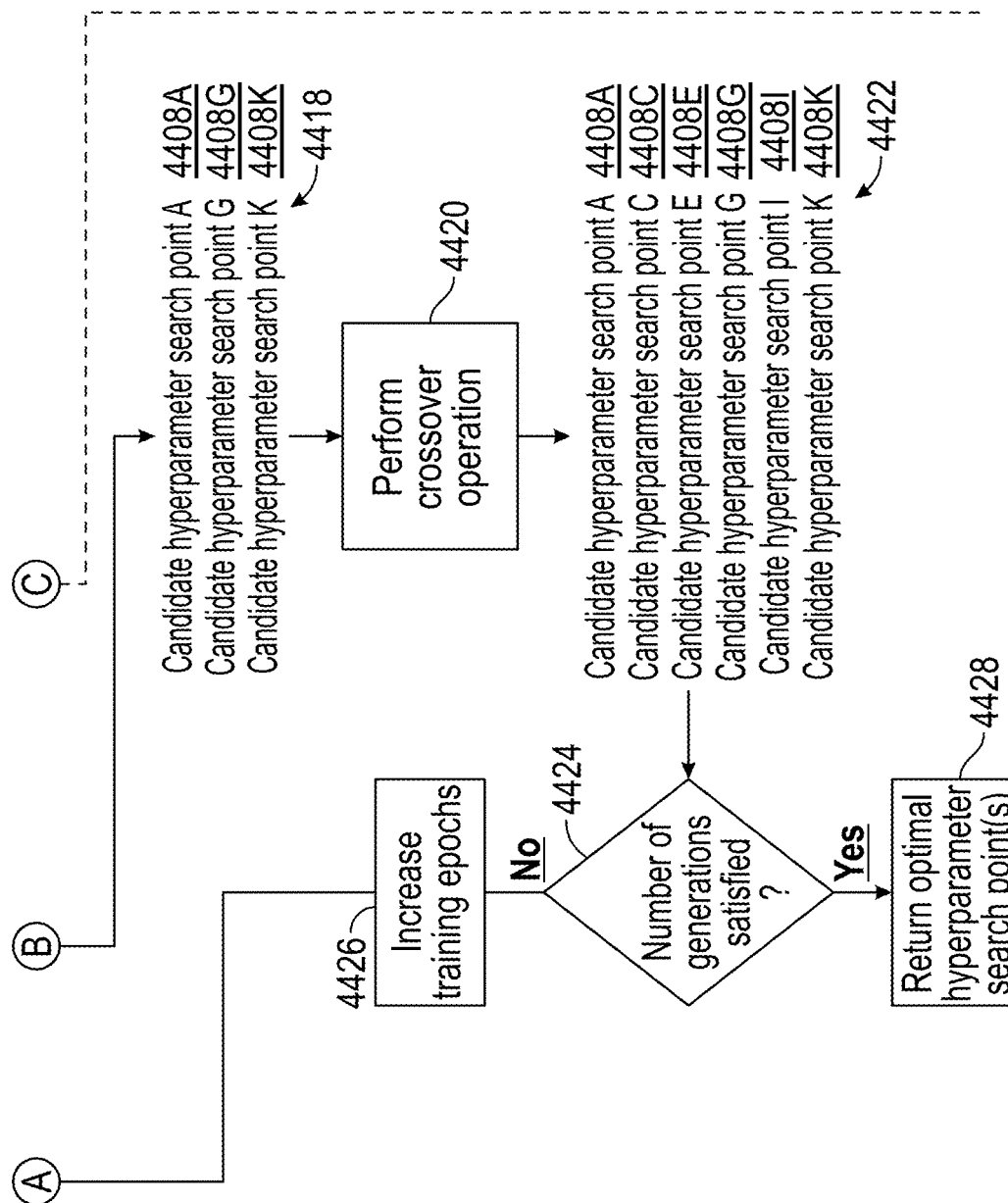
Figure 44B:
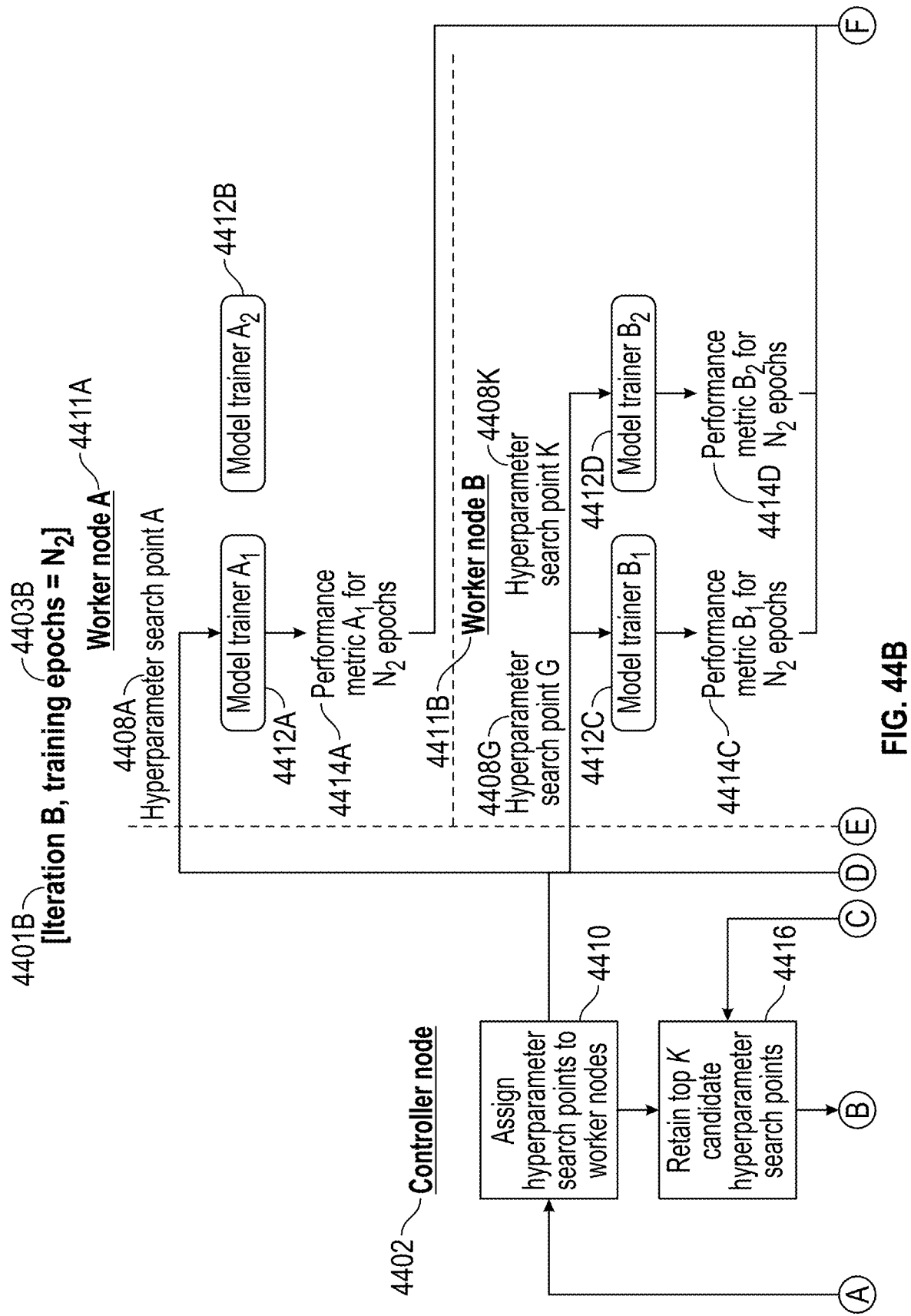
Figure 44B:
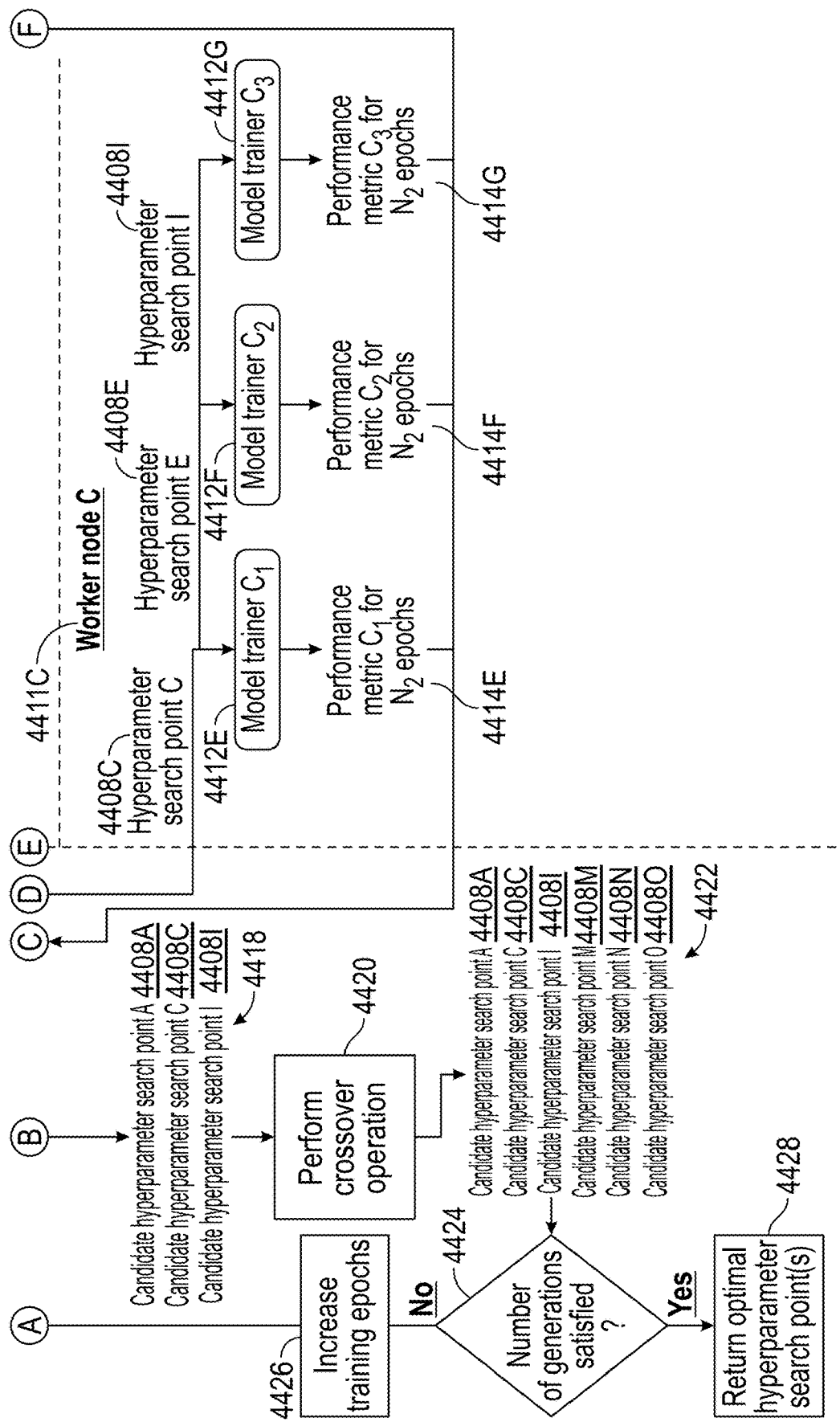
Figure 44C:
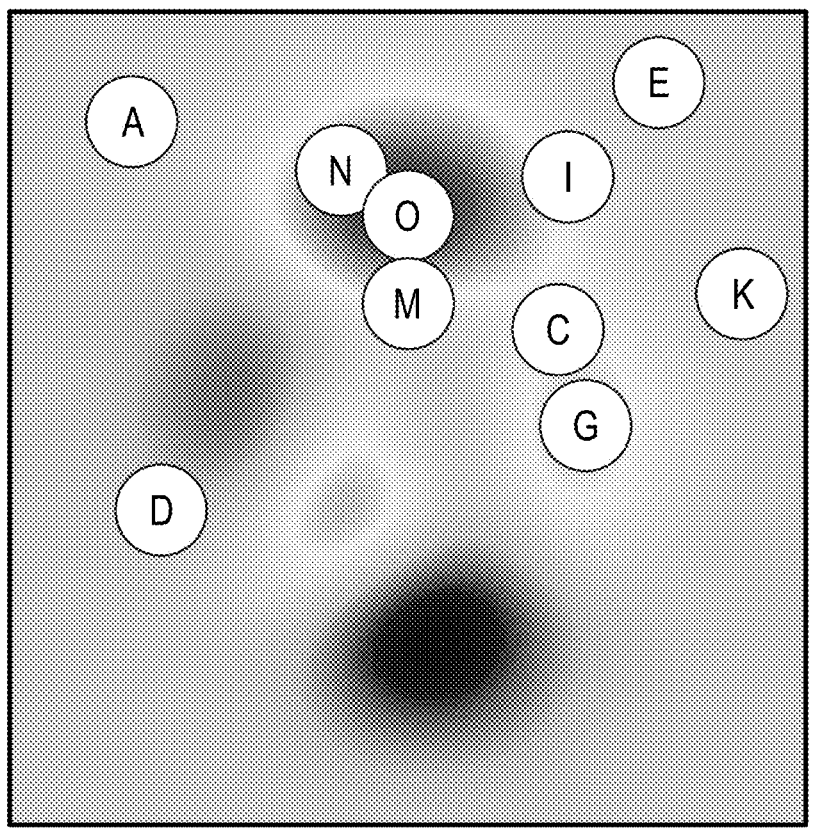
FIG. 44C illustrates an example of one or more crossover operations, according to some embodiments of the present technology.
Figure 44D:
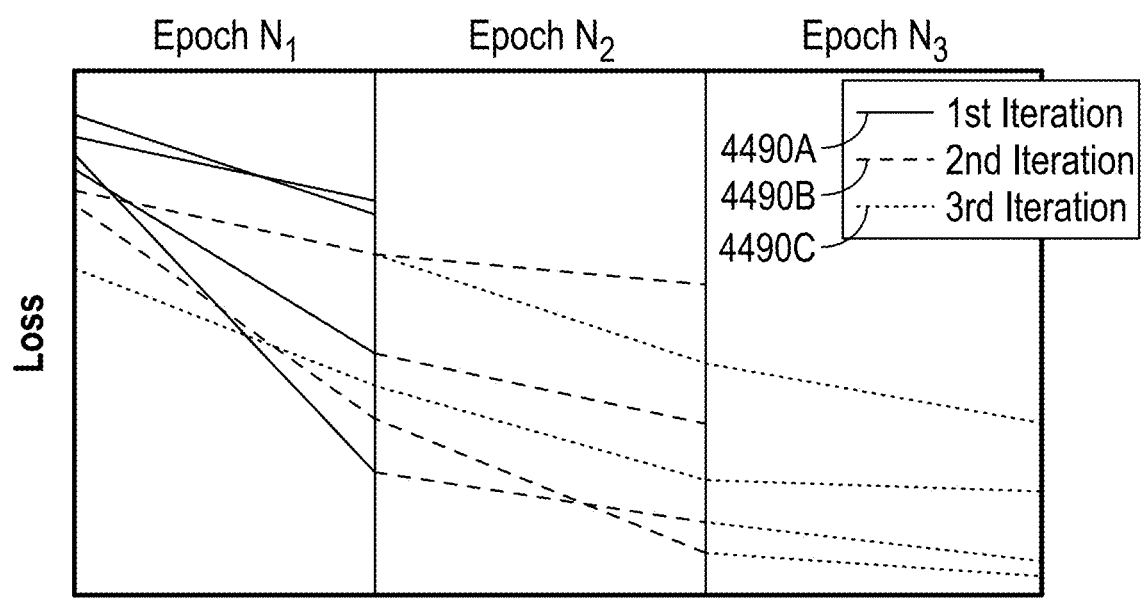
FIG. 44D graphically illustrates training of one or more machine learning models over one or more epochs, according to some embodiments of the present technology.
Figure 44E:
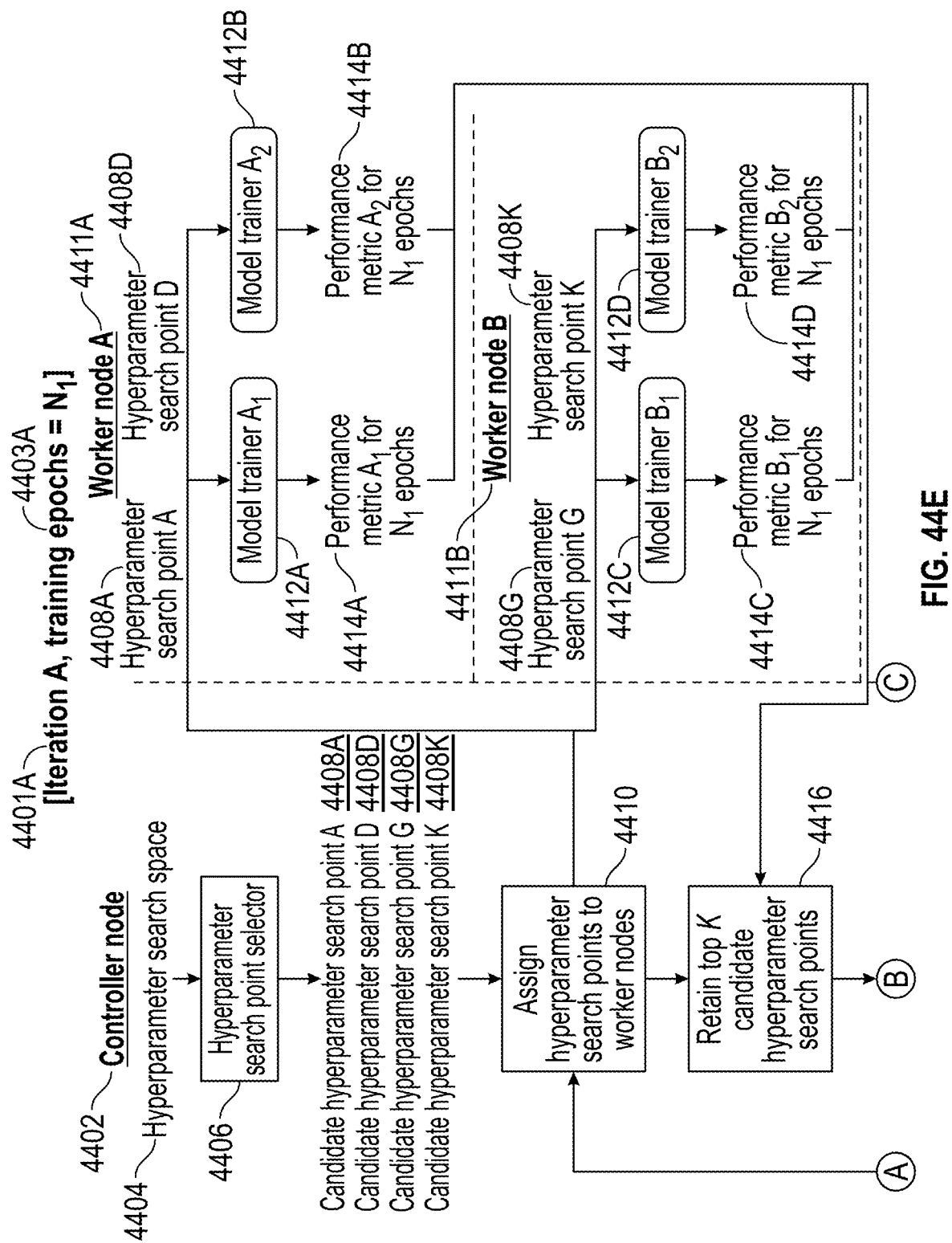
FIG. 44E illustrates another example of expanding the exploration of hyperparameter search points over one or more iterations, according to some embodiments of the present technology.
Figure 44E:
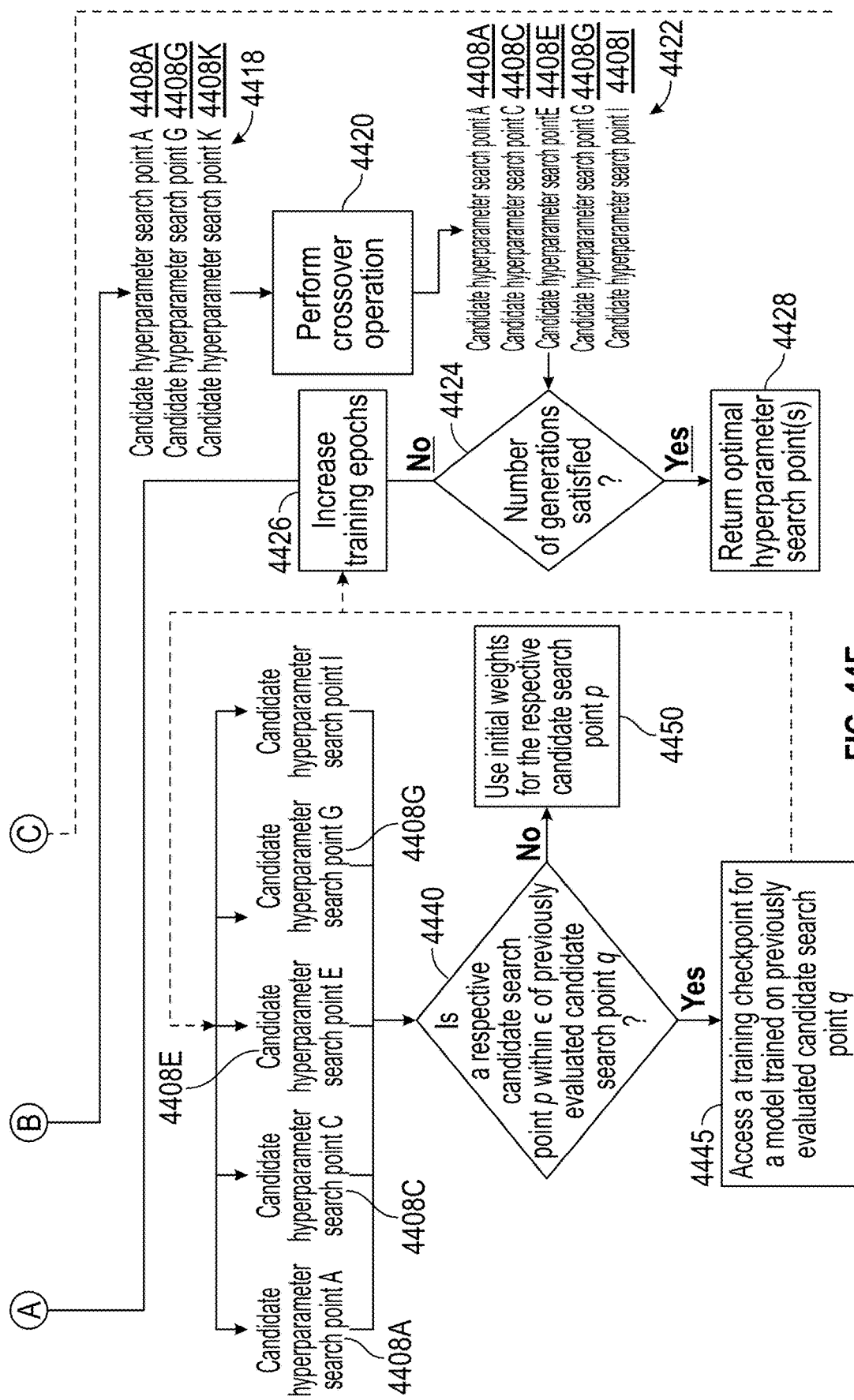

In a non-limiting example, FIGS. 44A and 44E may depict a controller node 4402 that includes a hyperparameter search point selector 4406. The hyperparameter search point selector 4406 may select a set of candidate hyperparameter search points from the hyperparameter search space 4404. For instance, hyperparameter search point selector 4406 may select hyperparameter search points 4408A (i.e., Candidate Hyperparameter Search Point A), 4408D (i.e., Candidate Hyperparameter Search Point D), 4408G (i.e., Candidate Hyperparameter Search Point G), and 4408K (i.e., Candidate Hyperparameter Search Point K) which may each represent distinct search points in the hyperparameter search space 4404. The selected hyperparameter search points may, in some examples, be selected from a larger set previously identified by controller node 4402.

In some examples, the set of candidate hyperparameter search points are randomly selected from the hyperparameter search space and the set of candidate hyperparameter search points include less than a predefined maximum number of candidate hyperparameter search points. For instance, as described with reference to FIGS. 44A and 44E, hyperparameter search points 4408A, 4408D, 4408G, and 4408K may be randomly selected. Additionally, the selected hyperparameter search points may have less than a predefined maximum number of candidate hyperparameter search points (e.g., 4 search points may be selected but the hyperparameter search space may include more than 4 possible search points).

As shown in FIG. 43, process 4320 of method 4300 may assign, by the controller node, the set of candidate hyperparameter search points to a set of model trainers of one or more worker nodes. A "worker node" may refer to a subordinate component in a distributed computing or network architecture that performs tasks or computations under the control of a controller node. A "model trainer" may refer to a system or component responsible for training a machine learning model. Each worker node may have a respective subset of the set of model trainers. Additionally, each model trainer may have a corresponding processor for performing the training (e.g., a corresponding graphics processing unit (GPU)). Assigning the set of candidate hyperparameter search points may include providing a respective message from the controller node to each worker node, where the respective message may indicate the respective hyperparameter search points. Additionally, the message may indicate which hyperparameter search point is to be trained by which model trainer.

In a non-limiting example, controller node 4402 of FIGS. 44A and 44E may assign the selected hyperparameter search points to respective model trainers of worker nodes. For instance, at 4410, controller node 4402 may assign first hyperparameter search point 4408A to a first model trainer 4412A of first worker node 4411A and second hyperparameter searcher search point 4408D to a second model trainer 4412B of first worker node 4411A. Additionally, controller node 4402 may assign third hyperparameter search point 4408G to first model trainer 4412C of second worker node 4411B and may assign fourth hyperparameter search point 4408K to second model trainer 4412D of second worker node 4411B.

In some examples, process 4320 assigning the set of candidate hyperparameter search points to the set of model trainers of the one or more worker nodes includes assigning a first candidate hyperparameter search point to a first respective model trainer of a first worker node and assigning a second candidate hyperparameter search point to a first respective model trainer of a second worker node. For instance, in a non-limiting example as depicted with reference to FIGS. 44A and 44E, controller node 4402 may assign candidate hyperparameter search point 4408A to model trainer 4412A of worker node 4411A and may assign candidate hyperparameter search point 4408G to model trainer 4412C of worker node 4411B.

Alternatively, process 4320 assigning the set of candidate hyperparameter search points to the set of model trainers of the one or more worker nodes may include assigning a first candidate hyperparameter search point to a first respective model trainer of a first worker node and assigning a second candidate hyperparameter search point to a second respective model trainer of the first worker node. For instance, in a non-limiting example as depicted with reference to FIGS. 44A and 44E, controller node 4402 may assign candidate hyperparameter search point 4408A to model trainer 4412A of worker node 4411A and may assign candidate hyperparameter search point 4408D to model trainer 4412C of worker node 4411B.

As shown in FIG. 43, process 4330 of method 4300 may concurrently train, via the set of model trainers, a set of machine learning models for a target number of epochs using the set of candidate hyperparameter search points assigned to the set of model trainers. A "machine learning model" may refer to a computational object used to determine patterns and relationships associated with a set of data. An "epoch" may refer to a single complete pass of data through a machine learning model. A "target number of epochs" may refer to a configured (e.g., by the controller node) or pre-configured number of times that data is passed through a machine earning model. The set of model trainers being trained "concurrently" may refer to each of the set of model trainers performing training over a respective duration, where the respective duration for a first model trainer of the set of model trainers overlaps with the respective duration for each other model trainer of the set of model trainers.

In some examples, each model trainer may be associated with a respective machine learning model. In such examples, training a machine learning model at a respective model trainer may include the corresponding worker node configuring the machine learning model with the hyperparameter values indicated by the candidate hyperparameter search point assigned to the respective model trainer. Additionally, the training may adjust, according to the configured hyperparameter values, one or more internal parameters (e.g., weights) of the machine learning model using a training data set over the target number of epochs. In some examples, from the training, each model trainer may identify an associated performance metric and may provide an indication of the performance metric to the controller node.

In a non-limiting example, as depicted in FIGS. 44A and 44E, model trainer 4412A, 4412B, 4412C, and 4412D may be configured (e.g., by the controller node) or pre-configured with a target number of training epochs 4403A (e.g., $N_1$). First model trainer 4412A of first worker node 4411A may perform training on a first machine learning model using candidate hyperparameter search point 4408A for the target number of epochs 4403A; second model trainer 4412B of first worker node 4411A may perform training on a second machine learning model using candidate hyperparameter search point 4408D for the target number of epochs 4403A; first model trainer 4412C of second worker node 4411B may perform training on a third machine learning model using candidate hyperparameter search point 4408G for the target number of epochs 4403A; and second model trainer 4412D of second worker node 4411B may perform training on a fourth machine learning using candidate hyperparameter search point 4408K for the target number of epochs 4403A. As a result of the training, model trainer 4412A may output first performance metric 4414A (i.e., $A_1$), model trainer 4412B may output second performance metric 4414B (i.e., $A_2$), model trainer 4412C may output third performance metric 4414C (i.e., $B_1$), and model trainer 4412D may output fourth performance metric 4414D (i.e., $B_2$). Each of performance metrics 4414A, 4414B, 4414C, and 4414D may be provided by worker nodes 4411A and 4411B to the controller node 4402.

In some examples, the controller node may instruct the one or more worker nodes to concurrently train the set of machine learning models for the target number of epochs using the set of candidate hyperparameter search points. For instance, in a non-limiting example as depicted with reference to FIGS. 44A and 44E, controller node 4402 may provide signaling to worker nodes 4411A and 4411B instructing worker nodes 4411A and 4411B to train the set of machine learning models concurrently.

In some examples, process 4330 may save, to a computer database, a set of training checkpoints associated with training the set of machine learning models for the target number of epochs in process 4330. A "training checkpoint" may refer to a state of a machine learning model at a particular time (e.g., in between epochs). The state of the machine learning model may include learned parameters (e.g., weights and/or biases), a state of an optimizer, and additional metadata. The computer database may be located at the respective worker node where training is performed or may be located at an external entity accessible to the worker node.

As shown in FIG. 43, process 4340 of method 4300 may identify, by the controller node, a collection of intermediate candidate hyperparameter search points that outperform a remainder of the set of candidate hyperparameter search points by evaluating a performance of the set of machine learning models after training for the target number of epochs. A "collection of intermediate candidate hyperparameter search points" may refer to a subset of the set of candidate hyperparameter search points.

Evaluating a performance of the set of machine learning models may include providing, by the worker nodes to the controller node, a set of performance metric values (e.g., efficacy metric values) corresponding to the set of candidate hyperparameter search points. For instance, the set of performance metric values may include a performance metric value for each candidate hyperparameter search point assigned to the set of worker nodes. The performance metric value associated with a respective candidate hyperparameter search point may be output by the respective model trainer to which the candidate hyperparameter search point is assigned. After the controller node receives the set of performance metric values, the controller node may identify which of the performance metric values rank within a predefined scoring range. Examples of performance metrics (e.g., efficacy metrics) may include, but not be limited to, accuracy, precision, recall, or an F1 score.

The collection of intermediate candidate hyperparameter search points outperforming the remainder of the set of candidate hyperparameter search points may refer to each of the performance metric values associated with the collection of intermediate candidate hyperparameter search points being within the predefined scoring range and each performance metric values associated with the remainder of the set of candidate hyperparameter search points being outside of the predefined scoring range. Additionally, or alternatively, the candidate hyperparameter search points with the K maximum or minimum performance metric values (e.g., or the K values closest to some threshold value) may be included in the collection of intermediate candidate hyperparameter search points, where K may be an integer value greater than or equal to 1. In some examples K may be configured (e.g., via a user interface) or pre-configured at the controller node.

In a non-limiting example, as depicted in FIGS. 44A and 44E, first model trainer 4412A of first worker node 4411A may output first performance metric 4414A (e.g., $A_1$) and second model trainer 4412B of first worker node 4411A may output second performance metric 4414B (e.g., $A_2$). Additionally, first model trainer 4412C of second worker node 4411B may output third performance metric 4414C (e.g., $B_1$) and second model trainer 4412D of second worker node 4411B may output fourth performance metric 4414D (e.g., $B_2$). Performance metrics 4414A, 4414B, 4414C, and 4414D may be determined based on providing data through the corresponding trainers over training epochs 4403A (e.g., $N_1$).

Performance metric 4414A, 4414B, 4414C, and 4414D may be provided by worker nodes 4411A and 4411B to controller node 4402. At 4416, controller node 4402 may retain the top K hyperparameter search points of the assigned hyperparameter search points. For instance, if K is equal to 3 and performance metrics 4414A, 4414C, and 4414D are the 3 closest values to a predefined threshold and/or if performance metrics 4414A, 4414C, and 4414D have the 3 lowest or 3 highest values, hyperparameter search points 4408A, 4408G, and 4408K, respectively, may be included in the collection of intermediate hyperparameter search points 4418 and hyperparameter search point 4408C may be excluded. Additionally, or alternatively, if performance metrics 4414A, 4414C, and 4414D are within a predefined scoring range and performance metric 4414B is outside of the predefined scoring range, hyperparameter search points 4408A, 4408G, and 4408K, respectively, may be included in the collection of intermediate hyperparameter search points 4418 and hyperparameter search point 4408C may be excluded. Hyperparameter search point 4408C may, additionally, or alternatively, be included if performance metric 4414B is included within the predefined scoring range, but the presence of hyperparameter search point 4408C would result in the collection of intermediate hyperparameter search points 4418 having greater than K hyperparameter search points.

As shown in FIG. 43, process 4350 of method 4300 may perform, by the controller node, a crossover operation with the collection of intermediate candidate hyperparameter search points to identify one or more new candidate hyperparameter search points to test in the hyperparameter search space. A "crossover operation" may refer to a computational operation performed using the intermediate candidate hyperparameter search points in order to generate a new candidate hyperparameter search point. A crossover operation, in some examples, may also be referred to as a mutation.

Testing the new candidate hyperparameter search points may refer to the controller node assigning the new candidate hyperparameter to a worker node for the worker node to provide to a model trainer for training a machine learning model. In a non-limiting example, as depicted in FIGS. 44A and 44E, the controller node 4402 may provide the collection of intermediate hyperparameter search points 4418 to 4420, where the controller node 4402 may perform the crossover operation.

Figure 44F:
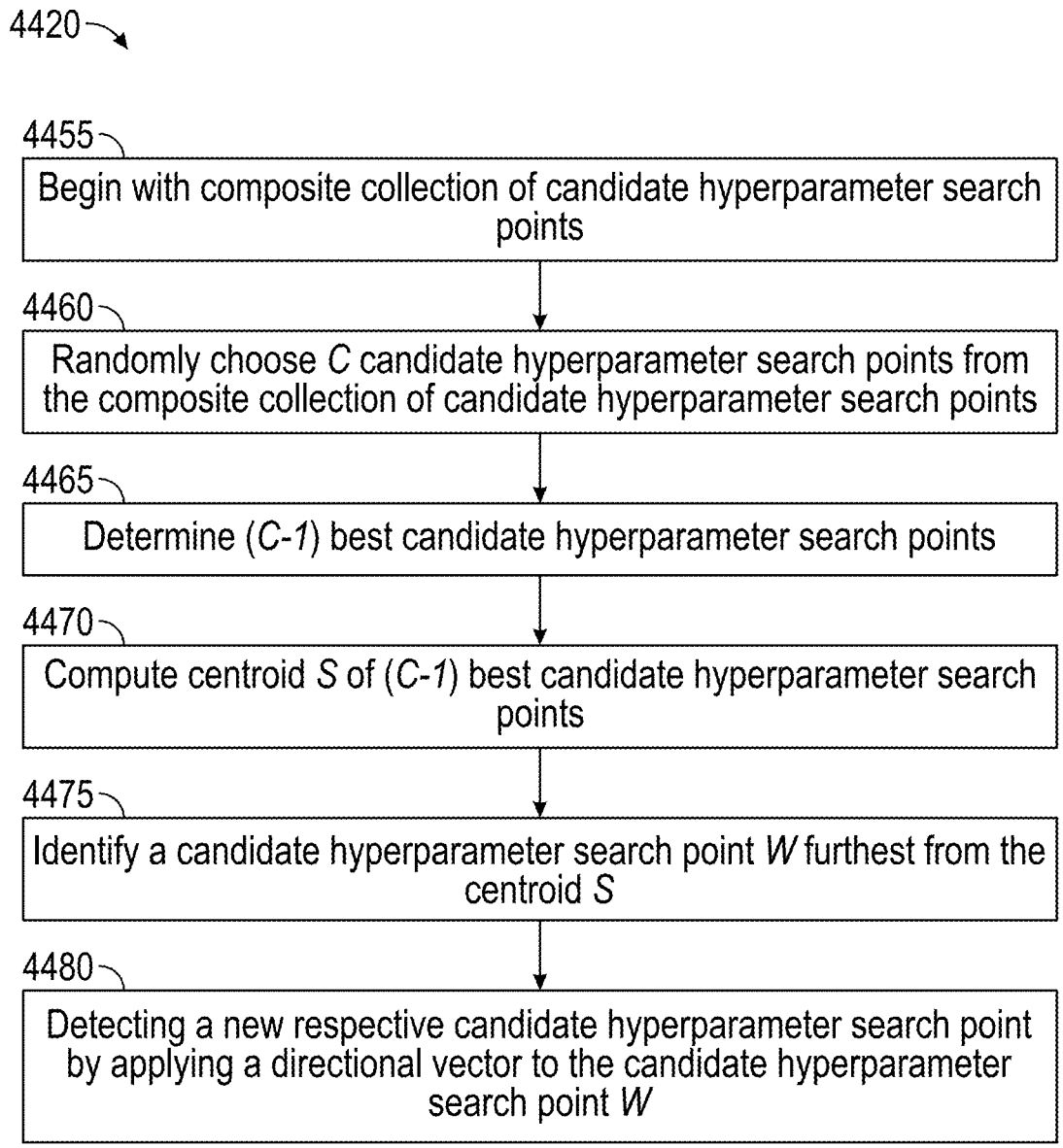
FIG. 44F illustrates various steps of a crossover operation, according to some embodiments of the present technology.

In some examples, the crossover operation may include randomly selecting a group of intermediate candidate hyperparameter search points from the collection of intermediate candidate hyperparameter search points. For instance, if there are K intermediate hyperparameter search points, the controller node may select C hyperparameter search points from the intermediate hyperparameter search points, where C≤K. In a non-limiting example, as depicted in FIG. 44F, the controller node at 4455, may begin with or acquire a composite collection of candidate hyperparameter search points. For instance, the controller node may determine the collection of intermediate candidate hyperparameter search points as described herein (e.g., as described with reference to 1416 in FIGS. 44A and 44E). After performing 4455, the controller node, at 4460 may randomly choose C candidate hyperparameter search points from the composite collection of candidate hyperparameter search points.

The crossover operation may further include identifying a subgroup of intermediate candidate hyperparameter search points that satisfies a pre-defined criterion. For instance, the controller node may choose a best C−1 points from the K intermediate candidate hyperparameter search points, where the best C−1 points may be those that satisfy the pre-defined criterion (e.g., having a maximum associated performance metric, a minimum associated performance metric, an associated performance metric within a pre-defined range or closest to a pre-defined value). In a no-limiting example, as depicted in FIG. 44F, the controller node at 4465 may determine the C−1 best candidate hyperparameter search points.

The crossover operation may further include computing a centroid for the subgroup of intermediate candidate hyperparameter search points, where a centroid may be defined as a geometric center or an average position of each of the subgroup of intermediate candidate hyperparameter search points. For instance, the controller node may compute a centroid S of the C−1 points from the K picked points. In a non-limiting example, as depicted in FIG. 44F, the controller node at 4470 may compute centroid S of the C−1 points best candidate hyperparameter search points.

The crossover operation may further include identifying a candidate hyperparameter search point W farthest (e.g., furthest) from the centroid S. For instance, the controller node may identify one of the subgroup of intermediate candidate hyperparameter search points or of the group of intermediate candidate hyperparameter search points as the point W farthest from the centroid (e.g., relative to the other points in the subgroup or the group). In a non-limiting example, as depicted in FIG. 44F, the controller node at 4475 may identify a candidate hyperparameter search point W farthest from the centroid S.

The crossover operation may further include detecting a new respective hyperparameter search point to test in the hyperparameter search space by applying a directional vector from the intermediate candidate hyperparameter search point identified as being furthest from the centroid. Additionally, or alternatively, a random value t may be selected in interval [0.1, 2] and a new hyperparameter search point may be computed as point $p=(1-t)*W+t*S$. In a non-limiting example, as depicted in FIG. 44F, the controller node at 4480 may detect a new respective candidate hyperparameter search point by applying a directional vector to the candidate hyperparameter search point W.

As shown in FIG. 43, process 4360 of method 4300 may add, by the crossover operation, the one or more new candidate hyperparameter search points to the collection of intermediate candidate hyperparameter search points to generate a composite collection of candidate hyperparameter search points. A "composite collection of candidate hyperparameters" may refer to a collection of hyperparameter search points including the intermediate candidate hyperparameter search points and some or each of the new hyperparameter search points generated during via the crossover operation.

In a non-limiting example, as depicted in FIG. 44A, the controller node may provide hyperparameter search points 4408A, 4408G, and 4408K to 4420, where the controller node may perform the crossover operation. From the crossover operation, the controller node may generate candidate hyperparameter search point 4408C, 4408E, and 4408I via the crossover operation and may add candidate hyperparameter search points to the collection of intermediate hyperparameter search points including hyperparameter search points 4408A, 440G, and 4408K to form the composite collection of candidate hyperparameter search points 4422. The composite collection of candidate hyperparameter search points 4422 may include candidate hyperparameter search points 4408A, 4408C, 4408E, 4408G, 4408I, and 4408K.

In some examples, the crossover operation may perform 4350 and 4360 until the composite collection of candidate hyperparameter search points reaches a target size. A "target size" may refer to an exact quantity of candidate hyperparameter search points to include in the composite collection of candidate hyperparameter search points. In a non-limiting example, as depicted in FIG. 44A, if the target size is 6, the controller node may perform the crossover operation 3 times to generate 3 new candidate hyperparameter search points (e.g., candidate hyperparameter search points 4408C, 4408E, and 4408I). The target size may be configured at the controller node (e.g., via a user interface) or may be pre-configured.

As shown in FIG. 43, process 4370 of method 4300 may determine, by the controller node, if a threshold number of generations have been exceeded after generating the composite collection of candidate hyperparameter search points. A "number of generations" may refer to a number of iterations that the system including the controller node and/or worker nodes has performed, where a single iteration may refer to a single instance of performing processes 4420 through 4460. For instance, FIGS. 44A and 44E may depict an initial iteration 4401A (e.g., a first iteration) for performing processes 4420 through 4460 and FIG. 44B may depict a subsequent iteration 4401B (e.g., a second iteration) for performing processes 4420 through 4460.

In a non-limiting example as depicted in FIGS. 44A and 44E, the controller node, after generating the composite collection of candidate hyperparameters, may determine at 4424 whether the threshold number of generations have been exceeded. If iteration 4401A is a first iteration and the threshold number of generations is set to 0, then the controller node may proceed to 4428, where the controller node may return an indication of the composite collection of hyperparameter search points 4422. Otherwise, the controller node may proceed to 4426 and/or 4440 (e.g., as depicted in FIG. 44E).

As shown in FIG. 43, process 4380 of method 4300 may, based upon determining that the threshold number of generations have not been exceeded, repeat process 4320 through 4370 for the composite collection of candidate hyperparameter search points until the threshold number of generations are exceeded.

In a non-limiting example, as depicted in FIGS. 44A, the controller node may determine, at 4424, that a threshold number of generations has not been exceeded and may proceed to 4426. At 4426, the controller node may increase training epochs (e.g., from training epochs 4403A as depicted in FIG. 44A to training epochs 4403B as depicted in FIG. 44B). Upon increasing the training epochs at 4426 or upon determining that that the threshold number of generations have not been exceeded at 4424, the controller node may transition from iteration 4401A (e.g., as depicted in FIG. 44A) to iteration 4401B (e.g., as depicted in FIG. 44B).

After transition to interval 4401B and increasing the training epochs at 4426 to training epochs 4403B (e.g., $N_2$, where $N_2 > N_1$), controller node 4402 may repeat process 4320, as depicted in FIG. 44B, by assigning the candidate hyperparameter search points from the previously generated composite collection of candidate hyperparameter search points 4422 (e.g., hyperparameter search points 4408A, 4408C, 4408E, 4408G, 4408I, and 4408K) to respective model trainers of respective worker nodes. For instance, controller node 4402 may assign candidate hyperparameter search point 4408A to first model trainer 4412A of first worker node 4411A; candidate hyperparameter search point 4408G to first model trainer 4412C of second worker node 4411B; candidate hyperparameter search point 4408K to second model trainer 4412D of second worker node 4411B; candidate hyperparameter search point 4408C to first model trainer 4412E of third worker node 4411C; candidate hyperparameter search point 4408E to second model trainer 4412F of third worker node 4411C; and candidate hyperparameter search point 4408I to third model trainer 4412G of third worker node 4411C. In some examples, the controller node may assign no candidate hyperparameter search point from the composite collection to second model trainer 4412B of first worker node 4411A). It should be noted that candidate hyperparameter search points used for training in previous iterations may keep their previous assignments (e.g., in which case no reassignment may occur) or may be given new assignments.

Additionally, as depicted in FIG. 44B, to repeat 4330, model trainers 4412A, 4412B, 4412C, 4412D, 4412E, 4412F, and 4412G may be concurrently trained according to the hyperparameter values given by the respective assigned hyperparameter search point over the updated number of training epochs 4403B and may output corresponding performance metric values. For instance, model trainer 4412A may generate an updated performance metric 4414A; model trainer 4412C may generate an updated performance metric 4414C; model trainer 4412D may generate an updated performance metric 4414D; model trainer 4412E may generate a performance metric 4414E (e.g., $C_1$); model trainer 4412F may generate a performance metric 4414F (e.g., $C_2$); and model trainer 4412G may generate a performance metric 4414G (e.g., $C_3$). The worker nodes 4411A, 4411B, and 4411C may provide each of these performance metrics to the controller node 4402. In some examples, model trainer 4412B may not output an updated performance metric 4412B or worker node 4411A may refrain from providing the updated performance metric 4412B to the controller node 4402.

Further, as depicted in FIG. 44B, to repeat 4340, the controller node 4402 may select an updated collection of intermediate candidate hyperparameter search points that outperform a remainder of the previously identified composite collection of candidate hyperparameter search points 4422 by evaluating a performance of the set of machine learning models after training for the updated number of epochs 4403B. For instance, the controller node 4402 may select K candidate hyperparameter search points (e.g., hyperparameter search points 4408A, 4408C, and 4408I) from the previously identified composite collection of candidate hyperparameter search points 4422 (e.g., hyperparameter search points 4408A, 4408C, 4408E, 4408G, 4408I, and 4408K) for the updated collection of intermediate candidate hyperparameter search points. The K candidate hyperparameter search points may be selected based on the received performance metrics 4414A through 4414G for the updated number of epochs 4403B. It should be noted that K may have the same value for each interval (e.g., same between intervals 4401A and 4401B) or may vary in value between intervals (e.g., different for intervals 4401A and 4401B).

Additionally, as depicted in FIG. 44B, to repeat 4350, the controller node 4402 may perform a crossover operation at 4420 with the updated collection of intermediate candidate hyperparameter search points 4418 (e.g., candidate hyperparameter search points 4408A, 4408C, and 4408I) to identify one or more additional new candidate hyperparameter search points to test in the hyperparameter search space. To repeat 4360, the controller node 4402 may add, by the crossover operation at 4420, the one or more additional new candidate hyperparameter search points to the updated collection of intermediate candidate hyperparameter search points 4418 to generate an updated composite collection of candidate hyperparameter search points 4422. For instance, the controller node 4402 may generate new hyperparameter search points 4408M, 4408N, and 4408O according to the techniques described herein and may add these search points to the updated collection of intermediate candidate hyperparameter search points 4418 (e.g., hyperparameter search points 4408A, 4048C, and 4408I) to generate the updated composite collection of candidate hyperparameter search points 4422.

After generating the updated composite collection of candidate hyperparameter search points 4420, the controller node 4402, as depicted in FIG. 44B, may repeat 4370 by determining if the threshold number of generations have been exceeded after generating the updated composite collection of candidate hyperparameter search points 4422. If so, the controller node 4402 may proceed to 4428, where the controller node may return an indication of the updated composite collection of hyperparameter search points 4422. Otherwise, the controller node 4402 may proceed to 4426 to perform 4430 through 4470 an additional time.

In some examples, performing process 4380 may include process 4380 determining if a respective candidate hyperparameter search point of the composite collection of candidate hyperparameter search points is within a predefined threshold of a previously tested candidate hyperparameter search point of the set of candidate hyperparameter search points used in process 4330. For instance, as depicted in FIG. 44E, after controller node 4402 determines that the number of generations are not satisfied at 4424, the controller node 4402 may proceed to 4440. The controller node 4402 may determine, for each candidate hyperparameter search point of the composite collection of candidate hyperparameter search points 4422 (e.g., hyperparameter search points 4408A, 4408C, 4408E, 4408G, 4408I, and 4408K), whether the candidate hyperparameter search point is within a threshold distance of a candidate hyperparameter search point of a previously evaluated candidate set (e.g., the originally assigned set including hyperparameters 4408A, 4408D, 4408G, and 4408K). For instance, the controller node may determine if a hyperparameter search point of the predefined threshold E (e.g., a threshold distance) of a hyperparameter search point of a previously evaluated candidate set (e.g., the originally assigned set or the assigned set of a previous iteration). In some examples, e may be a vector value that includes hyperparameter offset values defining how far any matching hyperparameter search point of the previously evaluated candidate set is able to be from that of the hyperparameter search point of the composite collection.

If the respective candidate hyperparameter search point is within the predefined threshold of the previously tested candidate hyperparameter search point, the controller node may access a training checkpoint associated with a first machine learning model trained on the previously test candidate hyperparameter search point for the target number of epochs and may repeat processes 4320 through 4370 for the composite collection of candidate hyperparameter search points using at least the training checkpoint of the first machine learning model. In examples in which the training checkpoint is accessed by the controller node, repeating processes 4320 through 4330 may include assigning, by the controller node, the respective candidate hyperparameter search point to a model trainer of a first worker node and using, by the model trainer, of the first worker node, the training checkpoint of the first machine learning model to train a second machine learning model on the respective candidate hyperparameter search point for a second target number of epochs, the second target number of epochs greater than the target number of epochs.

In a non-limiting example, as illustrated with FIG. 44E, controller node 4402 may determine that candidate hyperparameter search point 4408C is within e of candidate hyperparameter search point 4408A (e.g., one of the previously assigned hyperparameter search points) and may proceed to 4445 and may access a training checkpoint for a model trained on hyperparameter search point 4408A (e.g., the model previously trained by model trainer 4412A). In such examples, when assigning candidate hyperparameter search point 4408C to model trainer 4412E, the controller node 4402 may further assign a training checkpoint associated with hyperparameter search point 4408A (e.g., a training checkpoint logged during number of epochs 4403A) to model trainer 4412E for training over the number of epochs 4403B.

Alternatively, if the respective candidate hyperparameter is not within the predefined threshold of the previously tested candidate hyperparameter search point, process 4380 may further include initializing, by the controller node, a set of initial weights that is not based on the training checkpoint associated with the machine learning model and repeating processes 4320 and 4330 for the respective candidate hyperparameter search point using at least the set of initial weights. In a non-limiting example, as illustrated with FIG. 44E, controller node 4402 may determine that candidate hyperparameter search point 4408E is not within e of any of a previously evaluated collection of hyperparameter search points (e.g., hyperparameter search points 4408A, 4408D, 4408G, or 4408K) and may, accordingly, proceed to 4450, where the controller node 4402 may initialize a set of initial weights without respect to the training checkpoints for any hyperparameter search points of the previously evaluated collection of hyperparameter search points when training a machine learning model using model trainer 4412F.

In some examples, the composite collection of candidate hyperparameter search points includes a first candidate hyperparameter search point of the set of candidate hyperparameter search points. In such examples, repeating process 4330 for the composite collection of candidate hyperparameter search points may include resuming, at a first model trainer, training of a machine learning model trained on the first candidate hyperparameter search point until the machine learning model has been trained on the first candidate hyperparameter search point for a second target number of epochs, the second target number of epochs being greater than the target number of epochs. In such examples, repeating processes 4320 and 4330 may include assigning, by the controller node, the respective candidate hyperparameter search point to a model trainer of a first worker node and using, by the model trainer of the first worker node, the training checkpoint of the first machine learning model to train a second machine learning model on the respective candidate hyperparameter search point for a second target number of epochs, the second target number of epochs greater than the target number of epochs.

In a non-limiting example, as illustrated with FIG. 44A, hyperparameter search point 4408A may be in both the initially assigned set of hyperparameter search points at 4410 and the composite collection of hyperparameter search points 4422. Accordingly, when assigning candidate hyperparameter search point 4408A to model trainer 4412A in FIG. 44B, the controller node may further assign a training checkpoint associated with hyperparameter search point 4408A (e.g., a training checkpoint logged during number of epochs 4403A) to model trainer 4412A for training over the number of epochs 4403B.

In some examples, the composite collection of candidate hyperparameter search points may include a second candidate hyperparameter search points that was not included in the collection of intermediate candidate hyperparameter search points identified in process 4340. In such examples, repeating process 4330 for the composite collection of candidate hyperparameter search points may include initiating, at a second model trainer, training of a machine learning model for the second target number of epochs using the second candidate hyperparameter search point. In a non-limiting example, as illustrated with FIG. 44A, hyperparameter search point 4408C may be in the composite collection of hyperparameter search points 4422 but not in the initially assigned set of hyperparameter search points at 4410. Accordingly, when assigning candidate hyperparameter search point 4408C to model trainer 4412E in FIG. 44B, the controller node, in some examples, may not assign a corresponding training checkpoint (e.g., unless candidate hyperparameter search point 4408C is with e of a hyperparameter search point included in the collection of intermediate candidate hyperparameter search points).

As shown in FIG. 43, process 4390 of method 4300 may, based upon determining that the threshold number of generations have been exceeded, output at least one hyperparameter search point from the composite collection of candidate hyperparameters as an optimal hyperparameter search point for the hyperparameter search space. For instance, as illustrated with FIG. 44B, if iteration 4401B represents a second iteration and the threshold number of generations is 1, the controller node 4402 may proceed from 4424 to 4428. Accordingly, controller node 4402 may output (e.g., to a user interface), the updated composite collection of hyperparameters 4422 (e.g., candidate hyperparameter search points 4408A, 4408C, 4408I, 4408M, 4408N, and 4408O).

FIG. 44C may depict hyperparameter search points within a hyperparameter search space. In some examples, hyperparameter search points A, C, D, E, G, I, K, M, N, and O may correspond to hyperparameter search point 4408A, 4408C, 4408D, 4408E, 4408G, 4408I, 4408K, 4408M, 4408N, and 4408O, respectively, as described with reference to FIGS. 44A, 44B, and 44E. As depicted in FIG. 44C, various hyperparameter search points (e.g., M, N, and O) may be associated with better performance metric values and other hyperparameter search points (e.g., D) may be associated with worse performance metric values.

FIG. 44D may depict a hyperparameter tuning timeline. A first set of hyperparameter search points may be selected for a first iteration 4490A (e.g., iteration 4401A as described with reference to FIG. 44A) and may be trained over a first epoch $N_1$ (e.g., epoch 4403A as described with reference to FIG. 44A) according to the techniques described herein. A first subset of the selected hyperparameter search points may be selected for a second iteration 4490B (e.g., two) and a second subset of the selected hyperparameter search points (e.g., two hyperparameter search points) may not be selected for the second iteration 4490B. Instead, additional hyperparameter search points may be generated and/or selected. During the second iteration 4490B (e.g., iteration 4401B as described with reference to FIG. 44B), the first subset of the selected hyperparameter search points may undergo additional training over a second epoch $N_2$ (e.g., epoch 4403B as described with reference to FIG. 44B). Such hyperparameter search points may, in some examples, avoid reperforming training over the first epoch $N_1$ before performing training over the second epoch $N_2$ (e.g., by using a training checkpoint). The additional hyperparameter search points may undergo training over the first epoch $N_1$ and the second epoch $N_2$.

After the second iteration 4490B, a first subset of the hyperparameter search points (e.g., two hyperparameter search points) trained in the second iteration 4490B may be selected for a third iteration 4490C and a second subset of the hyperparameter search points trained in the second iteration 4490B may not be selected for the third iteration. Instead, additional hyperparameter search points may be generated and/or selected for the third iteration 4490c. During the third iteration 4490C, the first subset of the selected hyperparameter search points may undergo additional training under a third epoch $N_3$. Such hyperparameter search points may, in some examples, avoid reperforming training over the first epoch $N_1$ and the second epoch $N_2$ before performing training over the third epoch $N_3$ (e.g., by using a training checkpoint). Additionally, a portion of the additional hyperparameter search points generated for the third iteration may be similar enough to a previously trained hyperparameter search point (e.g., as determined according to the process described with reference to FIG. 44E) to avoid reperforming at least some training (e.g., to start from a training checkpoint associated with a training of another similar hyperparameter search point over the first epoch $N_1$). The remaining portion of the additional hyperparameter search points may undergo training over the first epoch $N_1$, the second epoch $N_2$, and the third epoch $N_3$.

In some examples, the techniques performed with regards to processes 4410 through 4490 may be a form of hyperparameter space parallelism, where hyperparameter space parallelism may involve a tuner searching a hyperparameter space for best training results. Hyper-parameter space parallelism, in some examples, may involve each trainer (e.g., each model trainer) using one GPU and training for a subset of hyperparameters (e.g., a respective hyperparameter search point). Each trainer may perform training on one hyperparameter search point at a time. Additionally, gradient accumulation and updating of weights may happen independently and GPU resources may be utilized in parallelism. Such training may avoid limitations on data parallelism and model parallelism for tuning-related tasks.

Other techniques that support processes 4410 through 4490 may include checkpointing of temporary weights to a table, which may reduce or mitigate a limitation on the number of points to try (e.g., a number of hyperparameter search points to evaluate) based on memory size. Additionally, or alternatively, such techniques may include implementing data locality, in which a job or task with the same point may be sent to the same node or process (e.g., the same worker node), which may avoid an associated data migration. Additionally, or alternatively, such techniques may include keeping a training process alive across different training sessions, which may avoid an associated initialization and/or a reloading of weights. Additionally, or alternatively, such techniques may include online monitoring, where a table of results is generated while tuning is still in progress (e.g., a table including hyperparameters, number of epochs, loss history, or a history of other metrics and where a user may monitor the progress online (e.g., via a user interface).

It shall be noted that, in the method(s) described herein where one or more steps (e.g., processes) are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

It shall also be noted that the system and methods of the embodiments and variations described herein can be embodied and/or implemented at least in part as a machine comprising a computer-readable medium storing computer-readable instructions. The instructions may be executed by computer-executable components integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, memory sticks (e.g., SD cards, USB flash drives), cloud-based services (e.g., cloud storage), magnetic storage devices, Solid-State Drives (SSDs), or any suitable device. The computer-executable component is preferably a general or application-specific processor, but any suitable dedicated hardware or hardware/firmware combination device can alternatively or additionally execute the instructions.

The systems and methods of the preferred embodiments may additionally, or alternatively, be implemented on an integrated data analytics software application and/or software architecture such as those offered by SAS Institute Inc. of Cary, N.C., USA. Merely for illustration, the systems and methods of the preferred embodiments may be implemented using or integrated with one or more SAS software tools such as SAS® Viya™ which is developed and provided by SAS Institute Inc. of Cary, N.C., USA.

Although omitted for conciseness, the preferred embodiments include every combination and permutation of the implementations of the systems and methods described herein.

As a person skilled in the art will recognize from the previous detailed description and from the figures and claims, modifications and changes can be made to the embodiments of the disclosure without departing from the scope of the various described embodiments. For example, aspects/operations of methods 1400, 2100, 3000, 3400, 3900, 4100, and 4300 may be interchanged, substituted, and/or added between these methods.

What is claimed is:

1. A computer-program product comprising a non-transitory machine-readable storage medium storing computer instructions that, when executed by one or more processors, perform operations comprising:
    (A) selecting, by a controller node, a plurality of hyperparameter search points from a hyperparameter search space;
    (B) assigning, by the controller node, the plurality of hyperparameter search points to a plurality of model trainers of one or more worker nodes;
    (C) concurrently training, via the plurality of model trainers, a plurality of machine learning models for a target number of epochs using the plurality of hyperparameter search points assigned to the plurality of model trainers;
    (D) computing, via the plurality of model trainers, a plurality of performance metrics that measure a performance of the plurality of machine learning models during the target number of epochs;
    (E) transmitting, by the one or more worker nodes, the plurality of performance metrics to the controller node;
    (F) removing, by the controller node, one or more underperforming hyperparameter search points from the plurality of hyperparameter search points according to a pre-defined performance metric ranking criterion associated with the plurality of performance metrics;
    (G) determining, by the controller node, if a remainder of the plurality of hyperparameter search points satisfy a termination condition after removing the one or more underperforming hyperparameter search points in (F);
    (H) based upon determining that the plurality of hyperparameter search points does not satisfy the termination condition, increasing the target number of epochs and repeating (B)-(G) for the remainder of the plurality of hyperparameter search points until the termination condition is satisfied; and
    (I) based upon determining that the remainder of the plurality of hyperparameter search points satisfy the termination condition, outputting at least one hyperparameter search point from the remainder of the plurality of hyperparameter search points as an optimal configuration for a plurality of hyperparameters.

2. The computer-program product according to claim 1, wherein:
    a first respective hyperparameter search point is assigned to a first model trainer, and a second respective hyperparameter search point is assigned to a second model trainer, and
    concurrently training the plurality of machine learning models for the target number of epochs includes concurrently:
        training, via the first model trainer, a first machine learning model for the target number of epochs using hyperparameter values associated with the first respective hyperparameter search point; and
        training, via the second model trainer, a second machine learning model for the target number of epochs using hyperparameter values associated with the second respective hyperparameter search point.

3. The computer-program product according to claim 1, wherein:
    a first respective hyperparameter search point and a second respective hyperparameter search point remain in the plurality of hyperparameter search points after removing the one or more underperforming hyperparameter search points in (F), and
    repeating (C) of (B)-(G) for the remainder of the plurality of hyperparameter search points at least includes concurrently:
        resuming, at a first model trainer, training of a machine learning model trained on the first respective hyperparameter search point for the target number of epochs increased by (H), and
        resuming, at a second model trainer, training of a machine learning model trained on the second respective hyperparameter search point for the target number of epochs increased by (H).

4. The computer-program product according to claim 1, wherein:
    concurrently training the plurality of machine learning models for the target number of epochs in (C) includes concurrently training the plurality of machine learning models for a first number of epochs,
    increasing the target number of epochs in (F) includes increasing the target number of epochs from the first number of epochs to a second number of epochs, and
    repeating (C) of (B)-(G) for the remainder of the plurality of hyperparameter search points at least includes:
        concurrently training, via the plurality of model trainers, machine learning models associated with the remainder of the plurality of hyperparameter search points for the second number of epochs.

5. The computer-program product according to claim 1, wherein:
    a first respective hyperparameter search point remains and a second respective hyperparameter search point does not remain in the plurality of hyperparameter search points after removing the one or more underperforming hyperparameter search points in (F), and repeating (C) of (B)-(G) for the remainder of the plurality of hyperparameter search points at least includes concurrently:
  resuming, at a first model trainer, training of a machine learning model trained on the first respective hyperparameter search point for the target number of epochs increased by (H), and
  forgoing resuming, at a second model trainer, training of a machine learning model trained on the second respective hyperparameter search point for the target number of epochs increased by (H).

6. The computer-program product according to claim 1, wherein:
the plurality of performance metrics computed in (D) includes a respective performance metric that measures the performance of a machine learning model trained on a first respective hyperparameter search point for the target number of epochs,
the first respective hyperparameter search point remains in the plurality of hyperparameter search points after removing the one or more underperforming hyperparameter search points in (F), and
repeating (D) of (B)-(G) for the remainder of the plurality of hyperparameter search points at least includes:
  re-computing the respective performance metric to measure the performance of the machine learning model trained on the first respective hyperparameter search point for the target number of epochs increased by (H).

7. The computer-program product according to claim 1, wherein:
transmitting the plurality of performance metrics to the controller node in (E) includes transmitting a first respective performance metric that measures the performance of a machine learning model trained on a first respective hyperparameter search point for the target number of epochs,
the first respective hyperparameter search point remains in the plurality of hyperparameter search points after removing the one or more underperforming hyperparameter search points in (F), and
repeating (E) of (B)-(G) for the remainder of the plurality of hyperparameter search points at least includes transmitting an update to the first respective performance metric that measures the performance of the machine learning model trained on the first respective hyperparameter search point for the target number of epochs increased by (H).

8. The computer-program product according to claim 1, wherein:
a respective performance metric of the plurality of performance metrics measures the performance of a machine learning model trained by a respective model trainer, and
removing the one or more underperforming hyperparameter search points from the plurality of hyperparameter search points according to the pre-defined performance metric ranking criterion includes:
  determining if the respective performance metric exceeds a minimum percentile threshold of the pre-defined performance metric ranking criterion; and
  if the determining determines that respective performance metric does not exceed the minimum percentile threshold of the pre-defined performance metric ranking criterion:
    identifying a hyperparameter search point assigned to the respective model trainer that trained the machine learning model as an underperforming hyperparameter search point; and
    removing the hyperparameter search point from the plurality of hyperparameter search points.

9. The computer-program product according to claim 8, wherein:
removing the one or more underperforming hyperparameter search points from the plurality of hyperparameter search points according to the pre-defined performance metric ranking criterion further includes:
  if the determining determines that respective performance metric exceeds the minimum percentile threshold of the pre-defined performance metric ranking criterion:
    forgoing identifying the hyperparameter search point assigned to the respective model trainer as the underperforming hyperparameter search point; and
    forgoing removing the hyperparameter search point from the plurality of hyperparameter search points.

10. The computer-program product according to claim 8, wherein:
the respective performance metric is determined to exceed the minimum percentile threshold of the pre-defined performance metric ranking criterion when the respective performance metric ranks above a pre-defined percentage of other performance metrics in the plurality of performance metrics, and
the respective performance metric is determined to not exceed the minimum percentile threshold of the pre-defined performance metric ranking criterion when the respective performance metric does not rank above the pre-defined percentage of other performance metrics.

11. The computer-program product according to claim 1, wherein determining if the remainder of the plurality of hyperparameter search points satisfy the termination condition in (G) includes:
determining that the remainder of the plurality of hyperparameter search points satisfies the termination condition when the remainder of the plurality of hyperparameter search points do not include more than one hyperparameter search point, and
determining that the remainder of the plurality of hyperparameter search points does not satisfy the termination condition when the remainder of the plurality of hyperparameter search points include more than one hyperparameter search point.

12. The computer-program product according to claim 1, wherein:
repeating (B)-(G) for the remainder of the plurality of hyperparameter search points until the termination condition is satisfied includes repeating (B)-(G) until the remainder of the plurality of hyperparameter search points includes one remaining hyperparameter search point, and
the at least one hyperparameter search point outputted in (I) corresponds to the one remaining hyperparameter search point.

13. The computer-program product according to claim 1, wherein:
a subset of the plurality of hyperparameter search points remains in the plurality of hyperparameter search points after removing the one or more underperforming hyperparameter search points in (F), and repeating (E) and (F) of (B)-(G) for the remainder of the plurality of hyperparameter search points at least includes:
- transmitting a subset of the plurality of performance metrics that measure the performance of machine learning models that were trained on the subset of the plurality of hyperparameter search points for the target number of epochs increased by (H), and
- removing, by the controller node, one or more second underperforming hyperparameter search points from the subset of the plurality of hyperparameter search points according to the pre-defined performance metric ranking criterion associated with the subset of the plurality of performance metrics.

14. The computer-program product according to claim 1, wherein:
repeating (B)-(G) for the remainder of the plurality of hyperparameter search points at least includes repeating (B)-(G) an additional time,
removing the one or more underperforming hyperparameter search points during the additional time includes removing one or more additional underperforming hyperparameter search points, and
repeating (G) of (B)-(G) for the additional time includes:
- determining, by the controller node, if the remainder of the plurality of hyperparameter search points satisfy the termination condition after removing the one or more additional underperforming hyperparameter search points from the remainder of the plurality of hyperparameter search points in (F) of the additional time.

15. A computer-implemented method comprising:
(A) selecting, by a controller node, a plurality of hyperparameter search points from a hyperparameter search space;
(B) assigning, by the controller node, the plurality of hyperparameter search points to a plurality of model trainers of one or more worker nodes;
(C) concurrently training, via the plurality of model trainers, a plurality of machine learning models for a target number of epochs using the plurality of hyperparameter search points assigned to the plurality of model trainers;
(D) computing, via the plurality of model trainers, a plurality of performance metrics that measure a performance of the plurality of machine learning models during the target number of epochs;
(E) transmitting, by the one or more worker nodes, the plurality of performance metrics to the controller node;
(F) removing, by the controller node, one or more underperforming hyperparameter search points from the plurality of hyperparameter search points according to a pre-defined performance metric ranking criterion associated with the plurality of performance metrics;
(G) determining, by the controller node, if a remainder of the plurality of hyperparameter search points satisfy a termination condition after removing the one or more underperforming hyperparameter search points in (F);
(H) based upon determining that the plurality of hyperparameter search points does not satisfy the termination condition, increasing the target number of epochs and repeating (B)-(G) for the remainder of the plurality of hyperparameter search points until the termination condition is satisfied; and
(I) based upon determining that the remainder of the plurality of hyperparameter search points satisfy the termination condition, outputting at least one hyperparameter search point from the remainder of the plurality of hyperparameter search points as an optimal configuration for a plurality of hyperparameters.

16. The computer-implemented method according to claim 15, wherein:
a first respective hyperparameter search point is assigned to a first model trainer, and a second respective hyperparameter search point is assigned to a second model trainer, and
concurrently training the plurality of machine learning models for the target number of epochs includes concurrently:
- training, via the first model trainer, a first machine learning model for the target number of epochs using hyperparameter values associated with the first respective hyperparameter search point; and
- training, via the second model trainer, a second machine learning model for the target number of epochs using hyperparameter values associated with the second respective hyperparameter search point.

17. The computer-implemented method according to claim 15, wherein:
a first respective hyperparameter search point and a second respective hyperparameter search point remain in the plurality of hyperparameter search points after removing the one or more underperforming hyperparameter search points in (F), and
repeating (C) of (B)-(G) for the remainder of the plurality of hyperparameter search points at least includes concurrently:
- resuming, at a first model trainer, training of a machine learning model trained on the first respective hyperparameter search point for the target number of epochs increased by (H), and
- resuming, at a second model trainer, training of a machine learning model trained on the second respective hyperparameter search point for the target number of epochs increased by (H).

18. The computer-implemented method according to claim 15, wherein:
concurrently training the plurality of machine learning models for the target number of epochs in (C) includes concurrently training the plurality of machine learning models for a first number of epochs,
increasing the target number of epochs in (F) includes increasing the target number of epochs from the first number of epochs to a second number of epochs, and
repeating (C) of (B)-(G) for the remainder of the plurality of hyperparameter search points at least includes:
- concurrently training, via the plurality of model trainers, machine learning models associated with the remainder of the plurality of hyperparameter search points for the second number of epochs.

19. The computer-implemented method according to claim 15, wherein:
a first respective hyperparameter search point remains and a second respective hyperparameter search point does not remain in the plurality of hyperparameter search points after removing the one or more underperforming hyperparameter search points in (F), and
repeating (C) of (B)-(G) for the remainder of the plurality of hyperparameter search points at least includes concurrently:
- resuming, at a first model trainer, training of a machine learning model trained on the first respective hyperparameter search point for the target number of epochs increased by (H), and forgoing resuming, at a second model trainer, training of a machine learning model trained on the second respective hyperparameter search point for the target number of epochs increased by (H).

20. The computer-implemented method according to claim 15, wherein:
the plurality of performance metrics computed in (D) includes a respective performance metric that measures the performance of a machine learning model trained on a first respective hyperparameter search point for the target number of epochs,
the first respective hyperparameter search point remains in the plurality of hyperparameter search points after removing the one or more underperforming hyperparameter search points in (F), and
repeating (D) of (B)-(G) for the remainder of the plurality of hyperparameter search points at least includes:
re-computing the respective performance metric to measure the performance of the machine learning model trained on the first respective hyperparameter search point for the target number of epochs increased by (H).

21. The computer-implemented method according to claim 15, wherein:
transmitting the plurality of performance metrics to the controller node in (E) includes transmitting a first respective performance metric that measures the performance of a machine learning model trained on a first respective hyperparameter search point for the target number of epochs,
the first respective hyperparameter search point remains in the plurality of hyperparameter search points after removing the one or more underperforming hyperparameter search points in (F), and
repeating (E) of (B)-(G) for the remainder of the plurality of hyperparameter search points at least includes transmitting an update to the first respective performance metric that measures the performance of the machine learning model trained on the first respective hyperparameter search point for the target number of epochs increased by (H).

22. The computer-implemented method according to claim 15, wherein:
a respective performance metric of the plurality of performance metrics measures the performance of a machine learning model trained by a respective model trainer, and
removing the one or more underperforming hyperparameter search points from the plurality of hyperparameter search points according to the pre-defined performance metric ranking criterion includes:
determining if the respective performance metric exceeds a minimum percentile threshold of the pre-defined performance metric ranking criterion; and
if the determining determines that respective performance metric does not exceed the minimum percentile threshold of the pre-defined performance metric ranking criterion:
identifying a hyperparameter search point assigned to the respective model trainer that trained the machine learning model as an underperforming hyperparameter search point; and
removing the hyperparameter search point from the plurality of hyperparameter search points.

23. A computer-implemented system comprising:
one or more processors;
a memory; and
a computer-readable medium operably coupled to the one or more processors, the computer-readable medium having computer-readable instructions stored thereon that, when executed by the one or more processors, cause a computing device to perform operations comprising:
(A) selecting, by a controller node, a plurality of hyperparameter search points from a hyperparameter search space;
(B) assigning, by the controller node, the plurality of hyperparameter search points to a plurality of model trainers of one or more worker nodes;
(C) concurrently training, via the plurality of model trainers, a plurality of machine learning models for a target number of epochs using the plurality of hyperparameter search points assigned to the plurality of model trainers;
(D) computing, via the plurality of model trainers, a plurality of performance metrics that measure a performance of the plurality of machine learning models during the target number of epochs;
(E) transmitting, by the one or more worker nodes, the plurality of performance metrics to the controller node;
(F) removing, by the controller node, one or more underperforming hyperparameter search points from the plurality of hyperparameter search points according to a pre-defined performance metric ranking criterion associated with the plurality of performance metrics;
(G) determining, by the controller node, if a remainder of the plurality of hyperparameter search points satisfy a termination condition after removing the one or more underperforming hyperparameter search points in (F);
(H) based upon determining that the plurality of hyperparameter search points does not satisfy the termination condition, increasing the target number of epochs and repeating (B)-(G) for the remainder of the plurality of hyperparameter search points until the termination condition is satisfied; and
(I) based upon determining that the remainder of the plurality of hyperparameter search points satisfy the termination condition, outputting at least one hyperparameter search point from the remainder of the plurality of hyperparameter search points as an optimal configuration for a plurality of hyperparameters.

24. The computer-implemented system according to claim 23, wherein:
a first respective hyperparameter search point is assigned to a first model trainer, and a second respective hyperparameter search point is assigned to a second model trainer, and
concurrently training the plurality of machine learning models for the target number of epochs includes concurrently:
training, via the first model trainer, a first machine learning model for the target number of epochs using hyperparameter values associated with the first respective hyperparameter search point; and
training, via the second model trainer, a second machine learning model for the target number of epochs using hyperparameter values associated with the second respective hyperparameter search point.

25. The computer-implemented system according to claim 23, wherein:
  a first respective hyperparameter search point and a second respective hyperparameter search point remain in the plurality of hyperparameter search points after removing the one or more underperforming hyperparameter search points in (F), and
  repeating (C) of (B)-(G) for the remainder of the plurality of hyperparameter search points at least includes concurrently:
    resuming, at a first model trainer, training of a machine learning model trained on the first respective hyperparameter search point for the target number of epochs increased by (H), and
    resuming, at a second model trainer, training of a machine learning model trained on the second respective hyperparameter search point for the target number of epochs increased by (H).

26. The computer-implemented system according to claim 23, wherein:
  concurrently training the plurality of machine learning models for the target number of epochs in (C) includes concurrently training the plurality of machine learning models for a first number of epochs,
  increasing the target number of epochs in (F) includes increasing the target number of epochs from the first number of epochs to a second number of epochs, and
  repeating (C) of (B)-(G) for the remainder of the plurality of hyperparameter search points at least includes:
    concurrently training, via the plurality of model trainers, machine learning models associated with the remainder of the plurality of hyperparameter search points for the second number of epochs.

27. The computer-implemented system according to claim 23, wherein:
  a first respective hyperparameter search point remains and a second respective hyperparameter search point does not remain in the plurality of hyperparameter search points after removing the one or more underperforming hyperparameter search points in (F), and
  repeating (C) of (B)-(G) for the remainder of the plurality of hyperparameter search points at least includes concurrently:
    resuming, at a first model trainer, training of a machine learning model trained on the first respective hyperparameter search point for the target number of epochs increased by (H), and
    forgoing resuming, at a second model trainer, training of a machine learning model trained on the second respective hyperparameter search point for the target number of epochs increased by (H).

28. The computer-implemented system according to claim 23, wherein:
  the plurality of performance metrics computed in (D) includes a respective performance metric that measures the performance of a machine learning model trained on a first respective hyperparameter search point for the target number of epochs,
  the first respective hyperparameter search point remains in the plurality of hyperparameter search points after removing the one or more underperforming hyperparameter search points in (F), and
  repeating (D) of (B)-(G) for the remainder of the plurality of hyperparameter search points at least includes:
    re-computing the respective performance metric to measure the performance of the machine learning model trained on the first respective hyperparameter search point for the target number of epochs increased by (H).

29. The computer-implemented system according to claim 23, wherein:
  transmitting the plurality of performance metrics to the controller node in (E) includes transmitting a first respective performance metric that measures the performance of a machine learning model trained on a first respective hyperparameter search point for the target number of epochs,
  the first respective hyperparameter search point remains in the plurality of hyperparameter search points after removing the one or more underperforming hyperparameter search points in (F), and
  repeating (E) of (B)-(G) for the remainder of the plurality of hyperparameter search points at least includes transmitting an update to the first respective performance metric that measures the performance of the machine learning model trained on the first respective hyperparameter search point for the target number of epochs increased by (H).

30. An apparatus comprising at least one processor and a storage to store instructions that, when executed by the at least one processor, cause the at least one processor to perform operations comprising:
  (A) selecting, by a controller node, a plurality of hyperparameter search points from a hyperparameter search space;
  (B) instructing, by the controller node, one or more worker nodes to concurrently train a plurality of machine learning models for a target number of epochs using the plurality of hyperparameter search points;
  (C) receiving, from the one or more worker nodes, a plurality of performance metrics that measure a performance of the plurality of machine learning models during the target number of epochs;
  (D) removing, by the controller node, one or more underperforming hyperparameter search points from the plurality of hyperparameter search points according to a pre-defined performance metric ranking criterion associated with the plurality of performance metrics;
  (E) determining, by the controller node, if a remainder of the plurality of hyperparameter search points satisfy a termination condition after removing the one or more underperforming hyperparameter search points in (F);
  (H) based upon determining that the plurality of hyperparameter search points does not satisfy the termination condition, increasing the target number of epochs and repeating (B)-(E) for the remainder of the plurality of hyperparameter search points until the termination condition is satisfied; and
  (I) based upon determining that the remainder of the plurality of hyperparameter search points satisfy the termination condition, outputting at least one hyperparameter search point from the remainder of the plurality of hyperparameter search points as an optimal configuration for a plurality of hyperparameters.

* * * * *